(12) United States Patent
Hotta et al.

(10) Patent No.: US 9,191,197 B2
(45) Date of Patent: Nov. 17, 2015

(54) AES ENCRYPTION/DECRYPTION CIRCUIT

(75) Inventors: Hirohisa Hotta, Kawasaki (JP); Akihiko Yushiya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1218 days.

(21) Appl. No.: 12/236,905

(22) Filed: Sep. 24, 2008

(65) Prior Publication Data
US 2009/0097639 A1 Apr. 16, 2009

(30) Foreign Application Priority Data

Oct. 10, 2007 (JP) ................................. 2007-264967
Sep. 11, 2008 (JP) ................................. 2008-233094

(51) Int. Cl.
*H04L 9/06* (2006.01)
*G09C 1/00* (2006.01)

(52) U.S. Cl.
CPC ................ *H04L 9/0631* (2013.01); *G09C 1/00* (2013.01); *H04L 2209/12* (2013.01); *H04L 2209/24* (2013.01)

(58) Field of Classification Search
CPC .............. H04L 9/0631; H04L 2209/24; H04L 2209/12
USPC ............ 380/28, 29, 37, 42, 46; 713/181, 189, 713/190, 192
See application file for complete search history.

(56) References Cited

U.S. PATENT DOCUMENTS

| | | | | |
|---|---|---|---|---|
| 6,625,572 B1 * | 9/2003 | Zemlyak et al. | ................ | 703/19 |
| 7,158,638 B2 * | 1/2007 | Okada et al. | .................... | 380/37 |
| 7,295,671 B2 | 11/2007 | Snell | | |
| 7,403,620 B2 * | 7/2008 | Liardet et al. | ................. | 380/259 |
| 7,421,076 B2 * | 9/2008 | Stein et al. | ...................... | 380/42 |
| 7,688,974 B2 * | 3/2010 | Lee et al. | ........................ | 380/37 |
| 7,801,301 B2 * | 9/2010 | Macchetti et al. | ............. | 380/29 |
| 7,900,055 B2 * | 3/2011 | Henry et al. | .................. | 713/189 |
| 7,925,891 B2 * | 4/2011 | Crispin et al. | ................ | 713/190 |
| 7,965,836 B2 * | 6/2011 | Ahn et al. | ........................ | 380/28 |
| 8,036,377 B1 * | 10/2011 | Poo et al. | ........................ | 380/28 |

(Continued)

FOREIGN PATENT DOCUMENTS

JP  2005-527853 A  9/2005

OTHER PUBLICATIONS

Hämäläinen, Panu, et al. "Design and implementation of low-area and low-power AES encryption hardware core." Digital System Design: Architectures, Methods and Tools, 2006. DSD 2006. 9th Euromicro Conference on. IEEE, 2006.(pp. 577-583).*

(Continued)

*Primary Examiner* — Kari Schmidt
(74) *Attorney, Agent, or Firm* — Fitzpatrick, Cella, Harper & Scinto

(57) ABSTRACT

This invention makes the number of cycles required for AES encryption or decryption by hardware smaller than before by reducing the difference among the summation of the signal processing time for each sub-block transformations in each clock cycle period. To do this, an encryption/decryption circuit includes a first AddRoundKey Transformation module, a second AddRoundKey Transformation module, a ShiftRows Transformation module, a SubBytes Transformation module, a MixColumns Transformation module, and a data holding unit, wherein in a cycle of encryption, the first AddRoundKey Transformation module and the second AddRoundKey Transformation module are executed using different Round Keys.

8 Claims, 73 Drawing Sheets

| NUMBER OF CYCLES | PRIOR ART | | FIRST EMBODIMENT | |
|---|---|---|---|---|
| | PROCESSES TO BE EXECUTED | ROUND KEYS TO BE USED | PROCESSES TO BE EXECUTED | ROUND KEYS TO BE USED |
| 0 | · AddRoundKey | · 0TH ROUND KEY (wkey$_0$) | · AddRoundKey<br>· SubBytes<br>· ShiftRows<br>· MixColumns | · 0TH ROUND KEY (wkey$_0$) |
| 1 | · SubBytes<br>· ShiftRows<br>· MixColumns<br>· AddRoundKey | · FIRST ROUND KEY (wkey$_1$) | · AddRoundKey<br>· SubBytes<br>· ShiftRows<br>· MixColumns | · FIRST ROUND KEY (wkey$_1$) |
| 8 | · SubBytes<br>· ShiftRows<br>· MixColumns<br>· AddRoundKey | · EIGHTH ROUND KEY (wkey$_8$) | · AddRoundKey<br>· SubBytes<br>· ShiftRows<br>· MixColumns | · EIGHTH ROUND KEY (wkey$_8$) |
| 9 | · SubBytes<br>· ShiftRows<br>· MixColumns<br>· AddRoundKey | · NINTH ROUND KEY (wkey$_9$) | · AddRoundKey<br>· SubBytes<br>· ShiftRows<br>· AddRoundKey | · NINTH ROUND KEY (wkey$_9$)<br>· 10TH ROUND KEY (wkey$_{10}$) |
| 10 | · SubBytes<br>· ShiftRows<br>· AddRoundKey | · 10TH ROUND KEY (wkey$_{10}$) | | |

(56) References Cited

U.S. PATENT DOCUMENTS

| | | | |
|---|---|---|---|
| 2001/0024502 A1* | 9/2001 | Ohkuma et al. | 380/46 |
| 2002/0191784 A1 | 12/2002 | Yup | |
| 2003/0223580 A1 | 12/2003 | Snell | |
| 2006/0126835 A1* | 6/2006 | Kim et al. | 380/44 |
| 2006/0198524 A1 | 9/2006 | Sexton | |
| 2010/0057823 A1* | 3/2010 | Filseth et al. | 708/492 |

OTHER PUBLICATIONS

Standaert, François-Xavier, et al. "A methodology to implement block ciphers in reconfigurable hardware and its application to fast and compact AES Rijndael." Proceedings of the 2003 ACM/SIGDA eleventh international symposium on Field programmable gate arrays. ACM, 2003. (pp. 216-224).*

OL_AES, AES Core Family, Rev 1.5 (http://www.ocean-logic.com/pub/OL_AES.pdf.

Official Action, dated Oct. 12, 2012, issued by the Japanese Patent Office, in Japanese Patent Application No. 2008-233094.

Daemen J. et al., "Specification of Rijndael", The Design of Rijndael, AES—The Advanced Encryption Standard, Springer, pp. 31-51, sections 3.7.2 and 3.7.3 and Figure 3.12, Jan. 1, 2002.

European Search Report issued in Corresponding European Application No. 08017194.5 dated Sep. 30, 2014.

* cited by examiner

FIG. 1

| NUMBER OF CYCLES | PRIOR ART | | FIRST EMBODIMENT | |
|---|---|---|---|---|
| | PROCESSES TO BE EXECUTED | ROUND KEYS TO BE USED | PROCESSES TO BE EXECUTED | ROUND KEYS TO BE USED |
| 0 | · AddRoundKey | · 0TH ROUND KEY (wkey$_0$) | · AddRoundKey<br>· SubBytes<br>· ShiftRows<br>· MixColumns | · 0TH ROUND KEY (wkey$_0$) |
| 1 | · SubBytes<br>· ShiftRows<br>· MixColumns<br>· AddRoundKey | · FIRST ROUND KEY (wkey$_1$) | · AddRoundKey<br>· SubBytes<br>· ShiftRows<br>· MixColumns | · FIRST ROUND KEY (wkey$_1$) |
| ⋯ | | | | |
| 8 | · SubBytes<br>· ShiftRows<br>· MixColumns<br>· AddRoundKey | · EIGHTH ROUND KEY (wkey$_8$) | · AddRoundKey<br>· SubBytes<br>· ShiftRows<br>· MixColumns | · EIGHTH ROUND KEY (wkey$_8$) |
| 9 | · SubBytes<br>· ShiftRows<br>· MixColumns<br>· AddRoundKey | · NINTH ROUND KEY (wkey$_9$) | · AddRoundKey<br>· SubBytes<br>· ShiftRows<br>· AddRoundKey | · NINTH ROUND KEY (wkey$_9$)<br>· 10TH ROUND KEY (wkey$_{10}$) |
| 10 | · SubBytes<br>· ShiftRows<br>· AddRoundKey | · 10TH ROUND KEY (wkey$_{10}$) | | |

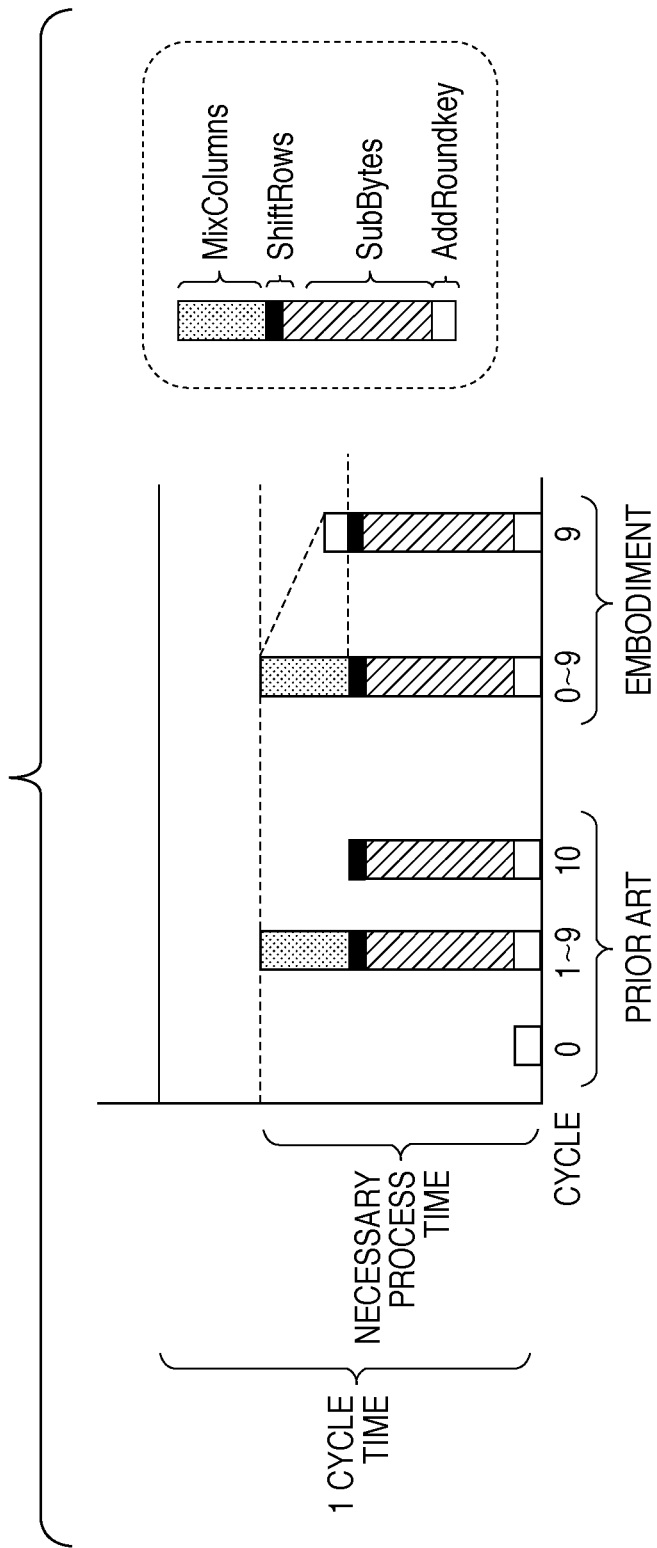

FIG. 3

| NUMBER OF CYCLES | PRIOR ART | | FIRST EMBODIMENT | |
|---|---|---|---|---|
| | PROCESSES TO BE EXECUTED | ROUND KEYS TO BE USED | PROCESSES TO BE EXECUTED | ROUND KEYS TO BE USED |
| 0 | · AddRoundKey | · 10TH ROUND KEY (wkey$_{10}$) | · AddRoundKey<br>· InvShiftRows<br>· InvSubBytes<br>· AddRoundKey | · 10TH ROUND KEY (wkey$_{10}$)<br>· NINTH ROUND KEY (wkey$_9$) |
| 1 | · InvShiftRows<br>· InvSubBytes<br>· AddRoundKey<br>· InvMixColumns | · NINTH ROUND KEY (wkey$_9$) | · InvMixColumns<br>· InvShiftRows<br>· InvSubBytes<br>· AddRoundKey | · EIGHTH ROUND KEY (wkey$_8$) |
| | | | | |
| 8 | · InvShiftRows<br>· InvSubBytes<br>· AddRoundKey<br>· InvMixColumns | · SECOND ROUND KEY (wkey$_2$) | · InvMixColumns<br>· InvShiftRows<br>· InvSubBytes<br>· AddRoundKey | · FIRST ROUND KEY (wkey$_1$) |
| 9 | · InvShiftRows<br>· InvSubBytes<br>· AddRoundKey<br>· InvMixColumns | · FIRST ROUND KEY (wkey$_1$) | · InvMixColumns<br>· InvShiftRows<br>· InvSubBytes<br>· AddRoundKey | · 0TH ROUND KEY (wkey$_0$) |
| 10 | · InvShiftRows<br>· InvSubBytes<br>· | · 0TH ROUND KEY (wkey$_0$) | | |

FIG. 11

| NUMBER OF CYCLES | ENCRYPTION PROCESSING | | DECRYPTION PROCESSING | |
|---|---|---|---|---|
| | PROCESSES TO BE EXECUTED | ROUND KEYS TO BE USED | PROCESSES TO BE EXECUTED | ROUND KEYS TO BE USED |
| 0 | · AddRoundKey<br>· SubBytes<br>· ShiftRows<br>· MixColumns<br>· AddRoundKey | · 0TH ROUND KEY ($wkey_0$)<br>· FIRST ROUND KEY ($wkey_1$) | · AddRoundKey<br>· InvShiftRows<br>· InvSubBytes | · 10TH ROUND KEY ($wkey_{10}$) |
| 1 | · SubBytes<br>· ShiftRows<br>· MixColumns<br>· AddRoundKey | · SECOND ROUND KEY ($wkey_2$) | · AddRoundKey<br>· InvMixColumns<br>· InvShiftRows<br>· InvSubBytes | · NINTH ROUND KEY ($wkey_9$) |
| ... | ... | ... | ... | ... |
| 8 | · SubBytes<br>· ShiftRows<br>· MixColumns<br>· AddRoundKey | · NINTH ROUND KEY ($wkey_9$) | · AddRoundKey<br>· InvMixColumns<br>· InvShiftRows<br>· InvSubBytes | · SECOND ROUND KEY ($wkey_2$) |
| 9 | · SubBytes<br>· ShiftRows<br>· AddRoundKey | · 10TH ROUND KEY ($wkey_{10}$) | · AddRoundKey<br>· InvMixColumns<br>· InvShiftRows<br>· InvSubBytes<br>· AddRoundKey | · FIRST ROUND KEY ($wkey_1$)<br>· 0TH ROUND KEY ($wkey_0$) |

FIG. 20

| NUMBER OF CLOCK CYCLES FROM START OF PROCESSING | ENCRYPTION PROCESSING | | DECRYPTION PROCESSING | |
|---|---|---|---|---|
| | PROCESSES TO BE EXECUTED | ROUND KEYS TO BE USED | PROCESSES TO BE EXECUTED | ROUND KEYS TO BE USED |
| 0 | · AddRoundKey<br>· SubBytes<br>· ShiftRows | · 0TH ROUND KEY (wkey$_0$) | · AddRoundKey<br>· InvShiftRows<br>· InvSubBytes<br>· AddRoundKey<br>· InvMixColumns | · 10TH ROUND KEY (wkey$_{10}$)<br>· NINTH ROUND KEY (wkey$_9$) |
| 1 | · MixColumns<br>· AddRoundKey<br>· SubBytes<br>· ShiftRows | · FIRST ROUND KEY (wkey$_1$) | · InvShiftRows<br>· InvSubBytes<br>· AddRoundKey<br>· InvMixColumns | · EIGHTH ROUND KEY (wkey$_8$) |
| | | | | |
| 8 | · MixColumns<br>· AddRoundKey<br>· SubBytes<br>· ShiftRows | · EIGHTH ROUND KEY (wkey$_8$) | · InvShiftRows<br>· InvSubBytes<br>· AddRoundKey<br>· InvMixColumns | · FIRST ROUND KEY (wkey$_1$) |
| 9 | · MixColumns<br>· AddRoundKey<br>· SubBytes<br>· ShiftRows<br>· AddRoundKey | · NINTH ROUND KEY (wkey$_9$)<br>· 10TH ROUND KEY (wkey$_{10}$) | · InvShiftRows<br>· InvSubBytes<br>· AddRoundKey | · 0TH ROUND KEY (wkey$_0$) |

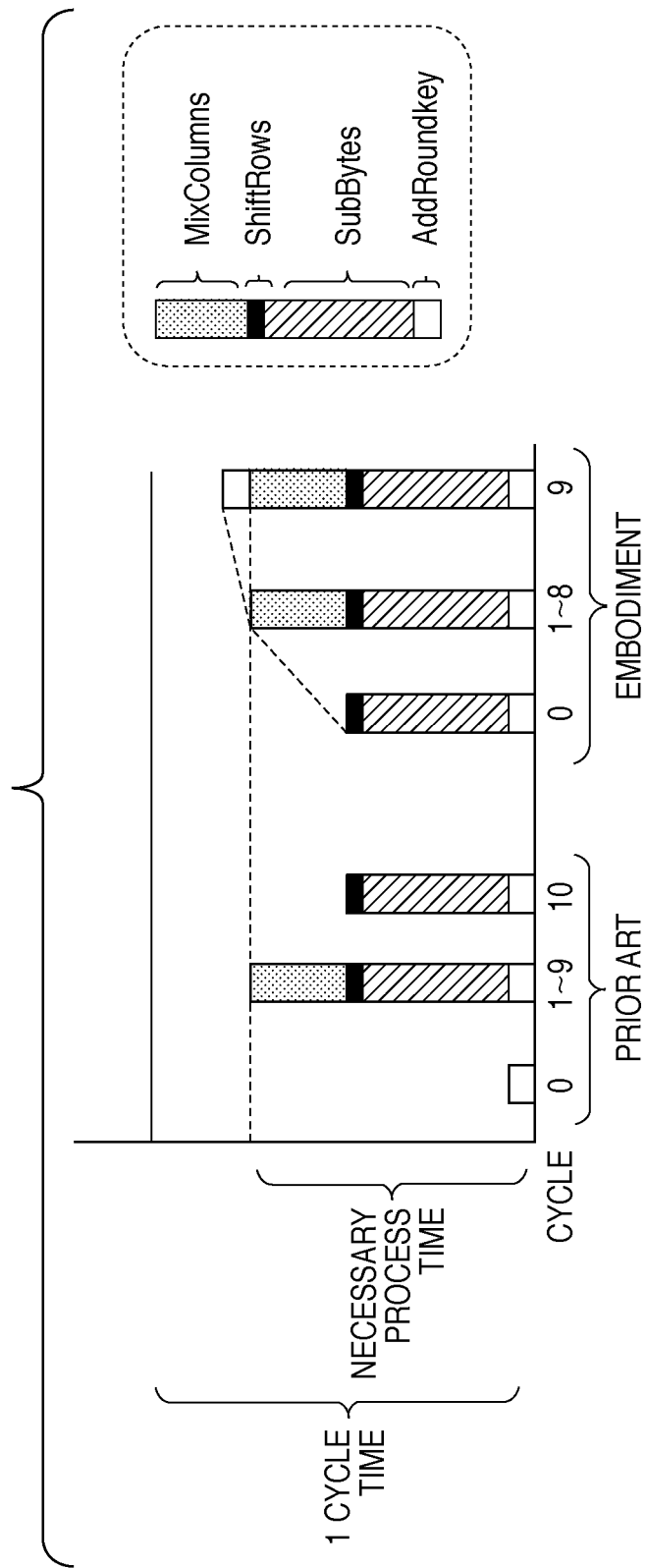

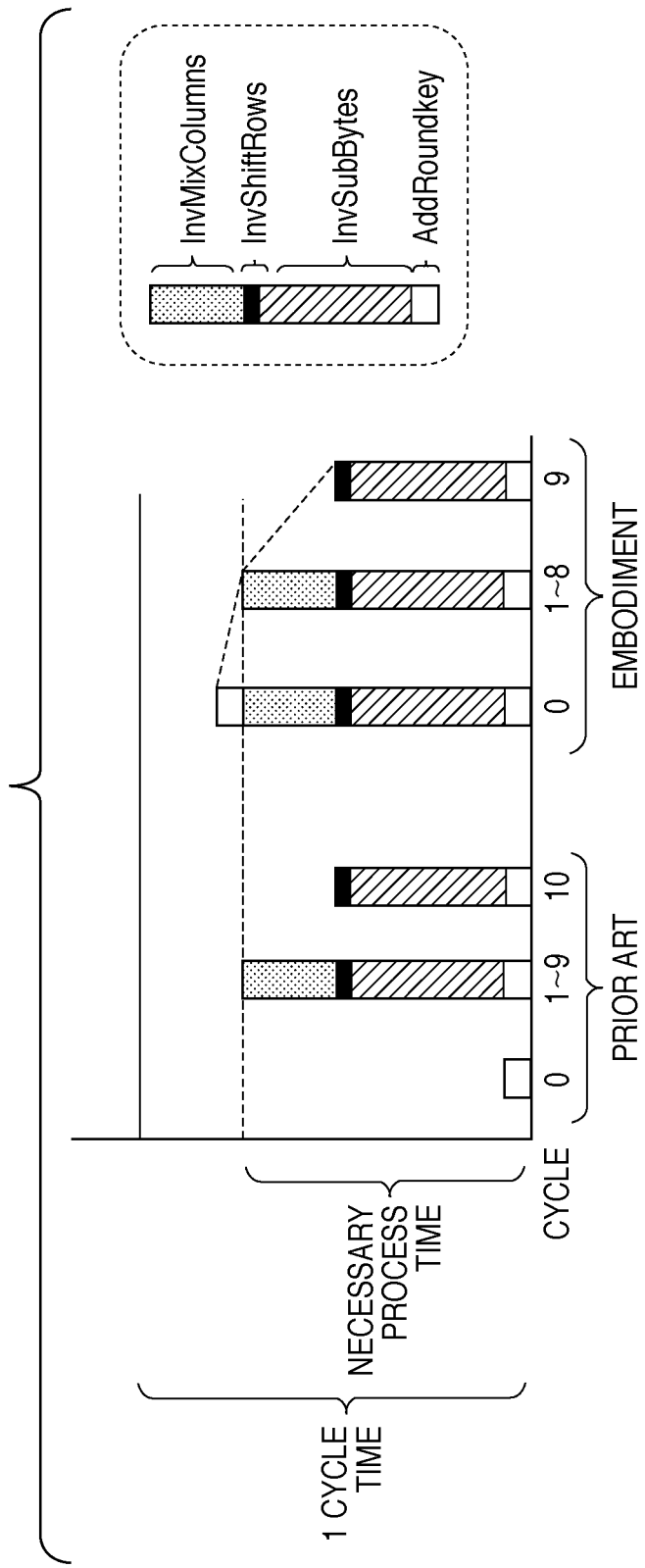

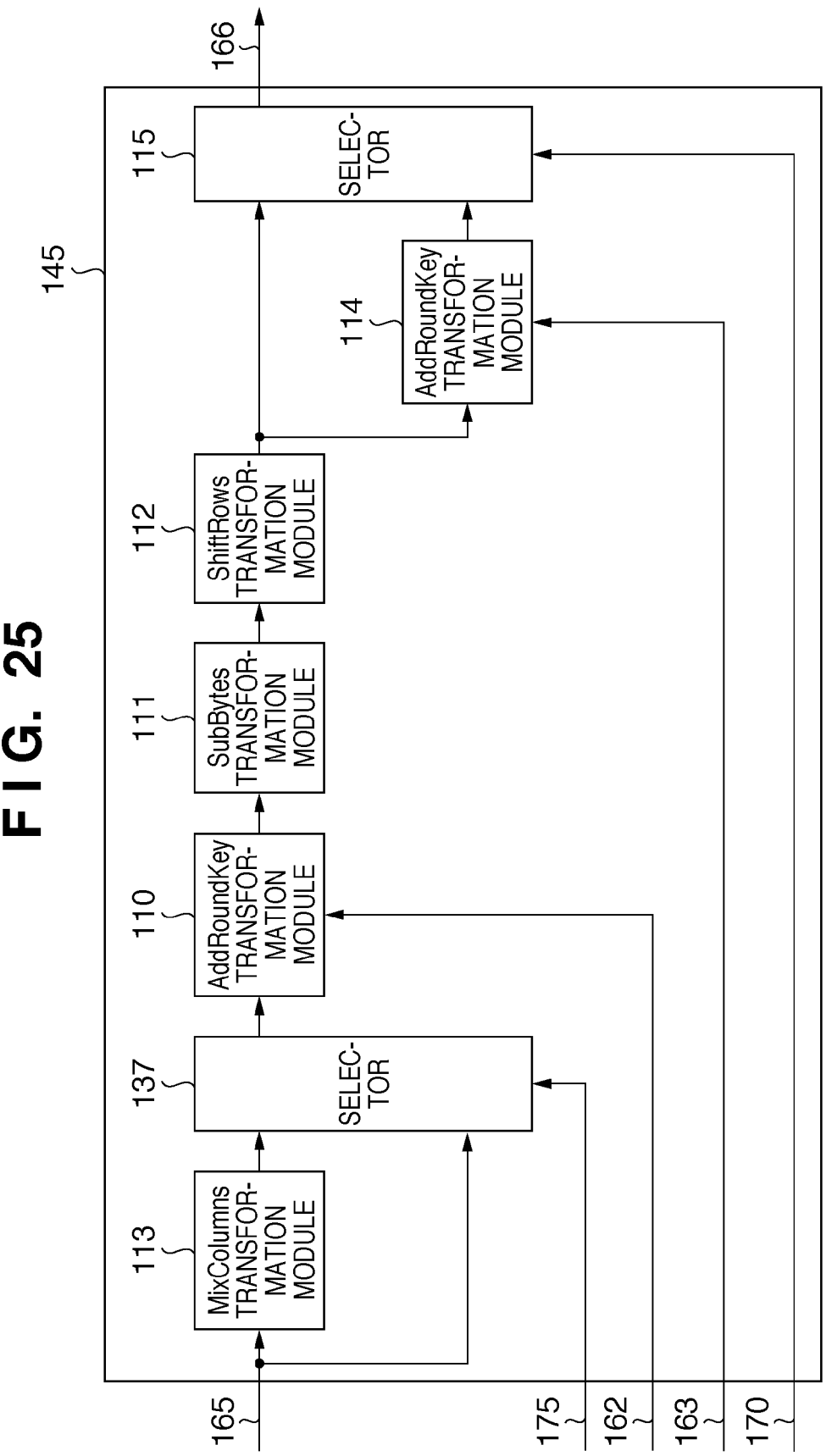
F I G. 25

F I G. 29

| NUMBER OF CYCLES | PRIOR ART | | FOURTH EMBODIMENT | |
|---|---|---|---|---|
| | PROCESSES TO BE EXECUTED | ROUND KEYS TO BE USED | PROCESSES TO BE EXECUTED | ROUND KEYS TO BE USED |
| 0 | · AddRoundKey | · 0TH ROUND KEY (wkey$_0$) | · AddRoundKey<br>· SubBytes<br>· ShiftRows<br>· MixColumns | · 0TH ROUND KEY (wkey$_0$) |
| 1 | · SubBytes<br>· ShiftRows<br>· MixColumns<br>· AddRoundKey | · FIRST ROUND KEY (wkey$_1$) | · AddRoundKey<br>· SubBytes<br>· ShiftRows<br>· MixColumns | · FIRST ROUND KEY (wkey$_1$) |
| ⋮ | | | | |
| 8 | · SubBytes<br>· ShiftRows<br>· MixColumns<br>· AddRoundKey | · EIGHTH ROUND KEY (wkey$_8$) | · AddRoundKey<br>· SubBytes<br>· ShiftRows<br>· MixColumns | · EIGHTH ROUND KEY (wkey$_8$) |
| 9 | · SubBytes<br>· ShiftRows<br>· MixColumns<br>· AddRoundKey | · NINTH ROUND KEY (wkey$_9$) | · AddRoundKey<br>· SubBytes<br>· ShiftRows<br>· AddRoundKey | · NINTH ROUND KEY (wkey$_9$)<br>· 10TH ROUND KEY (wkey$_{10}$) |
| 10 | · SubBytes<br>· ShiftRows<br>· AddRoundKey | · 10TH ROUND KEY (wkey$_{10}$) | | |

FIG. 30

| NUMBER OF CYCLES | PRIOR ART | | FOURTH EMBODIMENT | |
|---|---|---|---|---|
| | PROCESSES TO BE EXECUTED | ROUND KEYS TO BE USED | PROCESSES TO BE EXECUTED | ROUND KEYS TO BE USED |
| 0 | · AddRoundKey | · 10TH ROUND KEY ($wkey_{10}$) | · AddRoundKey<br>· InvSubBytes<br>· InvShiftRows<br>· InvMixColumns | · 10TH ROUND KEY ($wkey_{10}$) |
| 1 | · InvSubBytes<br>· InvShiftRows<br>· InvMixColumns<br>· AddRoundKey | · NINTH MODIFIED DECRYPTION KEY ($wkey_9'$) | · AddRoundKey<br>· InvSubBytes<br>· InvShiftRows<br>· InvMixColumns | · NINTH MODIFIED DECRYPTION KEY ($wkey_9'$) |
| 8 | · InvSubBytes<br>· InvShiftRows<br>· InvMixColumns<br>· AddRoundKey | · SECOND MODIFIED DECRYPTION KEY ($wkey_2'$) | · AddRoundKey<br>· InvSubBytes<br>· InvShiftRows<br>· InvMixColumns | · SECOND MODIFIED DECRYPTION KEY ($wkey_2'$) |
| 9 | · InvSubBytes<br>· InvShiftRows<br>· InvMixColumns<br>· AddRoundKey | · FIRST MODIFIED DECRYPTION KEY ($wkey_1'$) | · AddRoundKey<br>· InvSubBytes<br>· InvShiftRows<br>· AddRoundKey | · FIRST MODIFIED DECRYPTION KEY ($wkey_1'$)<br>· 0TH ROUND KEY ($wkey_0$) |
| 10 | · InvSubBytes<br>· InvShiftRows<br>· AddRoundKey | · 0TH ROUND KEY ($wkey_0$) | | |

FIG. 36

| NUMBER OF CYCLES | ENCRYPTION PROCESSING | | DECRYPTION PROCESSING | |
|---|---|---|---|---|
| | PROCESSES TO BE EXECUTED | ROUND KEYS TO BE USED | PROCESSES TO BE EXECUTED | ROUND KEYS TO BE USED |
| 0 | · AddRoundKey<br>· SubBytes<br>· ShiftRows<br>· MixColumns<br>· AddRoundKey | · 0TH ROUND KEY (wkey$_0$)<br>· FIRST ROUND KEY (wkey$_1$) | · AddRoundKey<br>· InvSubBytes<br>· InvShiftRows<br>· InvMixColumns<br>· AddRoundKey | · 10TH ROUND KEY (wkey$_{10}$)<br>· NINTH MODIFIED DECRYPTION KEY (wkey$_9$') |
| 1 | · SubBytes<br>· ShiftRows<br>· MixColumns<br>· AddRoundKey | · SECOND ROUND KEY (wkey$_2$) | · InvSubBytes<br>· InvShiftRows<br>· InvMixColumns<br>· AddRoundKey | · EIGHTH MODIFIED DECRYPTION KEY (wkey$_8$') |
| | | | | |
| 8 | · SubBytes<br>· ShiftRows<br>· MixColumns<br>· AddRoundKey | · NINTH ROUND KEY (wkey$_9$) | · InvSubBytes<br>· InvShiftRows<br>· InvMixColumns<br>· AddRoundKey | · FIRST MODIFIED DECRYPTION KEY (wkey$_1$') |
| 9 | · SubBytes<br>· ShiftRows<br>· AddRoundKey | · 10TH ROUND KEY (wkey$_{10}$) | · InvSubBytes<br>· InvShiftRows<br>· AddRoundKey | · 0TH ROUND KEY (wkey$_0$) |

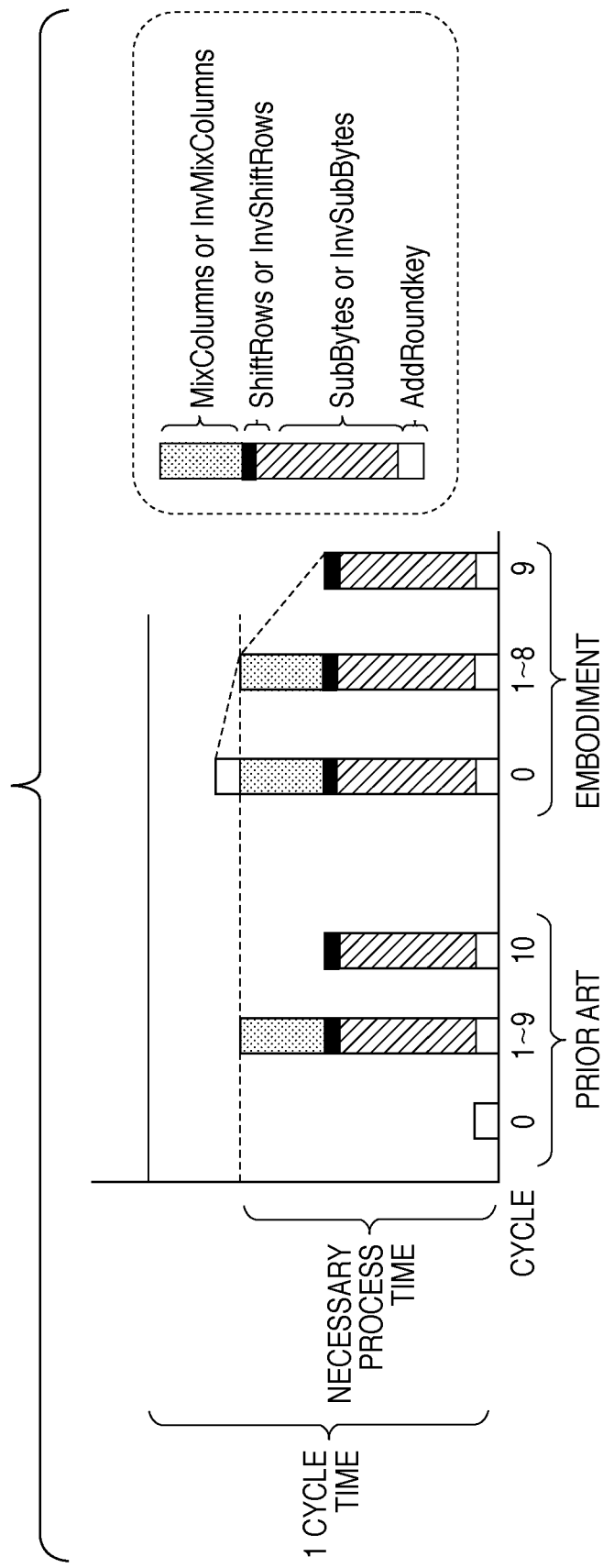

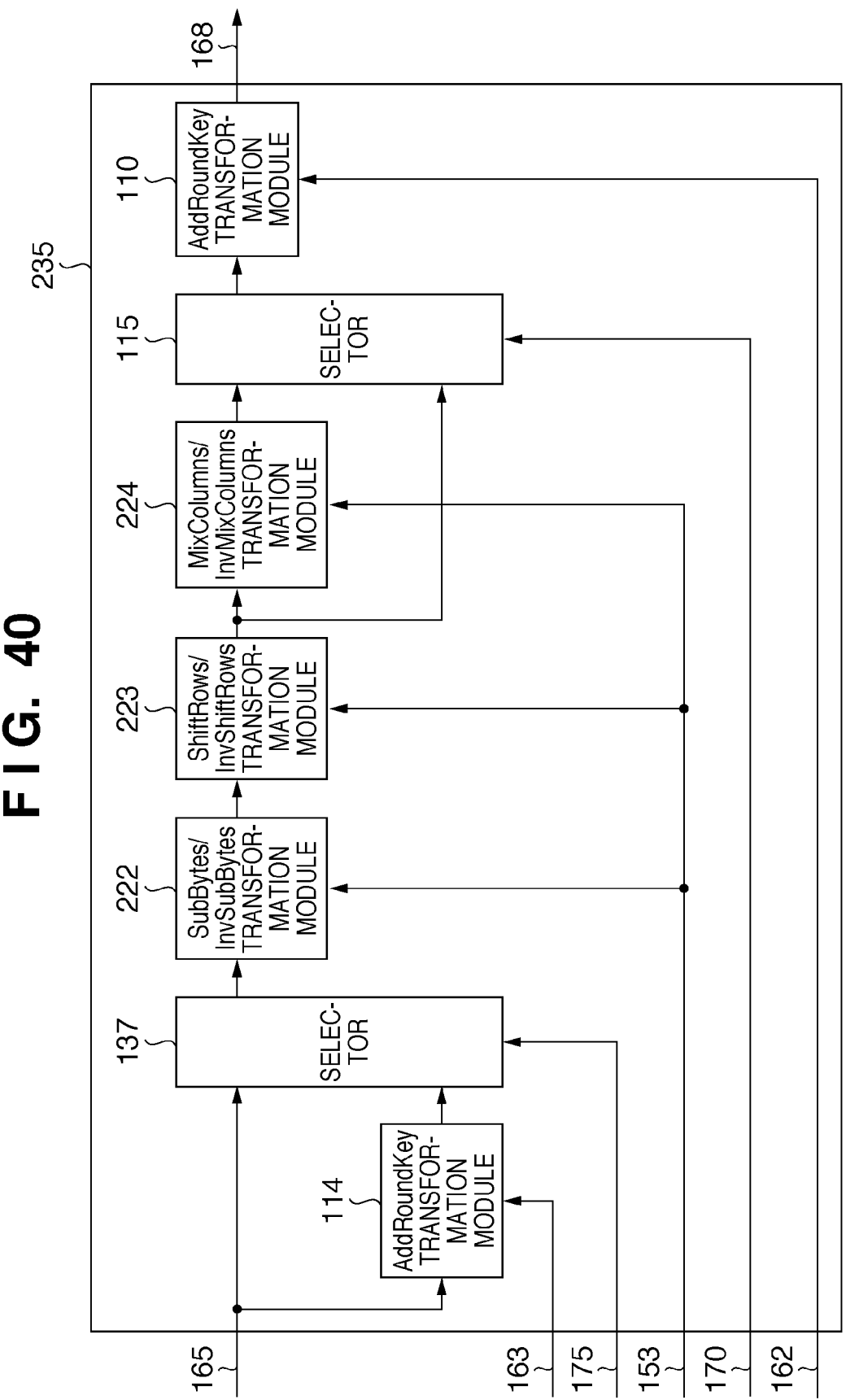
F I G. 40

FIG. 42

| NUMBER OF CYCLES | ENCRYPTION PROCESSING | | DECRYPTION PROCESSING | |
|---|---|---|---|---|
| | PROCESSES TO BE EXECUTED | ROUND KEYS TO BE USED | PROCESSES TO BE EXECUTED | ROUND KEYS TO BE USED |
| 0 | · AddRoundKey<br>· SubBytes<br>· ShiftRows<br>· MixColumns<br>· AddRoundKey | · 0TH ROUND KEY ($wkey_0$)<br>· FIRST ROUND KEY ($wkey_1$) | · AddRoundKey<br>· InvSubBytes<br>· InvShiftRows<br>· InvMixColumns<br>· AddRoundKey | · 10TH ROUND KEY ($wkey_{10}$)<br>· NINTH MODIFIED DECRYPTION KEY ($wkey_9'$) |
| 1 | · SubBytes<br>· ShiftRows<br>· MixColumns<br>· AddRoundKey | · SECOND ROUND KEY ($wkey_2$) | · InvSubBytes<br>· InvShiftRows<br>· InvMixColumns<br>· AddRoundKey | · EIGHTH MODIFIED DECRYPTION KEY ($wkey_8'$) |
| ⋮ | ⋮ | ⋮ | ⋮ | ⋮ |
| 8 | · SubBytes<br>· ShiftRows<br>· MixColumns<br>· AddRoundKey | · NINTH ROUND KEY ($wkey_9$) | · InvSubBytes<br>· InvShiftRows<br>· InvMixColumns<br>· AddRoundKey | · FIRST MODIFIED DECRYPTION KEY ($wkey_1'$) |
| 9 | · SubBytes<br>· ShiftRows<br>· AddRoundKey | · 10TH ROUND KEY ($wkey_{10}$) | · InvSubBytes<br>· InvShiftRows<br>· AddRoundKey | · 0TH ROUND KEY ($wkey_0$) |

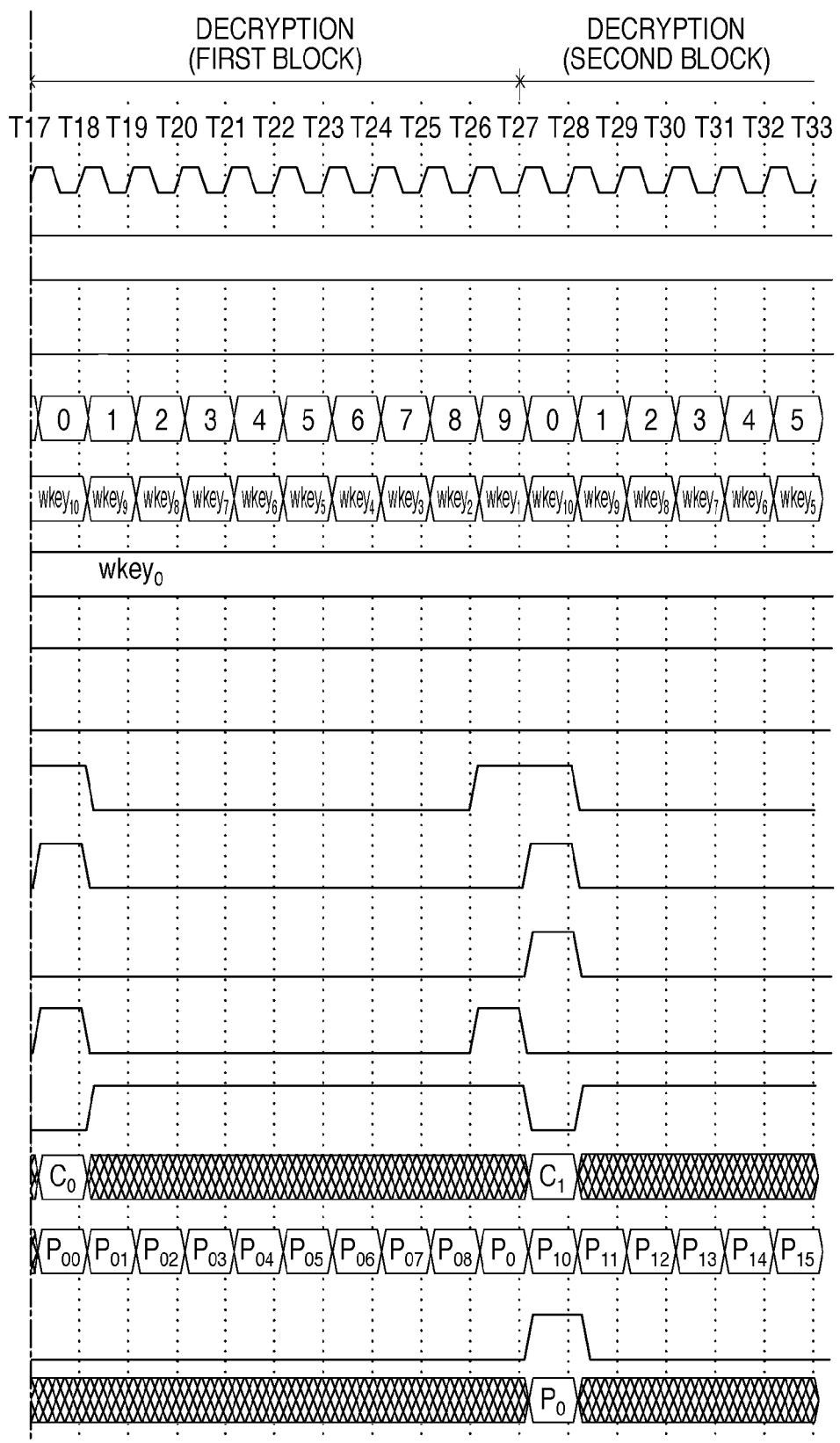
F I G. 47B

FIG. 48

| NUMBER OF CYCLES | ENCRYPTION PROCESSING | | SEVENTH EMBODIMENT | |
|---|---|---|---|---|
| | PROCESSES TO BE EXECUTED | ROUND KEYS TO BE USED | PROCESSES TO BE EXECUTED | ROUND KEYS TO BE USED |
| 0 | · AddRoundKey | · 0TH ROUND KEY (wkey$_0$) | · AddRoundKey<br>· SubBytes<br>· ShiftRows<br>· MixColumns<br>· AddRoundKey<br>· SubBytes<br>· ShiftRows<br>· MixColumns | · 0TH ROUND KEY (wkey$_0$)<br>· FIRST ROUND KEY (wkey$_1$) |
| 1 | · SubBytes<br>· ShiftRows<br>· MixColumns<br>· AddRoundKey<br>· SubBytes<br>· ShiftRows<br>· MixColumns<br>· AddRoundKey | · FIRST ROUND KEY (wkey$_1$)<br>· SECOND ROUND KEY (wkey$_2$) | · AddRoundKey<br>· SubBytes<br>· ShiftRows<br>· MixColumns<br>· AddRoundKey<br>· SubBytes<br>· ShiftRows<br>· MixColumns | · SECOND ROUND KEY (wkey$_2$)<br>· THIRD ROUND KEY (wkey$_3$) |
| 4 | · SubBytes<br>· ShiftRows<br>· MixColumns<br>· AddRoundKey<br>· SubBytes<br>· ShiftRows<br>· MixColumns<br>· AddRoundKey | · SEVENTH ROUND KEY (wkey$_7$)<br>· EIGHTH ROUND KEY (wkey$_8$) | · AddRoundKey<br>· SubBytes<br>· ShiftRows<br>· MixColumns<br>· AddRoundKey<br>· SubBytes<br>· ShiftRows<br>· AddRoundKey | · EIGHTH ROUND KEY (wkey$_8$)<br>· NINTH ROUND KEY (wkey$_9$)<br>· 10TH ROUND KEY (wkey$_{10}$) |
| 5 | · SubBytes<br>· ShiftRows<br>· MixColumns<br>· AddRoundKey<br>· SubBytes<br>· ShiftRows<br>· AddRoundKey | · NINTH ROUND KEY (wkey$_9$)<br>· 10TH ROUND KEY (wkey$_{10}$) | | |

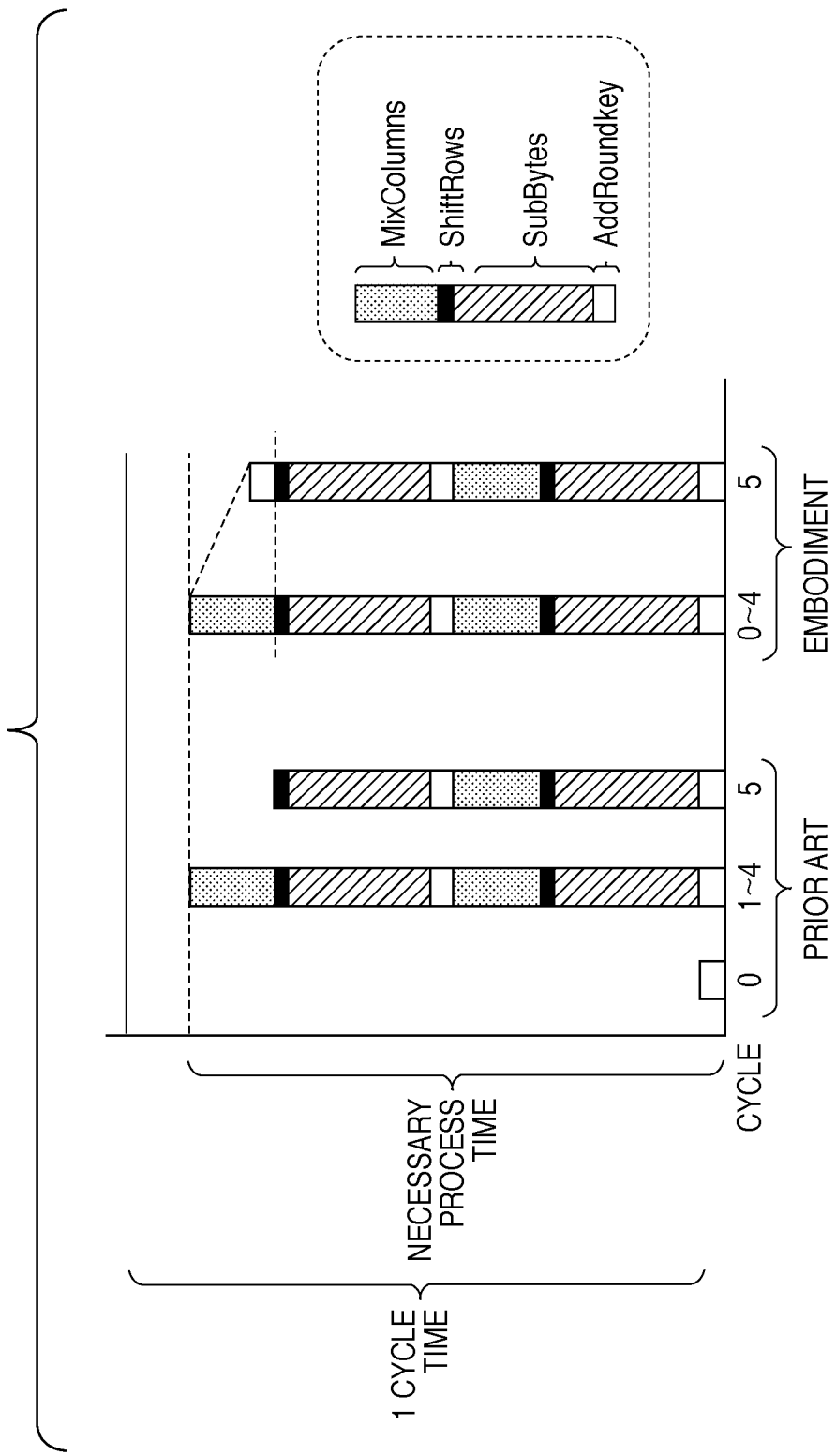

FIG. 50

| NUMBER OF CYCLES | ENCRYPTION PROCESSING | | SEVENTH EMBODIMENT | |
|---|---|---|---|---|
| | PROCESSES TO BE EXECUTED | ROUND KEYS TO BE USED | PROCESSES TO BE EXECUTED | ROUND KEYS TO BE USED |
| 0 | · AddRoundKey | · 10TH ROUND KEY (wkey$_{10}$) | · AddRoundKey<br>· InvShiftRows<br>· InvSubBytes<br>· AddRoundKey<br>· InvMixColumns<br>· InvShiftRows<br>· InvSubBytes<br>· AddRoundKey | · 10TH ROUND KEY (wkey$_{10}$)<br>· NINTH ROUND KEY (wkey$_9$)<br>· EIGHTH ROUND KEY (wkey$_8$) |
| 1 | · InvShiftRows<br>· InvSubBytes<br>· AddRoundKey<br>· InvMixColumns<br>· InvShiftRows<br>· InvSubBytes<br>· AddRoundKey<br>· InvMixColumns | · NINTH ROUND KEY (wkey$_9$)<br>· EIGHTH ROUND KEY (wkey$_8$) | · InvMixColumns<br>· InvShiftRows<br>· InvSubBytes<br>· AddRoundKey<br>· InvMixColumns<br>· InvShiftRows<br>· InvSubBytes<br>· AddRoundKey | · SEVENTH ROUND KEY (wkey$_7$)<br>· SIXTH ROUND KEY (wkey$_6$) |
| ⋯ | | | | |
| 4 | · InvShiftRows<br>· InvSubBytes<br>· AddRoundKey<br>· InvMixColumns<br>· InvShiftRows<br>· InvSubBytes<br>· AddRoundKey<br>· InvMixColumns | · THIRD ROUND KEY (wkey$_3$)<br>· SECOND ROUND KEY (wkey$_2$) | · InvMixColumns<br>· InvShiftRows<br>· InvSubBytes<br>· AddRoundKey<br>· InvMixColumns<br>· InvShiftRows<br>· InvSubBytes<br>· AddRoundKey | · FIRST ROUND KEY (wkey$_1$)<br>· 0TH ROUND KEY (wkey$_0$) |
| 5 | · InvShiftRows<br>· InvSubBytes<br>· AddRoundKey<br>· InvMixColumns<br>· InvShiftRows<br>· InvSubBytes<br>· AddRoundKey | · FIRST ROUND KEY (wkey$_1$)<br>· 0TH ROUND KEY (wkey$_0$) | | |

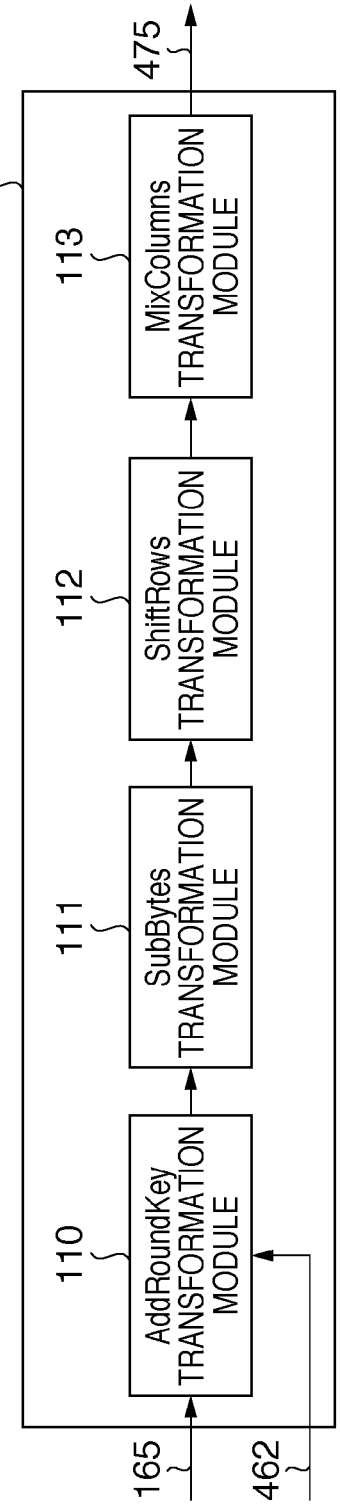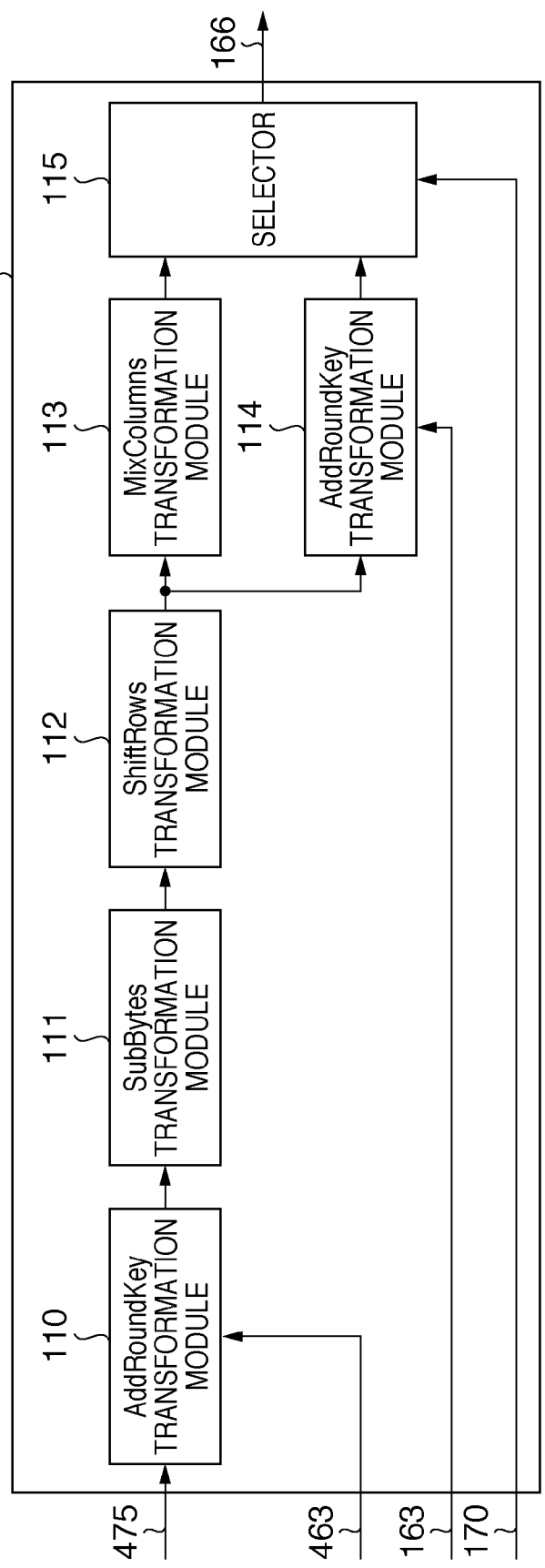

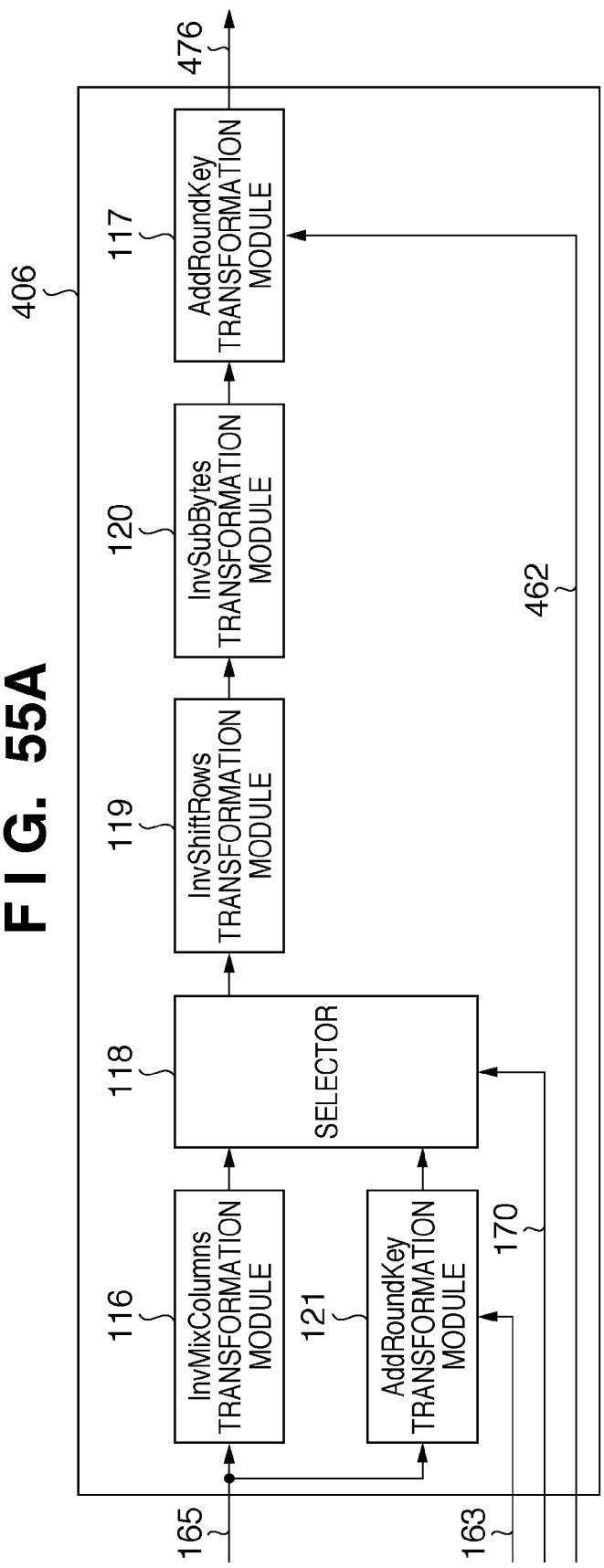
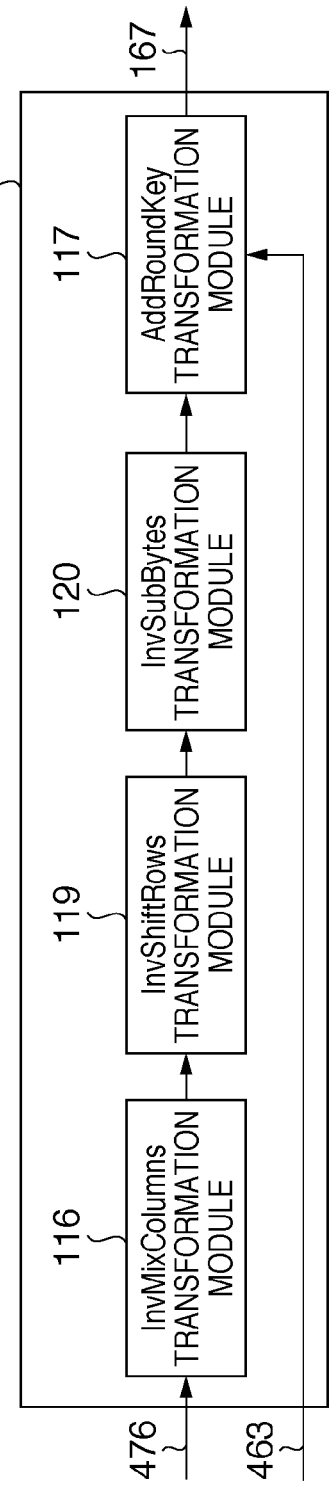
FIG. 55A
FIG. 55B

```
AddRoundKey ( )

For round = 1 step 1 to Nr-1
    SubBytes ( )
    ShiftRows ( )
    MixColumns ( )
    AddRoundKey ( )
End for SubBytes ( )
ShiftRows ( )
AddRoundKey ( )
```

ENCRYPTION ALGORITHM

F I G. 60A

```
AddRoundKey ( )

For round = 1 step 1 to Nr-1
    InvShiftRows ( )
    InvSubBytes ( )
    AddRoundKey ( )
    InvMixColumns ( )
End for InvShiftRows ( )
InvSubBytes ( )
AddRoundKey ( )
```

DECRYPTION ALGORITHM

F I G. 60B

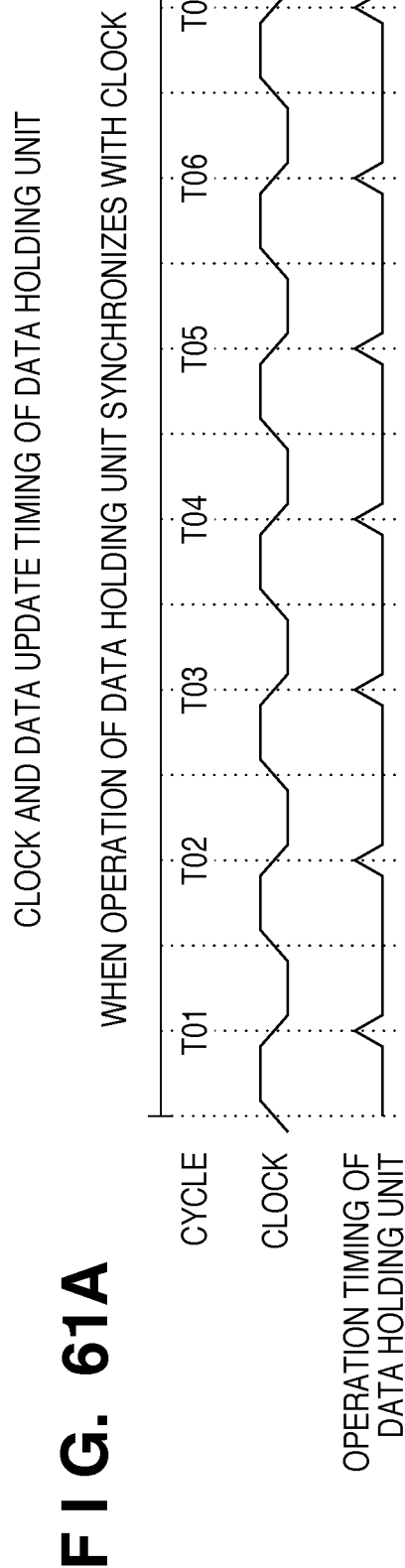
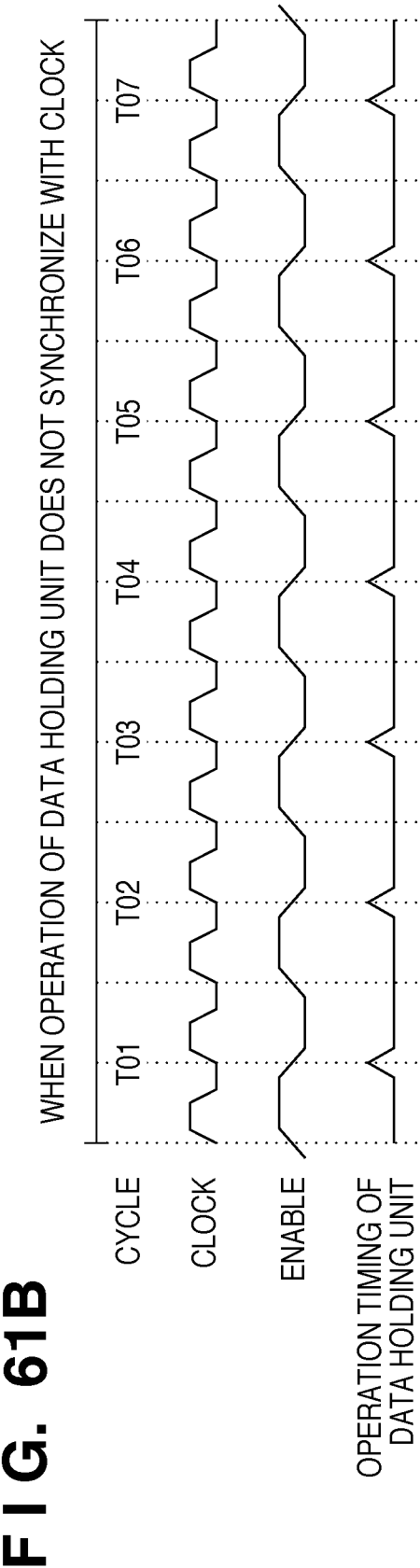
F I G. 61A
F I G. 61B

FIG. 62

ANOTHER IMPLEMENTATION METHOD

| NUMBER OF CLOCK CYCLES FROM START OF PROCESSING | FIRST EMBODIMENT | |
| --- | --- | --- |
| | PROCESSES TO BE EXECUTED | ROUND KEYS TO BE USED |
| 0 | · AddRoundKey<br>· SubBytes<br>· ShiftRows<br>· MixColumns | · 0TH ROUND KEY (wkey$_0$) |
| 1 | · AddRoundKey<br>· SubBytes<br>· ShiftRows<br>· MixColumns | · FIRST ROUND KEY (wkey$_1$) |
| ⋯ | ⋯ | ⋯ |
| 7 | · AddRoundKey<br>· SubBytes<br>· ShiftRows<br>· MixColumns<br>· AddRoundKey | · SEVENTH ROUND KEY (wkey$_7$)<br>· EIGHTH ROUND KEY (wkey$_8$) |
| 8 | · SubBytes<br>· ShiftRows<br>· MixColumns<br>· AddRoundKey | · NINTH ROUND KEY (wkey$_9$) |
| 9 | · SubBytes<br>· ShiftRows<br>· AddRoundKey | · 10TH ROUND KEY (wkey$_{10}$) |

AES ENCRYPTION/DECRYPTION CIRCUIT

BACKGROUND OF THE INVENTION

1. Field of the Invention

The present invention relates to an AES encryption/decryption circuit for executing AES (Advanced Encryption Standard) processing that is defined by FIPS (Federal Information Processing Standards) 197.

2. Description of the Related Art

Along with the recent improvement of optical fiber networks, everybody can readily use high-speed communications on the Internet. This also facilitates mass data communication such as high-quality video distribution. However, there are threats on the networks, including wiretapping, alteration, and spoofing. To protect network communications from these threats, needs for cryptography have grown.

Although encryption is essential for secure communications, any decrease in the transfer rate is not preferable. This tendency is especially conspicuous in the video distribution field where an enormous quantity of data is processed. High-speed encryption is necessary for securely transmitting a large quantity of data at a high speed.

Mass encryption communication generally uses symmetric block cipher.

The most widely used symmetric block cipher is AES defined by FIPS (Federal Information Processing Standards) 197.

To cope with high-speed encryption communication, the AES needs to be accelerated using a dedicated hardware accelerator.

FIGS. 60A and 60B show the AES encryption and decryption algorithms. AddRoundKey, SubBytes, ShiftRows, MixColumns, InvSubBytes, InvShiftRows, and InvMixColumns in FIGS. 60A and 60B are processes of the same names, which are defined as sub-block transformations in FIPS197. NR is a number of rounds which is determined in accordance with the key length and is 10 in AES-128, 12 in AES-192, or 14 in AES-256.

As shown in FIGS. 60A and 60B, the AES algorithm repeats a round function defined by the standards NR times after AddRoundKey Transformation. The round function includes four processes SubBytes, ShiftRows, MixColumns, and AddRoundKey for encryption, and four processes InvShiftRows, InvSubBytes, AddRoundKey, and InvMixColumns for decryption. As an exception, the round function of NRth time includes three processes SubBytes, ShiftRows, and AddRoundKey for encryption, and three processes InvShiftRows, InvSubBytes, and AddRoundKey for decryption. The AddRoundKey Transformation requires a Round Key wkeyi (Round Key described in FIPS197; i is the round number) generated from a cipher key and having a value that changes every round. However, wkey0 is equal to the cipher key.

In order to implement the AES algorithm as a hardware, all of the AES signal processing must be divided into the one that can be executed within the 1 clock cycle period that is supplied into the AES circuit. For example, one round function is executed within one clock cycle, two round functions are executed within one clock cycle, or one round function is executed within two clock cycles in the general implementation method.

In the conventional method, encryption and decryption of AES-128 require 11 clock cycles when one round function is executed within one clock cycle, 6 clock cycles when two round functions are executed within one clock cycle, and 22 clock cycles when one round function is executed within two clock cycles.

The AES implemented by hardware can achieve high-speed processing of a predetermined level. However, the AES process speed is required to be higher.

SUMMARY OF THE INVENTION

The present invention has been made in consideration of the above-described situations, and provides an encryption/decryption circuit which executes AES processing at a higher speed by reducing the number of cycles required for encryption and decryption.

The present invention in its first aspect provides an AES encryption/decryption circuit comprising
   a first AddRoundKey Transformation module;
   a second AddRoundKey Transformation module;
   a ShiftRows Transformation module;
   a SubBytes Transformation module;
   a MixColumns Transformation module; and
   a data holding unit,
   wherein in a cycle of encryption, the first AddRoundKey Transformation module and the second AddRoundKey Transformation module are executed using different Round Keys.

The present invention in its second aspect provides an AES encryption/decryption circuit comprising
   a first AddRoundKey Transformation module;
   a second AddRoundKey Transformation module;
   an InvShiftRows Transformation module;
   an InvSubBytes Transformation module;
   an InvMixColumns Transformation module; and
   a data holding unit,
   wherein in a cycle of decryption, the first AddRoundKey Transformation module and the second AddRoundKey Transformation module are executed using different Round Keys.

The present invention in its third aspect provides an AES encryption/decryption circuit comprising
   a first AddRoundKey Transformation module;
   a second AddRoundKey Transformation module;
   a third AddRoundKey Transformation module;
   a first ShiftRows Transformation module;
   a second ShiftRows Transformation module;
   a first SubBytes Transformation module;
   a second SubBytes Transformation module;
   a first MixColumns Transformation module;
   a second MixColumns Transformation module; and
   a data holding unit,
   wherein in a cycle of encryption, the first AddRoundKey Transformation module, the second AddRoundKey Transformation module, and the third AddRoundKey Transformation module are executed using different Round Keys.

The present invention in its fourth aspect provides an AES encryption/decryption circuit comprising
   a first AddRoundKey Transformation module;
   a second AddRoundKey Transformation module;
   a third AddRoundKey Transformation module;
   a first InvShiftRows Transformation module;
   a second InvShiftRows Transformation module;
   a first InvSubBytes Transformation module;
   a second InvSubBytes Transformation module;
   a first InvMixColumns Transformation module;
   a second InvMixColumns Transformation module; and
   a data holding unit, wherein in a cycle of decryption, the first AddRoundKey Transformation module, the second AddRoundKey Transformation module, and the third AddRoundKey Transformation module are executed using different Round Keys.

In the present invention, the signal processing in some clock cycles is increased so that the difference among the summation of the signal processing time for each of the sub-block transformations in each clock cycle period is minimized. This makes the number of cycles required for AES encryption or decryption by hardware smaller than before.

When the present invention is implemented, the maximum value of the summation of the signal processing time for each of the sub-block transformations in each clock cycle period is equal to that of the prior art. For this reason, reduction of the number of cycles means improvement of the process speed.

The present invention is applicable to both encryption and decryption (including Equivalent Inverse Cipher). The present invention is applicable to any implementation method such as 1Round/Cycle, 2Round/Cycle, or 0.5Round/Cycle. The present invention is applicable to any encryption mode such as an ECB mode or CBC mode. The present invention is applicable to any key length.

As the effect of the present invention, in the implementation method of 1Round/Cycle, 11 cycles can be reduced to 10 cycles in AES-128, 13 cycles can be reduced to 12 cycles in AES-192, and 15 cycles can be reduced to 14 cycles in AES-256.

In the implementation method of 2Round/Cycle, 6 cycles can be reduced to 5 cycles in AES-128, 7 cycles can be reduced to 6 cycles in AES-192, and 8 cycles can be reduced to 7 cycles in AES-256.

Further features of the present invention will become apparent from the following description of exemplary embodiments with reference to the attached drawings.

BRIEF DESCRIPTION OF THE DRAWINGS

FIG. 1 is a view for comparing the process contents of encryption executed in clock cycles in the prior art with those of the first embodiment;

FIG. 2 is a view for comparing the summation of the encryption processing time for each sub-block transformations in each clock cycle period in the prior art with that of the first embodiment;

FIG. 3 is a view for comparing the process contents of decryption executed in clock cycles in the prior art with those of the first embodiment;

FIG. 11 is a view showing the process contents of encryption and decryption executed in clock cycles according to the second embodiment;

FIG. 20 is a view showing the process contents of encryption and decryption executed in clock cycles according to the third embodiment;

FIG. 21 is a view for comparing the summation of the encryption processing time for each sub-block transformations in each clock cycle period in the prior art with that of the third embodiment;

FIG. 22 is a view for comparing the summation of the decryption processing time for each sub-block transformations in each clock cycle period in the prior art with that of the third embodiment;

FIG. 25 is a block diagram of a modified round function module for encryption according to the third embodiment;

FIGS. 28A and 28B are a timing chart of decryption according to the third embodiment;

FIG. 29 is a view for comparing the process contents of encryption executed in clock cycles in the prior art with those of the fourth embodiment;

FIG. 30 is a view for comparing the process contents of decryption executed in clock cycles in the prior art with those of the fourth embodiment;

FIG. 36 is a view showing the process contents of encryption and decryption executed in clock cycles according to the fifth embodiment;

FIG. 37 is a view for comparing the summation of the signal processing time for each sub-block transformations executed in clock cycles in the prior art with that of the fifth embodiment;

FIG. 40 is a block diagram of a modified round function module according to the fifth embodiment;

FIG. 42 is a view showing the process contents of encryption and decryption executed in clock cycles according to the sixth embodiment;

FIGS. 47A and 47B are a timing chart of decryption according to the sixth embodiment;

FIG. 48 is a view for comparing the process contents of encryption executed in clock cycles in the prior art with those of the seventh embodiment;

FIG. 49 is a view for comparing the summation of the encryption processing time for each sub-block transformations in each clock cycle period in the prior art with that of the seventh embodiment;

FIG. 50 is a view for comparing the process contents of decryption executed in clock cycles in the prior art with those of the seventh embodiment;

FIGS. 54A and 54B are block diagrams of modified round function modules for encryption according to the seventh embodiment;

FIGS. 55A and 55B are block diagrams of modified round function modules for decryption according to the seventh embodiment;

FIGS. 60A and 60B are views showing the algorithm of AES;

FIGS. 61A and 61B are timing charts showing a clock and the data update timing of a data holding unit; and FIG. 62 is a view showing another implementation method.

DESCRIPTION OF THE EMBODIMENTS

Figure 4:
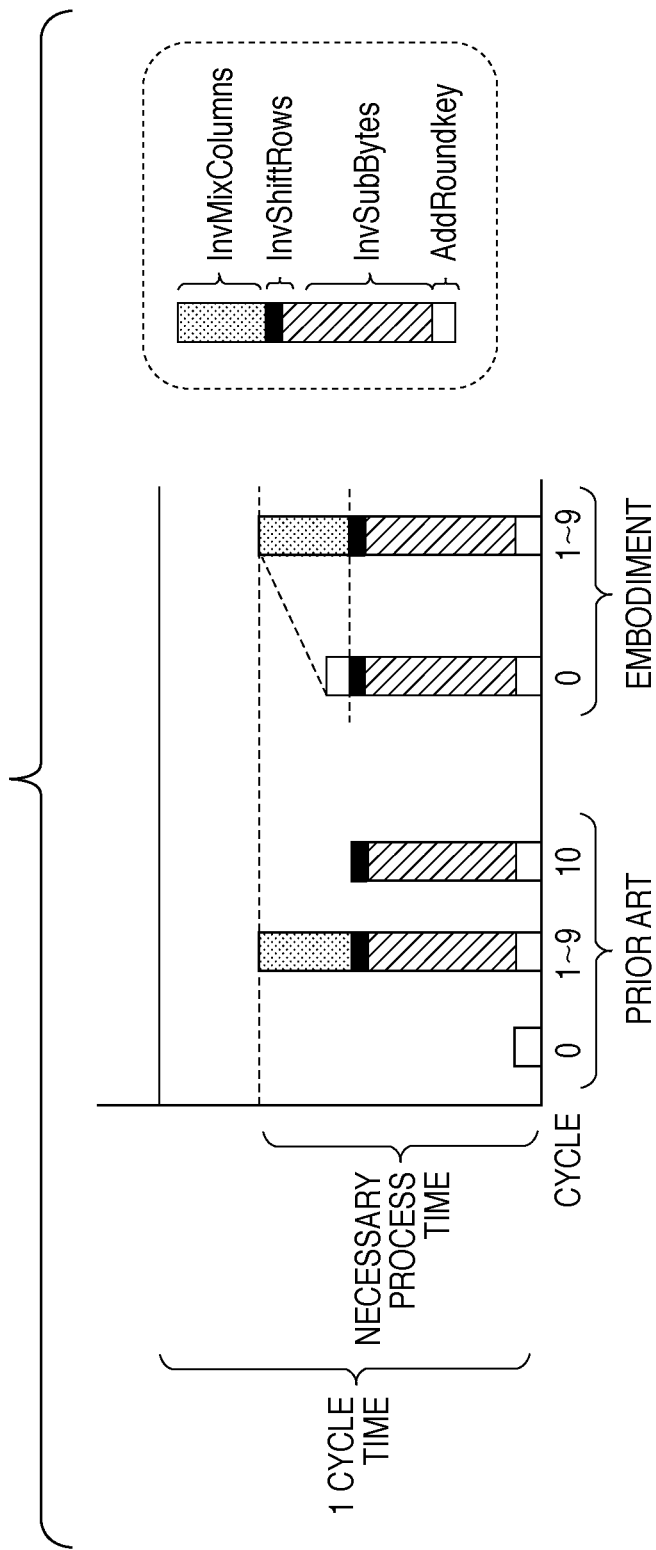
FIG. 4 is a view for comparing the summation of the decryption processing time for each sub-block transformations in each clock cycle period in the prior art with that of the first embodiment.

Here, the embodiments of the present invention will be described in detail with reference to the accompanying drawings. In this embodiment AES-128 (to be simply referred to as AES hereinafter) defined by FIPS197 will be exemplified.

First Embodiment

FIG. 1 shows the comparison between the process contents of encryption executed in clock cycles in the first embodiment and those of the prior art.

Referring to FIG. 1, a cycle count indicates a clock cycle count that is "0" at the start of AES processing. A Round Key wkeyi is a Round Key described in FIPS197 (i is the round number).

In this embodiment, AddRoundKey Transformation, ShiftRows Transformation, SubBytes Transformation, and MixColumns Transformation are executed in the 0th to eighth cycles. In the ninth cycle, first AddRoundKey Transformation, ShiftRows Transformation, SubBytes Transformation, and second AddRoundKey Transformation are executed. As the Round Keys, wkey0 is used in the 0th cycle, wkey1 is used in the first cycle, . . . , and wkey8 is used in the eighth cycle. In the ninth cycle, two Round Keys wkey9 and wkey10 are used.

In this embodiment, the same processing as in the prior art is executed as a whole. In this embodiment, however, AES encryption can be executed in clock cycles fewer by one.

The summation of the encryption processing time for each of the sub-block transformations in each clock cycle period according to this embodiment will be described next. FIG. 2 is a view showing the comparison between the summation of the encryption processing time for each of the sub-block transformations in each clock cycle period in the prior art and that of the first embodiment. The ordinate represents the time. The longer the bar is, the longer the processing time is. To implement this embodiment, the maximum value of the summation of the signal processing time for each of the sub-block transformations in each clock cycle period must be less than one clock cycle time. As shown in FIG. 2, the processing time of each of the sub-block transformation is longest in SubBytes Transformation and shortens in the order of MixColumns Transformation, AddRoundKey Transformation, and ShiftRows Transformation.

In this embodiment, the summation of the signal processing time for each of the sub-block transformations in each of the 0th to eighth cycles where AddRoundKey Transformation, SubBytes Transformation, ShiftRows Transformation, and MixColumns Transformation are executed is longer than the summation of the signal processing time for each of the sub-block transformations in the ninth cycle where AddRoundKey Transformation, SubBytes Transformation, ShiftRows Transformation, and AddRoundKey Transformation are executed. Hence, the maximum value of the summation of the signal processing time for each of the sub-block transformations executed in one cycle period in this embodiment is equal to that of the prior art. If the maximum value of the summation of the signal processing time for each of the sub-block transformations executed in one cycle period is shorter than one cycle time in the prior art, this embodiment can also be implemented.

The present invention is also applicable to AES decryption.

FIG. 3 shows the comparison between the process contents of decryption executed in clock cycles in the embodiment and those of the prior art.

Referring to FIG. 3, a cycle count indicates a clock cycle count that is "0" at the start of AES processing.

In this embodiment, first AddRoundKey Transformation, InvShiftRows Transformation, InvSubBytes Transformation, and second AddRoundKey Transformation are executed in the 0th cycle. In the first to ninth cycles, InvMixColumns Transformation, InvShiftRows Transformation, InvSubBytes Transformation, and AddRoundKey Transformation are executed. As the Round Keys, two Round Keys wkey9 and wkey10 are used in the 0th cycle, wkey8 is used in the first cycle, wkey7 is used in the second cycle, . . . , and wkey0 is used in the ninth cycle.

In this embodiment, the same processing as in the prior art is executed as a whole. In this embodiment, however, AES decryption can be executed in clock cycles fewer by one.

The summation of the decryption processing time for each of the sub-block transformations in each clock cycle period according to this embodiment will be described next. FIG. 4 is a view showing the comparison between the summation of the decryption processing time for each sub-block transformations in each clock cycle period in the first embodiment and that of the prior art. The ordinate represents the time. The longer the bar is, the longer the processing time is. To implement this embodiment, the maximum value of the summation of the signal processing time for each of the sub-block transformations in each clock cycle period must be less than one cycle time. As shown in FIG. 4, the processing time of each sub-block transformation is longest in InvSubBytes Transformation, and shortens in the order of InvMixColumns Transformation, AddRoundKey Transformation, and InvShiftRows Transformation.

In this embodiment, the summation of the signal processing time for each of the sub-block transformations in each of the first to ninth cycles where AddRoundKey Transformation, InvSubBytes Transformation, InvShiftRows Transformation, and InvMixColumns Transformation are executed is longer than the summation of the signal processing time for each of the sub-block transformations in the 0th cycle where AddRoundKey Transformation, InvSubBytes Transformation, InvShiftRows Transformation, and AddRoundKey Transformation are executed. The maximum value of the summation of the signal processing time for each of the sub-block transformations in each clock cycle period in this embodiment is equal to that of the prior art. So this embodiment can also be implemented.

The above-described characteristic features of the present invention will be summarized.

In the conventional general implementation method, a round function defined by the standards is regarded as a break in processing, and encryption and decryption are distributed to clock cycles. For this reason, the summation of the signal processing time for each of the sub-block transformations in the 10th and 0th cycles is shorter than the one in each of the first to ninth cycles. That is, the summation of the signal processing time for each of the sub-block transformations in each cycle varies.

On the other hand, in the present invention, the signal processing in some clock cycles are increased so that the difference among the summation of the signal processing time for each of the sub-block transformations in each clock cycle period is minimized. In the present invention, the number of clock cycles required for AES encryption or decryption is decreased by one without increasing the summation of the signal processing time for each of the sub-block transformations in each clock cycle period. This raises the AES processing speed about 10%.

The circuit arrangement of an AES Core for implementing AES encryption and decryption will be described next.

Figure 5:
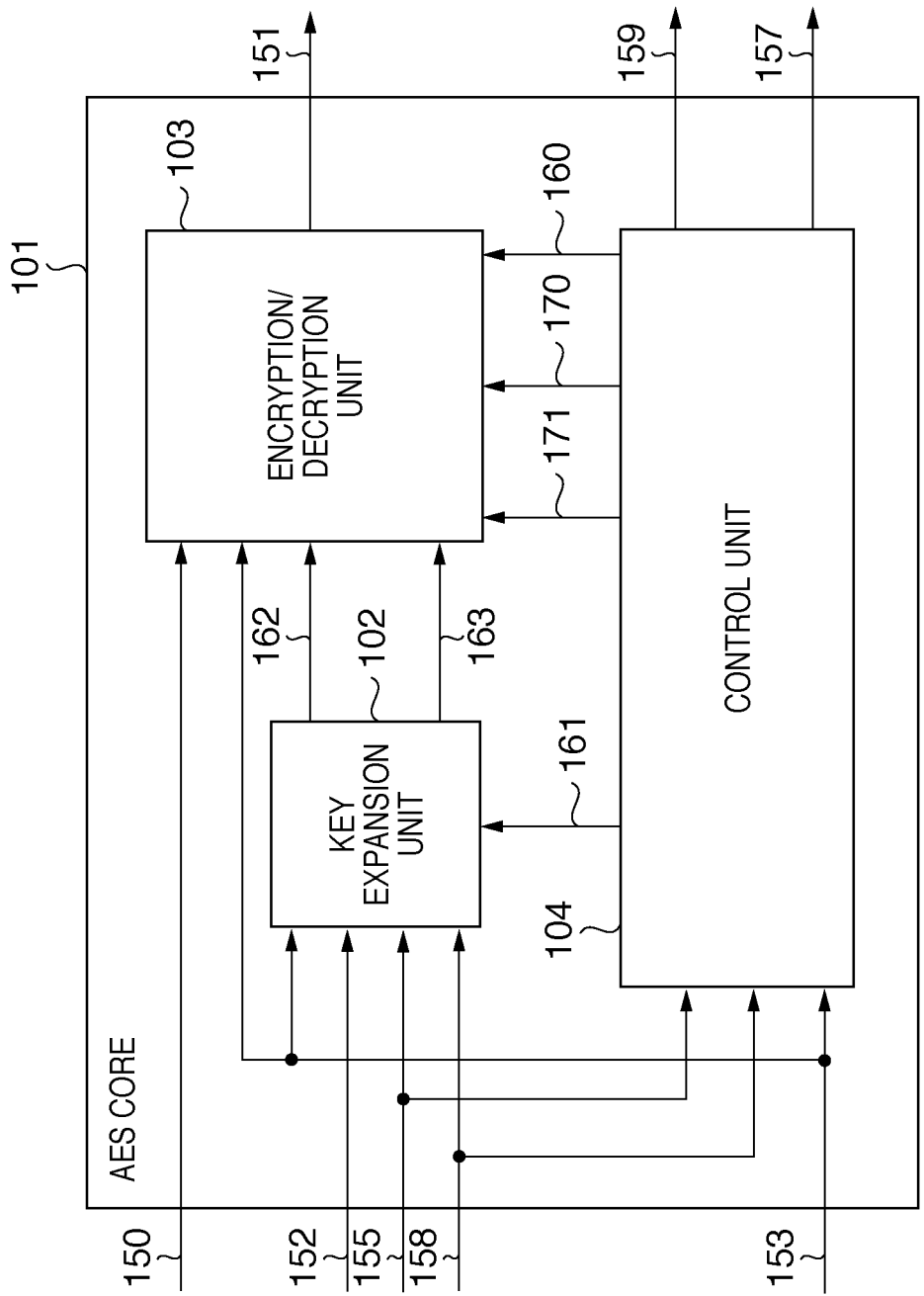
FIG. 5 is a block diagram of an AES Core according to the first embodiment.

FIG. 5 is a block diagram of an AES Core according to this embodiment.

Referring to FIG. 5, an AES Core 101 executes AES processing. A Key Expansion unit 102 generates a Round Key necessary for AES encryption and decryption from a cipher key and outputs the Round Key. An encryption/decryption unit 103 executes encryption of 128-bit plaintext data or decryption of 128-bit ciphertext data using the Round Key supplied from the Key Expansion unit 102. A control unit 104 receives a control signal from a unit outside the AES Core 101 and generates signals to control the operations of the Key Expansion unit 102 and encryption/decryption unit 103 and a signal to notify the unit outside the AES Core 101 of completion of the operation.

Referring to FIG. 5, an input signal 150 is plaintext data to be encrypted or ciphertext data to be decrypted. An output signal 151 is the result obtained by causing the encryption/decryption unit 103 to encrypt or decrypt the input signal 150. A cipher key 152 is used for encryption or decryption. An encryption/decryption selection signal 153 selects one of encryption and decryption to execute. A key preparation start signal 155 causes the Key Expansion unit 102 to start key expansion to generate a Round Key from the cipher key 152. An control signal 157 enables encryption/decryption processing one cycle later. An encryption/decryption start signal 158 starts encryption or decryption of the input signal 150. A valid signal 159 represents that the output signal 151 holds the result of encryption or decryption by the encryption/decryption unit 103. A control signal 160 causes the encryption/decryption unit 103 to hold the value of output signal 151. A counter signal 161 represents the number of cycles from the leading edge of the key preparation start signal 155 or encryption/decryption start signal 158 in key preparation or encryption/decryption. A Round Key A 162 is one of the Round Keys. A Round Key B 163 is a Round Key that is generated by the Key Expansion unit 102 and used in the final cycle of encryption or in the first cycle of decryption. A selection signal 170 switches the connection of sub-block transformations in the encryption/decryption unit 103. A selection signal 171 switches target process data in the encryption/decryption unit 103.

In the above arrangement, the input signal 150 is externally input to the encryption/decryption unit 103. The output signal 151 is externally output from the encryption/decryption unit 103. The cipher key 152 is externally input to the Key Expansion unit 102. The encryption/decryption selection signal 153 is externally input to the Key Expansion unit 102, encryption/decryption unit 103, and control unit 104. The key preparation start signal 155 is externally input to the Key Expansion unit 102 and the control unit 104. The control signal 157 is externally output from the control unit 104. The encryption/decryption start signal 158 is externally input to the Key Expansion unit 102 and the control unit 104. The valid signal 159 is externally output from the control unit 104. The output holding control signal 160 is output from the control unit 104 to the encryption/decryption unit 103. The counter signal 161 is output from the control unit 104 to the Key Expansion unit 102. The Round Key A 162 is output from the Key Expansion unit 102 to the encryption/decryption unit 103. The Round Key B 163 is output from the Key Expansion unit 102 to the encryption/decryption unit 103. The selection signal 170 is output from the control unit 104 to the encryption/decryption unit 103. The selection signal 171 is output from the control unit 104 to the encryption/decryption unit 103.

Figure 6:
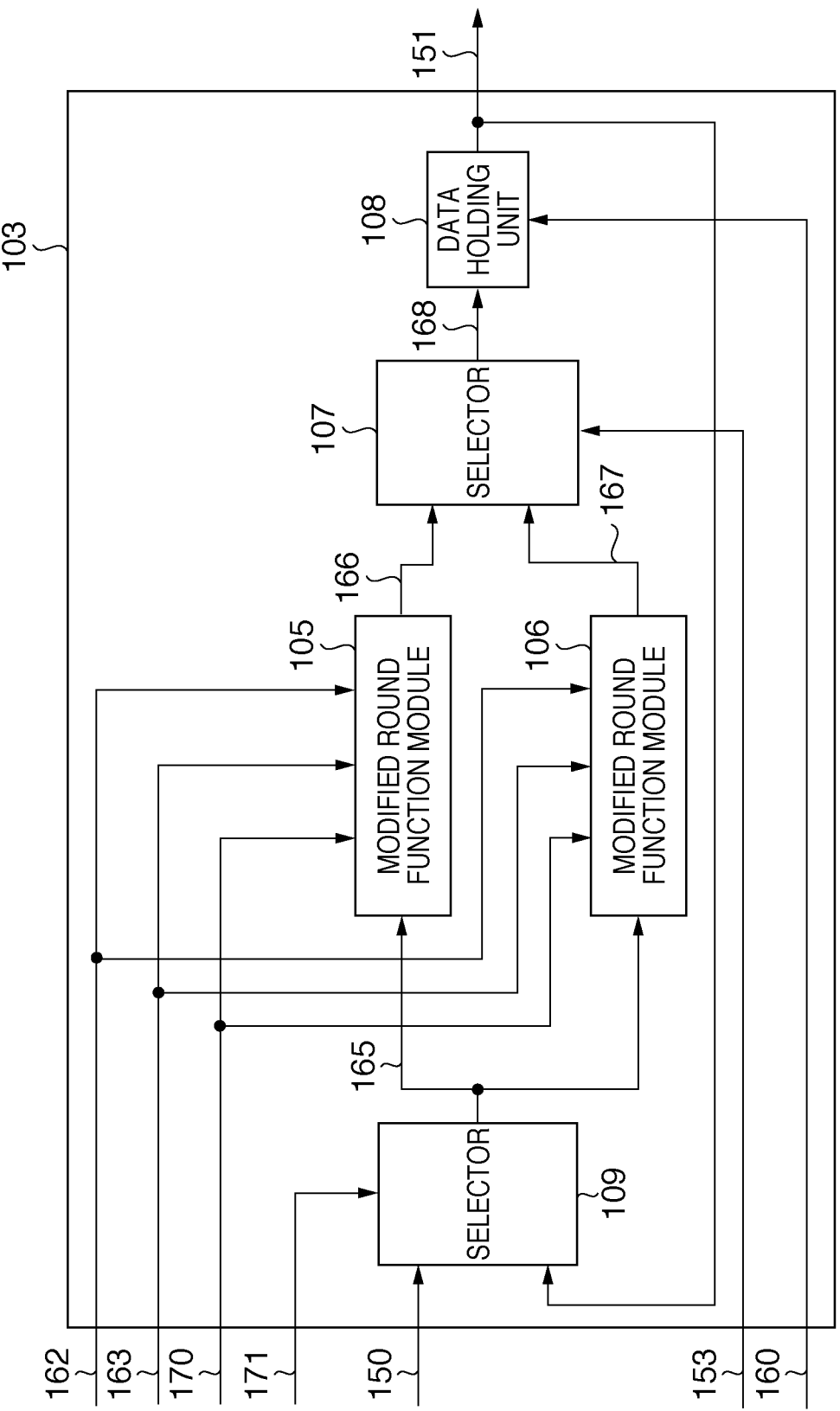
FIG. 6 is a block diagram of an encryption/decryption unit according to the first embodiment.

The encryption/decryption unit 103 will be described next. FIG. 6 is a block diagram of the encryption/decryption unit 103. Referring to FIG. 6, a modified round function module 105 executes encryption of one cycle using the Round Key A 162 and the Round Key B 163 under the control of the selection signal 170. A modified round function module 106 executes decryption using the Round Key A 162 and the Round Key B 163 under the control of the selection signal 170.

A selector 107 selects one of the output from the modified round function module 105 and the output from the modified round function module 106 in accordance with the encryption/decryption selection signal 153. A data holding unit 108 holds, in accordance with the output holding control signal 160, the signal selected by the selector 107. A selector 109 selects one of the input signal 150 and the output signal from the data holding unit 108 in accordance with the selection signal 171.

Referring to FIG. 6, an input signal 165 is input to the modified round function modules 105 and 106. An output signal 166 is the result obtained by causing the modified round function module 105 to process the input signal 165. An output signal 167 is the result obtained by causing the modified round function module 106 to process the input signal 165. An output signal 168 is output from the selector 107.

In the above arrangement, the input signal 150, the output from the data holding unit, and the selection signal 171 are input to the selector 109. The output from the selector 109, the Round Key A 162, the Round Key B 163, and the selection signal 170 are input to the modified round function module 105. The output from the selector 109, the Round Key A 162, the Round Key B 163, and the selection signal 170 are input to the modified round function module 106. The output signal from the modified round function module 105, the output signal from the modified round function module 106, and the encryption/decryption selection signal 153 are input to the selector 107. The output from the selector 107 and the output holding control signal 160 are input to the data holding unit 108. The data holding unit 108 outputs the output signal 151 of the encryption/decryption unit 103.

In the above arrangement, when the selection signal 171 is negated, the selector 109 selects and outputs the input signal 150. When the selection signal 171 is asserted, the selector 109 selects and outputs the output signal 151 from the data holding unit 108. The input signal 165 that is the result selected by the selector 109 is input to the modified round function modules 105 and 106 which perform encryption and decryption, respectively. When the encryption/decryption selection signal 153 is negated, the selector 107 selects and outputs the output signal 166 that is the output result of the modified round function module 105. When the encryption/decryption selection signal 153 is asserted, the selector 107 selects and outputs the output signal 167 that is the output result of the modified round function module 106. The output signal 168 from the selector 107 is input to the data holding unit 108 and temporarily held. The output signal 151 of the data holding unit 108 is the output signal of the encryption/decryption unit 103. The output signal is also connected to the input of the selector 109. While the selection signal 171 is being asserted, encryption by the modified round function module 105 or decryption by the modified round function module 106 is repeatedly executed.

When encryption/decryption has finished, and the next encryption/decryption has not started yet, the control unit 104 asserts the output holding control signal 160. During this time, the data holding unit 108 continuously holds the value of output signal 151 independently of the output signal 168.

Figure 7:
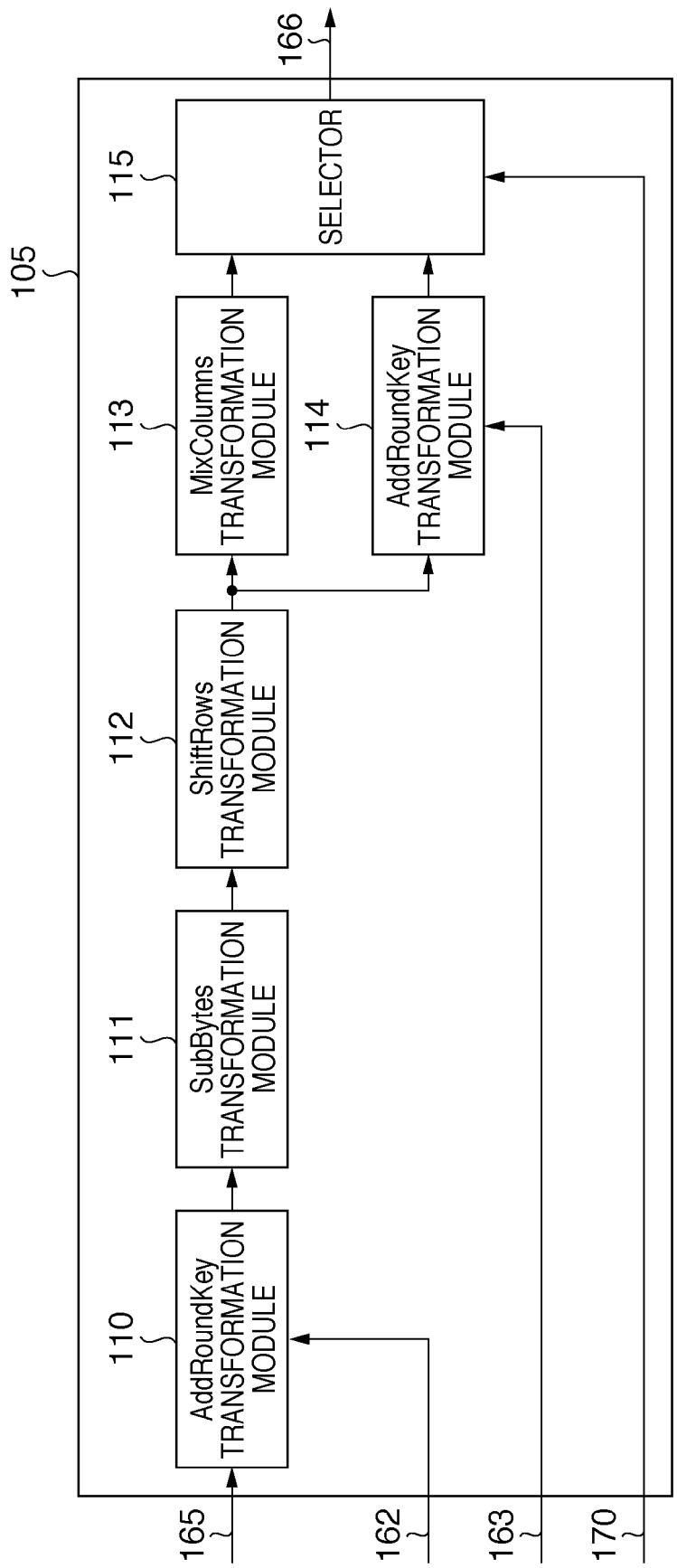
FIG. 7 is a block diagram of a modified round function module for encryption according to the first embodiment.

The modified round function module 105 will be described next. FIG. 7 is a block diagram of the modified round function module 105. Referring to FIG. 7, an AddRoundKey Transformation module 110 (corresponding to a first AddRoundKey Transformation module) receives the input signal 165 and the Round Key A 162 and executes AddRoundKey Transformation. A SubBytes Transformation module 111 receives the output from the AddRoundKey Transformation module 110 and executes SubBytes Transformation. A ShiftRows Transformation module 112 receives the output from the SubBytes Transformation module 111 and executes ShiftRows Transformation. A MixColumns Transformation module 113 receives the output from the ShiftRows Transformation module 112 and executes MixColumns Transformation. An AddRoundKey Transformation module 114 (corresponding to a second AddRoundKey Transformation module) receives the output from the ShiftRows Transformation module 112 and the Round Key B 163 and executes AddRoundKey Transformation. A selector 115 selects and outputs one of the output from the MixColumns Transformation module 113 and the output from the AddRoundKey Transformation module 114 in accordance with the selection signal 170. The output signal of the selector 115 is the output signal of the modified round function module 105.

In the above arrangement, when the selection signal 170 is negated, the selector 115 selects and outputs the output from the MixColumns Transformation module. When the selection signal 170 is asserted, the selector 115 selects and outputs the output from the AddRoundKey Transformation module.

The modified round function module 106 will be described next with reference to the block diagram of FIG. 8.

Figure 8:
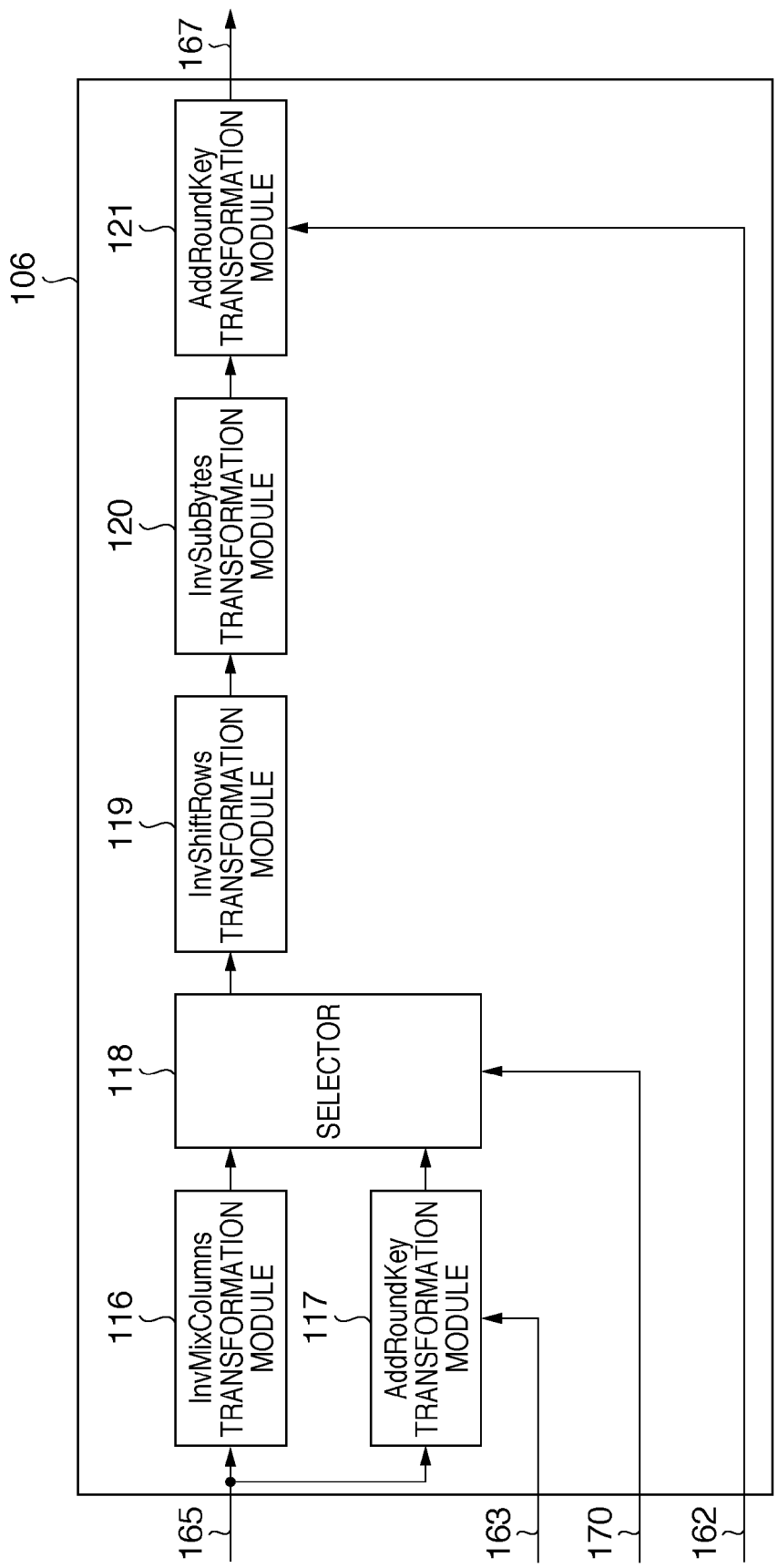
FIG. 8 is a block diagram of a modified round function module for decryption according to the first embodiment.

Referring to FIG. 8, an InvMixColumns Transformation module 116 receives the input signal 165 and executes InvMixColumns Transformation. An AddRoundKey Transformation module 117 receives the input signal 165 and the Round Key B 163 and executes AddRoundKey Transformation. A selector 118 selects and outputs one of the output from the InvMixColumns Transformation module 116 and the output from the AddRoundKey Transformation module 117 in accordance with the selection signal 170. An InvShiftRows Transformation module 119 receives the output from the selector 118 and executes InvShiftRows Transformation. An InvSubBytes Transformation module 120 receives the output from the InvShiftRows Transformation module 119 and executes InvSubBytes Transformation. An AddRoundKey Transformation module 121 receives the output from the InvSubBytes Transformation module 120 and executes AddRoundKey Transformation. The output of the AddRoundKey Transformation module 121 is the output of the modified round function module 106.

In the above arrangement, when the selection signal 170 is negated, the selector 118 selects and outputs the output from the InvMixColumns Transformation module 116. When the selection signal 170 is asserted, the selector 118 selects and outputs the output from the AddRoundKey Transformation module 117.

Figure 9A:
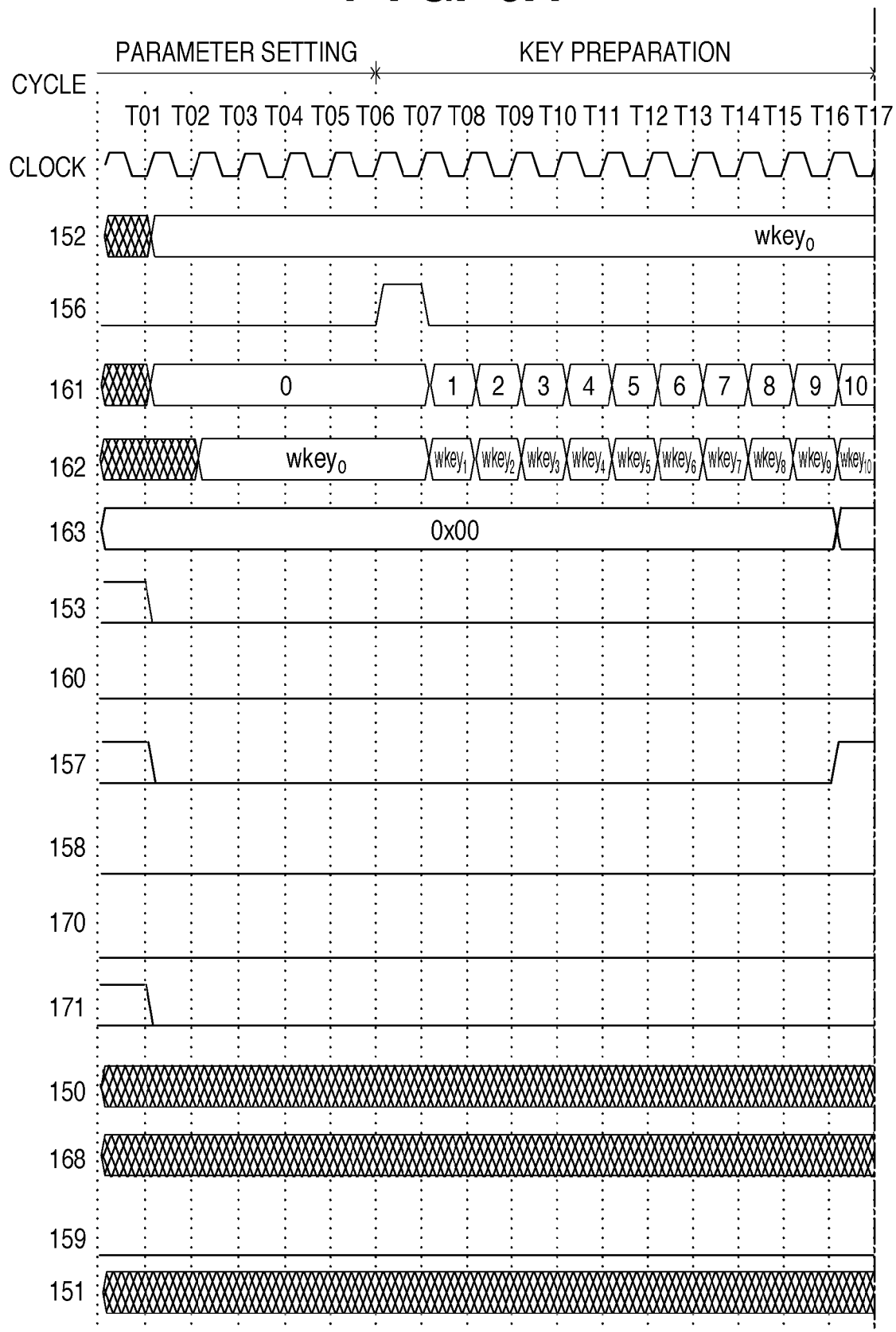
FIGS. 9A and 9B are a timing chart of encryption according to the first embodiment.
Figure 9B:
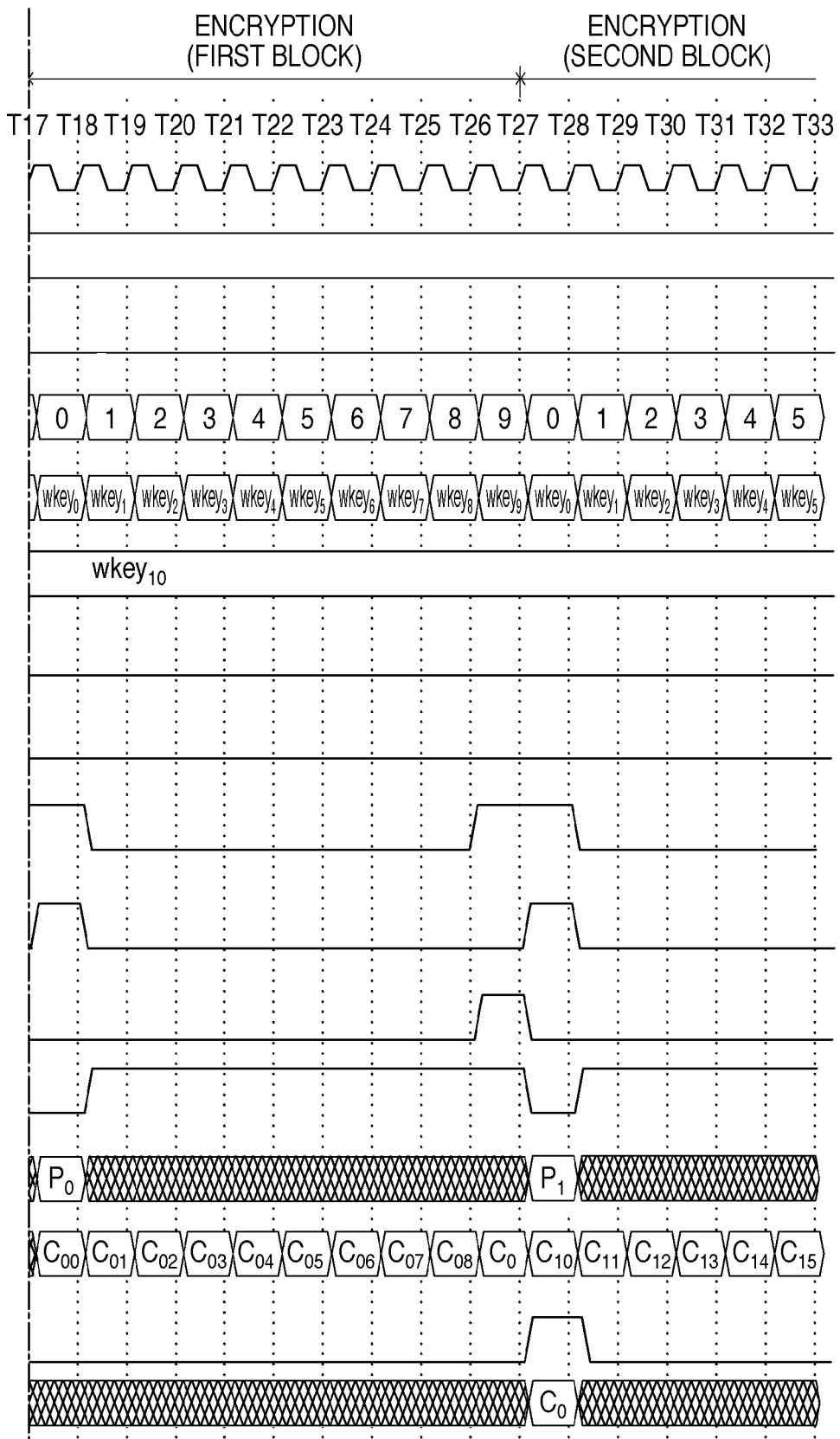

The encryption operation in the above arrangement will be described next. FIGS. 9A and 9B are a timing chart of encryption according to this embodiment. Referring to FIGS. 9A and 9B, the abscissa represents the time. Timing names T01, T02, . . . , T33 are assigned to the leading edges of the clock pulses.

Three-digit numbers along the ordinate on the left end of FIG. 9A indicate signal lines and have a one-to-one correspondence with the reference numerals of the signal lines used in FIGS. 5 to 8.

The encryption operation shown in the timing chart of FIGS. 9A and 9B is roughly divided into four parts. The first part is a parameter setting period (T01 to T06) for setting various parameters such as a cipher key. The second part is a key preparation period (T06 to T17) for generating wkey10 and holding it in a register. The third part is a first block encryption period (T17 to T27). The fourth part is a second block encryption period (from T27).

In parameter setting, various kinds of parameters for encryption/decryption such as a key length and an encryption mode are set, as needed, in addition to the cipher key 152 and the encryption/decryption selection signal 153. The values of the encryption/decryption selection signal 153 and the cipher key 152 need to always be externally held until new parameter setting. The parameter setting period is a period having an arbitrary length immediately after reset. When the key preparation start signal 155 is asserted from the unit outside the AES Core 101 (T06), the parameter setting period finishes.

Simultaneously with the end of the parameter setting period, the next key preparation period starts. In the key preparation period, the Key Expansion unit 102 generates the final Round Key (wkey10) in advance to simultaneously supply the two Round Keys (wkey9 and wkey10) to the encryption/decryption unit 103 in the ninth cycle (T26) of encryption/decryption. The key preparation period is the period from assertion of the key preparation start signal 155 (T06) to the timing (T17) 11 cycles later, at which the final Round Key (wkey10) is generated.

The operation of each circuit during the key preparation period will be described next. When the key preparation start signal 155 is asserted, the control unit 104 counts up the counter signal 161 sequentially from 0. The Key Expansion unit 102 expands wkey0 (cipher key 152) in each clock cycle in accordance with the counter signal 161, thereby generating 10 Round Keys wkey1, wkey2, ..., wkey10. The generated Round Keys are sequentially output as the Round Key A 162.

At the timing T16, the counter signal 161 reaches "10". The Key Expansion unit 102 holds the generated Round Key (wkey10) in the register and outputs it as the Round Key B 163. After that, wkey10 is continuously held until the next execution of key preparation.

When the key preparation period has finished (T17), the Key Expansion unit 102 outputs, as the Round Key A 162, the Round Key (wkey0 in encryption or wkey9 in decryption) to be used in encryption/decryption first. The value of the Round Key A 162 is held until assertion of the encryption/decryption start signal 158. The control unit 104 stops counting up the counter signal 161 and clears the counter to 0.

Near the end of the key preparation period, predicting that key preparation will finish at T17, and encryption is enabled, the control unit 104 asserts the control signal 157 at T16.

Upon detecting assertion of the control signal 157 at T17, an input signal supply unit arranged outside the AES Core 101 supplies plaintext data P0 to the AES Core 101 as the input signal 150. The encryption/decryption start signal 158 is asserted to start encryption of the input signal 150 (T17). In the timing chart, the encryption/decryption start signal 158 is asserted in a shortest cycle. However, the timing is freely determined outside the AES Core 101.

In the encryption period, the input signal 150 is encrypted. The encryption period is the period from assertion of the encryption/decryption start signal 158 (T17) to the timing (T27) 10 cycles later.

Upon detecting assertion of the encryption/decryption start signal 158, the control unit 104 negates the control signal 157, output holding signal 159, and output holding control signal 160 in the next cycle (T18). Simultaneously, the control unit 104 starts counting up the counter signal 161.

The Key Expansion unit 102 performs key expansion sequentially from the Round Key wkey0 in accordance with the counter signal 161. The Key Expansion unit 102 outputs wkey1 at T18, wkey2 at T19, ..., and wkey9 at T26 to the encryption/decryption unit 103 as the Round Key A 162.

From T17 to T18, the selection signal 171 is negated. Hence, the modified round function module 105 executes the sub-block transformations for the input signal 150 using wkey0 output as the Round Key A. From T18 to T27, the selection signal 171 is asserted. Hence, the modified round function module 105 executes the sub-block transformations for the output from the data holding unit 108 using wkey1 from T18 to T19, wkey2 from T19 to T20, ..., and wkey8 from T25 to T26.

In the final cycle (T26) of encryption, the control unit 104 asserts the selection signal 170. Accordingly, the selector 115 of the modified round function module 105 selects the output from the AddRoundKey Transformation module 114 which executes AddRoundKey Transformation using the Round Key B 163 so that the sub-block transformations of the final cycle are executed. At T26, the output signal 166 of the modified round function module 105 outputs ciphertext data C0 that is the result of encryption of the plaintext data P0 as the input signal. One cycle after (T27), the data holding unit 108 externally outputs the value of the ciphertext data C0 as the output from the AES Core 101. Simultaneously, to notify the unit outside the AES Core 101 that the encryption is ended, and the output signal 151 is enabled, the control unit 104 asserts the valid signal 159 (T27). While the valid signal 159 is being asserted, the AES Core 101 guarantees that the output signal 151 is enabled.

On the other hand, the output holding control signal 160 is kept negated because the valid signal 159 is asserted at T27, but the encryption/decryption start signal 158 is also asserted at T27. If the encryption/decryption start signal 158 is not asserted at T27, the output holding control signal 160 is asserted at T27, and the value of the data holding unit 108 holds the ciphertext data C0.

At T27 when encryption finishes, the Key Expansion unit 102 outputs wkey0 as the Round Key A 162. The value of the Round Key A 162 is held until assertion of a next encryption/decryption start signal 156.

Predicting the end of the encryption (T27), the control unit 104 asserts the control signal 157 one cycle before (T26) the end. When the control signal 157 is asserted, the unit outside the AES Core 101 sets the value of the input signal 150 to next plaintext data P1 so that encryption of the second block can start. In the timing chart of FIGS. 9A and 9B, the unit outside the AES Core 101 asserts the next encryption/decryption start signal in a shortest cycle (T27). The decryption operation of the second block is performed in the same way as that for the first block. From then on, the encryption operation is repeatedly performed as many as a predetermined number of blocks. In the timing chart of FIGS. 9A and 9B, the encryption of the second block starts at a shortest interval from the end of the encryption of the first block. The AES Core can exhibit its maximum performance by executing the encryption of all blocks at such a timing. However, the encryption interval can fundamentally be set to an arbitrary length.

When the encryption of a predetermined number of blocks has completely finished, and the next job is to be executed using different parameters such as a cipher key, the processing starts again from parameter setting.

Figure 10A:
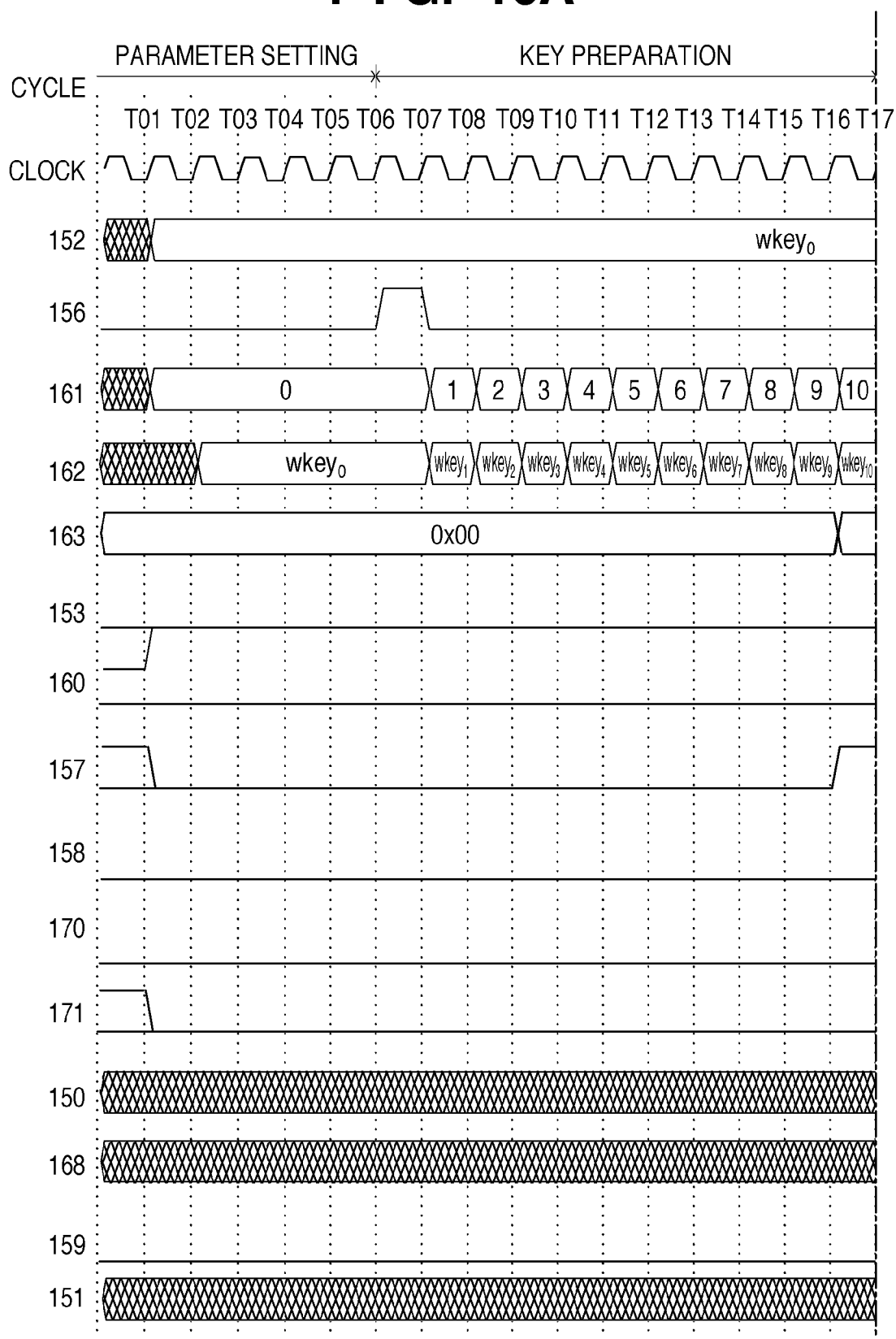
FIGS. 10A and 10B are a timing chart of decryption according to the first embodiment.
Figure 10B:
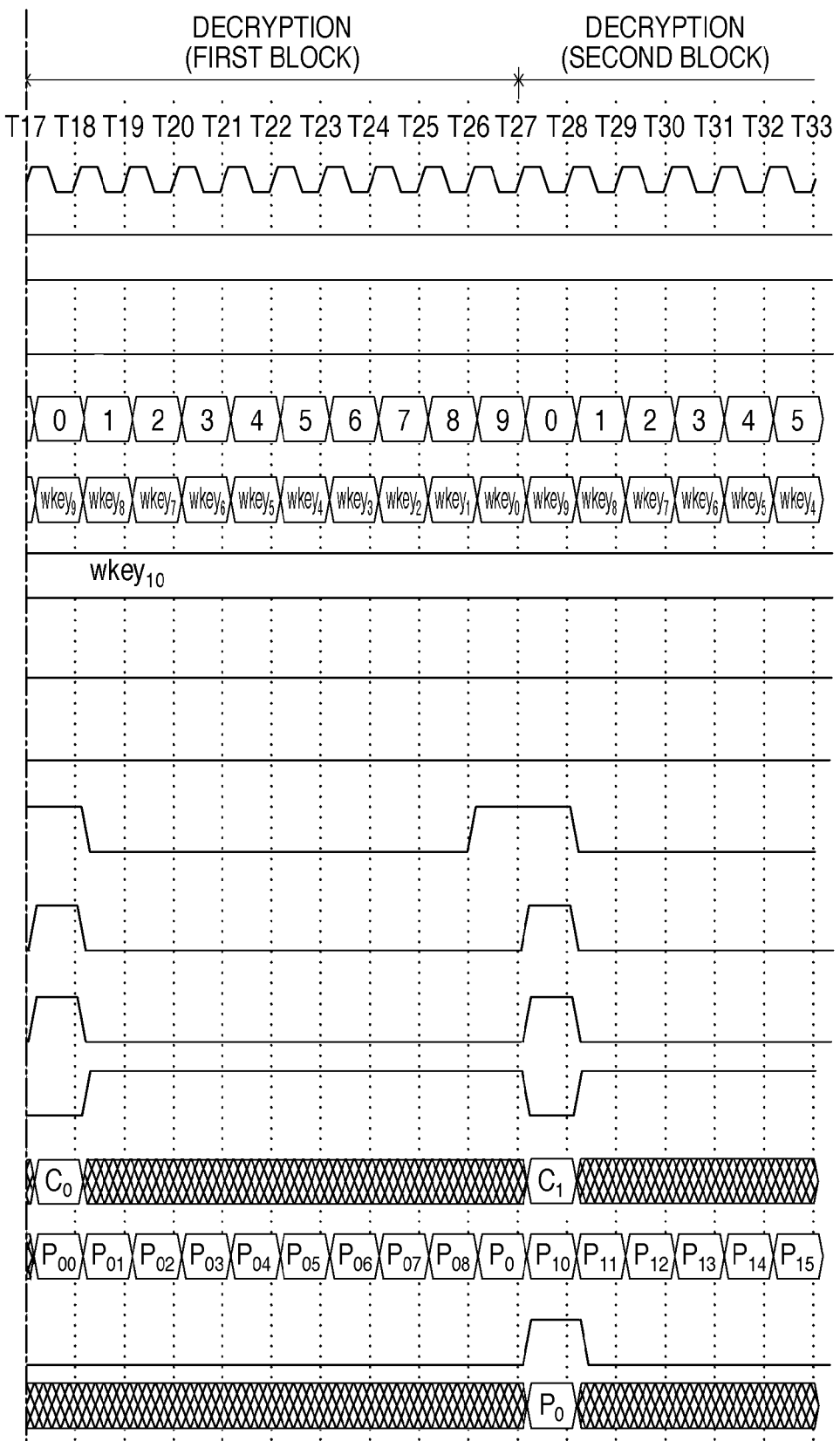

The decryption operation of this embodiment will be described next. FIGS. 10A and 10B are a timing chart of decryption according to this embodiment. Referring to FIGS. 10A and 10B, the abscissa represents the time. Timing names T01, T02, ..., T33 are assigned to the leading edges of the clock pulses. Three-digit numbers along the ordinate on the left end of FIG. 10A indicate signal lines and have a one-to-one correspondence with the reference numerals of the signal lines used in FIGS. 5 to 8.

The decryption operation is also roughly divided into four parts: a parameter setting period (T01 to T06), a key preparation period (T06 to T17), a first block decryption period (T17 to T27), and a second block decryption period (from T27).

The parameter setting period is from T01 to T06, and its role, start condition, and end condition are the same as in encryption of the embodiment. However, the encryption/decryption selection signal 153 is asserted in decryption.

The key preparation period is from T06 to T17, and its start condition and end condition are the same as in encryption of the embodiment. The operation of each circuit is also almost the same as in encryption of the embodiment. However, the Round Key used in the first cycle is different between encryption and decryption. Hence, the Key Expansion unit 102 performs key expansion reversely from wkey10 at the end of the key preparation period (T17) to generate wkey9 and outputs the key as the Round Key A 162. The value of the Round Key A 162 is held until assertion of the encryption/decryption start signal 158. The control unit 104 stops counting up the counter signal 161 and clears the counter to 0.

Near the end of the key preparation period, predicting that key preparation will finish at T17, and decryption is enabled, the control unit 104 asserts the control signal 157 at T16.

Upon detecting assertion of the control signal 157 at T17, the input signal supply unit arranged outside the AES Core 101 supplies the ciphertext data C0 to the AES Core 101 as the input signal 150. The encryption/decryption start signal 158 is asserted to start decryption of the input signal 150 (T17). In the timing chart, the encryption/decryption start signal 158 is asserted in a shortest cycle. However, the timing is freely determined outside the AES Core 101.

In the decryption period, the input signal 150 is decrypted. The decryption period is the period from assertion of the encryption/decryption start signal 158 (T17) to the timing (T27) 10 cycles later.

Upon detecting assertion of the encryption/decryption start signal 158, the control unit 104 negates the control signal 157, valid signal 159, and output holding control signal 160 in the next cycle (T18). Simultaneously, the control unit 104 starts counting up the counter signal 161.

The Key Expansion unit 102 performs key expansion reversely from the Round Key wkey9 in accordance with the counter signal 161. The Key Expansion unit 102 outputs wkey9 at T18, wkey8 at T19, . . . , and wkey0 at T26 to the encryption/decryption unit 103 as the Round Key A 162.

From T17 to T18, the selection signal 171 is negated. Hence, the modified round function module 106 executes the sub-block transformations for the input signal 150 using wkey9 output as the Round Key A. In the first cycle of decryption, the control unit 104 asserts the selection signal 170. Accordingly, the selector 118 of the modified round function module 106 selects the output from the AddRoundKey Transformation module 117 which executes AddRoundKey Transformation using the Round Key B 163 so that the sub-block transformations of the first cycle are executed.

From T18 to T27, the selection signal 171 is asserted. Hence, the modified round function module 106 executes the sub-block transformations for the output from the data holding unit 108 using wkey8 from T18 to T19, wkey7 from T19 to T20, . . . , and wkey0 from T25 to T26.

At T26, the output signal 167 of the modified round function module 106 outputs the plaintext data P0 that is the result of decryption of the ciphertext data C0 as the input signal. One cycle after (T27), the data holding unit 108 externally outputs the value of the plaintext data P0 as the output from the AES Core 101. Simultaneously, to notify the unit outside the AES Core 101 that the decryption is ended, and the output signal 151 is enabled, the control unit 104 asserts the valid signal 159 (T27). While the valid signal 159 is being asserted, the AES Core 101 guarantees that the output signal 151 is enabled.

On the other hand, the output holding control signal 160 is kept negated because the valid signal 159 is asserted at T27, but the encryption/decryption start signal 158 is also asserted at T27. If the encryption/decryption start signal 158 is not asserted at T27, the output holding control signal 160 is asserted at T27, and the value of the data holding unit 108 holds the plaintext data P0.

At T27 when decryption finishes, the Key Expansion unit 102 obtains wkey9 from wkey10 by an inverse operation and outputs it as the Round Key A 162. The value of the Round Key A 162 is held until assertion of the next encryption/decryption start signal 156.

Predicting the end of the decryption (T27), the control unit 104 asserts the control signal 157 one cycle before (T26) the end. When the control signal 157 is asserted, the unit outside the AES Core 101 sets the value of the input signal 150 to next ciphertext data C1 so that decryption of the second block can start. In the timing chart of FIGS. 10A and 10B, the unit outside the AES Core 101 asserts the next encryption/decryption start signal 158 in a shortest cycle (T27). The decryption operation of the second block is performed in the same way as that for the first block. From then on, the decryption operation is repeatedly performed an arbitrary number of times.

When the decryption has completely finished, and the next job is to be started, the processing starts again from parameter setting.

The first embodiment can be implemented in the above-described way. In the first embodiment, the number of clock cycles required for AES encryption is decreased by one without increasing the maximum value of the summation of the signal processing time for each of the sub-block transformations in each clock cycle period. This raises the AES processing speed about 10%.

Second Embodiment

FIG. 11 is a view showing the process contents of encryption and decryption executed in clock cycles according to the second embodiment.

Referring to FIG. 11, a cycle count indicates a clock cycle count that is "0" at the start of AES processing.

In encryption of this embodiment, first AddRoundKey Transformation, ShiftRows Transformation, SubBytes Transformation, MixColumns Transformation, and second AddRoundKey Transformation are executed in the 0th cycle. In the first to eighth cycles, AddRoundKey Transformation, ShiftRows Transformation, SubBytes Transformation, and MixColumns Transformation are executed. In the ninth cycle, AddRoundKey Transformation, ShiftRows Transformation, and SubBytes Transformation are executed. As the Round Keys, wkey0 and wkey1 are used in the 0th cycle, wkey2 is used in the first cycle, . . . , and wkey10 is used in the ninth cycle.

In the second embodiment, the same processing as in the prior art is executed as a whole. In this embodiment, however, AES encryption can be executed in clock cycles fewer by one.

Figure 12:
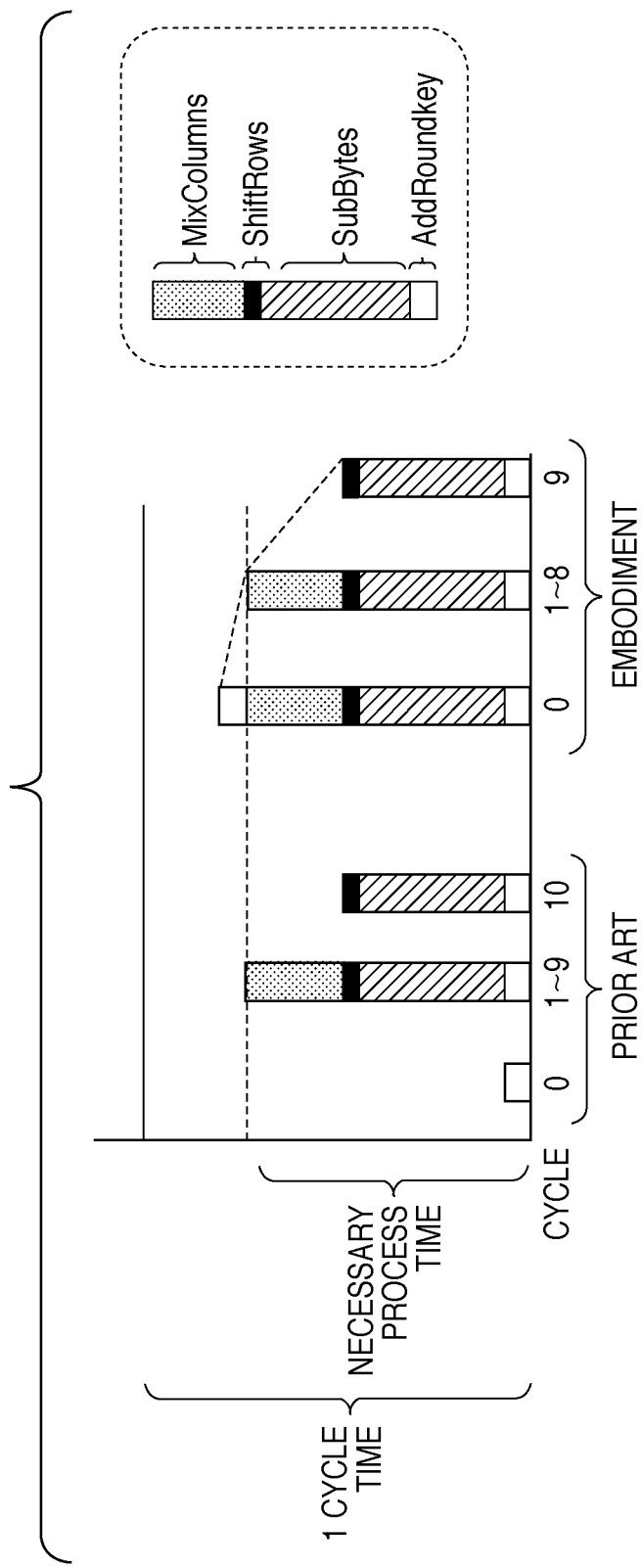
FIG. 12 is a view for comparing the summation of the encryption processing time for each sub-block transformations in each clock cycle period in the prior art with that of the second embodiment.

The summation of the signal processing time for each of the sub-block transformations executed in clock cycles according to the second embodiment will be described next. FIG. 12 is a view showing the comparison between the summation of the signal processing time for each of the sub-block transformations executed in clock cycles in the second embodiment and that of the prior art. The ordinate represents the time. The longer the bar is, the longer the processing time is. To implement the second embodiment, the maximum value of the summation of the signal processing time for each of the sub-block transformations in each clock cycle period must be less than one cycle time. As shown in FIG. 12, the processing time of each sub-block transformation is longest in SubBytes Transformation and shortens in the order of MixColumns Transformation, AddRoundKey Transformation, and ShiftRows Transformation.

In this embodiment, the summation of the signal processing time for each of the sub-block transformations in the 0th cycle where first AddRoundKey Transformation, SubBytes Transformation, ShiftRows Transformation, MixColumns Transformation, and second AddRoundKey Transformation are executed is longer than the summation of the signal processing time for each of the sub-block transformations in the first to eighth cycles where AddRoundKey Transformation, SubBytes Transformation, ShiftRows Transformation, and MixColumns Transformation are executed or the summation of the signal processing time for each of the sub-block transformations in the ninth cycle where AddRoundKey Transformation, SubBytes Transformation, and ShiftRows Transformation are executed. Hence, the maximum value of the summation of the signal processing time for each of the sub-block transformations of this embodiment is larger than that of the prior art by an amount corresponding to the processing time of one AddRoundKey Transformation. However, the processing time of one AddRoundKey Transformation is much shorter than the summation of the signal processing time for each of the sub-block transformations in one cycle. The maximum value of the summation of the signal processing time for each of the sub-block transformations in each clock cycle period is often set with a sufficient margin to one cycle time. For this reason, if the maximum value of the summation of the decryption processing time for each sub-block transformations in each clock cycle period of the prior art is shorter than one cycle time, this embodiment is also supposed to be implementable in many cases.

The present invention is also applicable to AES decryption.

As shown in FIG. 11, in decryption of this embodiment, AddRoundKey Transformation, InvShiftRows Transformation, and InvSubBytes Transformation are executed in the 0th cycle. In the first to eighth cycles, AddRoundKey Transformation, InvShiftRows Transformation, InvSubBytes Transformation, and InvMixColumns Transformation are executed. In the ninth cycle, first AddRoundKey Transformation, InvShiftRows Transformation, InvSubBytes Transformation, InvMixColumns Transformation, and second AddRoundKey Transformation are executed. As the Round Keys, wkey10 is used in the 0th cycle, wkey9 is used in the first cycle, . . . , and wkey2 is used in the eighth cycle. In the ninth cycle, two Round Keys wkey1 and wkey0 are used.

In the second embodiment, the same processing as in the prior art is executed as a whole. In the second embodiment, however, AES decryption can be executed in clock cycles fewer by one.

Figure 13:
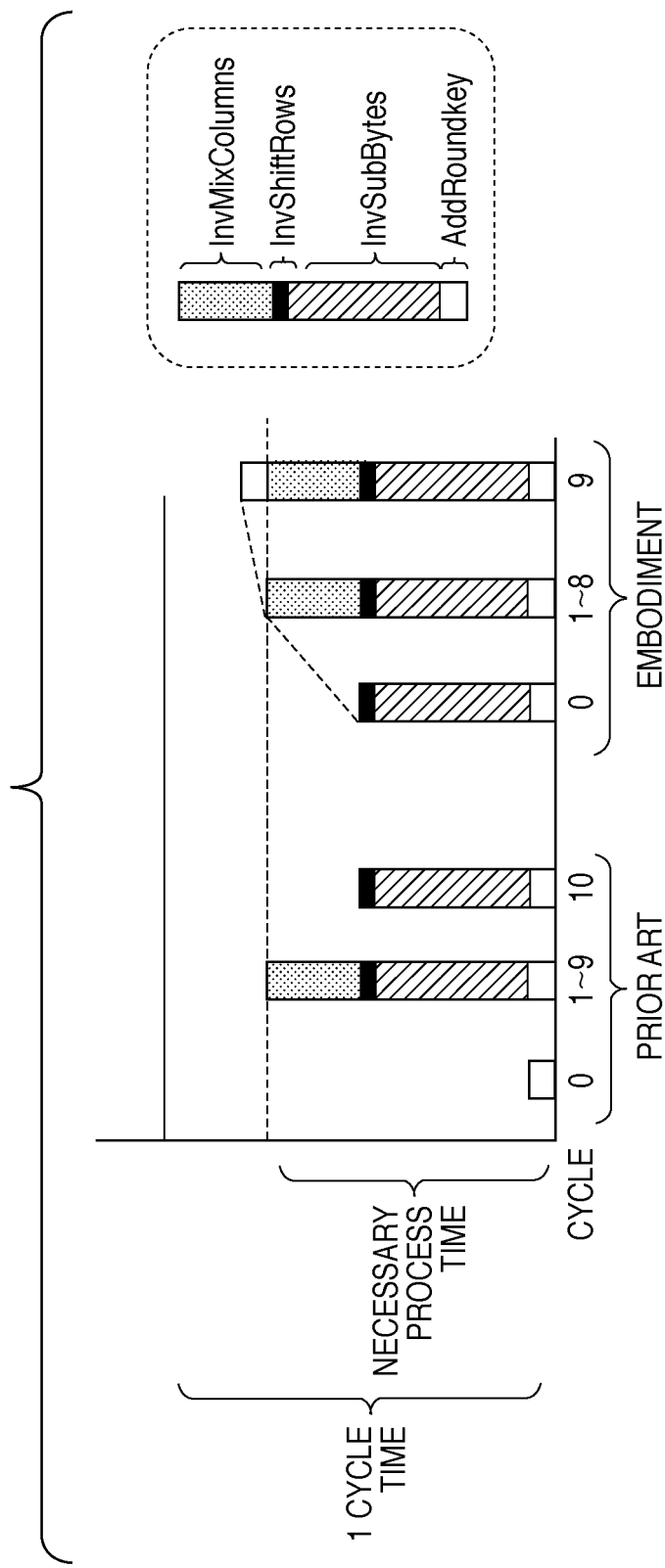
FIG. 13 is a view for comparing the summation of the decryption processing time for each sub-block transformations in each clock cycle period in the prior art with that of the second embodiment.

The summation of the signal processing time for each of the sub-block transformations executed in clock cycles according to the second embodiment will be described next. FIG. 13 is a view showing the comparison between the summation of the signal processing time for each of the sub-block transformations executed in clock cycles in the second embodiment and that of the prior art. The ordinate represents the time. The longer the bar is, the longer the processing time is. To implement this embodiment, the maximum value of the summation of the signal processing time for each of the sub-block transformations in each clock cycle period must be less than one cycle time. As shown in FIG. 13, the processing time of each sub-block transformation is longest in InvSubBytes Transformation, and shortens in the order of InvMixColumns Transformation, AddRoundKey Transformation, and InvShiftRows Transformation.

In the second embodiment, the summation of the signal processing time for each of the sub-block transformations in the ninth cycle where first AddRoundKey Transformation, InvSubBytes Transformation, InvShiftRows Transformation, InvMixColumns Transformation, and second AddRoundKey Transformation are executed is longer than the summation of the signal processing time for each of the sub-block transformations in the first to eighth cycles where AddRoundKey Transformation, InvSubBytes Transformation, InvShiftRows Transformation, and InvMixColumns Transformation are executed, or the summation of the signal processing time for each of the sub-block transformations in the 0th cycle where AddRoundKey Transformation, InvSubBytes Transformation, and InvShiftRows Transformation are executed. Hence, the maximum value of the summation of the signal processing time for each of the sub-block transformations of the second embodiment is larger than that of the prior art by an amount corresponding to the processing time of one AddRoundKey Transformation. However, the processing time of one AddRoundKey Transformation is much shorter than the summation of the signal processing time for each of the sub-block transformations in one cycle. The maximum value of the summation of the signal processing time for each of the sub-block transformations in each clock cycle period is often set with a sufficient margin to one cycle time. For this reason, if the maximum value of the summation of the decryption processing time for each of the sub-block transformations in each clock cycle period of the prior art is shorter than one cycle time, this embodiment is also supposed to be implementable in many cases.

The above-described characteristic features of the second embodiment will be summarized.

In the conventional general implementation method, a round function defined by the standards is regarded as a break in processing, and encryption and decryption are distributed to clock cycles. For this reason, the summation of the signal processing time for each of the sub-block transformations in the 10th and 0th cycles is shorter than the summation of the decryption processing time for each of the sub-block transformations in each of the first to ninth cycles. That is, the summation of the signal processing time for each of the sub-block transformations executed in each cycle varies.

On the other hand, in the present invention, the signal processing in some clock cycles is increased so that the difference among the summation of the signal processing time for each of the sub-block transformations in each clock cycle period is reduced.

In this embodiment, the maximum value of the summation of the signal processing time for each of the sub-block transformations executed in one cycle slightly increases. For this reason, the embodiment is not necessarily implementable under conditions where the prior art can be implemented. However, this hardly poses a problem in many cases because the maximum value of the summation of the signal processing time for each of the sub-block transformations in each clock cycle period is often set with a sufficient margin to one cycle time. In many cases, the number of clock cycles required for AES encryption or decryption can be decreased by one. This raises the AES processing speed about 10%.

The circuit arrangement of an AES Core for implementing AES encryption and decryption will be described next.

Figure 14:
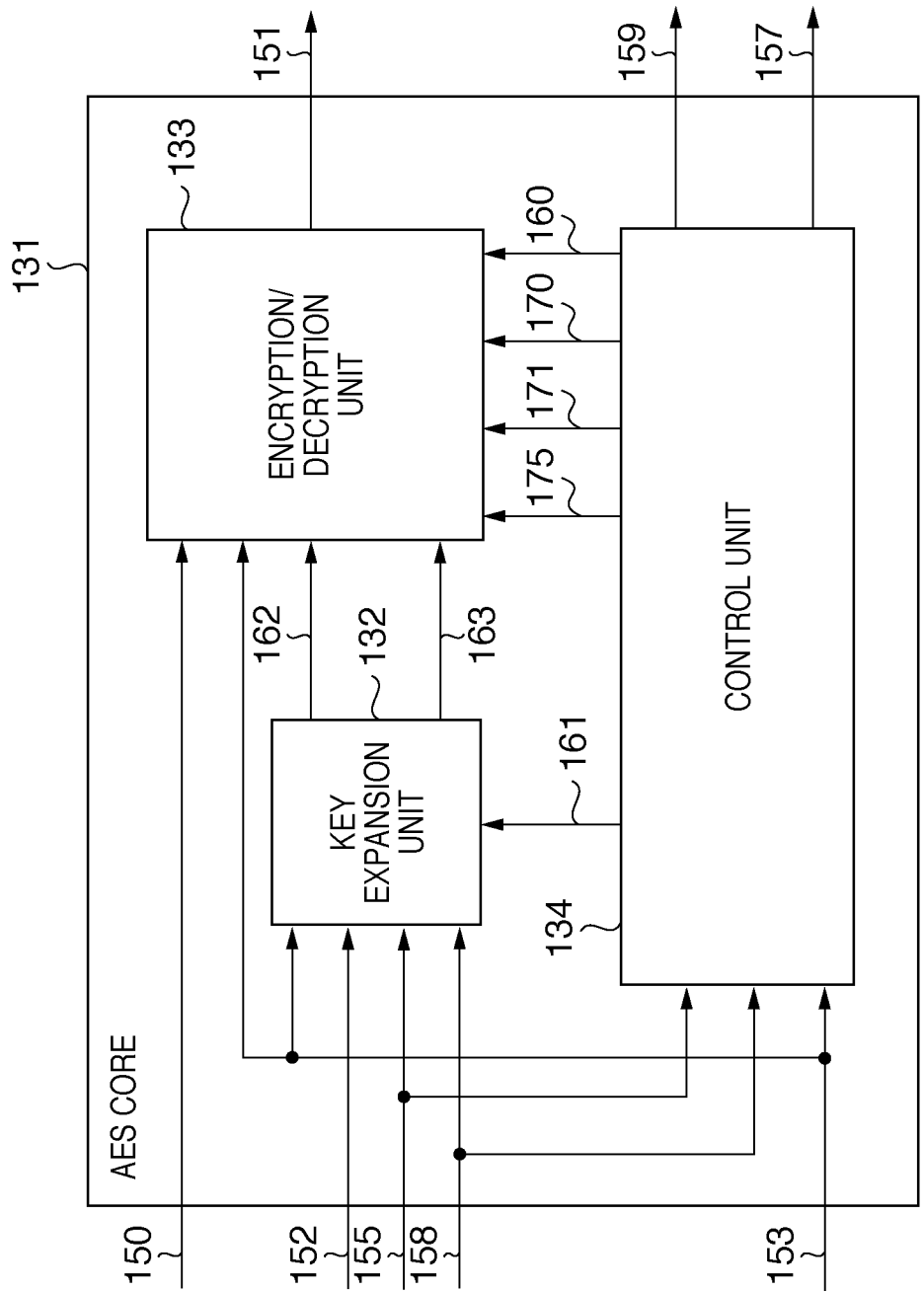
FIG. 14 is a block diagram of an AES Core according to the second embodiment.

FIG. 14 is a block diagram of an AES Core according to this embodiment.

Referring to FIG. 14, an AES Core 131 executes AES processing. A Key Expansion unit 132 generates a Round Key necessary for AES encryption and decryption from a cipher key and outputs the Round Key. An encryption/decryption unit 133 executes encryption of 128-bit plaintext data or decryption of 128-bit ciphertext data using the Round Key supplied from the Key Expansion unit 132. A control unit 134 receives a control signal from a unit outside the AES Core 131 and generates signals to control the operations of the Key Expansion unit 132 and encryption/decryption unit 133 and a signal to notify the unit outside the AES Core 131 of completion of the operation.

Referring to FIG. 14, a selection signal 175 is output from the control unit 134 to the encryption/decryption unit 133 to switch the connection of sub-block transformations in the encryption/decryption unit 133.

A description of constituent elements and signal lines in FIG. 14, which are the same as those described in the first embodiment, will be omitted.

Figure 15:
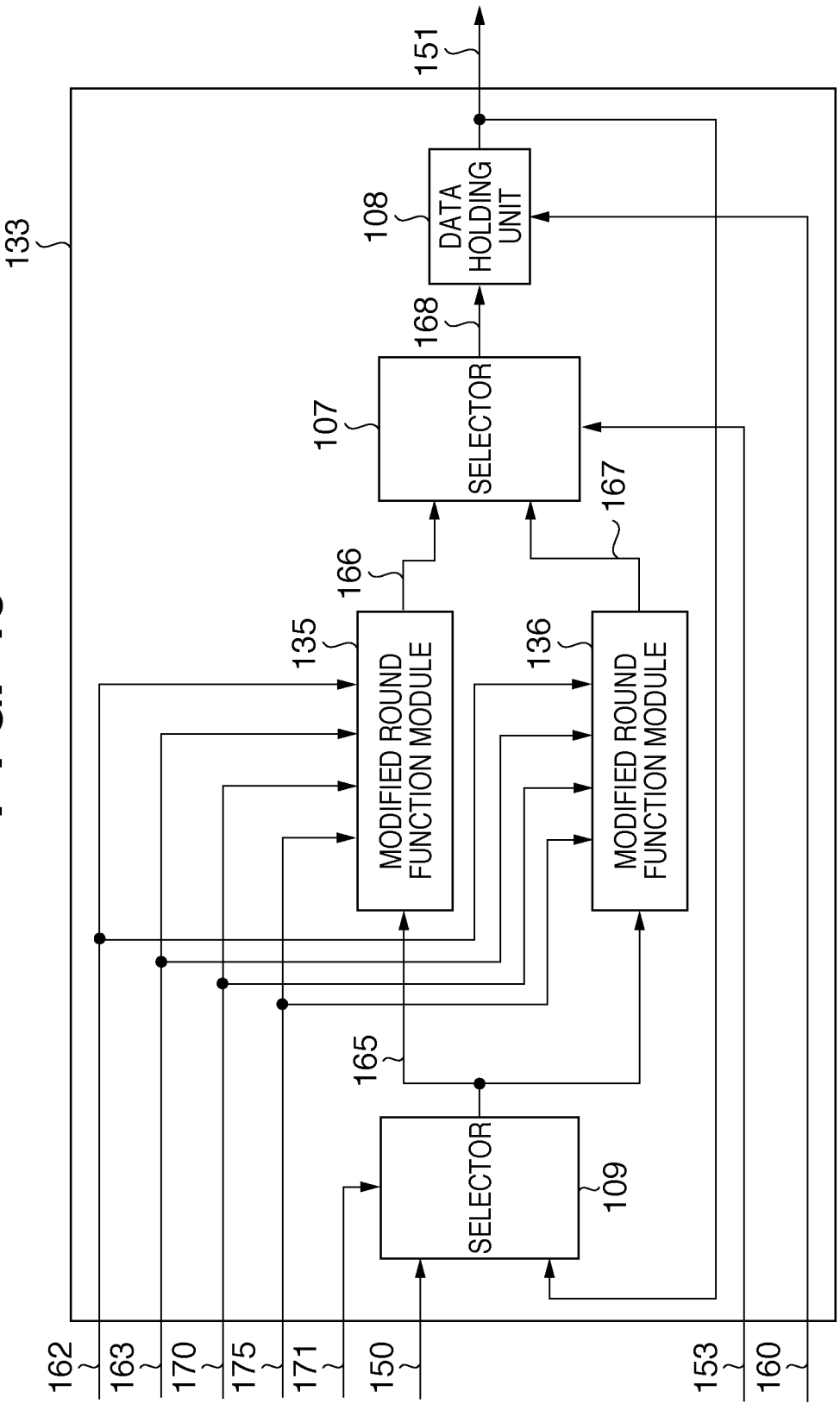
FIG. 15 is a block diagram of an encryption/decryption unit according to the second embodiment.

The encryption/decryption unit 133 will be described next. FIG. 15 is a block diagram for explaining the encryption/decryption unit 133. Referring to FIG. 15, a modified round function module 135 executes encryption of one cycle using a Round Key A 162 and a Round Key B 163 under the control of a selection signal 170 and the selection signal 175. A modified round function module 136 executes decryption using the Round Key A 162 and the Round Key B 163 under the control of the selection signals 170 and 175.

In the above arrangement, when a selection signal 171 is negated, a selector 109 of the encryption/decryption unit 133 selects an input signal 150. When the selection signal 171 is asserted, the selector 109 selects the output from a data holding unit 108.

A description of constituent elements and signal lines in FIG. 15, which are the same as those described in the first embodiment, will be omitted.

Figure 16:
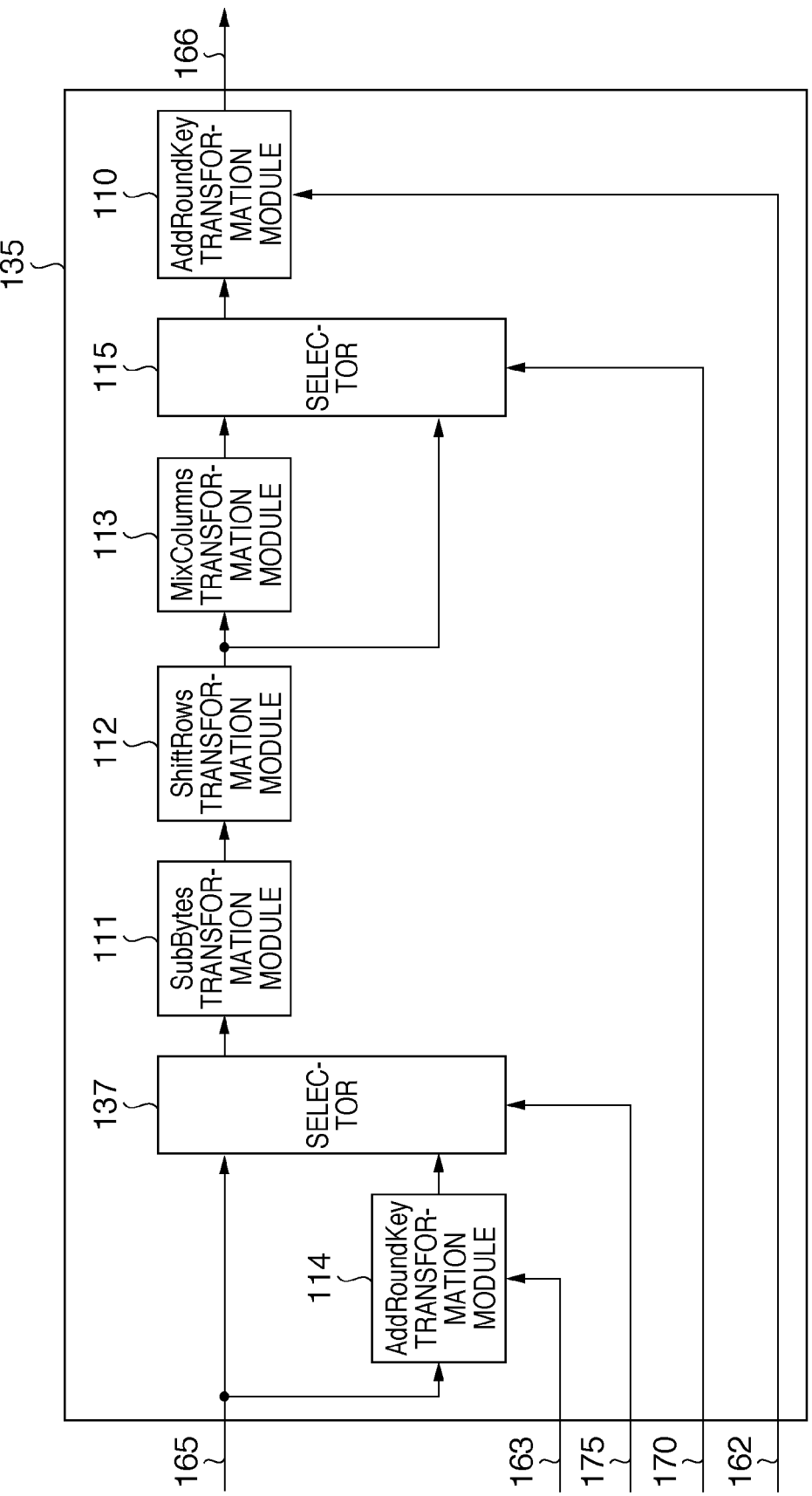
FIG. 16 is a block diagram of a modified round function module for encryption according to the second embodiment.

The modified round function module 135 will be described next. FIG. 16 is a block diagram of the modified round function module 135. Referring to FIG. 16, an AddRoundKey Transformation module 114 receives an input signal 165 and the Round Key B 163 and executes AddRoundKey Transformation. A selector 137 selects and outputs one of the input signal 165 and the output from the AddRoundKey Transformation module 114 in accordance with the selection signal 175. A SubBytes Transformation module 111 receives the output from the selector 137 and executes SubBytes Transformation. A ShiftRows Transformation module 112 receives the output from the SubBytes Transformation module 111 and executes ShiftRows Transformation. A MixColumns Transformation module 113 receives the output from the ShiftRows Transformation module 112 and executes MixColumns Transformation. A selector 115 selects and outputs one of the output from the MixColumns Transformation module 113 and the output from the ShiftRows Transformation module 112 in accordance with the selection signal 170. An AddRoundKey Transformation module 110 receives the output from the selector 115 and the Round Key A 162 and executes AddRoundKey Transformation. The output signal of the AddRoundKey Transformation module 110 is the output signal of the modified round function module 135.

In the above arrangement, when the selection signal 170 is negated, the selector 115 selects and outputs the output from the MixColumns Transformation module 113. When the selection signal 170 is asserted, the selector 115 selects and outputs the output from the ShiftRows Transformation module 112. When the selection signal 175 is negated, the selector 137 selects and outputs the input signal 165. When the selection signal 175 is asserted, the selector 137 selects and outputs the output from the AddRoundKey Transformation module 114.

Figure 17:
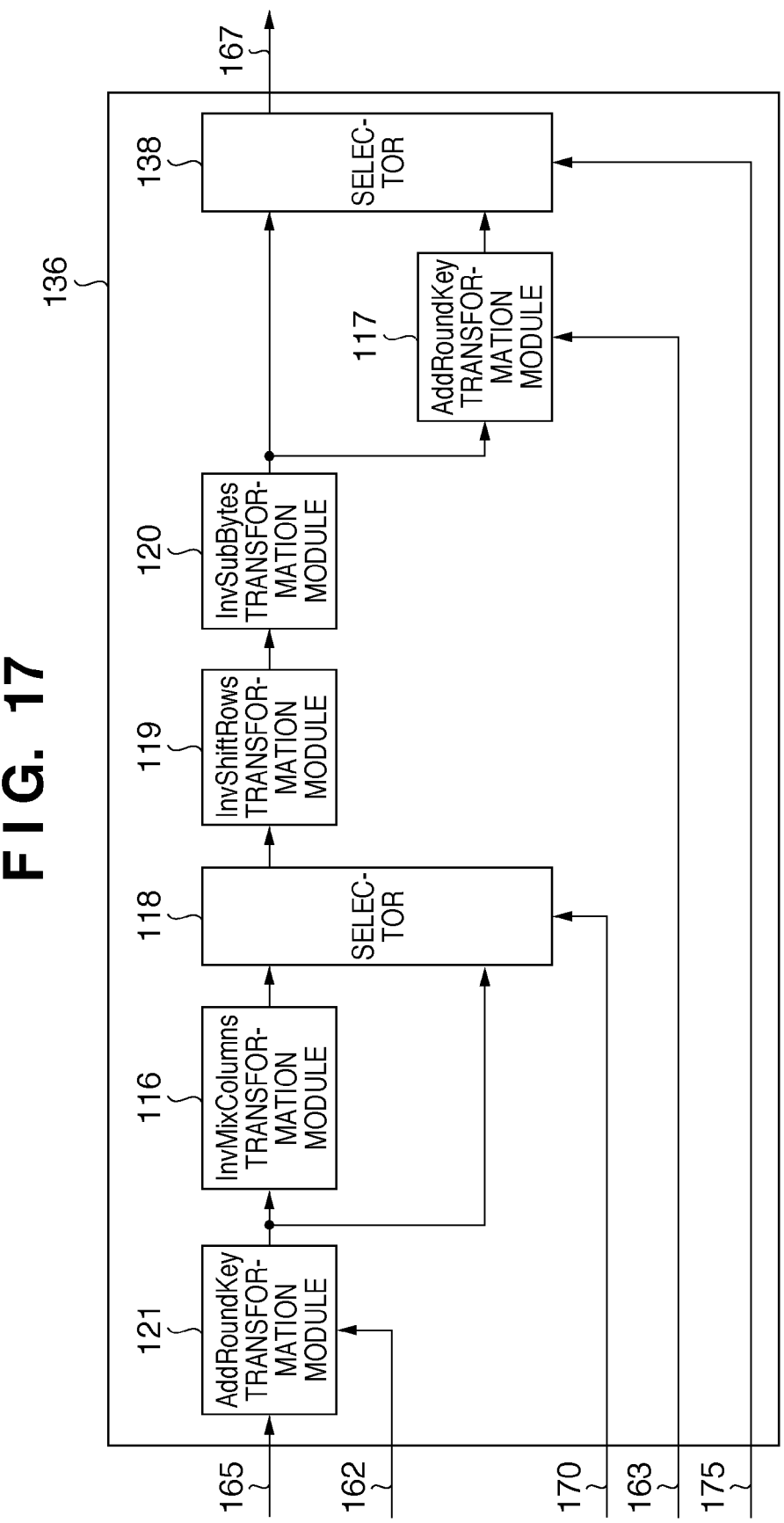
FIG. 17 is a block diagram of a modified round function module for decryption according to the second embodiment.

The modified round function module 136 will be described next. FIG. 17 is a block diagram of the modified round function module 136. Referring to FIG. 17, an AddRoundKey Transformation module 121 receives the input signal 165 and the Round Key A 162 and executes AddRoundKey Transformation. An InvMixColumns Transformation module 116 receives the output from the AddRoundKey Transformation module 121 and executes InvMixColumns Transformation. A selector 118 selects and outputs one of the output from the InvMixColumns Transformation module 116 and the output from the AddRoundKey Transformation module 121 in accordance with the selection signal 170. An InvShiftRows Transformation module 119 receives the output from the selector 118 and executes InvShiftRows Transformation. An InvSubBytes Transformation module 120 receives the output from the InvShiftRows Transformation module 119 and executes InvSubBytes Transformation. An AddRoundKey Transformation module 117 receives the output from the InvSubBytes Transformation module 120 and the Round Key B 163 and executes AddRoundKey Transformation. A selector 138 selects and outputs one of the output from the InvSubBytes Transformation module 120 and the output from the AddRoundKey Transformation module 117 in accordance with the selection signal 175. The output of the selector 138 is the output of the modified round function module 136.

In the above arrangement, when the selection signal 170 is negated, the selector 118 selects and outputs the output from the InvMixColumns Transformation module 116. When the selection signal 170 is asserted, the selector 118 selects and outputs the output from the AddRoundKey Transformation module 121. When the selection signal 175 is negated, the selector 138 selects and outputs the output from the InvSubBytes Transformation module 120. When the selection signal 175 is asserted, the selector 138 selects and outputs the output from the AddRoundKey Transformation module 117.

Figure 18A:
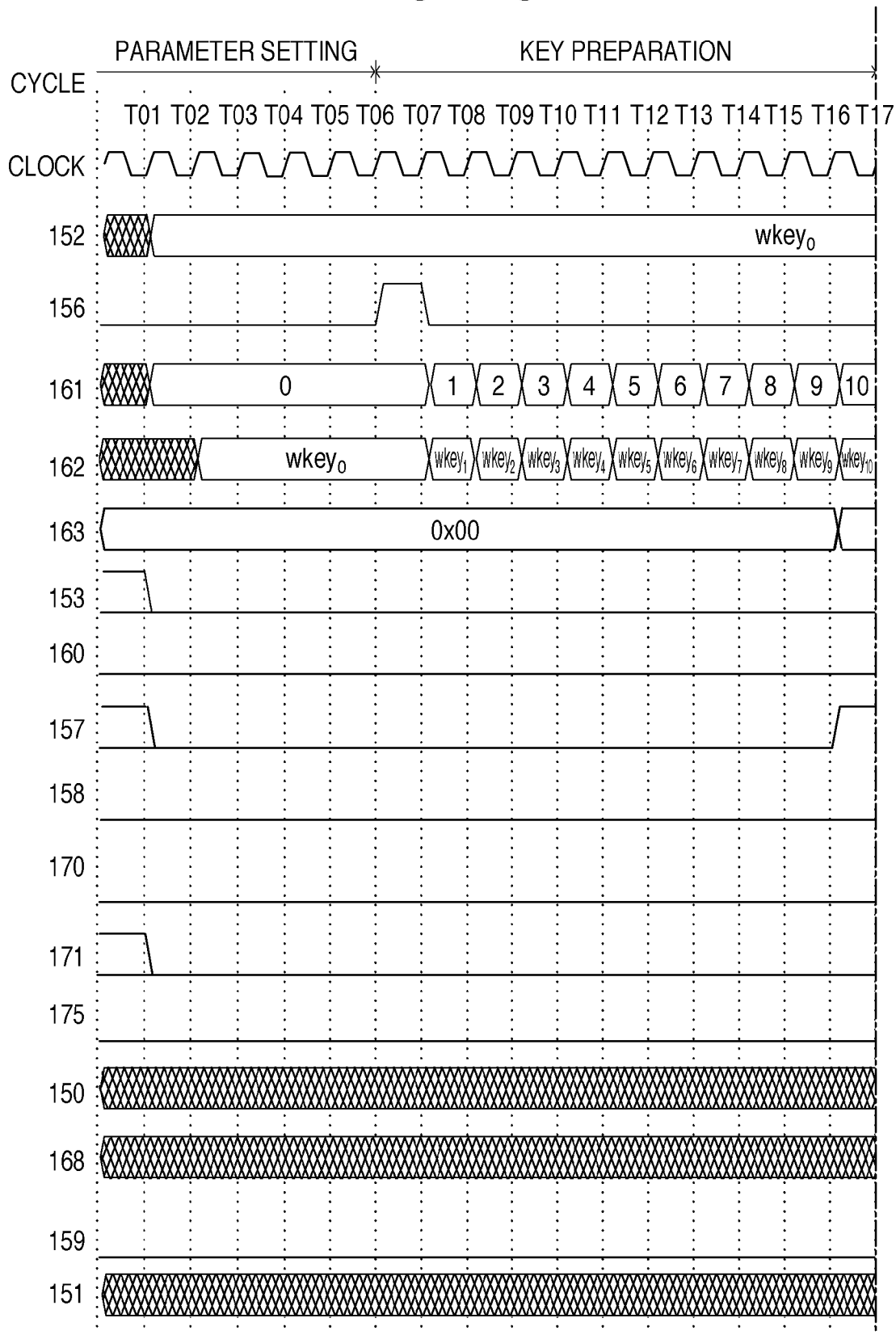
FIGS. 18A and 18B are a timing chart of encryption according to the second embodiment.
Figure 18B:
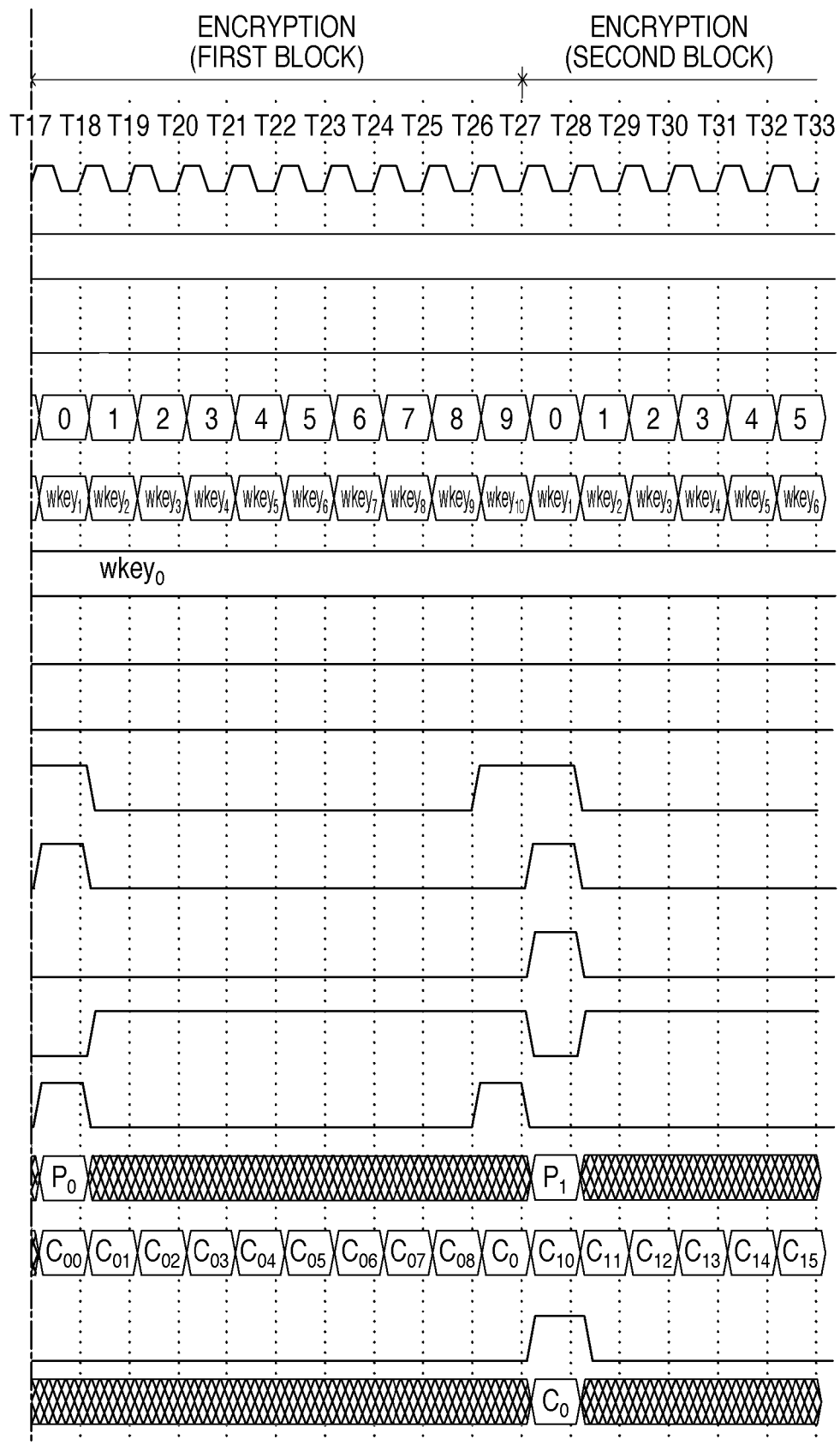

The encryption operation in the above arrangement will be described next. FIGS. 18A and 18B are a timing chart of encryption according to the second embodiment. Referring to FIGS. 18A and 18B, the abscissa represents the time. Timing names T01, T02, . . . , T33 are assigned to the leading edges of the clock pulses. Three-digit numbers along the ordinate on the left end of FIG. 18A indicate signal lines and have a one-to-one correspondence with the reference numerals of the signal lines used in FIGS. 14 to 17.

The encryption operation shown in the timing chart of FIGS. 18A and 18B is roughly divided into four parts. The first part is a parameter setting period (T01 to T06) for setting various parameters such as a cipher key. The second part is a key preparation period (T06 to T17) for generating wkey0 and holding it in a register. The third part is a first block encryption period (T17 to T27). The fourth part is a second block encryption period (from T27).

The role, start condition, and end condition of the parameter setting period are the same as in the first embodiment. The key preparation period is from T06 to T17, and its start condition and end condition are the same as in the first embodiment. The operation of each circuit is also almost the same as in the first embodiment. However, the operation of the Key Expansion unit 132 at the timing T16, and the operations of the Key Expansion unit 132 and the control unit 134 at the timing T17 are different from the first embodiment and will therefore be described below.

At the timing T16, the Key Expansion unit 132 outputs wkey0 as the Round Key B 163. The Round Key wkey10 is held in the register provided in the Key Expansion unit 132.

At the timing T17, the Key Expansion unit 132 outputs wkey1 as the Round Key A 162. The control unit 134 asserts the selection signal 175.

The first block encryption period is from T17 to T27, and its start condition and end condition are the same as in the first embodiment. The operation of each circuit is also almost the same as in the first embodiment.

The control unit 134 asserts the selection signal 175 at the end of encryption and negates it in the first cycle of encryption (T18 or T28). The control unit 134 also asserts the selection signal 170 in the final cycle of encryption (T16) and negates it at the end of encryption (T17). The control unit 134 also asserts the selection signal 171 in the first cycle of encryption and negates it at the end of encryption.

As described in association with the circuit arrangement, when the selection signal 171 is negated, the selector 109 selects the input signal 150. When the selection signal 171 is asserted, the selector 109 selects the output from the data holding unit 108. When the selection signal 170 is negated, the selector 115 selects and outputs the output from the MixColumns Transformation module 113. When the selection signal 170 is asserted, the selector 115 selects and outputs the output from the AddRoundKey Transformation module 112. When the selection signal 175 is negated, the selector 137 selects and outputs the input signal 165. When the selection signal 175 is asserted, the selector 137 selects and outputs the output from the AddRoundKey Transformation module 114.

Hence, in the 0th cycle (T17 to T18), the modified round function module 135 executes AddRoundKey Transformation, SubBytes Transformation, ShiftRows Transformation, MixColumns Transformation, and AddRoundKey Transformation for the input signal 150. From the first cycle, the modified round function module outputs a result obtained by executing SubBytes Transformation, ShiftRows Transformation, MixColumns Transformation, and AddRoundKey Transformation for the result of immediately preceding cycle. In the ninth cycle (T26 to T27), the modified round function module outputs a result obtained by executing SubBytes Transformation, ShiftRows Transformation, and AddRoundKey Transformation.

The modified round function module 135 can execute encryption as shown in FIG. 11 by controlling the selection signals 171, 170, and 175 in the above-described way.

On the other hand, the Key Expansion unit 132 outputs wkey1 as the Round Key A 162 and wkey0 as the Round Key B 163 after the key preparation period. For this reason, wkey0 and wkey1 are supplied to the modified round function module 135 at the start of encryption (T17). Upon detecting the start of encryption based on an encryption/decryption start signal 158 (T17), the Key Expansion unit 132 generates wkey2 using wkey1 held in the Round Key A register and holds wkey2 in the Round Key A register. Hence, wkey2 is supplied to the modified round function module 135 at T18. The Round Keys are supplied in the same way up to T26. When wkey10 is held in the Round Key A register, and Round Key supply is ended at T26, the Key Expansion unit 132 generates wkey1 using wkey0 that is continuously externally supplied as a cipher key 152 and holds wkey1 in the Round Key A register to prepare for the start of the next encryption (T27).

When the Key Expansion unit 132 operates in the above-described manner, the modified round function module 135 can use the Round Key in each cycle as shown in FIG. 11.

The operation during the encryption period according to the second embodiment is performed in the above-described way. The decryption operation of the second block is performed in the same way as that for the first block. From then on, the encryption operation is repeatedly performed as many as a predetermined number of blocks. In the timing chart of FIGS. 18A and 18B, the encryption of the second block starts at a shortest interval from the end of the encryption of the first block. The AES Core can exhibit its maximum performance by executing the encryption of all blocks at such a timing. However, the encryption interval can fundamentally be set to an arbitrary length.

When the encryption of a predetermined number of blocks has completely finished, and the next job is to be executed using different parameters such as a cipher key, the processing starts again from parameter setting.

Figure 19A:
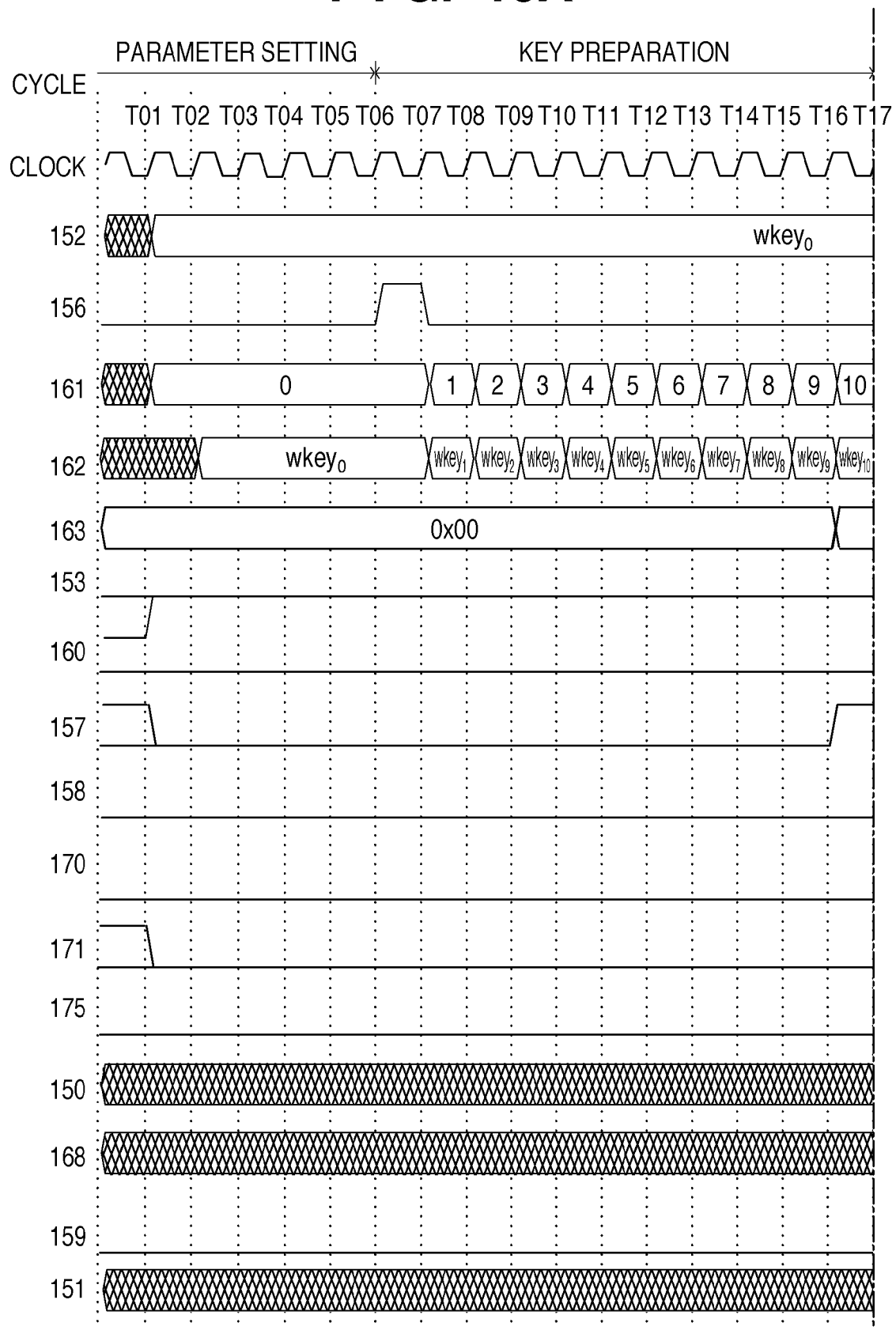
FIGS. 19A and 19B are a timing chart of decryption according to the second embodiment.
Figure 19B:
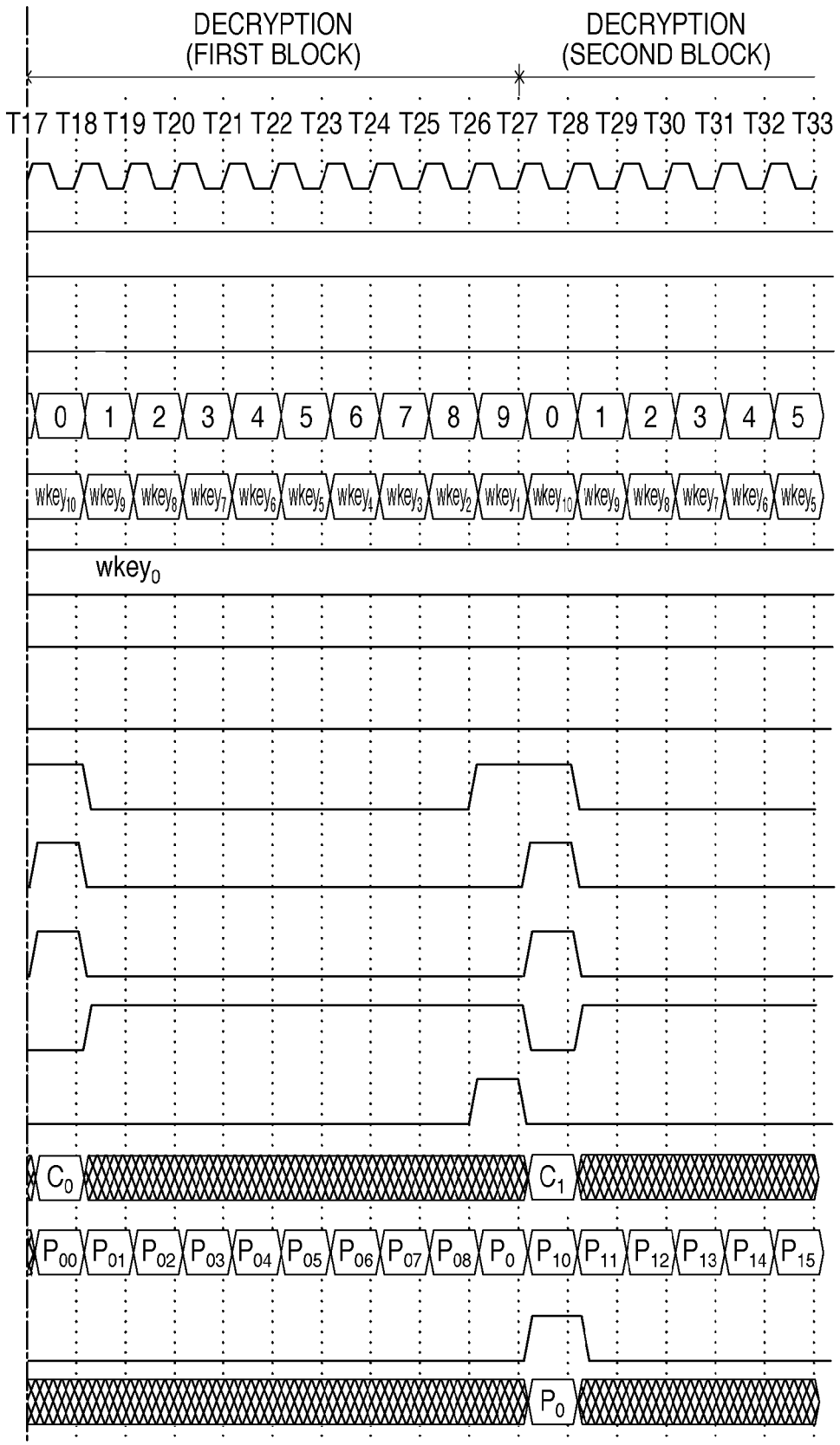

The decryption operation of this embodiment will be described next. FIGS. 19A and 19B are a timing chart of decryption according to this embodiment. Referring to FIGS. 19A and 19B, the abscissa represents the time. Timing names T0, T02, . . . , T33 are assigned to the leading edges of the clock pulses. Three-digit numbers along the ordinate on the left end of FIG. 19A indicate signal lines and have a one-to-one correspondence with the reference numerals of the signal lines used in FIGS. 14 to 17.

The decryption operation shown in the timing chart of FIGS. 19A and 19B is also roughly divided into four parts. The first part is a parameter setting period (T01 to T06) for setting various parameters such as a cipher key. The second part is a key preparation period (T06 to T17) for generating wkey0 and holding it in a register. The third part is a first block decryption period (T17 to T27). The fourth part is a second block decryption period (from T27).

The role, start condition, and end condition of the parameter setting period are the same as in the first embodiment. The key preparation period is from T06 to T17, and its start condition and end condition are the same as in the first embodiment. The operation of each circuit is also almost the same as in the first embodiment. However, the operation of the Key Expansion unit 132 at the timing T16, and the operations of the Key Expansion unit 132 and the control unit 134 at the timing T17 are different from the first embodiment and will therefore be described below.

At the timing T16, the Key Expansion unit 132 outputs wkey0 as the Round Key B 163. The Round Key wkey0 is held in the register provided in the Key Expansion unit 132.

At the timing T17, the Key Expansion unit 132 outputs wkey10 as the Round Key A 162. The control unit 134 asserts the selection signal 170.

The first block decryption period is from T17 to T27, and its start condition and end condition are the same as in the first embodiment. The operation of each circuit is also almost the same as in the first embodiment.

The control unit 134 asserts the selection signal 170 at the end of decryption and negates it in the first cycle of decryption (T18 or T28). The control unit 134 also asserts the selection signal 175 in the final cycle of decryption (T16) and negates it at the end of decryption (T17). The control unit 134 also asserts the selection signal 171 in the first cycle of decryption and negates it at the end of decryption.

As described in association with the circuit arrangement, when the selection signal 171 is negated, the selector 109 selects the input signal 150. When the selection signal 171 is asserted, the selector 109 selects the output from the data holding unit 108. When the selection signal 170 is negated, the selector 118 selects and outputs the output from the Inv-MixColumns Transformation module 116. When the selection signal 170 is asserted, the selector 118 selects and outputs the output from AddRoundKey Transformation module 121. When the selection signal 175 is negated, the selector 138 selects and outputs the output from the InvSubBytes Transformation module 120. When the selection signal 175 is asserted, the selector 138 selects and outputs the output from the AddRoundKey Transformation module 117.

Hence, in the 0th cycle (T17 to T18), the modified round function module 136 executes AddRoundKey Transformation, InvShiftRows Transformation, and InvSubBytes Transformation for the input signal 150. From the first cycle, the modified round function module outputs a result obtained by executing AddRoundKey Transformation, InvMixColumns Transformation, InvShiftRows Transformation, and InvSubBytes Transformation for the result of immediately preceding cycle. In the ninth cycle (T26 to T27), the modified round function module outputs a result obtained by executing AddRoundKey Transformation, InvMixColumns Transformation, InvShiftRows Transformation, InvSubBytes Transformation, and AddRoundKey Transformation.

The modified round function module 136 can execute decryption as shown in FIG. 11 by controlling the selection signals 171, 170, and 175 in the above-described way.

On the other hand, the Key Expansion unit 132 outputs wkey10 as the Round Key A 162 and wkey0 as the Round Key B 163 after the key preparation period. For this reason, wkey10 is supplied to the modified round function module 136 at the start of decryption (T17). Upon detecting the start of decryption based on the decryption/decryption start signal 158 (T17), the Key Expansion unit 132 generates wkey9 using wkey10 held in the Round Key A register and holds wkey9 in the Round Key A register. Hence, wkey9 is supplied to the modified round function module 136 at T18. The Round Keys are supplied in the same way up to T26. When wkey1 is held in the Round Key A register, and Round Key supply is ended at T26, the Key Expansion unit 132 loads, in the Round Key A register, wkey10 held in the internal register of the Key Expansion unit to prepare for the start of the next decryption (T27).

When the Key Expansion unit 132 operates in the above-described manner, the modified round function module 136 can use the Round Key in each cycle as shown in FIG. 11.

The operation during the decryption period according to the second embodiment is performed in the above-described way. The decryption operation of the second block is performed in the same way as that for the first block. From then on, the decryption operation is repeatedly performed as many as a predetermined number of blocks. In the timing chart of FIGS. 19A and 19B, the decryption of the second block starts at a shortest interval from the end of the decryption of the first block. The AES Core can exhibit its maximum performance by executing the decryption of all blocks at such a timing. However, the decryption interval can fundamentally be set to an arbitrary length.

When the decryption of a predetermined number of blocks has completely finished, and the next job is to be executed using different parameters such as a cipher key, the processing starts again from parameter setting.

The second embodiment can be implemented in the above-described way. In the second embodiment, the maximum value of the summation of the signal processing time for each of the sub-block transformations that must be executed in one cycle slightly increases. However, this hardly poses a problem in many cases because the maximum value of the summation of the decryption processing time for each of the sub-block transformations in each clock cycle period is often set with a sufficient margin to one cycle time. For this reason, in many cases, the number of clock cycles required for AES encryption can be decreased by one. This raises the AES processing speed about 10%.

The above-described second embodiment is merely an example of the present invention, and the effects of the present invention are not limited to those of the above-described embodiment.

Third Embodiment

FIG. 20 is a view showing the process contents of encryption and decryption executed in clock cycles according to the third embodiment. Referring to FIG. 20, a cycle count indicates a clock cycle count that is "0" at the start of AES processing.

In encryption of the third embodiment, AddRoundKey Transformation, ShiftRows Transformation, and SubBytes Transformation are executed in the 0th cycle. In the first to eighth cycles, AddRoundKey Transformation, ShiftRows Transformation, SubBytes Transformation, and MixColumns Transformation are executed. In the ninth cycle, MixColumns Transformation, first AddRoundKey Transformation, SubBytes Transformation, ShiftRows Transformation, and second AddRoundKey Transformation are executed. As the Round Keys, wkey0 is used in the 0th cycle, wkey1 is used in the first cycle, . . . , and wkey8 is used in the eighth cycle. In the ninth cycle, two Round Keys wkey9 and wkey10 are used.

In the third embodiment, the same processing as in the prior art is executed as a whole. In the third embodiment, however, AES encryption can be executed in clock cycles fewer by one.

The summation of the signal processing time for each of the sub-block transformations executed in clock cycles according to the third embodiment will be described next. FIG. 21 is a view showing the comparison between the summation of the encryption processing time for each of the sub-block transformations in each clock cycle period in the third embodiment and that of the prior art. The ordinate represents the time. The longer the bar is, the longer the processing time is. To implement the third embodiment, the maximum value of the summation of the signal processing time for each of the sub-block transformations in each clock cycle period must be less than one cycle time. As shown in FIG. 21, the processing time of each sub-block transformation is longest in SubBytes Transformation and shortens in the order of MixColumns Transformation, AddRoundKey Transformation, and ShiftRows Transformation.

In the third embodiment, the summation of the signal processing time for each of the sub-block transformations in the ninth cycle where first AddRoundKey Transformation, SubBytes Transformation, ShiftRows Transformation, MixColumns Transformation, and second AddRoundKey Transformation are executed is longer than the summation of the signal processing time for each of the sub-block transformations in the first to eighth cycles where AddRoundKey Transformation, SubBytes Transformation, ShiftRows Transformation, and MixColumns Transformation are executed or the summation of the signal processing time for each of the sub-block transformations in the 0th cycle where AddRoundKey Transformation, SubBytes Transformation, and ShiftRows Transformation are executed. Hence, the maximum value of the summation of the signal processing time for each of the sub-block transformations of the third embodiment is larger than that of the prior art by an amount corresponding to the processing time of one AddRoundKey Transformation. However, the processing time of one AddRoundKey Transformation is much shorter than the summation of the signal processing time for each of the sub-block transformations in one cycle. The maximum value of the summation of the signal processing time for each of the sub-block transformations in each clock cycle period is often set with a sufficient margin to one cycle time. For this reason, if the maximum value of the summation of the decryption processing time for each of the sub-block transformations in each clock cycle period of the prior art is shorter than one cycle time, this embodiment is also supposed to be implementable in many cases.

The present invention is also applicable to AES decryption.

As shown in FIG. 20, in decryption of the third embodiment, first AddRoundKey Transformation, InvShiftRows Transformation, InvSubBytes Transformation, InvMixColumns Transformation, and second AddRoundKey Transformation are executed in the 0th cycle. In the first to eighth cycles, AddRoundKey Transformation, InvShiftRows Transformation, InvSubBytes Transformation, and InvMixColumns Transformation are executed. In the ninth cycle, AddRoundKey Transformation, InvShiftRows Transformation, and InvSubBytes Transformation are executed. As the Round Keys, wkey10 and wkey9 are used in the 0th cycle, wkey8 is used in the first cycle, ..., and wkey0 is used in the ninth cycle.

In the third embodiment, the same processing as in the prior art is executed as a whole. In this embodiment, however, AES decryption can be executed in clock cycles fewer by one.

The summation of the signal processing time for each of the sub-block transformations executed in clock cycles according to the third embodiment will be described next. FIG. 22 is a view showing the comparison between the summation of the signal processing time for each of the sub-block transformations executed in clock cycles in the third embodiment and that of the prior art. The ordinate represents the time. The longer the bar is, the longer the processing time is. To implement this embodiment, the maximum value of the summation of the signal processing time for each of the sub-block transformations in each clock cycle period must be less than one cycle time. As shown in FIG. 22, the processing time of each sub-block transformation is longest in InvSubBytes Transformation, and shortens in the order of InvMixColumns Transformation, AddRoundKey Transformation, and InvShiftRows Transformation.

In the third embodiment, the summation of the signal processing time for each of the sub-block transformations in the 0th cycle where first AddRoundKey Transformation, InvSubBytes Transformation, InvShiftRows Transformation, InvMixColumns Transformation, and second AddRoundKey Transformation are executed is longer than the summation of the signal processing time for each of the sub-block transformations in the first to eighth cycles where AddRoundKey Transformation, InvSubBytes Transformation, InvShiftRows Transformation, and InvMixColumns Transformation are executed, or the summation of the signal processing time for each of the sub-block transformations in the ninth cycle where AddRoundKey Transformation, InvSubBytes Transformation, and InvShiftRows Transformation are executed. Hence, the maximum value of the summation of the signal processing time for each of the sub-block transformations of the third embodiment is larger than that of the prior art by an amount corresponding to the processing time of one AddRoundKey Transformation. However, the processing time of one AddRoundKey Transformation is much shorter than the summation of the signal processing time for each of the sub-block transformations in one cycle. The maximum value of the summation of the signal processing time for each of the sub-block transformations in each clock cycle period is often set with a sufficient margin to one cycle time. For this reason, if the maximum value of the summation of the signal processing time for each of the sub-block transformations in each clock cycle period of the prior art is shorter than one cycle time, this embodiment is also supposed to be implementable in many cases.

The above-described characteristic features of the third embodiment will be summarized.

In the conventional general implementation method, a round function defined by the standards is regarded as a break in processing, and encryption and decryption are distributed to clock cycles. For this reason, the summation of the signal processing time for each of the sub-block transformations in the 10th and 0th cycles is shorter than the summation of the signal processing time for each of the sub-block transformations in each of the first to ninth cycles. That is, the summation of the signal processing time for each of the sub-block transformations executed in each cycle varies.

On the other hand, in the third embodiment, the signal processing in some clock cycles is increased so that the difference among the summation of the signal processing time for each of the sub-block transformations in each clock cycle period reduces.

In the third embodiment, the maximum value of the summation of the signal processing time for each of the sub-block transformations executed in one cycle slightly increases. For this reason, the embodiment is not necessarily implementable under conditions where the prior art can be implemented. However, this hardly poses a problem in many cases because the maximum value of the summation of the signal processing time for each of the sub-block transformations in each clock cycle period is often set with a sufficient margin to one cycle time. In many cases, the number of clock cycles required for AES encryption or decryption can be decreased by one. This raises the AES processing speed about 10%.

Figure 23:
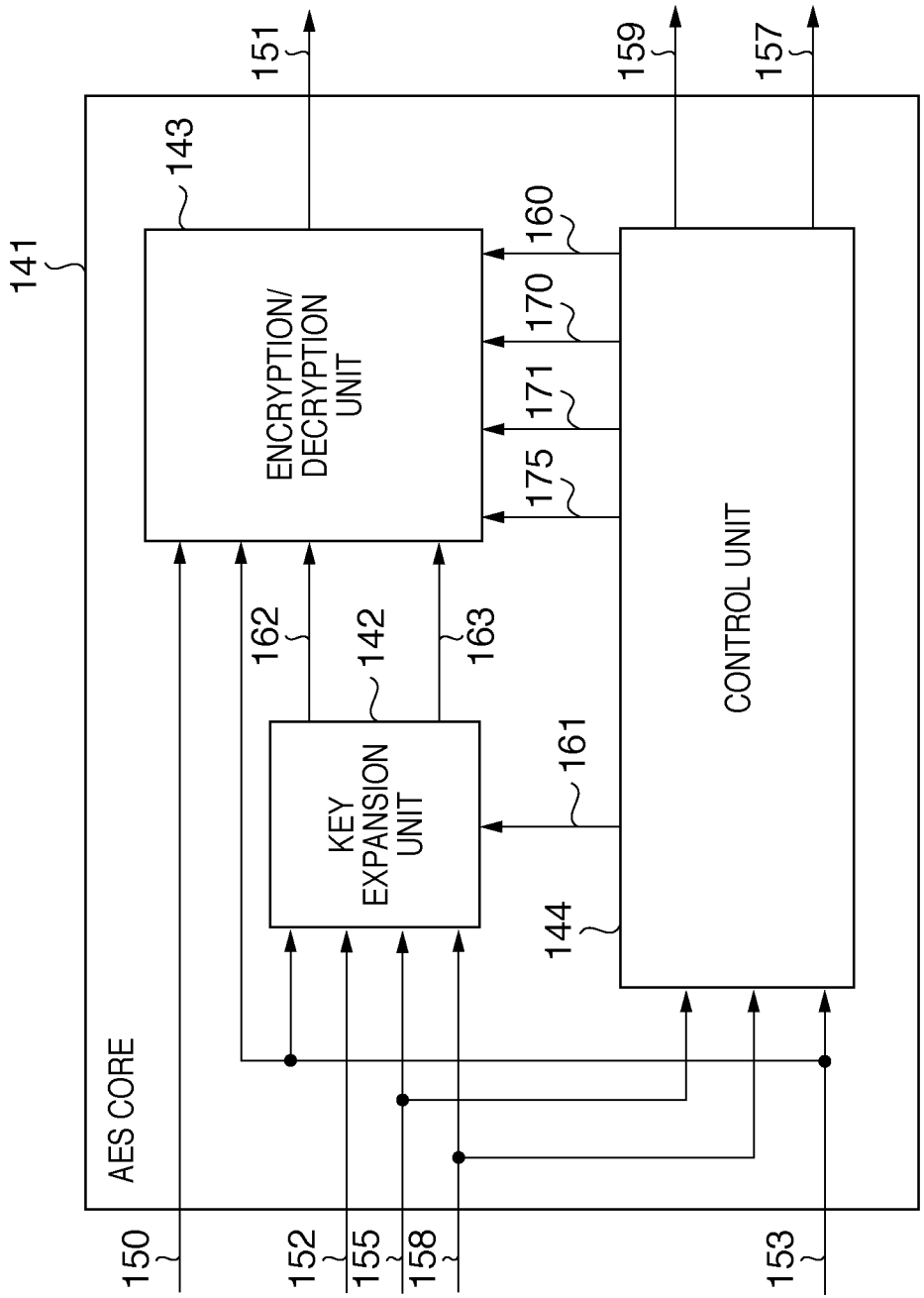
FIG. 23 is a block diagram of an AES Core according to the third embodiment.

The circuit arrangement of an AES Core for implementing AES encryption and decryption will be described next. FIG. 23 is a block diagram of an AES Core according to this embodiment. Referring to FIG. 23, an AES Core 141 executes AES processing. A Key Expansion unit 142 generates a Round Key necessary for AES encryption and decryption from a cipher key and outputs the Round Key. An encryption/decryption unit 143 executes encryption of 128-bit plaintext data or decryption of 128-bit ciphertext data using the Round Key supplied from the Key Expansion unit 142. A control unit 144 receives a control signal from a unit outside the AES Core 141 and generates signals to control the operations of the Key Expansion unit 142 and encryption/decryption unit 143 and a signal to notify the unit outside the AES Core 141 of completion of the operation.

A description of constituent elements and signal lines in FIG. 23, which are the same as those described in the first and second embodiments, will be omitted.

Figure 24:
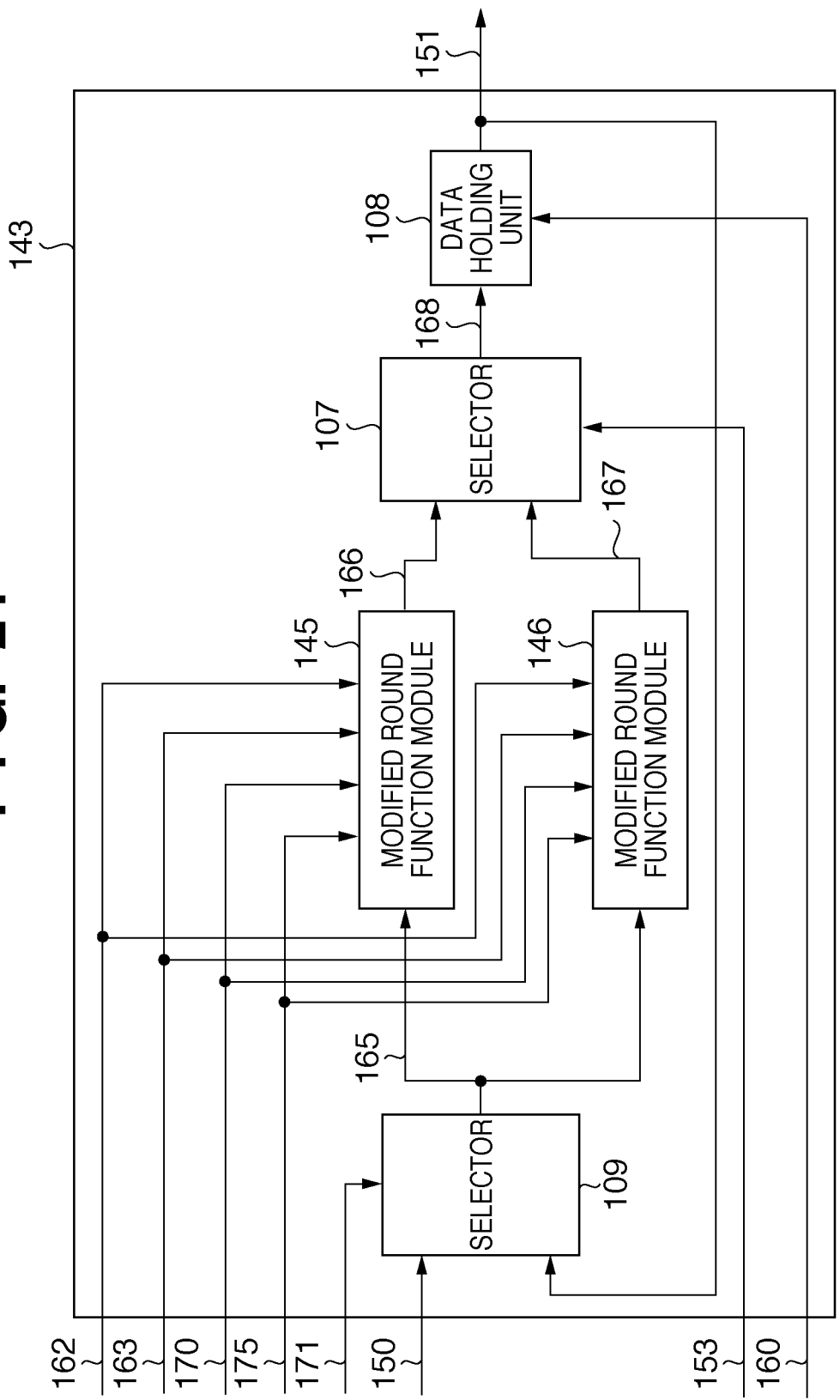
FIG. 24 is a block diagram of an encryption/decryption unit according to the third embodiment.

The encryption/decryption unit 143 will be described next. FIG. 24 is a block diagram showing the encryption/decryption unit 143. Referring to FIG. 24, a modified round function module 145 executes encryption of one cycle using a Round Key A 162 and a Round Key B 163 under the control of selection signals 170 and 175. A modified round function module 146 executes decryption using the Round Key A 162 and the Round Key B 163 under the control of the selection signals 170 and 175.

In the above arrangement, when a selection signal 171 is negated, a selector 109 of the encryption/decryption unit 143 selects an input signal 150. When the selection signal 171 is asserted, the selector 109 selects the output from a data holding unit 108.

A description of constituent elements and signal lines in FIG. 24, which are the same as those described in the first embodiment, will be omitted.

The modified round function module 145 will be described next. FIG. 25 is a block diagram of the modified round function module 145. Referring to FIG. 25, a MixColumns Transformation module 113 receives an input signal 165 and executes MixColumns Transformation. A selector 137 selects and outputs one of the input signal 165 and the output from the MixColumns Transformation module 113 in accordance with the selection signal 175. An AddRoundKey Transformation module 110 receives the output from the selector 137 and the Round Key A 162 and executes AddRoundKey Transformation. A SubBytes Transformation module 111 receives the output from the AddRoundKey Transformation module 110 and executes SubBytes Transformation. A ShiftRows Transformation module 112 receives the output from the SubBytes Transformation module 111 and executes ShiftRows Transformation. An AddRoundKey Transformation module 114 receives the output from the ShiftRows Transformation module 112 and the Round Key B 163 and executes AddRoundKey Transformation. A selector 115 selects and outputs one of the output from the ShiftRows Transformation module 112 and the output from the AddRoundKey Transformation module 114 in accordance with the selection signal 170. The output signal of the selector 115 is the output signal of the modified round function module 145.

In the above arrangement, when the selection signal 170 is negated, the selector 115 selects and outputs the output from the ShiftRows Transformation module 112. When the selection signal 170 is asserted, the selector 115 selects and outputs the output from the AddRoundKey Transformation module 114. When the selection signal 175 is negated, the selector 137 selects and outputs the output from the MixColumns Transformation module 113. When the selection signal 175 is asserted, the selector 137 selects and outputs the input signal 165.

Figure 26:
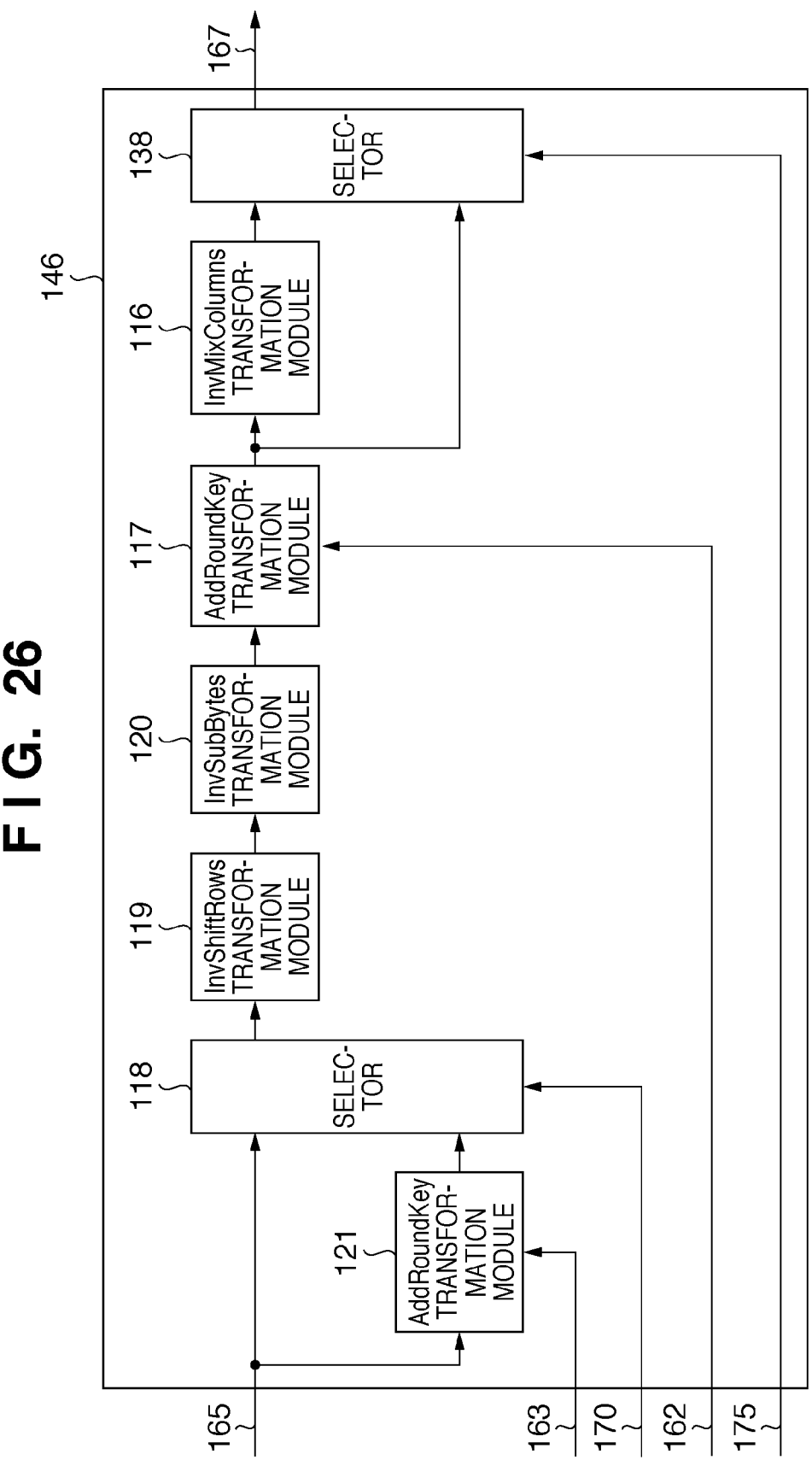
FIG. 26 is a block diagram of a modified round function module for decryption according to the third embodiment.

The modified round function module 146 will be described next. FIG. 26 is a block diagram of the modified round function module 146. Referring to FIG. 26, an AddRoundKey Transformation module 121 receives the input signal 165 and the Round Key A 162 and executes AddRoundKey Transformation. A selector 118 selects and outputs one of the input signal 165 and the output from the AddRoundKey Transformation module 121 in accordance with the selection signal 170. An InvShiftRows Transformation module 119 receives the output from the selector 118 and executes InvShiftRows Transformation. An InvSubBytes Transformation module 120 receives the output from the InvShiftRows Transformation module 119 and executes InvSubBytes Transformation. An AddRoundKey Transformation module 117 receives the output from the InvSubBytes Transformation module 120 and the Round Key B 163 and executes AddRoundKey Transformation. An InvMixColumns Transformation module 116 receives the output from the AddRoundKey Transformation module 117 and executes InvMixColumns Transformation. A selector 138 selects and outputs one of the output from the InvMixColumns Transformation module 116 and the output from the AddRoundKey Transformation module 117 in accordance with the selection signal 175. The output of the selector 138 is the output of the modified round function module 146.

In the above arrangement, when the selection signal 170 is negated, the selector 118 selects and outputs the input signal 165. When the selection signal 170 is asserted, the selector 118 selects and outputs the output from the AddRoundKey Transformation module 121. When the selection signal 175 is negated, the selector 138 selects and outputs the output from the InvMixColumns Transformation module 116. When the selection signal 175 is asserted, the selector 138 selects and outputs the output from the AddRoundKey Transformation module 117.

Figure 27A:
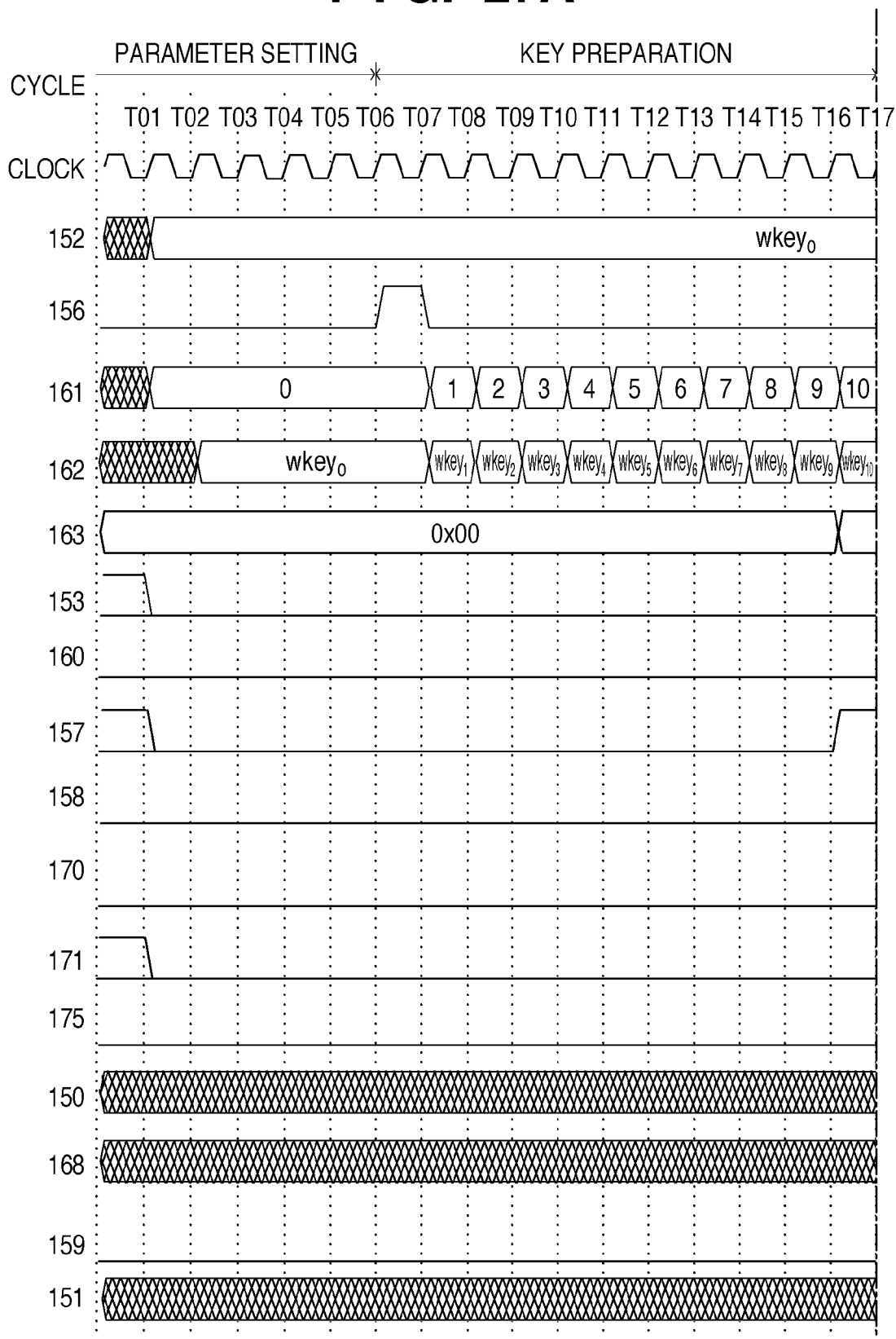
FIGS. 27A and 28B are a timing chart of encryption according to the third embodiment.
Figure 27B:
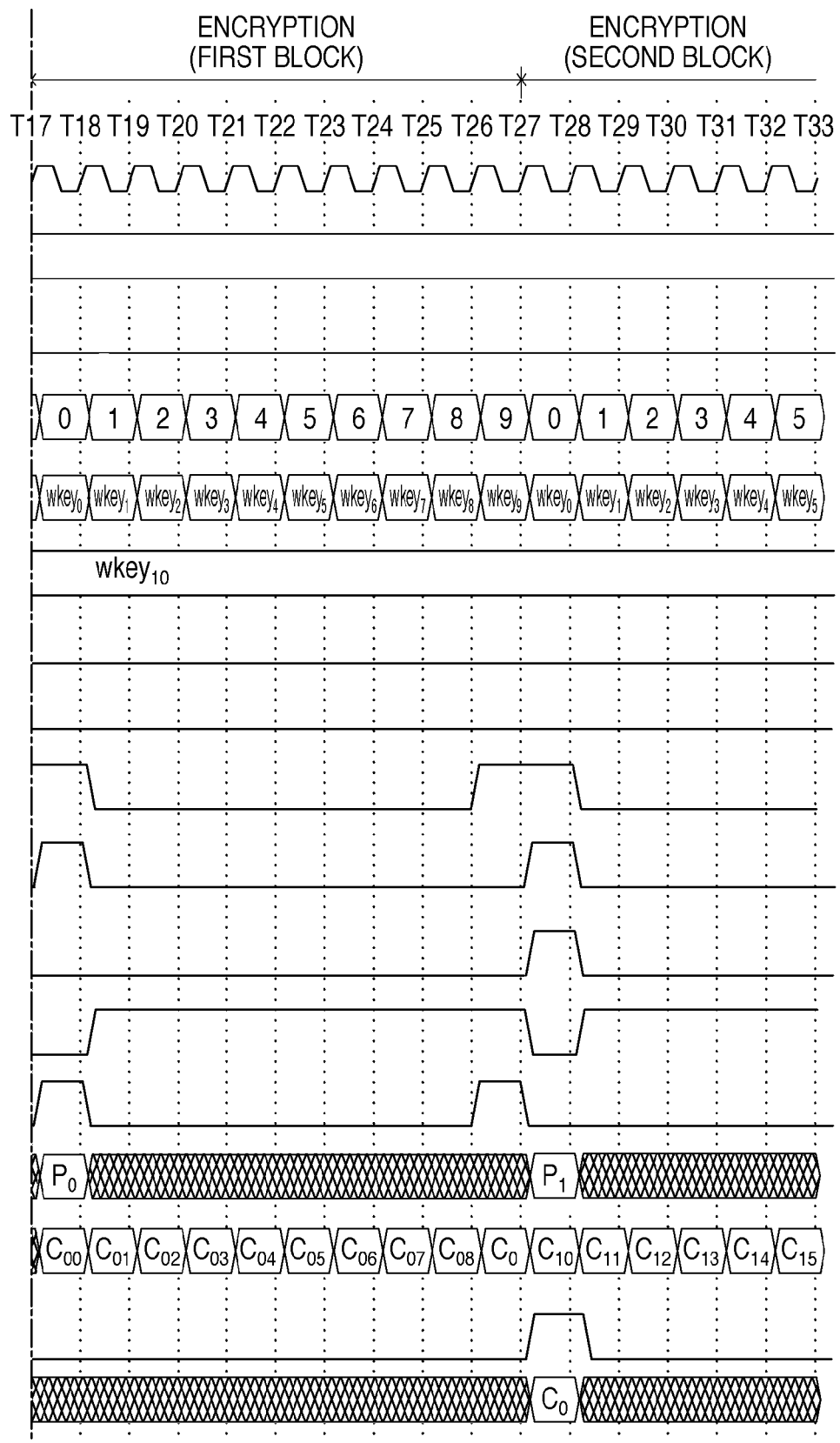

The encryption operation in the above arrangement will be described next. FIGS. 27A and 27B are a timing chart of encryption according to this embodiment. Referring to FIGS. 27A and 27B, the abscissa represents the time. Timing names T01, T02, . . . , T33 are assigned to the leading edges of the clock pulses. Three-digit numbers along the ordinate on the left end of FIG. 27A indicate signal lines and have a one-to-one correspondence with the reference numerals of the signal lines used in FIGS. 23 to 26.

The encryption operation shown in the timing chart of FIGS. 27A and 27B is roughly divided into four parts. The first part is a parameter setting period (T01 to T06) for setting various parameters such as a cipher key. The second part is a key preparation period (T06 to T17) for generating wkey0 and holding it in a register. The third part is a first block encryption period (T17 to T27). The fourth part is a second block encryption period (from T27).

The role, start condition, and end condition of the parameter setting period are the same as in the first embodiment. The key preparation period is from T06 to T17, and its start condition and end condition are the same as in the first embodiment. The operation of each circuit is also almost the same as in the first embodiment. However, the control unit 144 asserts the selection signal 175 at the end of the key preparation period (T17).

The first block encryption period is from T17 to T27, and its start condition and end condition are the same as in the first embodiment. The operation of each circuit is also almost the same as in the first embodiment.

The control unit 144 asserts the selection signal 175 at the end of encryption and negates it in the first cycle of encryption (T18 or T28). The control unit 144 also asserts the selection signal 170 in the final cycle of encryption (T16) and negates it at the end of encryption (T17). The control unit 144 also asserts the selection signal 171 in the first cycle of encryption and negates it at the end of encryption.

As described in association with the circuit arrangement, when the selection signal 171 is negated, the selector 109 selects the input signal 150. When the selection signal 171 is asserted, the selector 109 selects the output from the data holding unit 108. When the selection signal 170 is negated, the selector 115 selects and outputs the output from the ShiftRows Transformation module 112. When the selection signal 170 is asserted, the selector 115 selects and outputs the output from the AddRoundKey Transformation module 114. When the selection signal 175 is negated, the selector 137 selects and outputs the output from the MixColumns Transformation module 113. When the selection signal 175 is asserted, the selector 137 selects and outputs the input signal 165.

Hence, in the 0th cycle (T17 to T18), the modified round function module 145 executes AddRoundKey Transformation, SubBytes Transformation, and ShiftRows Transformation for the input signal 150. From the first cycle, the modified round function module outputs a result obtained by executing SubBytes Transformation, ShiftRows Transformation, MixColumns Transformation, and AddRoundKey Transformation for the result of immediately preceding cycle. In the ninth cycle (T26 to T27), the modified round function module outputs a result obtained by executing MixColumns Transformation, AddRoundKey Transformation, SubBytes Transformation, ShiftRows Transformation, and AddRoundKey Transformation.

The modified round function module 145 can execute encryption as shown in FIG. 20 by controlling the selection signals 171, 170, and 175 in the above-described way.

On the other hand, the Key Expansion unit 142 outputs wkey0 as the Round Key A 162 and wkey10 as the Round Key B 163 after the key preparation period. For this reason, wkey0 is supplied to the modified round function module 145 at the start of encryption (T17). Upon detecting the start of encryption based on an encryption/decryption start signal 158 (T17), the Key Expansion unit 142 generates wkey1 using wkey0 held in the Round Key A register and holds wkey1 in the Round Key A register. Hence, wkey1 is supplied to the modified round function module 145 at the timing T18. The Round Keys are supplied in the same way up to T26. At T26, wkey10 as the Round Key B 163 is also supplied. When wkey10 is held in the Round Key A register, and Round Key supply is ended at T26, the Key Expansion unit 142 holds, in the Round Key A register, wkey0 that is continuously externally supplied as a cipher key 152 to prepare for the start of the next encryption (T27).

When the Key Expansion unit 142 operates in the above-described manner, the modified round function module 145 can use the Round Key in each cycle as shown in FIG. 20.

The operation during the encryption period according to the third embodiment is performed in the above-described way. The decryption operation of the second block is performed in the same way as that for the first block. From then on, the encryption operation is repeatedly performed as many as a predetermined number of blocks. In the timing chart of FIGS. 27A and 27B, the encryption of the second block starts at a shortest interval from the end of the encryption of the first block. The AES Core can exhibit its maximum performance by executing the encryption of all blocks at such a timing. However, the encryption interval can fundamentally be set to an arbitrary length.

When the encryption of a predetermined number of blocks has completely finished, and the next job is to be executed using different parameters such as a cipher key, the processing starts again from parameter setting.

Figure 28A:
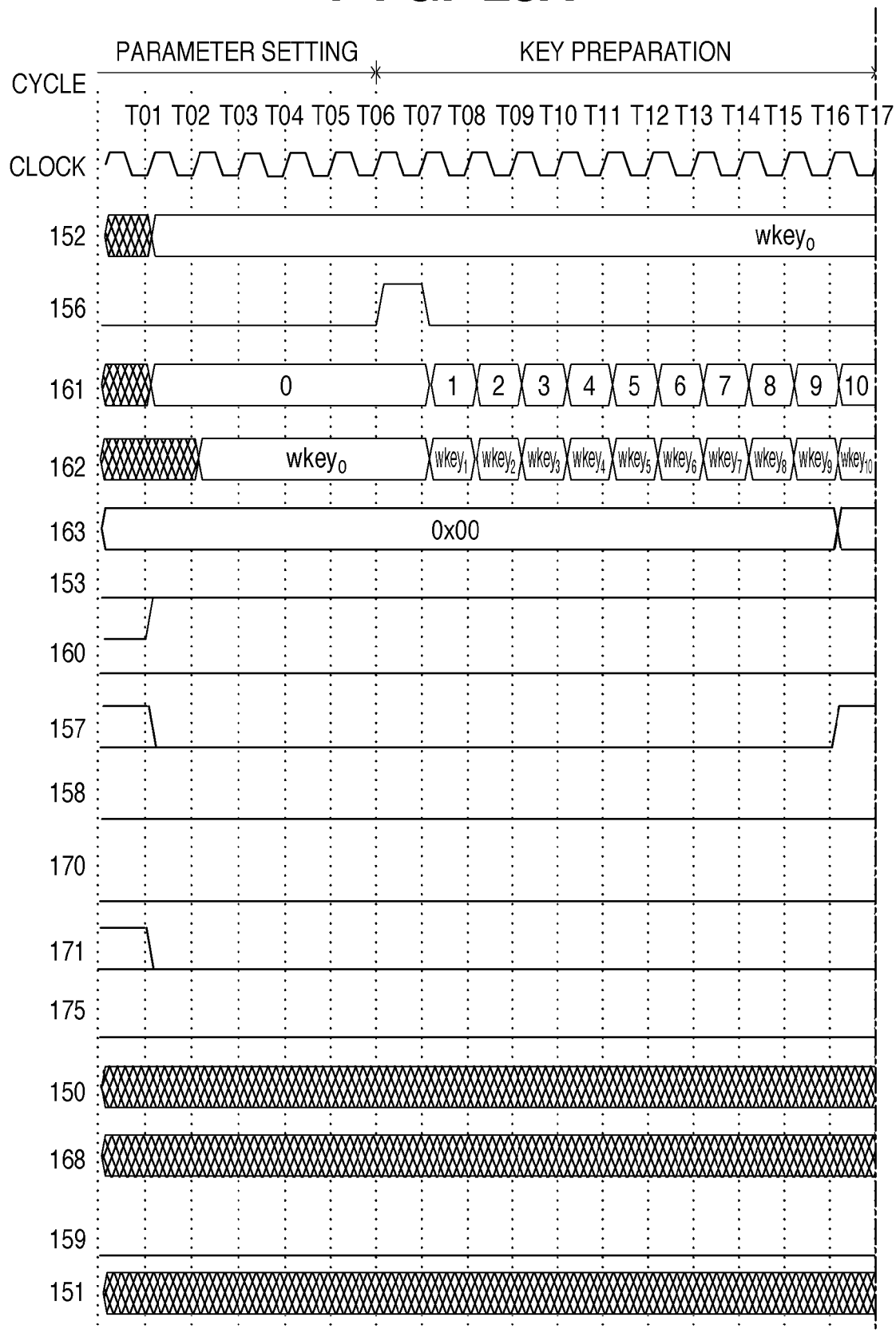
Figure 28B:
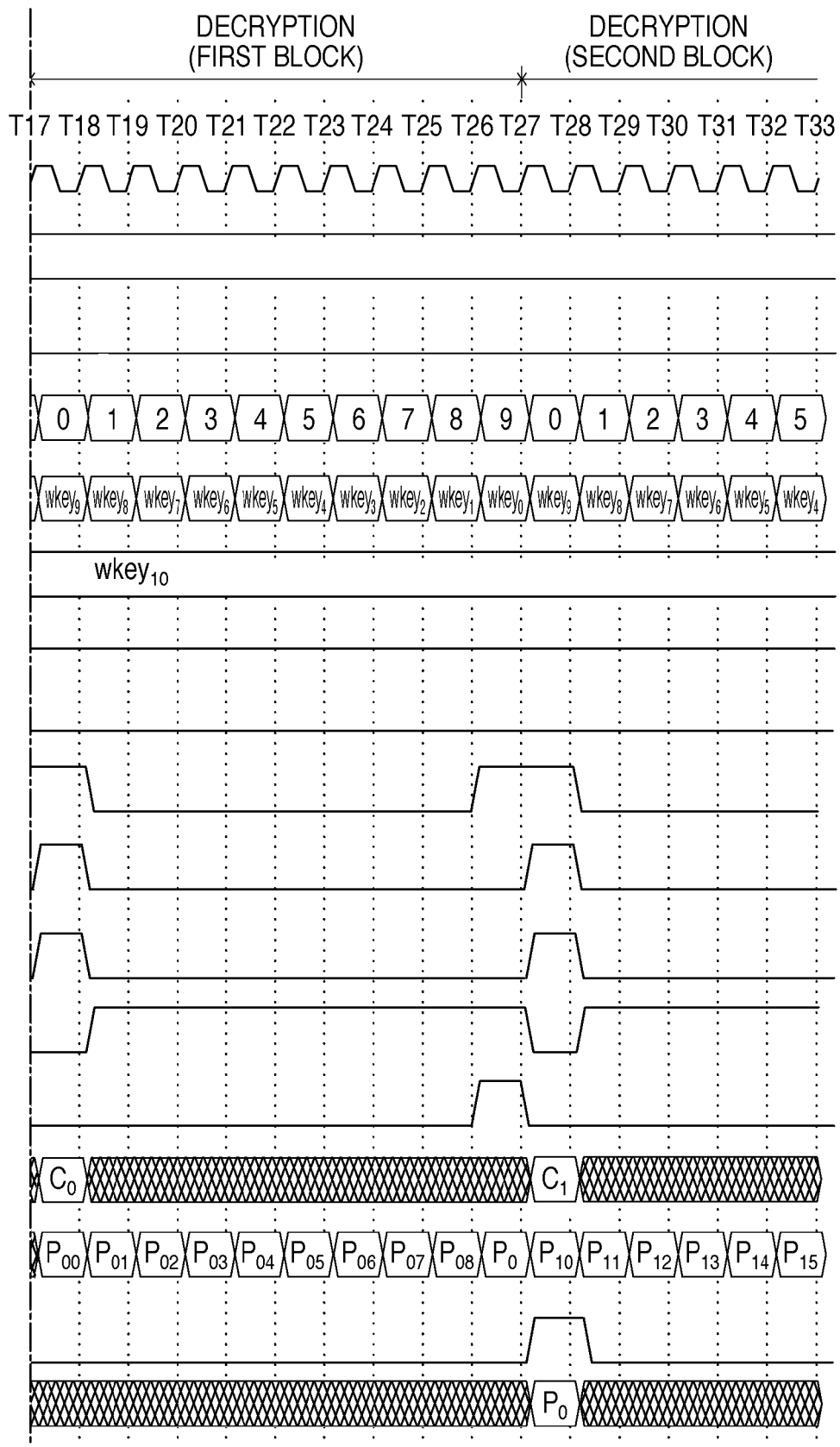

The decryption operation of this embodiment will be described next. FIGS. 28A and 28B are a timing chart of decryption according to this embodiment. Referring to FIGS. 28A and 28B, the abscissa represents the time. Timing names T01, T02, ..., T33 are assigned to the leading edges of the clock pulses. Three-digit numbers along the ordinate on the left end of FIG. 28A indicate signal lines and have a one-to-one correspondence with the reference numerals of the signal lines used in FIGS. 23 to 26.

The decryption operation shown in the timing chart of FIGS. 28A and 28B is roughly divided into four parts. The first part is a parameter setting period (T01 to T06) for setting various parameters such as a cipher key. The second part is a key preparation period (T06 to T17) for generating wkey0 and holding it in a register. The third part is a first block decryption period (T17 to T27). The fourth part is a second block decryption period (from T27).

The role, start condition, and end condition of the parameter setting period are the same as in the first embodiment. The key preparation period is from T06 to T17, and its start condition and end condition are the same as in the first embodiment. The operation of each circuit is also almost the same as in the first embodiment. However, the control unit 144 asserts the selection signal 170 at the end of the key preparation period (T17).

The first block decryption period is from T17 to T27, and its start condition and end condition are the same as in the first embodiment. The operation of each circuit is also almost the same as in the first embodiment.

The control unit 144 asserts the selection signal 170 at the end of decryption and negates it in the first cycle of decryption (T18 or T28). The control unit 144 also asserts the selection signal 175 in the final cycle of decryption (T16) and negates it at the end of decryption (T17). The control unit 144 also asserts the selection signal 171 in the first cycle of decryption and negates it at the end of decryption.

As described in association with the circuit arrangement, when the selection signal 171 is negated, the selector 109 selects the input signal 150. When the selection signal 171 is asserted, the selector 109 selects the output from the data holding unit 108. When the selection signal 170 is negated, the selector 118 selects and outputs the input signal 165. When the selection signal 170 is asserted, the selector 118 selects and outputs the output from AddRoundKey Transformation module 121. When the selection signal 175 is negated, the selector 138 selects and outputs the output from the InvMixColumns Transformation module 116. When the selection signal 175 is asserted, the selector 138 selects and outputs the output from the AddRoundKey Transformation module 117.

Hence, in the 0th cycle (T17 to T18), the modified round function module 146 executes AddRoundKey Transformation, InvShiftRows Transformation, InvSubBytes Transformation, AddRoundKey Transformation, and InvMixColumns Transformation for the input signal 150. From the first cycle, the modified round function module outputs a result obtained by executing InvShiftRows Transformation, InvSubBytes Transformation, AddRoundKey Transformation, and InvMixColumns Transformation for the result of immediately preceding cycle. In the ninth cycle (T26 to T27), the modified round function module outputs a result obtained by executing InvShiftRows Transformation, InvSubBytes Transformation, and AddRoundKey Transformation.

The modified round function module 146 can execute decryption as shown in FIG. 20 by controlling the selection signals 171, 170, and 175 in the above-described way.

On the other hand, the Key Expansion unit 142 outputs wkey9 as the Round Key A 162 and wkey10 as the Round Key B 163 after the key preparation period. For this reason, wkey10 and wkey9 are supplied to the modified round function module 146 at the start of decryption (T17). Upon detecting the start of decryption based on the decryption/decryption start signal 158 (T17), the Key Expansion unit 142 generates wkey8 using wkey9 held in the Round Key A register and holds wkey8 in the Round Key A register. Hence, wkey8 is supplied to the modified round function module 146 at T18. The Round Keys are supplied in the same way up to T26. When wkey0 is held in the Round Key A register, and Round Key supply is ended at T26, the Key Expansion unit 142 generates wkey9 using wkey10 held in the Round Key B register and holds wkey9 in the Round Key A register to prepare for the start of the next decryption (T27).

When the Key Expansion unit 142 operates in the above-described manner, the modified round function module 146 can use the Round Key in each cycle as shown in FIG. 20.

The operation during the decryption period according to this embodiment is performed in the above-described way. The decryption operation of the second block is performed in the same way as that for the first block. From then on, the decryption operation is repeatedly performed as many as a predetermined number of blocks. In the timing chart of FIGS. 28A and 28B, the decryption of the second block starts at a shortest interval from the end of the decryption of the first block. The AES Core can exhibit its maximum performance by executing the decryption of all blocks at such a timing. However, the decryption interval can fundamentally be set to an arbitrary length.

When the decryption of a predetermined number of blocks has completely finished, and the next job is to be executed using different parameters such as a cipher key, the processing starts again from parameter setting.

The third embodiment can be implemented in the above-described way. In the third embodiment, the maximum value of the summation of the signal processing time for each of the sub-block transformations that must be executed in one cycle slightly increases. However, this hardly poses a problem in many cases because the maximum value of the summation of the signal processing time for each of the sub-block transformations in each clock cycle period is often set with a sufficient margin to one cycle time. For this reason, in many cases, the number of clock cycles required for AES encryption and decryption can be decreased by one. This raises the AES processing speed about 10%.

As described above, a number of embodiments can be obtained in addition to the basic first embodiment by applying the idea of the present invention. The examples are the second and third embodiments. An arrangement for executing AddRoundKey Transformation twice in an arbitrary cycle of encryption is also available, as shown in FIG. 26 that illustrates an arrangement for executing AddRoundKey Transformation twice in the eighth cycle. The embodiments are merely examples of the present invention, and the effects of the present invention are not limited to those described the embodiments.

Fourth Embodiment

In the fourth embodiment, decryption is executed using Equivalent Inverse Cipher described in FIPS197.

FIG. 29 shows the comparison between the process contents of encryption executed in clock cycles in the fourth embodiment and those of the prior art.

Referring to FIG. 29, a cycle count indicates a clock cycle count that is "0" at the start of AES processing.

In this embodiment, AddRoundKey Transformation, ShiftRows Transformation, SubBytes Transformation, and MixColumns Transformation are executed in the 0th to eighth cycles. In the ninth cycle, first AddRoundKey Transformation, ShiftRows Transformation, SubBytes Transformation, and second AddRoundKey Transformation are executed. As the Round Keys, wkey0 is used in the 0th cycle, wkey1 is used in the first cycle, . . . , and wkey8 is used in the eighth cycle. In the ninth cycle, two Round Keys wkey9 and wkey10 are used.

In the fourth embodiment, the same processing as in the prior art is executed as a whole. In the fourth embodiment, however, AES encryption can be executed in clock cycles fewer by one.

Figure 31:
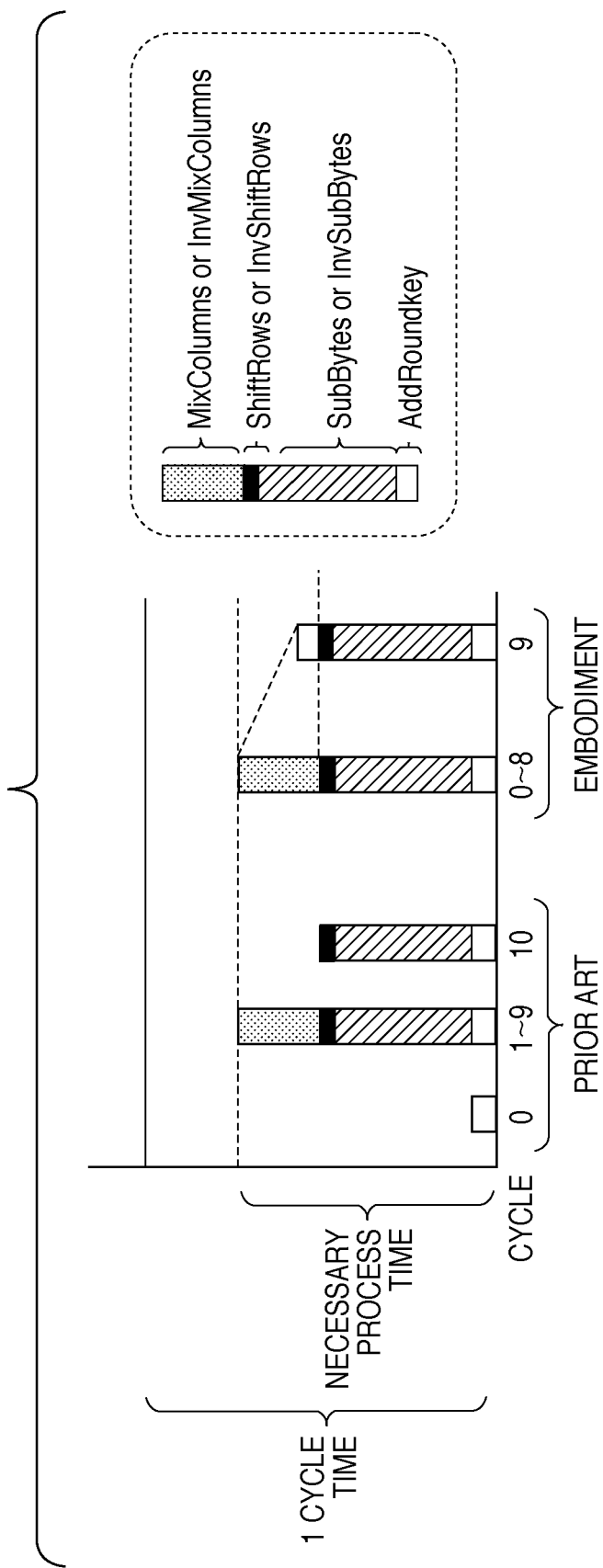
FIG. 31 is a view for comparing the summation of the signal processing time for each sub-block transformations executed in clock cycles in the prior art with that of the fourth embodiment.

The summation of the encryption processing time for each of the sub-block transformations in each clock cycle period according to the fourth embodiment will be described next. FIG. 31 is a view showing the comparison between the summation of the encryption processing time for each of the sub-block transformations in each clock cycle period in the prior art and that of the fourth embodiment. The ordinate represents the time. The longer the bar is, the longer the processing time is. To implement the fourth embodiment, the maximum value of the summation of the signal processing time for each of the sub-block transformations in each clock cycle period must be less than one cycle time. As shown in FIG. 31, the processing time of each sub-block transformation is longest in SubBytes Transformation and shortens in the order of MixColumns Transformation, AddRoundKey Transformation, and ShiftRows Transformation.

In the fourth embodiment, the summation of the signal processing time for each of the sub-block transformations in each of the 0th to eighth cycles where AddRoundKey Transformation, SubBytes Transformation, ShiftRows Transformation, and MixColumns Transformation are executed is longer than the summation of the signal processing time for each of the sub-block transformations in the ninth cycle where first AddRoundKey Transformation, SubBytes Transformation, ShiftRows Transformation, and second AddRoundKey Transformation are executed. Hence, the maximum value of the summation of the signal processing time for each of the sub-block transformations executed in one cycle in the fourth embodiment is equal to that of the prior art. If the maximum value of the summation of the signal processing time for each of the sub-block transformations executed in one cycle is shorter than one cycle time in the prior art, this embodiment can also be implemented.

The present invention is also applicable to AES decryption.

FIG. 30 shows the comparison between the process contents of decryption executed in clock cycles in the fourth embodiment and those of the prior art.

Referring to FIG. 30, a cycle count indicates a clock cycle count that is "0" at the start of AES processing. A modified decryption key wkeyi' (i is the round number) is a Round Key necessary for Equivalent Inverse Cipher described in FIPS197.

In the fourth embodiment, AddRoundKey Transformation, InvShiftRows Transformation, InvSubBytes Transformation, and InvMixColumns Transformation are executed in the 0th to eighth cycles. In the ninth cycle, first AddRoundKey Transformation, InvShiftRows Transformation, InvSubBytes Transformation, and second AddRoundKey Transformation are executed. As the Round Keys, wkey10 is used in the 0th cycle, wkey9' is used in the first cycle, . . . , wkey2' is used in the eighth cycle. In the ninth cycle, two round keys wkey1' and wkey0 are used.

In the fourth embodiment, the same processing as in the prior art is executed as a whole. In the fourth embodiment, however, AES decryption can be executed in clock cycles fewer by one.

The summation of the decryption processing time for each of the sub-block transformations in each clock cycle period according to the fourth embodiment will be described next. FIG. 31 is a view showing the comparison between the summation of the decryption processing time for each of the sub-block transformations in each clock cycle period in the fourth embodiment and that of the prior art. The ordinate represents the time. The longer the bar is, the longer the processing time is. To implement this embodiment, the maximum value of the summation of the signal processing time for each of the sub-block transformations in each clock cycle period must be less than one cycle time. As shown in FIG. 31, the processing time of each sub-block transformation is longest in InvSubBytes Transformation, and shortens in the order of InvMixColumns Transformation, AddRoundKey Transformation, and InvShiftRows Transformation.

In the fourth embodiment, the summation of the signal processing time for each of the sub-block transformations in each of the 0th to eighth cycles where AddRoundKey Transformation, InvSubBytes Transformation, InvShiftRows Transformation, and InvMixColumns Transformation are executed is longer than the summation of the signal processing time for each of the sub-block transformations in the ninth cycle where first AddRoundKey Transformation, InvSubBytes Transformation, InvShiftRows Transformation, and second AddRoundKey Transformation are executed. Hence, the maximum value of the summation of the signal processing time for each of the sub-block transformations executed in one cycle in this embodiment is equal to that of the prior art. If the maximum value of the summation of the signal processing time for each of the sub-block transformations executed in one cycle is shorter than one cycle time in the prior art, this embodiment can also be implemented The above-described characteristic features of the fourth embodiment will be summarized.

In the conventional general implementation method, a round function defined by the standards is regarded as a break in processing, and encryption and decryption are distributed to clock cycles. For this reason, the summation of the signal processing time for each of the sub-block transformations in the 10th and 0th cycles is shorter than the summation of the signal processing time for each of the sub-block transformations in each of the first to ninth cycles. That is, the summation of the signal processing time for each of the sub-block transformations executed in each cycle varies.

On the other hand, in the fourth embodiment, the signal processing in some clock cycles is increased so that the difference among the summation of the signal processing time for each of the sub-block transformations in each clock cycle period is minimized. In the present invention, the number of clock cycles required for AES encryption or decryption is decreased by one cycle without increasing the summation of the signal processing time for each of the sub-block transformations executed in one cycle. This raises the AES processing speed about 10%.

The circuit arrangement of an AES Core for implementing AES encryption and decryption will be described next.

Figure 32:
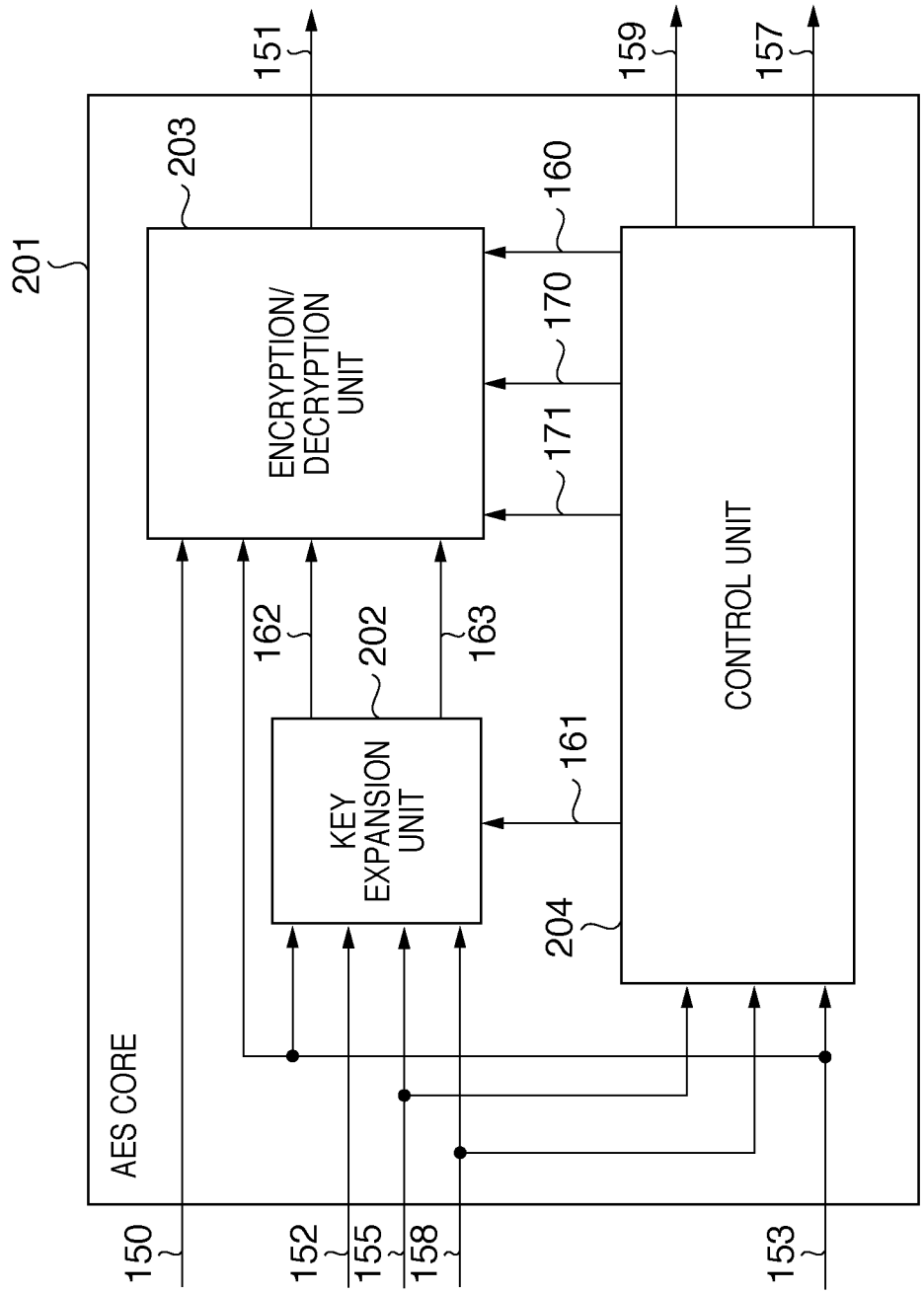
FIG. 32 is a block diagram of an AES Core according to the fourth embodiment.

FIG. 32 is a block diagram of an AES Core according to the fourth embodiment.

Referring to FIG. 32, an AES Core 201 executes AES processing. A Key Expansion unit 202 generates a Round Key necessary for AES encryption and decryption from a cipher key and outputs the Round Key. An encryption/decryption unit 203 executes encryption of 128-bit plaintext data or decryption of 128-bit ciphertext data using the Round Key supplied from the Key Expansion unit 202. A control unit 204 receives a control signal from a unit outside the AES Core 201 and generates signals to control the operations of the Key Expansion unit 202 and encryption/decryption unit 203 and a signal to notify the unit outside the AES Core 201 of completion of the operation.

A description of constituent elements and signal lines in FIG. 32, which are the same as those described in the first embodiment, will be omitted.

Figure 33:
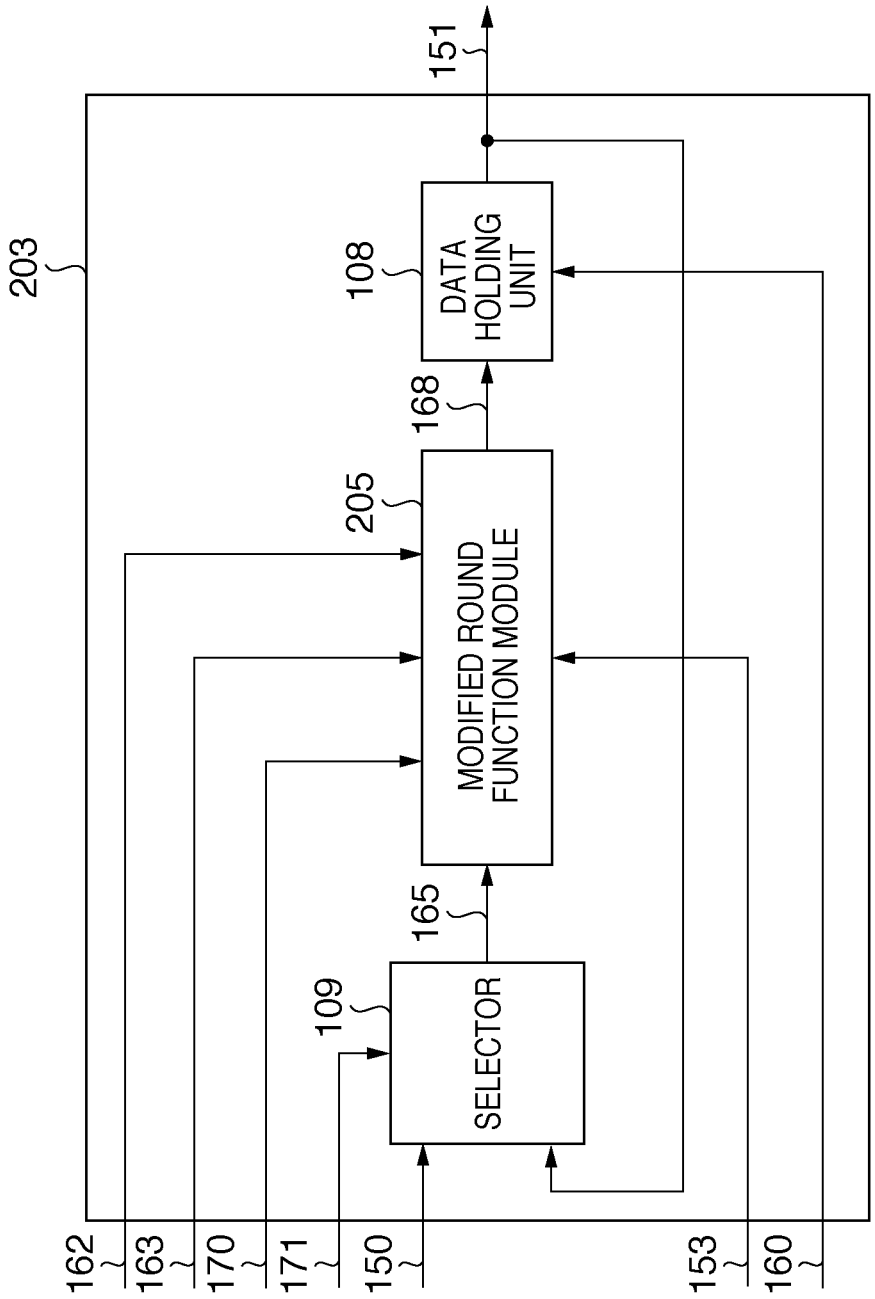
FIG. 33 is a block diagram of an encryption/decryption unit according to the fourth embodiment.

The encryption/decryption unit 203 will be described next. FIG. 33 is a block diagram of the encryption/decryption unit 203. Referring to FIG. 33, a modified round function module 205 executes encryption or decryption of one cycle using a Round Key A 162 and a Round Key B 163 under the control of a selection signal 170, an encryption/decryption selection signal 153, and a selection signal 175.

In the above arrangement, when a selection signal 171 is negated, a selector 109 selects an input signal 150. When the selection signal 171 is asserted, the selector 109 selects the output from a data holding unit 108.

A description of constituent elements and signal lines in FIG. 33, which are the same as those described in the first embodiment, will be omitted.

Figure 34:
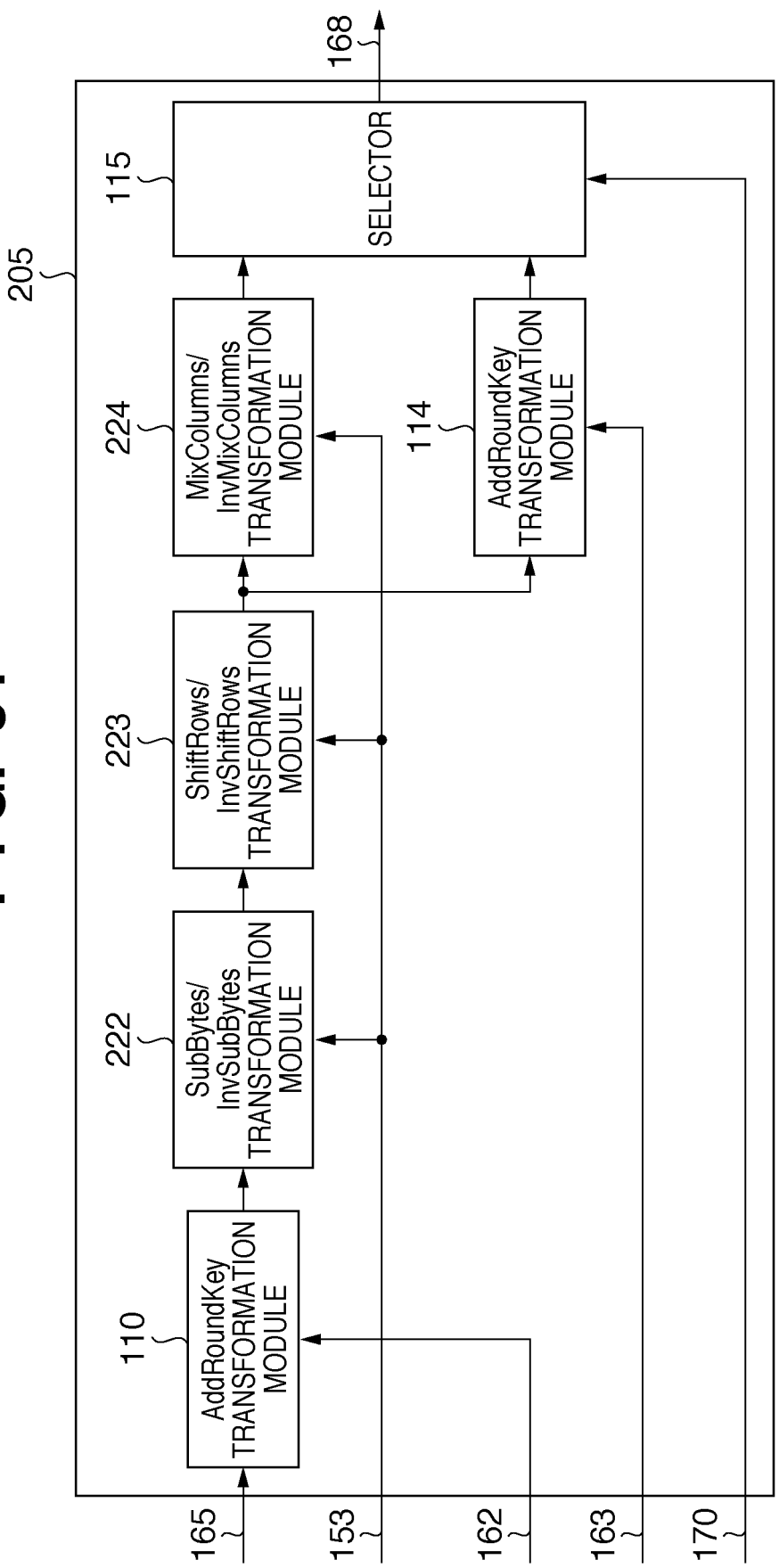
FIG. 34 is a block diagram of a modified round function module according to the fourth embodiment.

The modified round function module 205 will be described next. FIG. 34 is a block diagram of the modified round function module 205. Referring to FIG. 34, an AddRoundKey Transformation module 110 receives an input signal 165 and the Round Key A 162 and executes AddRoundKey Transformation. A SubBytes/InvSubBytes Transformation module 222 receives the output from the AddRoundKey Transformation module 110 and executes one of SubBytes Transformation and InvSubBytes Transformation in accordance with the encryption/decryption selection signal 153. A ShiftRows/InvShiftRows Transformation module 223 receives the output from the SubBytes/InvSubBytes Transformation module 222 and executes one of ShiftRows Transformation and InvShiftRows Transformation in accordance with the encryption/decryption selection signal 153. A MixColumns/InvMixColumns Transformation module 224 receives the output from the ShiftRows/InvShiftRows Transformation module 223 and executes one of MixColumns Transformation and InvMixColumns Transformation in accordance with the encryption/decryption selection signal 153. An AddRoundKey Transformation module 114 receives the output from the ShiftRows/InvShiftRows Transformation module 223 and executes AddRoundKey Transformation. A selector 115 selects and outputs one of the output from the MixColumns/InvMixColumns Transformation module 224 and the output from the AddRoundKey Transformation module 114 in accordance with the selection signal 170. The output signal of the selector 115 is the output signal of the modified round function module 205.

In the above arrangement, when the selection signal 170 is negated, the selector 115 selects and outputs the output from the MixColumns/InvMixColumns Transformation module 224. When the selection signal 170 is asserted, the selector 115 selects and outputs the output from the AddRoundKey Transformation module 114. When the encryption/decryption selection signal 153 is negated, the SubBytes/InvSubBytes Transformation module 222, ShiftRows/InvShiftRows Transformation module 223, and MixColumns/InvMixColumns Transformation module 224 execute SubBytes Transformation, ShiftRows Transformation, and MixColumns Transformation, respectively. When the encryption/decryption selection signal 153 is asserted, they execute InvSubBytes Transformation, InvShiftRows Transformation, and InvMixColumns Transformation, respectively.

The encryption operation in the above arrangement will be described next with reference to the timing chart of FIGS. 9A and 9B. Referring to FIGS. 9A and 9B, the abscissa represents the time. Timing names T01, T02, . . . , T33 are assigned to the leading edges of the clock pulses.

Three-digit numbers along the ordinate on the left end of FIG. 9A indicate signal lines and have a one-to-one correspondence with the reference numerals of the signal lines used in FIGS. 32 to 34.

The encryption operation shown in the timing chart of FIGS. 9A and 9B is roughly divided into four parts. The first part is a parameter setting period (T01 to T06) for setting various parameters such as a cipher key. The second part is a key preparation period (T06 to T17) for generating wkey0 and holding it in a register. The third part is a first block encryption period (T17 to T27). The fourth part is a second block encryption period (from T27).

The role, start condition, and end condition of the parameter setting period are the same as in the first embodiment. The key preparation period is from T06 to T17. The start condition, end condition, and the operation of each circuit in the key preparation period are the same as those described in the first embodiment, and a description thereof will not be repeated.

The first block encryption period is from T17 to T27, and its start condition and end condition are the same as in the first embodiment. The operation of each circuit is also almost the same as in the first embodiment.

The control unit 204 asserts the selection signal 170 in the final cycle of encryption (T16) and negates it at the end of encryption (T17). The control unit 204 also asserts the selection signal 171 in the first cycle of encryption and negates it at the end of encryption.

As described in association with the circuit arrangement, when the selection signal 171 is negated, the selector 109 selects the input signal 150. When the selection signal 171 is asserted, the selector 109 selects the output from the data holding unit 108. When the selection signal 170 is negated, the selector 115 selects and outputs the output from the MixColumns/InvMixColumns Transformation module 224. When the selection signal 170 is asserted, the selector 115 selects and outputs the output from the AddRoundKey Transformation module 114. When the encryption/decryption selection signal 153 is negated, the SubBytes/InvSubBytes Transformation module 222, ShiftRows/InvShiftRows Transformation module 223, and MixColumns/InvMixColumns Transformation module 224 execute SubBytes Transformation, ShiftRows Transformation, and MixColumns Transformation, respectively. When the encryption/decryption selection signal 153 is asserted, they execute InvSubBytes Transformation, InvShiftRows Transformation, and InvMixColumns Transformation, respectively.

Hence, in the 0th cycle (T17 to T18), the modified round function module 205 executes AddRoundKey Transformation, SubBytes Transformation, ShiftRows Transformation, and MixColumns Transformation for the input signal 150. From the first cycle, the modified round function module outputs a result obtained by executing AddRoundKey Transformation, SubBytes Transformation, ShiftRows Transformation, and MixColumns Transformation for the result of immediately preceding cycle. In the ninth cycle (T26 to T27), the modified round function module outputs a result obtained by executing AddRoundKey Transformation, SubBytes Transformation, ShiftRows Transformation, and AddRoundKey Transformation.

The modified round function module 205 can execute encryption as shown in FIG. 29 by controlling the selection signals 171 and 170 in the above-described way.

On the other hand, the Key Expansion unit 202 outputs wkey0 as the Round Key A 162 and wkey10 as the Round Key B 163 after the key preparation period. For this reason, wkey0 is supplied to the modified round function module 205 at the start of encryption (T17). Upon detecting the start of encryption based on an encryption/decryption start signal 158 (T17), the Key Expansion unit 202 generates wkey1 using wkey0 held in the Round Key A register and holds wkey1 in the Round Key A register. Hence, wkey1 is supplied to the modified round function module 205 at the timing T18. The Round Keys are supplied in the same way up to the timing T26. At T26, two Round Keys wkey9 and wkey10 as serving the Round Key B 163 are supplied. When wkey9 is held in the Round Key A register, and Round Key supply is ended at T26, the Key Expansion unit 202 holds, in the Round Key A register, wkey0 that is continuously externally supplied as a cipher key 152 to prepare for the start of the next encryption (T27).

When the Key Expansion unit 202 operates in the above-described manner, the modified round function module 205 can use the Round Key in each cycle as shown in FIG. 29.

The operation during the encryption period according to the fourth embodiment is performed in the above-described way. The decryption operation of the second block is performed in the same way as that for the first block. From then on, the encryption operation is repeatedly performed as many as a predetermined number of blocks. In the timing chart of FIGS. 9A and 9B, the encryption of the second block starts at a shortest interval from the end of the encryption of the first block. The AES Core can exhibit its maximum performance by executing the encryption of all blocks at such a timing. However, the encryption interval can fundamentally be set to an arbitrary length.

When the encryption of a predetermined number of blocks has completely finished, and the next job is to be executed using different parameters such as a cipher key, the processing starts again from parameter setting.

Figure 35A:
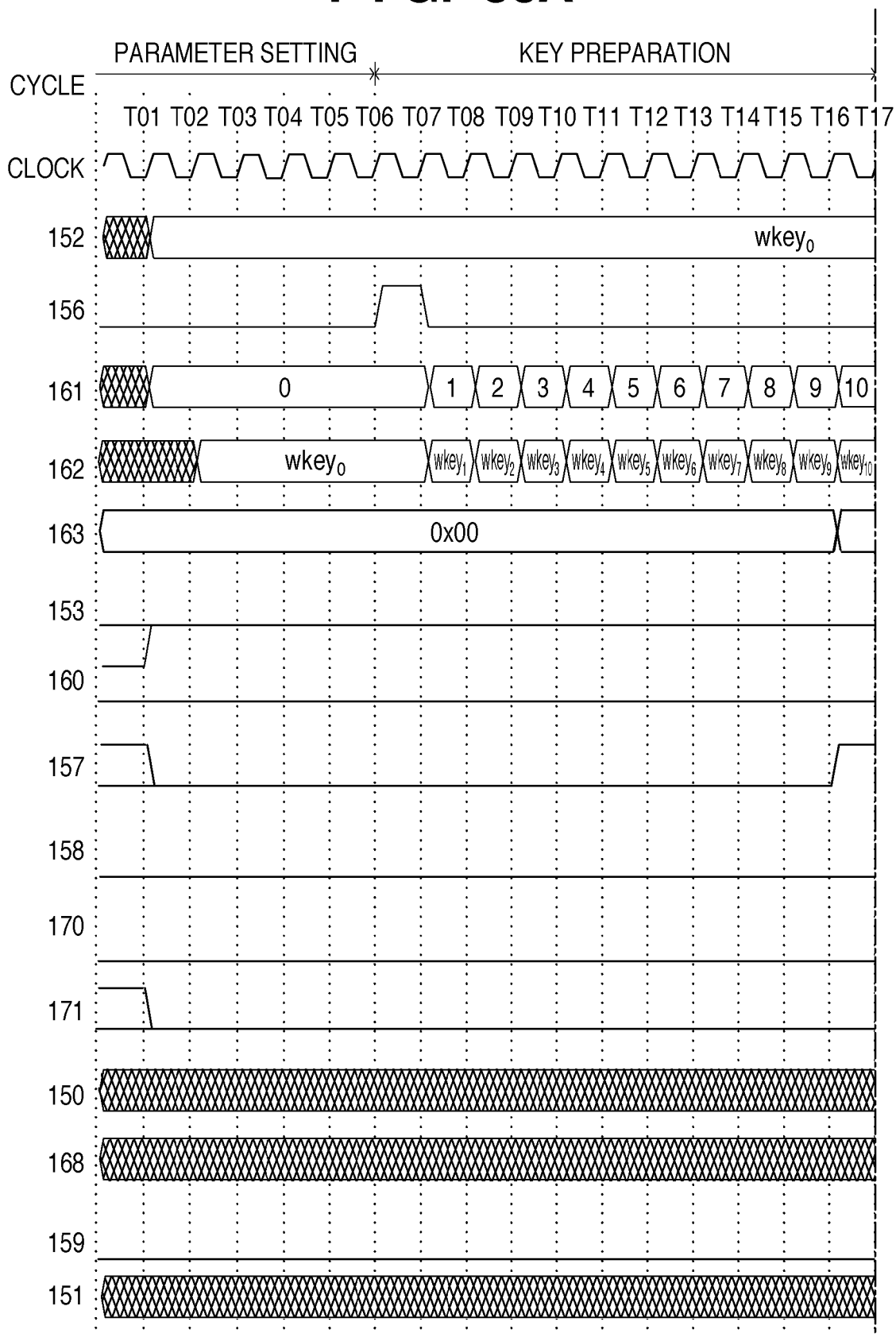
FIGS. 35A and 35B are a timing chart of decryption according to the fourth embodiment.
Figure 35B:
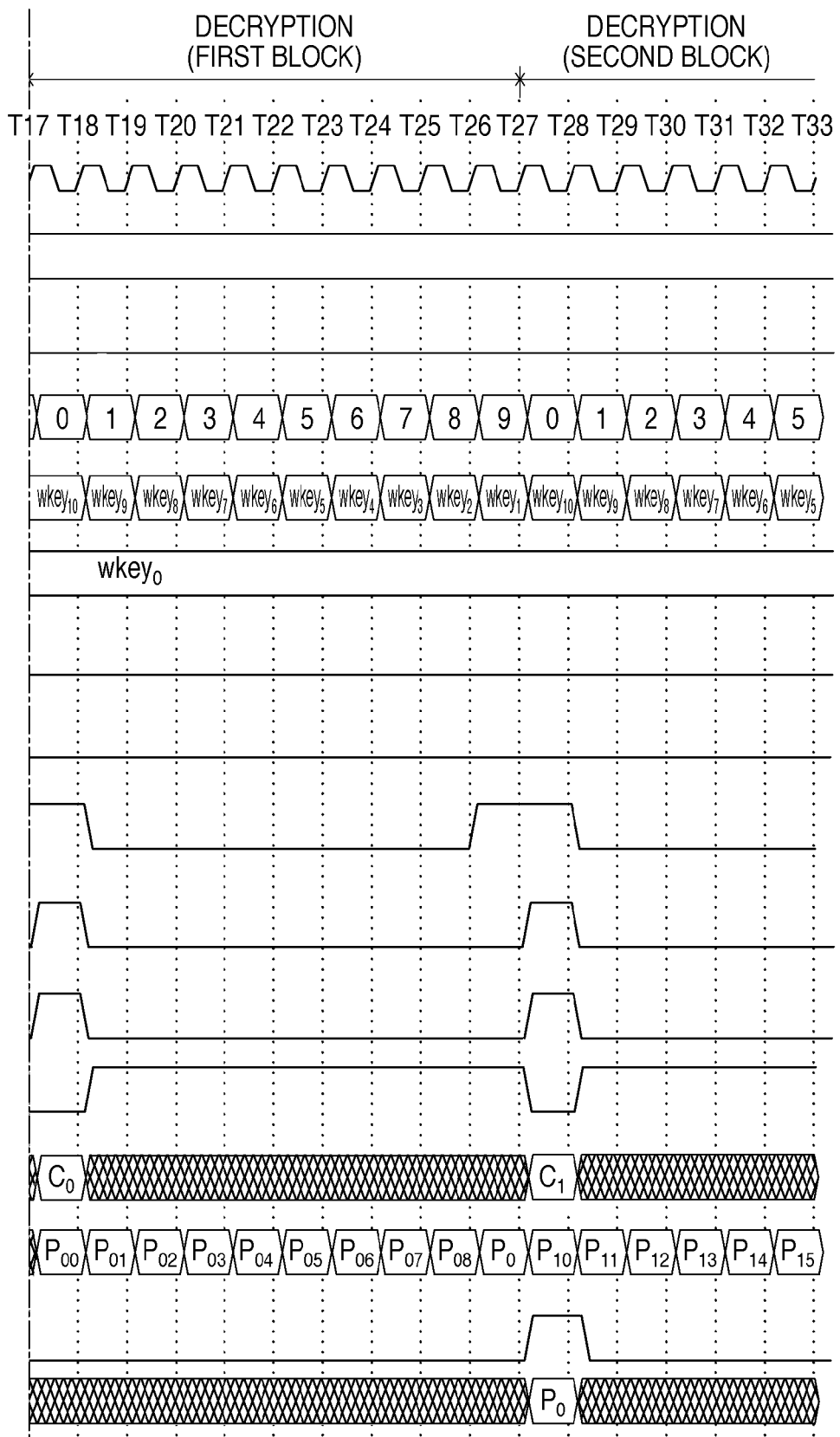

The decryption operation of this embodiment will be described next. FIGS. 35A and 35B are a timing chart of decryption according to the fourth embodiment. Referring to FIGS. 35A and 35B, the abscissa represents the time. Timing names T01, T02, ..., T33 are assigned to the leading edges of the clock pulses. Three-digit numbers along the ordinate on the left end of FIG. 35A indicate signal lines and have a one-to-one correspondence with the reference numerals of the signal lines used in FIGS. 32 to 34.

The decryption operation shown in the timing chart of FIGS. 35A and 35B is roughly divided into four parts. The first part is a parameter setting period (T01 to T06) for setting various parameters such as a cipher key. The second part is a key preparation period (T06 to T17) for generating wkey0 and holding it in a register. The third part is a first block decryption period (T17 to T27). The fourth part is a second block decryption period (from T27).

The role, start condition, and end condition of the parameter setting period are the same as in encryption of the first embodiment.

The key preparation period is from T06 to T17, and its start condition and end condition are the same as in encryption of the first embodiment. The operation of each circuit is also almost the same as in encryption of this embodiment. However, the operation of the Key Expansion unit 202 at the timing T16, and the operations of the Key Expansion unit 202 and the control unit 204 at the timing T17 are different from those in encryption and will therefore be described below.

At the timing T16, the Key Expansion unit 202 outputs wkey0 as the Round Key B 163 and wkey10 as the Round Key A 162. The Round Key wkey10 is also separately held in the register provided in the Key Expansion unit 202. At T16, the Key Expansion unit 202 performs key expansion reversely from wkey10 to generate the modified decryption key wkey9'.

At the timing T17, the Key Expansion unit 202 outputs wkey9' as the Round Key A 162. The control unit 204 asserts the selection signal 170.

The first block decryption period is from T17 to T27, and its start condition and end condition are the same as in the first embodiment. The operation of each circuit is also almost the same as in the first embodiment.

The control unit 204 asserts the selection signal 170 in the final cycle of decryption (T16) and negates it at the end of decryption (T17). The control unit 204 also asserts the selection signal 171 in the first cycle of decryption and negates it at the end of decryption.

As described in association with the circuit arrangement, when the selection signal 171 is negated, the selector 109 selects the input signal 150. When the selection signal 171 is asserted, the selector 109 selects the output from the data holding unit 108. When the selection signal 170 is negated, the selector 115 selects and outputs the output from the MixColumns/InvMixColumns Transformation module 224. When the selection signal 170 is asserted, the selector 115 selects and outputs the output from AddRoundKey Transformation module 114. When the encryption/decryption selection signal 153 is negated, the SubBytes/InvSubBytes Transformation module 222, ShiftRows/InvShiftRows Transformation module 223, and MixColumns/InvMixColumns Transformation module 224 execute SubBytes Transformation, ShiftRows Transformation, and MixColumns Transformation, respectively. When the encryption/decryption selection signal 153 is asserted, they execute InvSubBytes Transformation, InvShiftRows Transformation, and InvMixColumns Transformation, respectively.

Hence, in the 0th cycle (T17 to T18), the modified round function module 205 executes AddRoundKey Transformation, InvSubBytes Transformation, InvShiftRows Transformation, and InvMixColumns Transformation for the input signal 150. From the first cycle, the modified round function module outputs a result obtained by executing AddRoundKey Transformation, InvSubBytes Transformation, InvShiftRows Transformation, and InvMixColumns Transformation for the result of immediately preceding cycle. In the ninth cycle (T26 to T27), the modified round function module outputs a result obtained by executing AddRoundKey Transformation, InvSubBytes Transformation, InvShiftRows Transformation, and AddRoundKey Transformation.

The modified round function module 205 can execute decryption as shown in FIG. 30 by controlling the selection signals 171 and 170 in the above-described way.

On the other hand, the Key Expansion unit 202 outputs wkey10 as the Round Key A 162 and wkey0 as the Round Key B 163 after the key preparation period. For this reason, wkey10 is supplied to the modified round function module 205 at the start of decryption (T17). Upon detecting the start of decryption based on the decryption/decryption start signal 158 (T17), the Key Expansion unit 202 generates wkey9' using wkey10 held in the Round Key A register and holds wkey9' in the Round Key A register. Hence, wkey9' is supplied to the modified round function module 205 at the timing T18. The Round Keys are supplied in the same way up to the timing T26. At the timing T26, two Round Keys wkey1' and wkey0 serving as the Round Key B 163 are supplied. When wkey1' is held in the Round Key A register, and Round Key supply is ended at the timing T26, the Key Expansion unit 202 loads, in the Round Key A register, wkey10 held in the internal register of the Key Expansion unit to prepare for the start of the next decryption (T27).

When the Key Expansion unit 202 operates in the above-described manner, the modified round function module 205 can use the Round Key in each cycle as shown in FIG. 30.

The operation during the decryption period according to the fourth embodiment is performed in the above-described way. The decryption operation of the second block is performed in the same way as that for the first block. From then on, the decryption operation is repeatedly performed as many as a predetermined number of blocks. In the timing chart of FIGS. 35A and 35B, the decryption of the second block starts at a shortest interval from the end of the decryption of the first block. The AES Core can exhibit its maximum performance by executing the decryption of all blocks at such a timing. However, the decryption interval can fundamentally be set to an arbitrary length.

When the decryption of a predetermined number of blocks has completely finished, and the next job is to be executed using different parameters such as a cipher key, the processing starts again from parameter setting.

The fourth embodiment can be implemented in the above-described way. In the fourth embodiment, the circuit arrangement and operation of executing decryption using Equivalent Inverse Cipher have been described. In the fourth embodiment, the number of clock cycles required for AES encryption is decreased by one without increasing the maximum value of the summation of the signal processing time for each of the sub-block transformations in each clock cycle period. This raises the AES processing speed about 10%.

The above-described fourth embodiment is merely an example of the present invention, and the effects of the present invention are not limited to those of the above-described embodiment.

Fifth Embodiment

In the fifth embodiment, decryption is executed using Equivalent Inverse Cipher described in FIPS197.

FIG. 36 is a view showing the process contents of encryption and decryption executed in clock cycles according to the fifth embodiment.

Referring to FIG. 36, a cycle count indicates a clock cycle count that is "0" at the start of AES processing.

In encryption of this embodiment, first AddRoundKey Transformation, ShiftRows Transformation, SubBytes Transformation, MixColumns Transformation, and second AddRoundKey Transformation are executed in the 0th cycle using two Round Keys. In the first to eighth cycles, AddRoundKey Transformation, ShiftRows Transformation, SubBytes Transformation, and MixColumns Transformation are executed. In the ninth cycle, AddRoundKey Transformation, ShiftRows Transformation, and SubBytes Transformation are executed. As the Round Keys, wkey0 and wkey1 are used in the 0th cycle, wkey2 is used in the first cycle, . . . , and wkey10 is used in the ninth cycle.

In the fifth embodiment, the same processing as in the prior art is executed as a whole. In this embodiment, however, AES encryption can be executed in clock cycles fewer by one.

The summation of the encryption processing time for each of the sub-block transformations in each clock cycle period according to the fifth embodiment will be described next. FIG. 37 is a view showing the comparison between the summation of the signal processing time for each of the sub-block transformations executed in clock cycles in the fifth embodiment and that of the prior art. The ordinate represents the time. The longer the bar is, the longer the processing time is. To implement the fifth embodiment, the maximum value of the summation of the signal processing time for each of the sub-block transformations in each clock cycle period must be less than one cycle time. As shown in FIG. 37, the processing time of each sub-block transformation is longest in SubBytes Transformation and shortens in the order of MixColumns Transformation, AddRoundKey Transformation, and ShiftRows Transformation.

In the fifth embodiment, the summation of the signal processing time for each of the sub-block transformations in the 0th cycle where first AddRoundKey Transformation, SubBytes Transformation, ShiftRows Transformation, MixColumns Transformation, and second AddRoundKey Transformation are executed is longer than the summation of the signal processing time for each of the sub-block transformations in the first to eighth cycles where AddRoundKey Transformation, SubBytes Transformation, ShiftRows Transformation, and MixColumns Transformation are executed or the summation of the signal processing time for each of the sub-block transformations in the ninth cycle where AddRoundKey Transformation, SubBytes Transformation, and ShiftRows Transformation are executed. Hence, the maximum value of the summation of the signal processing time for each of the sub-block transformations of the fifth embodiment is larger than that of the prior art by an amount corresponding to the processing time of one AddRoundKey Transformation. However, the processing time of one AddRoundKey Transformation is much shorter than the summation of the signal processing time for each of the sub-block transformations in one cycle. The maximum value of the summation of the signal processing time for each of the sub-block transformations in each clock cycle period is often set with a sufficient margin to one cycle time. For this reason, if the maximum value of the summation of the signal processing time for each of the sub-block transformations in each clock cycle period of the prior art is shorter than one cycle time, this embodiment is also supposed to be implementable in many cases.

The present invention is also applicable to AES decryption.

As shown in FIG. 36, in decryption of this embodiment, first AddRoundKey Transformation, InvShiftRows Transformation, InvSubBytes Transformation, InvMixColumns Transformation, and second AddRoundKey Transformation are executed in the 0th cycle. In the first to eighth cycles, AddRoundKey Transformation, InvShiftRows Transformation, InvSubBytes Transformation, and InvMixColumns Transformation are executed. In the ninth cycle, AddRoundKey Transformation, InvShiftRows Transformation, and InvSubBytes Transformation are executed. As the Round Keys, wkey10 and wkey9' is used in the 0th cycle, wkey8' is used in the first cycle, . . . , and wkey0 is used in the ninth cycle.

In the fifth embodiment, the same processing as in the prior art is executed as a whole. In the fifth embodiment, however, AES decryption can be executed in clock cycles fewer by one.

The summation of the decryption processing time for each of the sub-block transformations in each clock cycle period according to the fifth embodiment will be described next. FIG. 37 is a view showing the comparison between the summation of the decryption processing time for each of the sub-block transformations in each clock cycle period in the fifth embodiment and that of the prior art. The ordinate represents the time. The longer the bar is, the longer the processing time is. To implement this embodiment, the maximum value of the summation of the signal processing time for each of the sub-block transformations in each clock cycle period must be less than one cycle time. As shown in FIG. 37, the processing time of each sub-block transformation is longest in InvSubBytes Transformation, and shortens in the order of InvMixColumns Transformation, AddRoundKey Transformation, and InvShiftRows Transformation.

In the fifth embodiment, the summation of the signal processing time for each of the sub-block transformations in the 0th cycle where AddRoundKey Transformation, InvSubBytes Transformation, InvShiftRows Transformation, InvMixColumns Transformation, and AddRoundKey Transformation are executed is longer than the summation of the signal processing time for each of the sub-block transformations in the first to eighth cycles where AddRoundKey Transformation, InvSubBytes Transformation, InvShiftRows Transformation, and InvMixColumns Transformation are executed, or the summation of the signal processing time for each of the sub-block transformations in the ninth cycle where AddRoundKey Transformation, InvSubBytes Transformation, and InvShiftRows Transformation are executed. Hence, the maximum value of the summation of the signal processing time for each of the sub-block transformations of the fifth embodiment is larger than that of the prior art by an amount corresponding to the processing time of one AddRoundKey Transformation. However, the processing time of one AddRoundKey Transformation is much shorter than the summation of the signal processing time for each of the sub-block transformations in one cycle. The maximum value of the summation of the signal processing time for each of the sub-block transformations in each clock cycle period is often set with a sufficient margin to one cycle time. For this reason, if the maximum value of the summation of the signal processing time for each of the sub-block transformations in each clock cycle period of the prior art is shorter than one cycle time, this embodiment is also supposed to be implementable in many cases.

The above-described characteristic features of the fifth embodiment will be summarized.

In the conventional general implementation method, a round function defined by the standards is regarded as a break in processing, and encryption and decryption are distributed to clock cycles. For this reason, the summation of the signal processing time for each of the sub-block transformations in the 10th and 0th cycles is shorter than the summation of the signal processing time for each of the sub-block transformations in each of the first to ninth cycles. That is, the summation of the signal processing time for each of the sub-block transformations executed in each cycle varies.

On the other hand, in the fifth embodiment, the signal processing in some clock cycles is increased so that the difference among the summation of the signal processing time for each of the sub-block transformations in each clock cycle period is reduced.

In the fifth embodiment, the maximum value of the summation of the signal processing time for each of the sub-block transformations executed in one cycle slightly increases. For this reason, the embodiment is not necessarily implementable under conditions where the prior art can be implemented. However, this hardly poses a problem in many cases because the maximum value of the summation of the signal processing time for each pf the sub-block transformations in each clock cycle period is often set with a sufficient margin to one cycle time. In many cases, the number of clock cycles required for AES encryption or decryption can be decreased by one. This raises the AES processing speed about 10%.

The circuit arrangement of an AES Core for implementing AES encryption and decryption will be described next.

Figure 38:
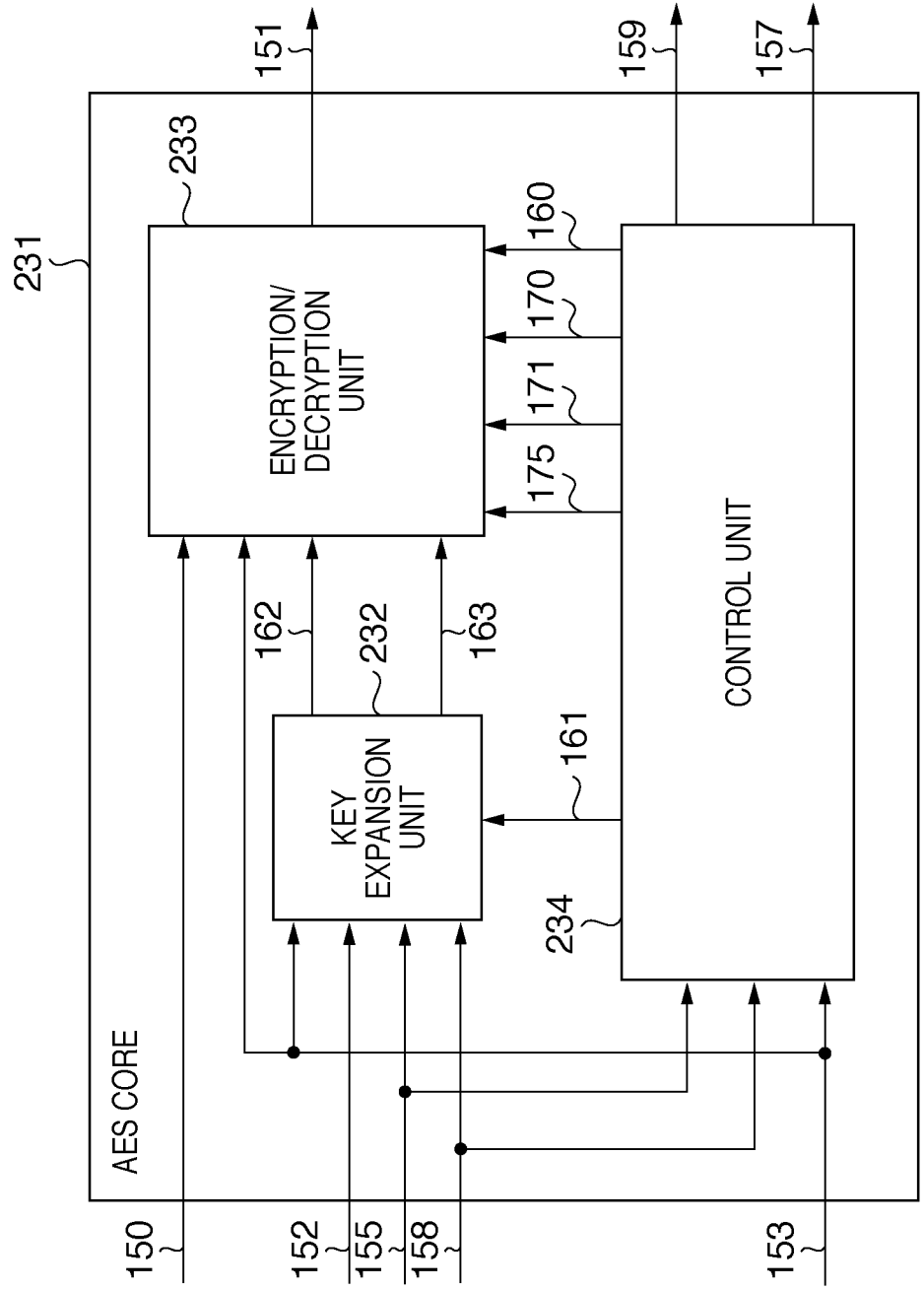
FIG. 38 is a block diagram of an AES Core according to the fifth embodiment.

FIG. 38 is a block diagram of an AES Core according to the fifth embodiment. Referring to FIG. 38, an AES Core 231 executes AES processing. A Key Expansion unit 232 generates a Round Key necessary for AES encryption and decryption from a cipher key and outputs the Round Key. An encryption/decryption unit 233 executes encryption of 128-bit plaintext data or decryption of 128-bit ciphertext data using the Round Key supplied from the Key Expansion unit 232. A control unit 234 receives a signal from a unit outside the AES Core 231 and generates signals to control the operations of the Key Expansion unit 232 and encryption/decryption unit 233 and a signal to notify the unit outside the AES Core 231 of completion of the operation.

A description of constituent elements and signal lines in FIG. 38, which are the same as those described in the first and second embodiments, will be omitted.

Figure 39:
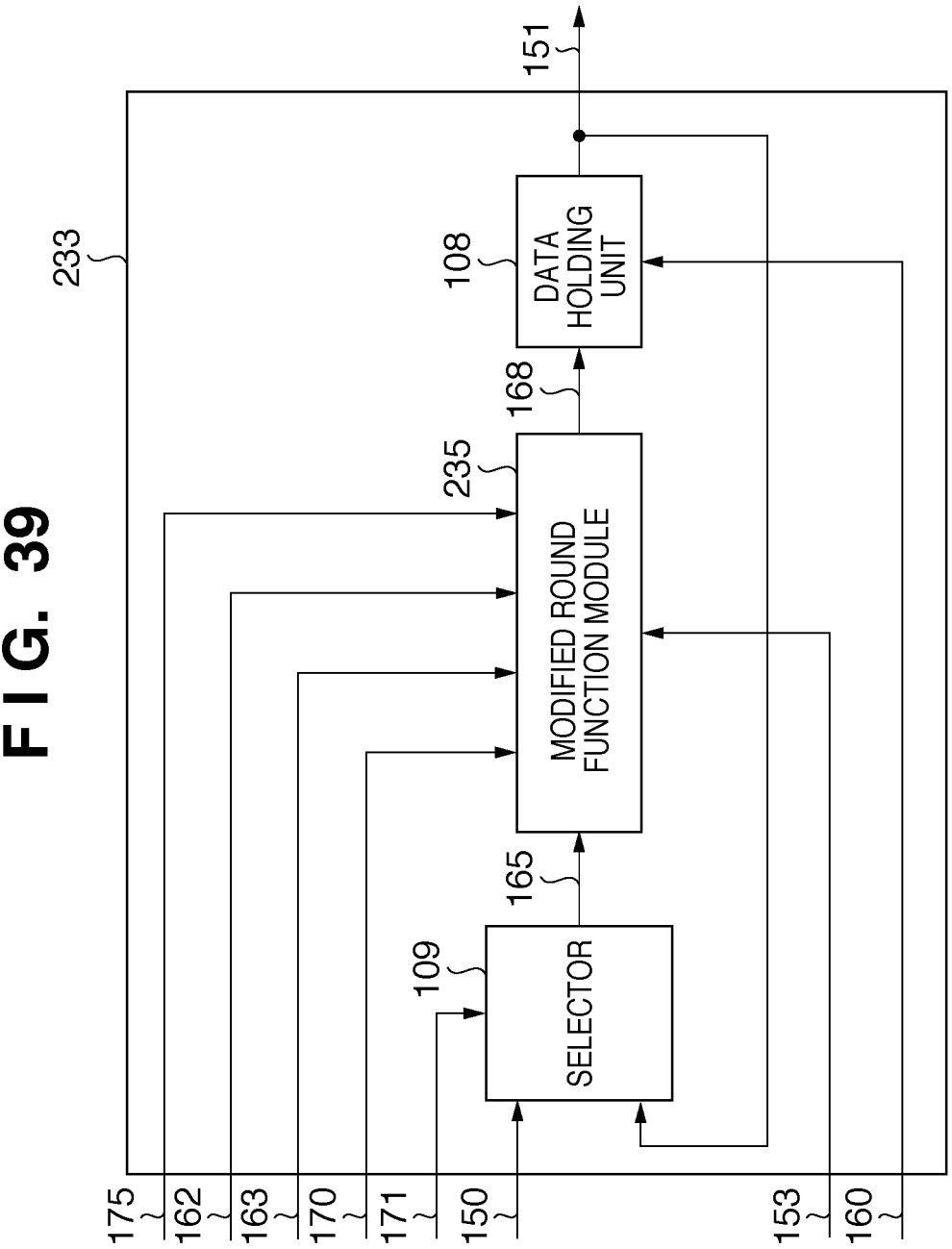
FIG. 39 is a block diagram of an encryption/decryption unit according to the fifth embodiment.

The encryption/decryption unit 233 will be described next. FIG. 39 is a block diagram of the encryption/decryption unit 233. Referring to FIG. 39, a modified round function module 235 executes encryption or decryption of one cycle using a Round Key A 162 and a Round Key B 163 under the control of selection signals 170 and 175 and an encryption/decryption selection signal 153.

In the above arrangement, when a selection signal 171 is negated, a selector 109 of the encryption/decryption unit 233 selects an input signal 150. When the selection signal 171 is asserted, the selector 109 selects the output from a data holding unit 108.

A description of constituent elements and signal lines in FIG. 39, which are the same as those described in the first and second embodiments, will be omitted.

The modified round function module 235 will be described next. FIG. 40 is a block diagram of the modified round function module 235. Referring to FIG. 40, an AddRoundKey Transformation module 114 receives an input signal 165 and the Round Key B 163 and executes AddRoundKey Transformation. A selector 137 selects and outputs one of the input signal 165 and the output from the AddRoundKey Transformation module 114 in accordance with the selection signal 175. A SubBytes/InvSubBytes Transformation module 222 receives the output from the selector 137 and executes one of SubBytes Transformation and InvSubBytes Transformation in accordance with the encryption/decryption selection signal 153. A ShiftRows/InvShiftRows Transformation module 223 receives the output from the SubBytes/InvSubBytes Transformation module 222 and executes one of ShiftRows Transformation and InvShiftRows Transformation in accordance with the encryption/decryption selection signal 153. A MixColumns/InvMixColumns Transformation module 224 receives the output from the ShiftRows/InvShiftRows Transformation module 223 and executes one of MixColumns Transformation and InvMixColumns Transformation in accordance with the encryption/decryption selection signal 153. A selector 115 selects and outputs one of the output from the MixColumns/InvMixColumns Transformation module 224 and the output from the ShiftRows/InvShiftRows Transformation module 223 in accordance with the selection signal 170. An AddRoundKey Transformation module 110 receives the output from the selector 115 and the Round Key A 162 and executes AddRoundKey Transformation. The output signal of the AddRoundKey Transformation module 110 is the output signal of the modified round function module 235.

In the above arrangement, when the selection signal 170 is negated, the selector 115 selects and outputs the output from the MixColumns/InvMixColumns Transformation module 224. When the selection signal 170 is asserted, the selector 115 selects and outputs the output from the ShiftRows/InvShiftRows Transformation module 223. When the selection signal 175 is negated, the selector 137 selects and outputs the input signal 165. When the selection signal 175 is asserted, the selector 137 selects and outputs the output from the AddRoundKey Transformation module 114.

The encryption operation in the above arrangement will be described next with reference to the timing chart of FIGS. 18A and 18B. Three-digit numbers along the ordinate on the left end of FIG. 18A indicate signal lines and have a one-to-one correspondence with the reference numerals of the signal lines used in FIGS. 38 to 40.

The encryption operation shown in the timing chart of FIGS. 18A and 18B is roughly divided into four parts. The first part is a parameter setting period (T01 to T06) for setting various parameters such as a cipher key. The second part is a key preparation period (T06 to T17) for generating wkey0 and holding it in a register. The third part is a first block encryption period (T17 to T27). The fourth part is a second block encryption period (from T27).

The role, start condition, and end condition of the parameter setting period are the same as in the second embodiment. The key preparation period is from T06 to T17. The start condition, end condition, and the operation of each circuit are also the same as in the second embodiment, and a description thereof will not be repeated. The first block encryption period is from T17 to T27, and its start condition and end condition are the same as in the second embodiment. The operation of each circuit is also the same as in the second embodiment.

The control unit 234 asserts the selection signal 175 at the end of encryption and negates it in the first cycle of encryption (T18 or T28). The control unit 234 also asserts the selection signal 170 in the final cycle of encryption (T16) and negates it at the end of encryption (T17). The control unit 234 also asserts the selection signal 171 in the first cycle of encryption and negates it at the end of encryption.

As described in association with the circuit arrangement, when the selection signal 171 is negated, the selector 109 selects the input signal 150. When the selection signal 171 is asserted, the selector 109 selects the output from the data holding unit 108. When the selection signal 170 is negated, the selector 115 selects and outputs the input signal 165. When the selection signal 170 is asserted, the selector 115 selects and outputs the output from the AddRoundKey Transformation module 114. When the selection signal 175 is negated, the selector 137 selects and outputs the output from the MixColumns/InvMixColumns Transformation module 224. When the selection signal 175 is asserted, the selector 137 selects and outputs the output from the ShiftRows/InvShiftRows Transformation module 223. When the encryption/decryption selection signal 000000000000000153 is negated, the SubBytes/InvSubBytes Transformation module 222, ShiftRows/InvShiftRows Transformation module 223, and MixColumns/InvMixColumns Transformation module 224 execute SubBytes Transformation, ShiftRows Transformation, and MixColumns Transformation, respectively. When the encryption/decryption selection signal 153 is asserted, they execute InvSubBytes Transformation, InvShiftRows Transformation, and InvMixColumns Transformation, respectively.

Hence, in the 0th cycle (T17 to T18), the modified round function module 235 executes AddRoundKey Transformation, SubBytes Transformation, ShiftRows Transformation, MixColumns Transformation, and AddRoundKey Transformation for the input signal 150. From the first cycle, the modified round function module outputs a result obtained by executing SubBytes Transformation, ShiftRows Transformation, MixColumns Transformation, and AddRoundKey Transformation for the result of immediately preceding cycle. In the ninth cycle (T26 to T27), the modified round function module outputs a result obtained by executing SubBytes Transformation, ShiftRows Transformation, and AddRoundKey Transformation.

The modified round function module 235 can execute encryption as shown in FIG. 36 by controlling the selection signals 171, 170, and 175 in the above-described way.

On the other hand, the Key Expansion unit 232 outputs wkey1 as the Round Key A 162 and wkey0 as the Round Key B 163 after the key preparation period. For this reason, wkey0 and wkey1 are supplied to the modified round function module 235 at the start of encryption (T17). Upon detecting the start of encryption based on an encryption/decryption start signal 158 (T17), the Key Expansion unit 232 generates wkey2 using wkey1 held in the Round Key A register and holds wkey2 in the Round Key A register. Hence, wkey2 is supplied to the modified round function module 235 at the timing T18. The Round Keys are supplied in the same way up to the timing T26. When wkey10 is held in the Round Key A register, and Round Key supply is ended at the timing T26, the Key Expansion unit 232 generates wkey1 using wkey0 that is continuously externally supplied as a cipher key 152 and holds wkey1 in the Round Key A register to prepare for the start of the next encryption (T27).

When the Key Expansion unit 232 operates in the above-described manner, the modified round function module 235 can use the Round Key in each cycle as shown in FIG. 36.

The operation during the encryption period according to the fifth embodiment is performed in the above-described way. The decryption operation of the second block is performed in the same way as that for the first block. From then on, the encryption operation is repeatedly performed as many as a predetermined number of blocks. In the timing chart of FIGS. 18A and 18B, the encryption of the second block starts at a shortest interval from the end of the encryption of the first block. The AES Core can exhibit its maximum performance by executing the encryption of all blocks at such a timing. However, the encryption interval can fundamentally be set to an arbitrary length.

When the encryption of a predetermined number of blocks has completely finished, and the next job is to be executed using different parameters such as a cipher key, the processing starts again from parameter setting.

Figure 41A:
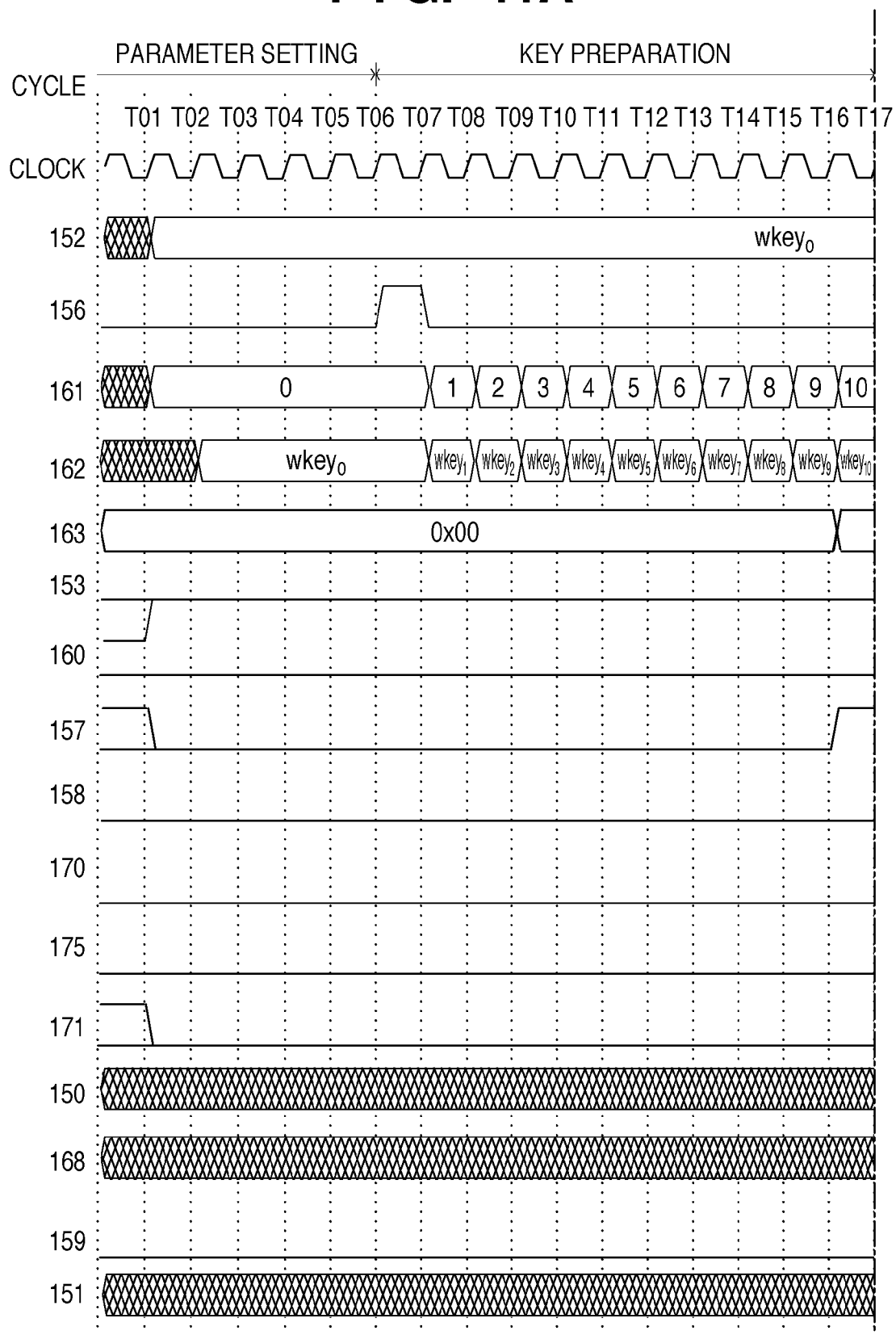
FIGS. 41A and 41B are a timing chart of decryption according to the fifth embodiment.
Figure 41B:
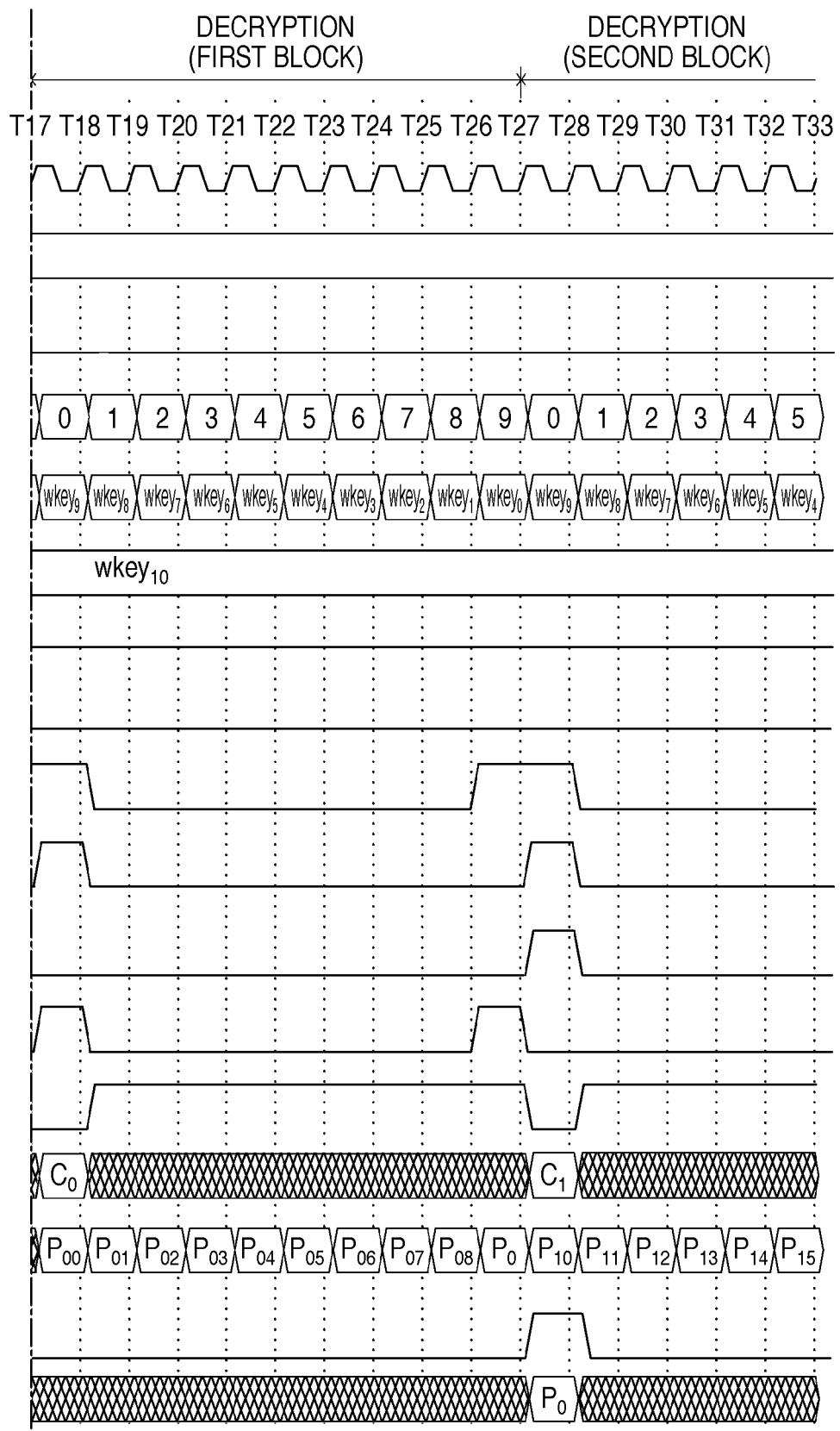

The decryption operation of the fifth embodiment will be described next. FIGS. 41A and 41B are a timing chart of decryption according to the fifth embodiment. Referring to FIGS. 41A and 41B, the abscissa represents the time. Timing names T01, T02, . . . , T33 are assigned to the leading edges of the clock pulses.

Three-digit numbers along the ordinate on the left end of FIG. 41A indicate signal lines and have a one-to-one correspondence with the reference numerals of the signal lines used in FIGS. 38 to 40.

The decryption operation shown in the timing chart of FIGS. 41A and 41B is roughly divided into four parts. The first part is a parameter setting period (T01 to T06) for setting various parameters such as a cipher key. The second part is a key preparation period (T06 to T17) for generating wkey0 and holding it in a register. The third part is a first block decryption period (T17 to T27). The fourth part is a second block decryption period (from T27).

The role, start condition, and end condition of the parameter setting period are the same as in encryption of this embodiment. In decryption, however, the encryption/decryption selection signal 153 is asserted.

The key preparation period is from T06 to T17, and its start condition and end condition are the same as in encryption of this embodiment. The operation of each circuit is also almost the same as in encryption of this embodiment. However, the operation of the Key Expansion unit 232 at the timing T16, and the operations of the Key Expansion unit 232 and the control unit 234 at the timing T17 are different from those in encryption and will therefore be described below.

At the timing T16, the Key Expansion unit 232 outputs wkey10 as the Round Key B 163 and wkey10 as the Round Key A 162. At the timing T16, the Key Expansion unit 232 performs key expansion reversely from wkey10 to generate a modified decryption key wkey9'.

At the timing T17, the Key Expansion unit 232 outputs wkey9' as the Round Key A 162. The control unit 234 asserts the selection signal 175.

At the end of the key preparation period (T17), the control unit 234 asserts the selection signal 175.

The first block decryption period is from T17 to T27, and its start condition and end condition are the same as in the first embodiment. The operation of each circuit is also almost the same as in the first embodiment.

The control unit 234 asserts the selection signal 170 in the final cycle of decryption (T26) and negates it in the first cycle decryption (T18 or T28). The control unit 234 also asserts the selection signal 175 at the end of decryption (T17) and negates it at the end of decryption (T17). The control unit 234 also asserts the selection signal 171 in the first cycle of decryption and negates it at the end of decryption.

As described in association with the circuit arrangement, when the selection signal 171 is negated, the selector 109 selects the input signal 150. When the selection signal 171 is asserted, the selector 109 selects the output from the data holding unit 108.

When the selection signal 175 is negated, the selector 137 selects and outputs the input signal 165. When the selection signal 175 is asserted, the selector 137 selects and outputs the output from the AddRoundKey Transformation module 114. When the selection signal 170 is negated, the selector 115 selects and outputs the output from the MixColumns/InvMixColumns Transformation module 224. When the selection signal 170 is asserted, the selector 115 selects and outputs the output from ShiftRows/InvShiftRows Transformation module 223.

Hence, in the 0th cycle (T17 to T18), the modified round function module 235 executes AddRoundKey Transformation, InvShiftRows Transformation, InvSubBytes Transformation, AddRoundKey Transformation, and InvMixColumns Transformation for the input signal 150. From the first cycle, the modified round function module outputs a result obtained by executing InvShiftRows Transformation, InvSubBytes Transformation, AddRoundKey Transformation, and InvMixColumns Transformation for the result of immediately preceding cycle. In the ninth cycle (T26 to T27), the modified round function module outputs a result obtained by executing InvShiftRows Transformation, InvSubBytes Transformation, and AddRoundKey Transformation.

The modified round function module 235 can execute decryption as shown in FIG. 36 by controlling the selection signals 171, 170, and 175 in the above-described way.

On the other hand, the Key Expansion unit 232 outputs wkey9' as the Round Key A 162 and wkey10 as the Round Key B 163 after the key preparation period. For this reason, wkey10 and wkey9' are supplied to the modified round function module 235 at the start of decryption (T17). Upon detecting the start of decryption based on the decryption/decryption start signal 158 (T17), the Key Expansion unit 232 generates wkey8' using wkey9' held in the Round Key A register and holds wkey8' in the Round Key A register. Hence, wkey8' is supplied to the modified round function module 235 at T18. The Round Keys are supplied in the same way up to the timing T26. When wkey0 is held in the Round Key A register, and Round Key supply is ended at the timing T26, the Key Expansion unit 232 generates wkey9' using wkey10 held in the Round Key B register and holds wkey9' in the Round Key A register to prepare for the start of the next decryption (T27).

When the Key Expansion unit 232 operates in the above-described manner, the modified round function module 235 can use the Round Key in each cycle as shown in FIG. 36.

The operation during the decryption period according to the fifth embodiment is performed in the above-described way. The decryption operation of the second block is performed in the same way as that for the first block. From then on, the decryption operation is repeatedly performed as many as a predetermined number of blocks. In the timing chart of FIGS. 41A and 41B, the decryption of the second block starts at a shortest interval from the end of the decryption of the first block. The AES Core can exhibit its maximum performance by executing the decryption of all blocks at such a timing. However, the decryption interval can fundamentally be set to an arbitrary length.

When the decryption of a predetermined number of blocks has completely finished, and the next job is to be executed using different parameters such as a cipher key, the processing starts again from parameter setting.

The fifth embodiment can be implemented in the above-described way. In the fifth embodiment, the maximum value of the summation of the signal processing time for each of the sub-block transformations that must be executed in one cycle slightly increases. However, this hardly poses a problem in many cases because the maximum value of the summation of the signal processing time for each of the sub-block transformations in each clock cycle period is often set with a sufficient margin to one cycle time. For this reason, in many cases, the number of clock cycles required for AES encryption can be decreased by one. This raises the AES processing speed about 10%.

The above-described fifth embodiment is merely an example of the present invention, and the effects of the present invention are not limited to those of the above-described embodiment.

Sixth Embodiment

In the sixth embodiment, decryption is executed using Equivalent Inverse Cipher described in FIPS197.

FIG. 42 is a view showing the process contents of encryption and decryption executed in clock cycles according to the sixth embodiment.

Referring to FIG. 42, a cycle count indicates a clock cycle count that is "0" at the start of AES processing.

In the sixth embodiment, first AddRoundKey Transformation, SubBytes/InvSubBytes Transformation, ShiftRows/InvShiftRows Transformation, MixColumns/InvMixColumns Transformation, and second AddRoundKey Transformation are executed in the 0th cycle using two Round Keys. In the first to eighth cycles, SubBytes/InvSubBytes Transformation, ShiftRows/InvShiftRows Transformation, MixColumns/InvMixColumns Transformation, and AddRoundKey Transformation are executed. In the ninth cycle, SubBytes/InvSubBytes Transformation, ShiftRows/InvShiftRows Transformation, and AddRoundKey Transformation are executed. SubBytes/InvSubBytes Transformation represents that SubBytes Transformation is executed in encryption, and SubBytes Transformation is executed in decryption. ShiftRows/InvShiftRows Transformation represents that ShiftRows Transformation is executed in encryption, and InvShiftRows Transformation is executed in decryption. MixColumns/InvMixColumns Transformation represents that MixColumns Transformation is executed in encryption, and InvMixColumns Transformation is executed in decryption.

Round Keys used in encryption of this embodiment are wkey0 and wkey1 in the 0th cycle, wkey2 in the first cycle, . . . , and wkey10 in the ninth cycle. Round Keys used in decryption are wkey10 and wkey9' in the 0th cycle, wkey8' in the first cycle, . . . , and wkey0 in the ninth cycle.

In the sixth embodiment, the same processing as in the prior art is executed as a whole. In this embodiment, however, AES encryption and decryption can be executed in clock cycles fewer by one.

Figure 43:
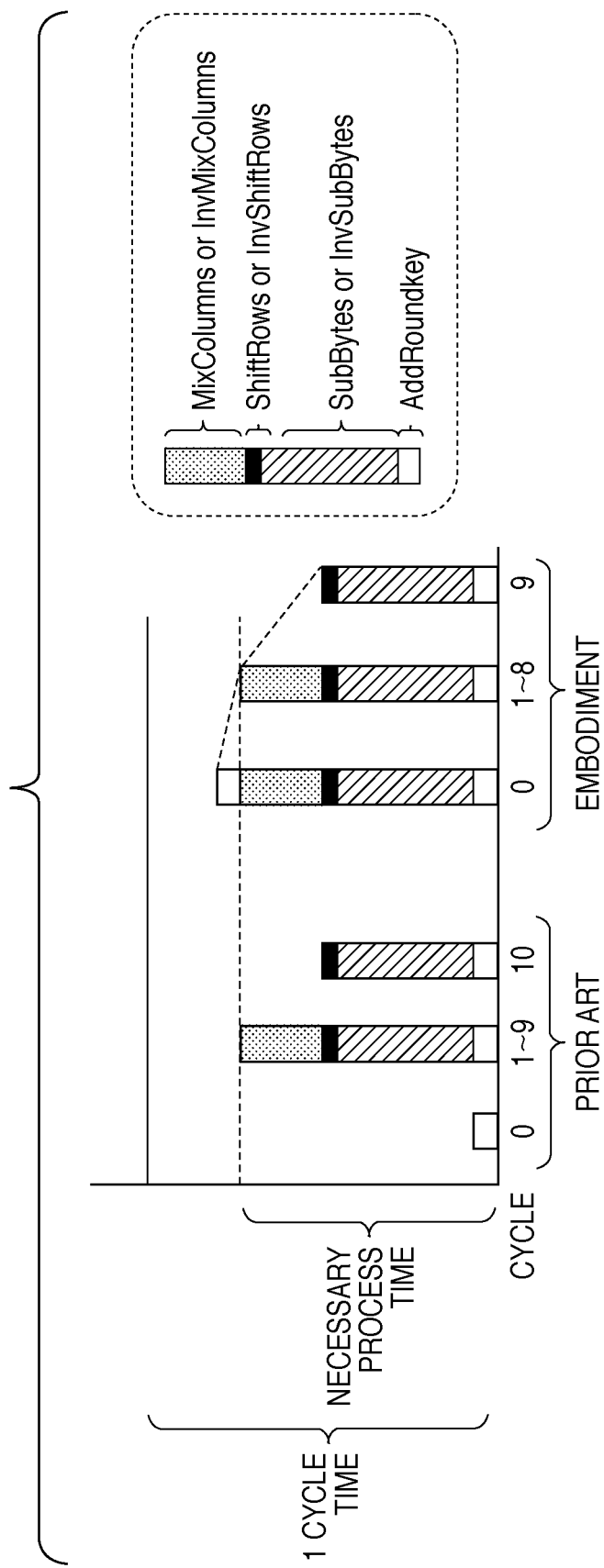
FIG. 43 is a view for comparing the summation of the signal processing time for each sub-block transformations executed in clock cycles in the prior art with that of the sixth embodiment.

The summation of the encryption processing time for each of the sub-block transformations in each clock cycle period according to this embodiment will be described next. FIG. 43 is a view showing the comparison between the summation of the signal processing time for each of the sub-block transformations executed in clock cycles in the sixth embodiment and that of the prior art. The ordinate represents the time. The longer the bar is, the longer the processing time is. To implement the sixth embodiment, the maximum value of the summation of the signal processing time for each of the sub-block transformations in each clock cycle period must be less than one cycle time. As shown in FIG. 43, the processing time of each sub-block transformation is longest in SubBytes Transformation and shortens in the order of MixColumns Transformation, AddRoundKey Transformation, and ShiftRows Transformation.

In this embodiment, the summation of the signal processing time for each of the sub-block transformations in the 0th cycle where AddRoundKey Transformation, SubBytes Transformation, ShiftRows Transformation, MixColumns Transformation, and AddRoundKey Transformation are executed is longer than the summation of the signal processing time for each of the sub-block transformations in the first to eighth cycles where AddRoundKey Transformation, SubBytes Transformation, ShiftRows Transformation, and MixColumns Transformation are executed or the summation of the signal processing time for each of the sub-block transformations in the ninth cycle where AddRoundKey Transformation, SubBytes Transformation, and ShiftRows Transformation are executed. FIG. 43 is also applicable to decryption, and the same as described above applies to decryption. Hence, the maximum value of the summation of the signal processing time for each of the sub-block transformations of the sixth embodiment is larger than that of the prior art by an amount corresponding to the processing time of one AddRoundKey Transformation. However, the processing time of one AddRoundKey Transformation is much shorter than the summation of the signal processing time for each of the sub-block transformations in one cycle. The maximum value of the summation of the signal processing time for each sub-block transformations in each clock cycle period is often set with a sufficient margin to one cycle time. For this reason, if the maximum value of the summation of the signal processing time for each of the sub-block transformations in each clock cycle period of the prior art is shorter than one cycle time, this embodiment is also supposed to be implementable in many cases.

The above-described characteristic features of the sixth embodiment will be summarized.

In the conventional general implementation method, a round function defined by the standards is regarded as a break in processing, and encryption and decryption are distributed to clock cycles. For this reason, the summation of the signal processing time for each of the sub-block transformations in the 10th and 0th cycles is shorter than the summation of the signal processing time for each of the sub-block transformations in each of the first to ninth cycles. That is, the summation of the signal processing time for each of the sub-block transformations executed in each cycle varies.

On the other hand, in the sixth embodiment, the signal processing in some clock cycles is increased so that the difference among the summation of the signal processing time for each of the sub-block transformations in each clock cycle period is reduced.

In the sixth embodiment, the maximum value of the summation of the signal processing time for each of the sub-block transformations executed in one cycle slightly increases. For this reason, the sixth embodiment is not necessarily implementable under conditions where the prior art can be implemented. However, this hardly poses a problem in many cases because the maximum value of the summation of the signal processing time for each of the sub-block transformations in each clock cycle period often set with a sufficient margin in one cycle time. In many cases, the number of clock cycles required for AES encryption or decryption can be decreased by one. This raises the AES processing speed about 10%.

The circuit arrangement of an AES Core for implementing AES encryption and decryption will be described next.

Figure 44:
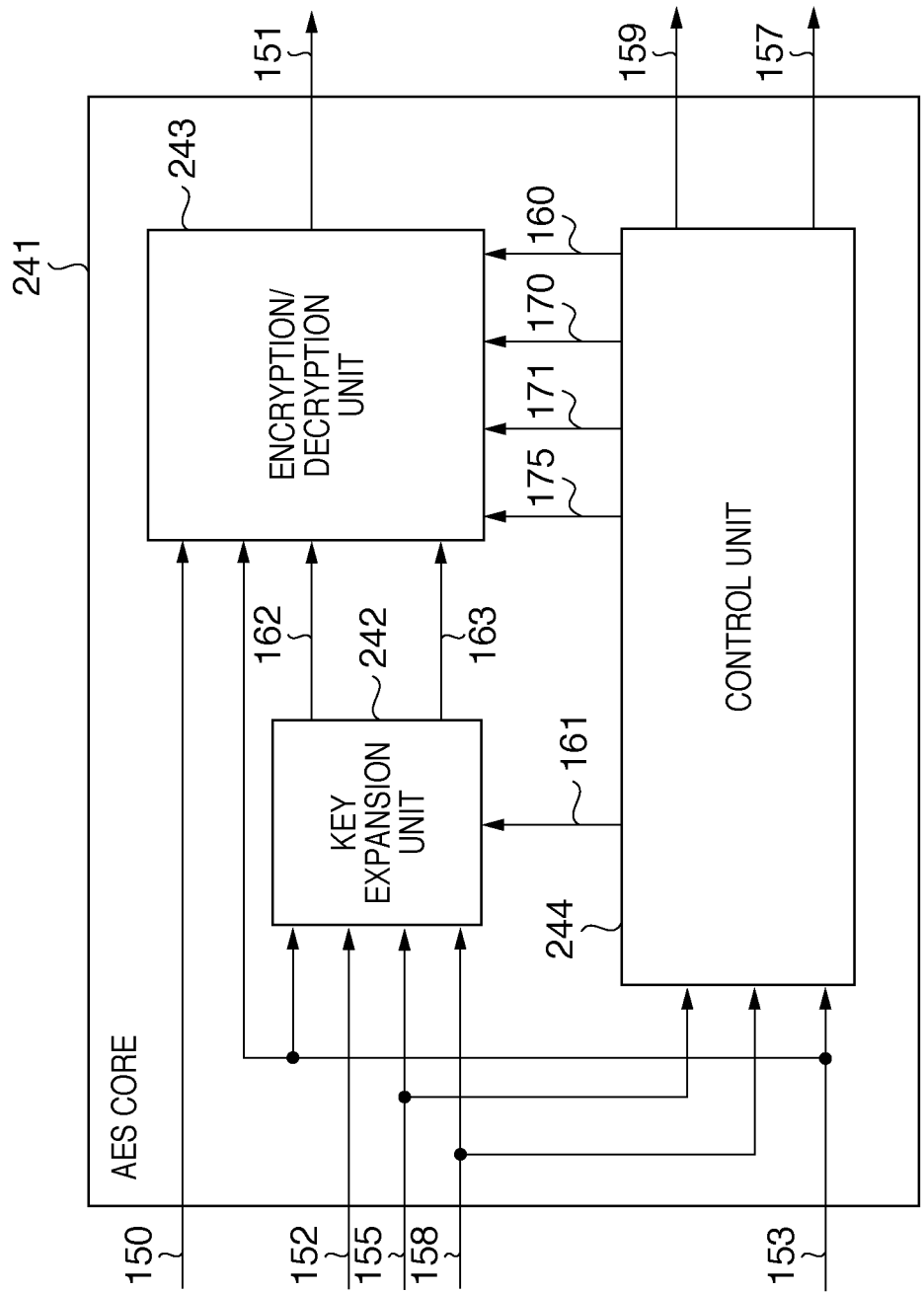
FIG. 44 is a block diagram of an AES Core according to the sixth embodiment.

FIG. 44 is a block diagram of an AES Core according to this embodiment. Referring to FIG. 44, an AES Core 241 executes AES processing. A Key Expansion unit 242 generates a Round Key necessary for AES encryption and decryption from a cipher key and outputs the Round Key. An encryption/decryption unit 243 executes encryption of 128-bit plaintext data or decryption of 128-bit ciphertext data using the Round Key supplied from the Key Expansion unit 242. A control unit 244 receives a signal from a unit outside the AES Core 241 and generates signals to control the operations of the Key Expansion unit 242 and encryption/decryption unit 243 and a signal to notify the unit outside the AES Core 241 of completion of the operation.

A description of constituent elements and signal lines in FIG. 44, which are the same as those described in the first and second embodiments, will be omitted.

Figure 45:
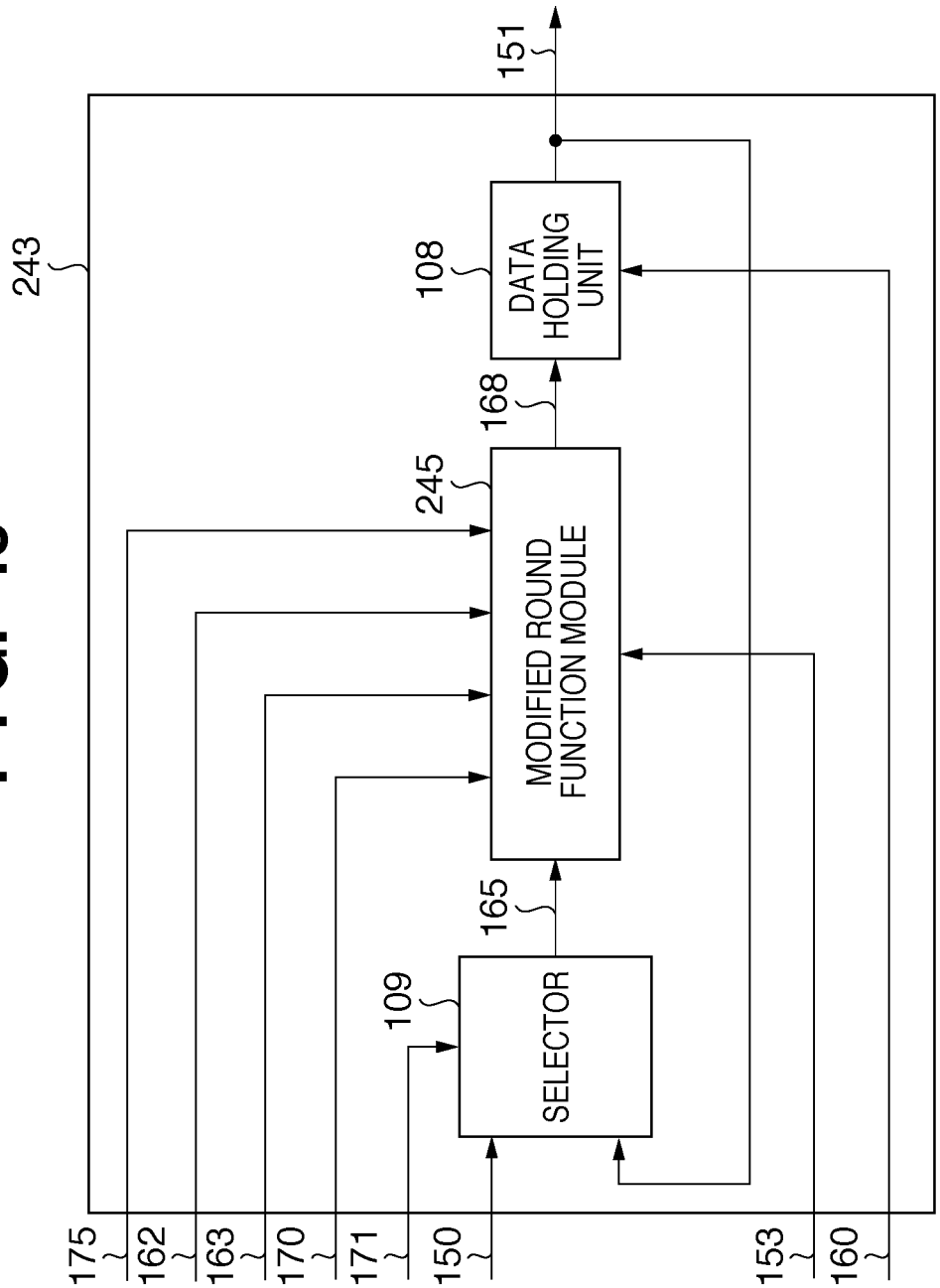
FIG. 45 is a block diagram of an encryption/decryption unit according to the sixth embodiment.

The encryption/decryption unit 243 will be described next. FIG. 45 is a block diagram of the encryption/decryption unit 243. Referring to FIG. 45, a modified round function module 245 executes encryption or decryption of one cycle using a Round Key A 162 and a Round Key B 163 under the control of selection signals 170 and 175 and an encryption/decryption selection signal 153.

In the above arrangement, when a selection signal 171 is negated, a selector 109 of the encryption/decryption unit 243 selects an input signal 150. When the selection signal 171 is asserted, the selector 109 selects the output from a data holding unit 108.

A description of constituent elements and signal lines in FIG. 45, which are the same as those described in the first and second embodiments, will be omitted.

Figure 46:
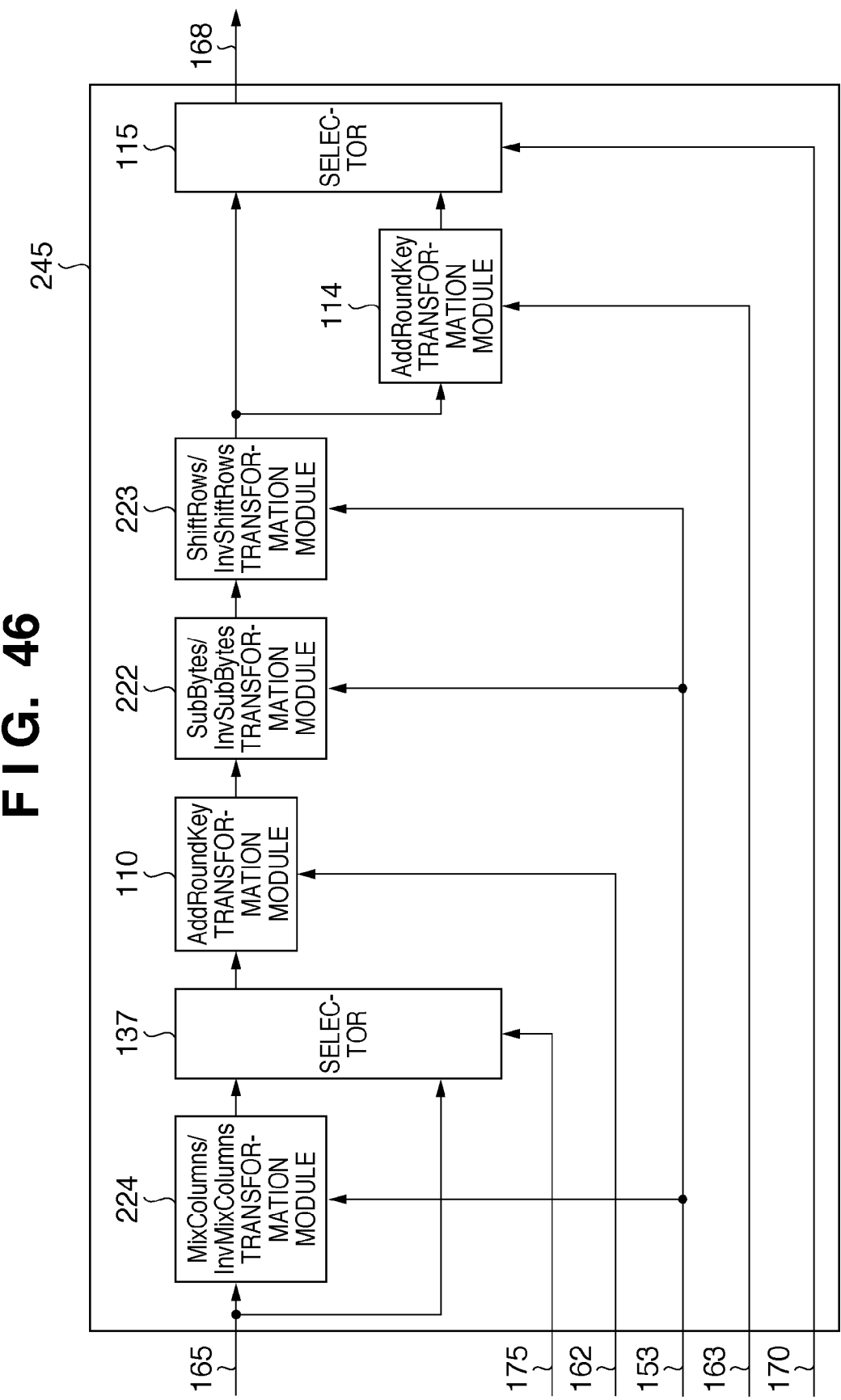
FIG. 46 is a block diagram of a modified round function module according to the sixth embodiment.

The modified round function module 245 will be described next with reference to the block diagram of FIG. 46. Referring to FIG. 46, an input signal 165 and the encryption/decryption selection signal 153 are input to a MixColumns/InvMixColumns Transformation module 224. The output from the MixColumns/InvMixColumns Transformation module 224, the input signal 165, and the selection signal 175 are input to a selector 137. The output from the selector 137 and the Round Key A 162 are input to an AddRoundKey Transformation module 110. The output from the AddRoundKey Transformation module 110 is input to a SubBytes/InvSubBytes Transformation module 222. The output from the SubBytes/InvSubBytes Transformation module 222 is input to a ShiftRows/InvShiftRows Transformation module 223. The output from the ShiftRows/InvShiftRows Transformation module 223 and the Round Key B 163 are input to an AddRoundKey Transformation module 114. The output from the ShiftRows/InvShiftRows Transformation module 223, the output from the AddRoundKey Transformation module 114, and the selection signal 170 are input to a selector 115. The output of the selector 115 is connected to an output signal 168 from the modified round function module 245. A description of constituent elements and signal lines in FIG. 46, which are the same as those described in the first, fourth, and fifth embodiments, will be omitted.

In the above arrangement, when the selection signal 175 is negated, the selector 137 selects and outputs the output from the MixColumns/InvMixColumns Transformation module 224. When the selection signal 175 is asserted, the selector 137 selects and outputs the input signal 165. When the selection signal 170 is negated, the selector 115 selects and outputs the output from the ShiftRows/InvShiftRows Transformation module 223. When the selection signal 170 is asserted, the selector 115 selects and outputs the output from the AddRoundKey Transformation module 114.

The encryption operation in the above arrangement will be described next with reference to the timing chart of FIGS. 27A and 27B. Three-digit numbers along the ordinate on the left end of FIG. 27A indicate signal lines and have a one-to-one correspondence with the reference numerals of the signal lines used in FIGS. 44 to 46.

The encryption operation shown in the timing chart of FIGS. 27A and 27B is roughly divided into four parts. The first part is a parameter setting period (T01 to T06) for setting various parameters such as a cipher key. The second part is a key preparation period (T06 to T17) for generating wkey0 and holding it in a register. The third part is a first block encryption period (T17 to T27). The fourth part is a second block encryption period (from T27).

The role, start condition, and end condition of the parameter setting period are the same as in the third embodiment. The key preparation period is from T06 to T17. The start condition, end condition, and the operation of each circuit are also the same as in the third embodiment, and a description thereof will not be repeated.

The control unit 244 asserts the selection signal 175 at the end of encryption and negates it in the first cycle of encryption (T18 or T28). The control unit 244 also asserts the selection signal 170 in the final cycle of encryption (T16) and negates it at the end of encryption (T17). The control unit 244 also asserts the selection signal 171 in the first cycle of encryption and negates it at the end of encryption.

As described in association with the circuit arrangement, when the selection signal 171 is negated, the selector 109 selects the input signal 150. When the selection signal 171 is asserted, the selector 109 selects the output from the data holding unit 108. When the selection signal 170 is negated, the selector 115 selects and outputs the output from the ShiftRows/InvShiftRows Transformation module 223. When the selection signal 170 is asserted, the selector 115 selects and outputs the output from the AddRoundKey Transformation module 114. When the selection signal 175 is negated, the selector 137 selects and outputs the output from the MixColumns/InvMixColumns Transformation module 224. When the selection signal 175 is asserted, the selector 137 selects and outputs the input signal 165. When the encryption/decryption selection signal 153 is negated, the SubBytes/InvSubBytes Transformation module 222, ShiftRows/InvShiftRows Transformation module 223, and MixColumns/InvMixColumns Transformation module 224 execute SubBytes Transformation, ShiftRows Transformation, and MixColumns Transformation, respectively. When the encryption/decryption selection signal 153 is asserted, they execute InvSubBytes Transformation, InvShiftRows Transformation, and InvMixColumns Transformation, respectively.

Hence, in the 0th cycle (T17 to T18), the modified round function module 245 executes AddRoundKey Transformation, SubBytes Transformation, and ShiftRows Transformation for the input signal 150. From the first cycle, the modified round function module outputs a result obtained by executing SubBytes Transformation, ShiftRows Transformation, MixColumns Transformation, and AddRoundKey Transformation for the result of immediately preceding cycle. In the ninth cycle (T26 to T27), the modified round function module outputs a result obtained by executing MixColumns Transformation, AddRoundKey Transformation, SubBytes Transformation, ShiftRows Transformation, and AddRoundKey Transformation.

The modified round function module 245 can execute encryption as shown in FIG. 42 by controlling the selection signals 171, 170, and 175 in the above-described way.

On the other hand, the Key Expansion unit 242 outputs wkey0 as the Round Key A 162 and wkey10 as the Round Key B 163 after the key preparation period. For this reason, wkey0 is supplied to the modified round function module 245 at the start of encryption (T17). Upon detecting the start of encryption based on an encryption/decryption start signal 158 (T17), the Key Expansion unit 242 generates wkey1 using wkey0 held in the Round Key A register and holds wkey1 in the Round Key A register. Hence, wkey1 is supplied to the modified round function module 245 at the timing T18. The Round Keys are supplied in the same way up to the timing T26. At the timing T26, wkey10 serving as the Round Key B 163 is also supplied. When wkey10 is held in the Round Key A register, and Round Key supply is ended at the timing T26, the Key Expansion unit 242 holds wkey0 that is continuously externally supplied as a cipher key 152 in the Round Key A register to prepare for the start of the next encryption (T27).

When the Key Expansion unit 242 operates in the above-described manner, the modified round function module 245 can use the Round Key in each cycle as shown in FIG. 42.

The operation during the encryption period according to this embodiment is performed in the above-described way. The decryption operation of the second block is performed in the same way as that for the first block. From then on, the encryption operation is repeatedly performed as many as a predetermined number of blocks. In the timing chart of FIGS. 27A and 27B, the encryption of the second block starts at a shortest interval from the end of the encryption of the first block. The AES Core can exhibit its maximum performance by executing the encryption of all blocks at such a timing. However, the encryption interval can fundamentally be set to an arbitrary length.

When the encryption of a predetermined number of blocks has completely finished, and the next job is to be executed using different parameters such as a cipher key, the processing starts again from parameter setting.

Figure 47A:
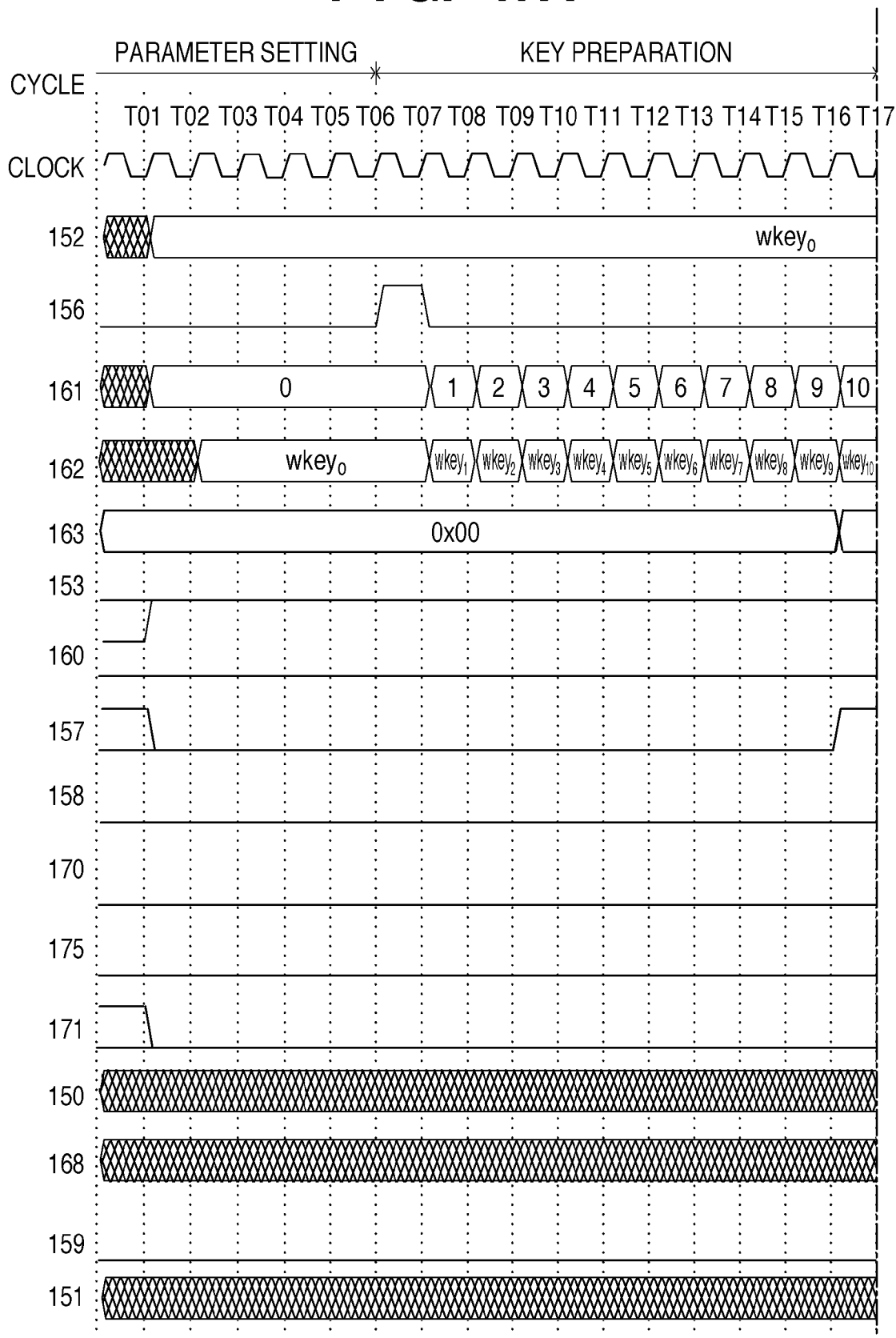

The decryption operation of the sixth embodiment will be described next. FIGS. 47A and 47B are a timing chart of decryption according to the sixth embodiment. Referring to FIGS. 47A and 47B, the abscissa represents the time. Timing names T01, T02, . . . , T33 are assigned to the leading edges of the clock pulses. Three-digit numbers along the ordinate on the left end of FIG. 47A indicate signal lines and have a one-to-one correspondence with the reference numerals of the signal lines used in FIGS. 44 to 46.

The decryption operation shown in the timing chart of FIGS. 47A and 47B is roughly divided into four parts. The first part is a parameter setting period (T01 to T06) for setting various parameters such as a cipher key. The second part is a key preparation period (T06 to T17) for generating wkey0 and holding it in a register. The third part is a first block decryption period (T17 to T27). The fourth part is a second block decryption period (from T27).

The role, start condition, and end condition of the parameter setting period are the same as in encryption of this embodiment. In decryption, however, the encryption/decryption selection signal 153 is asserted. The key preparation period is from T06 to T17, and its start condition and end condition are the same as in encryption of this embodiment. The operation of each circuit is also almost the same as in encryption of this embodiment. However, at the timing T16, wkey10 is output as the Round Key B 163. At the end of the key preparation period (T17), the control unit 244 asserts the selection signal 175.

The first block decryption period is from T17 to T27, and its start condition and end condition are the same as in encryption of this embodiment. The operation of each circuit is also almost the same as described above.

The control unit 244 asserts the selection signal 170 in the final cycle of decryption (T26) and negates it in the first cycle decryption (T18 or T28). The control unit 244 also asserts the selection signal 175 at the end of decryption (T17) and negates it at the end of decryption (T17). The control unit 244 also asserts the selection signal 171 in the first cycle of decryption and negates it at the end of decryption.

As described in association with the circuit arrangement, when the selection signal 171 is negated, the selector 109 selects the input signal 150. When the selection signal 171 is asserted, the selector 109 selects the output from the data holding unit 108. When the selection signal 175 is negated, the selector 137 selects and outputs the output from the MixColumns/InvMixColumns Transformation module 224. When the selection signal 175 is asserted, the selector 137 selects and outputs the input signal 165. When the selection signal 170 is negated, the selector 115 selects and outputs the output from the ShiftRows/InvShiftRows Transformation module 223. When the selection signal 170 is asserted, the selector 115 selects and outputs the output from AddRoundKey Transformation module 114.

Hence, in the 0th cycle (T17 to T18), the modified round function module 245 executes AddRoundKey Transformation, InvShiftRows Transformation, and InvSubBytes Transformation for the input signal 150. From the first cycle, the modified round function module outputs a result obtained by executing AddRoundKey Transformation, InvMixColumns Transformation, InvShiftRows Transformation, and InvSubBytes Transformation for the result of immediately preceding cycle. In the ninth cycle (T26 to T27), the modified round function module outputs a result obtained by executing AddRoundKey Transformation, InvMixColumns Transformation, InvShiftRows Transformation, InvSubBytes Transformation, and AddRoundKey Transformation.

The modified round function module 245 can execute decryption as shown in FIG. 42 by controlling the selection signals 171, 170, and 175 in the above-described way.

On the other hand, the Key Expansion unit 242 outputs wkey10 as the Round Key A 162 and wkey0 as the Round Key B 163 after the key preparation period. For this reason, wkey10 is supplied to the modified round function module 245 at the start of decryption (T17). Upon detecting the start of decryption based on the decryption/decryption start signal 158 (T17), the Key Expansion unit 242 generates wkey9' using wkey10' held in the Round Key A register and holds wkey9' in the Round Key A register. Hence, wkey9' is supplied to the modified round function module 245 at the timing T18. In the same way, wkey9' is supplied at T19, wkey8' is supplied at T20, . . . , and wkey1' is supplied at T26. Note that wkey0 that is necessary in the processing of the final cycle is continuously supplied as the Round Key B 163.

When Round Key supply is ended at T26, the Key Expansion unit 242 generates wkey9' using wkey10 held in the internal register of the Key Expansion unit 242 and holds wkey9' in the Round Key A register in the next cycle (T27) to prepare for the start of the next decryption.

The operation during the decryption period according to the sixth embodiment is performed in the above-described way. The decryption operation of the second block is performed in the same way as that for the first block. From then on, the decryption operation is repeatedly performed as many as a predetermined number of blocks. In the timing chart of FIGS. 47A and 47B, the decryption of the second block starts at a shortest interval from the end of the decryption of the first block. The AES Core can exhibit its maximum performance by executing the decryption of all blocks at such a timing. However, the decryption interval can fundamentally be set to an arbitrary length.

When the decryption of a predetermined number of blocks has completely finished, and the next job is to be executed using different parameters such as a cipher key, the processing starts again from parameter setting.

The sixth embodiment can be implemented in the above-described way. In the sixth embodiment, the maximum value of the summation of the signal processing time for each of the sub-block transformations that must be executed in one cycle slightly increases. However, this hardly poses a problem in many cases because the maximum value of the summation of the signal processing time for each of the sub-block transformations in each clock cycle period is often set with a sufficient margin to one cycle time. For this reason, in many cases, the number of clock cycles required for AES encryption can be decreased by one. This raises the AES processing speed about 10%.

The above-described sixth embodiment is merely an example of the present invention, and the effects of the present invention are not limited to those of the above-described embodiment.

Seventh Embodiment

In the first to sixth embodiments, if the maximum value of the summation of the signal processing time for each of the sub-block transformations in each clock cycle period is equal to or less than ½ of one cycle time, the process speed may be increased by carrying out implementation such that processes that have required two clock cycles are executed in one clock cycle. In the seventh embodiment, an example of implementing the speed-up method will be explained by exemplifying the first embodiment.

An arrangement associated with encryption of an encryption/decryption circuit according to the seventh embodiment includes a first modified round function module, second modified round function module, and data holding unit. The first modified round function module includes a first AddRoundKey Transformation module, first ShiftRows Transformation module, first SubBytes Transformation module, first MixColumns Transformation module, and second AddRoundKey Transformation module. The second modified round function module includes a third AddRoundKey Transformation module, second ShiftRows Transformation module, second SubBytes Transformation module, and second MixColumns Transformation module.

An arrangement associated with decryption of the encryption/decryption circuit according to the seventh embodiment includes a first modified round function module, second modified round function module, and data holding unit. The first modified round function module includes a first AddRoundKey Transformation module, first InvShiftRows Transformation module, first InvSubBytes Transformation module, first InvMixColumns Transformation module, and second AddRoundKey Transformation module. The second modified round function module includes a third AddRoundKey Transformation module, second InvShiftRows Transformation module, second InvSubBytes Transformation module, and second InvMixColumns Transformation module.

The arrangements of encryption and decryption will be apparent from the following description.

FIG. 48 shows the comparison between the process contents of encryption executed in clock cycles in the seventh embodiment and those of the prior art.

Referring to FIG. 48, a cycle count indicates a clock cycle count that is "0" at the start of AES processing. A Round Key wkeyi is a Round Key described in FIPS197 (i is the round number).

In the seventh embodiment, first AddRoundKey Transformation, first SubBytes Transformation, first ShiftRows Transformation, first MixColumns Transformation, second AddRoundKey Transformation, second SubBytes Transformation, second ShiftRows Transformation, and second MixColumns Transformation are executed in the 0th to third cycles. In the fourth cycle, first AddRoundKey Transformation, first SubBytes Transformation, first ShiftRows Transformation, first MixColumns Transformation, second AddRoundKey Transformation, second ShiftRows Transformation, second SubBytes Transformation, and third AddRoundKey Transformation are executed.

As the Round Keys, wkey0 and wkey1 are used in the 0th cycle, wkey2 and wkey3 are used in the first cycle, . . . , and wkey8, wkey9, and wkey10 are used in the fourth cycle.

In the seventh embodiment, the same processing as in the prior art is executed as a whole. In the seventh embodiment, however, AES encryption can be executed in clock cycles fewer by one. The summation of the encryption processing time for each of the sub-block transformations in each clock cycle period according to the seventh embodiment will be described next. FIG. 49 is a view showing the comparison between the summation of the encryption processing time for each of the sub-block transformations in each clock cycle period in the prior art and that of the seventh embodiment. The ordinate represents the time. The longer the bar is, the longer the processing time is. To implement the seventh embodiment, the maximum value of the summation of the signal processing time for each of the sub-block transformations in each clock cycle period must be less than one cycle time. As shown in FIG. 49, the processing time of each sub-block transformation is longest in SubBytes Transformation and shortens in the order of MixColumns Transformation, AddRoundKey Transformation, and ShiftRows Transformation.

In the seventh embodiment, the summation of the signal processing time for each of the sub-block transformations in each of the 0th to third cycles where first AddRoundKey Transformation, first SubBytes Transformation, first ShiftRows Transformation, first MixColumns Transformation, second AddRoundKey Transformation, second SubBytes Transformation, second ShiftRows Transformation, and second MixColumns Transformation are executed is longer than the summation of the signal processing time for each of the sub-block transformations in the fourth cycle where first AddRoundKey Transformation, first SubBytes Transformation, first ShiftRows Transformation, first MixColumns Transformation, second AddRoundKey Transformation, second ShiftRows Transformation, second SubBytes Transformation, and third AddRoundKey Transformation are executed. Hence, the maximum value of the summation of the signal processing time for each of the sub-block transformations executed in one cycle in the seventh embodiment is equal to that of the prior art. If the maximum value of the summation of the signal processing time for each of the sub-block transformations executed in one cycle is shorter than one cycle time in the prior art, the seventh embodiment can also be implemented.

The present invention is also applicable to AES decryption.

FIG. 50 shows the comparison between the process contents of decryption executed in clock cycles in the seventh embodiment and those of the prior art. Referring to FIG. 50, a cycle count indicates a clock cycle count that is "0" at the start of AES processing.

In the seventh embodiment, first AddRoundKey Transformation, first InvShiftRows Transformation, first InvSubBytes Transformation, second AddRoundKey Transformation, first InvMixColumns Transformation, second InvShiftRows Transformation, second InvSubBytes Transformation, and third AddRoundKey Transformation are executed in the 0th cycle. First InvMixColumns Transformation, first InvShiftRows Transformation, first InvSubBytes Transformation, first AddRoundKey Transformation, second InvMixColumns Transformation, second InvShiftRows Transformation, second InvSubBytes Transformation, and second AddRoundKey Transformation are executed in the first to fourth cycles. As the Round Keys, wkey10, wkey9, and wkey8 are used in the 0th cycle, wkey7 and wkey6 are used in the first cycle, wkey5 and wkey4 are used in the second cycle, . . . , and wkey1 and wkey0 are used in the fourth cycle.

In the seventh embodiment, the same processing as in the prior art is executed as a whole. In the seventh embodiment, however, AES decryption can be executed in clock cycles fewer by one.

Figure 51:
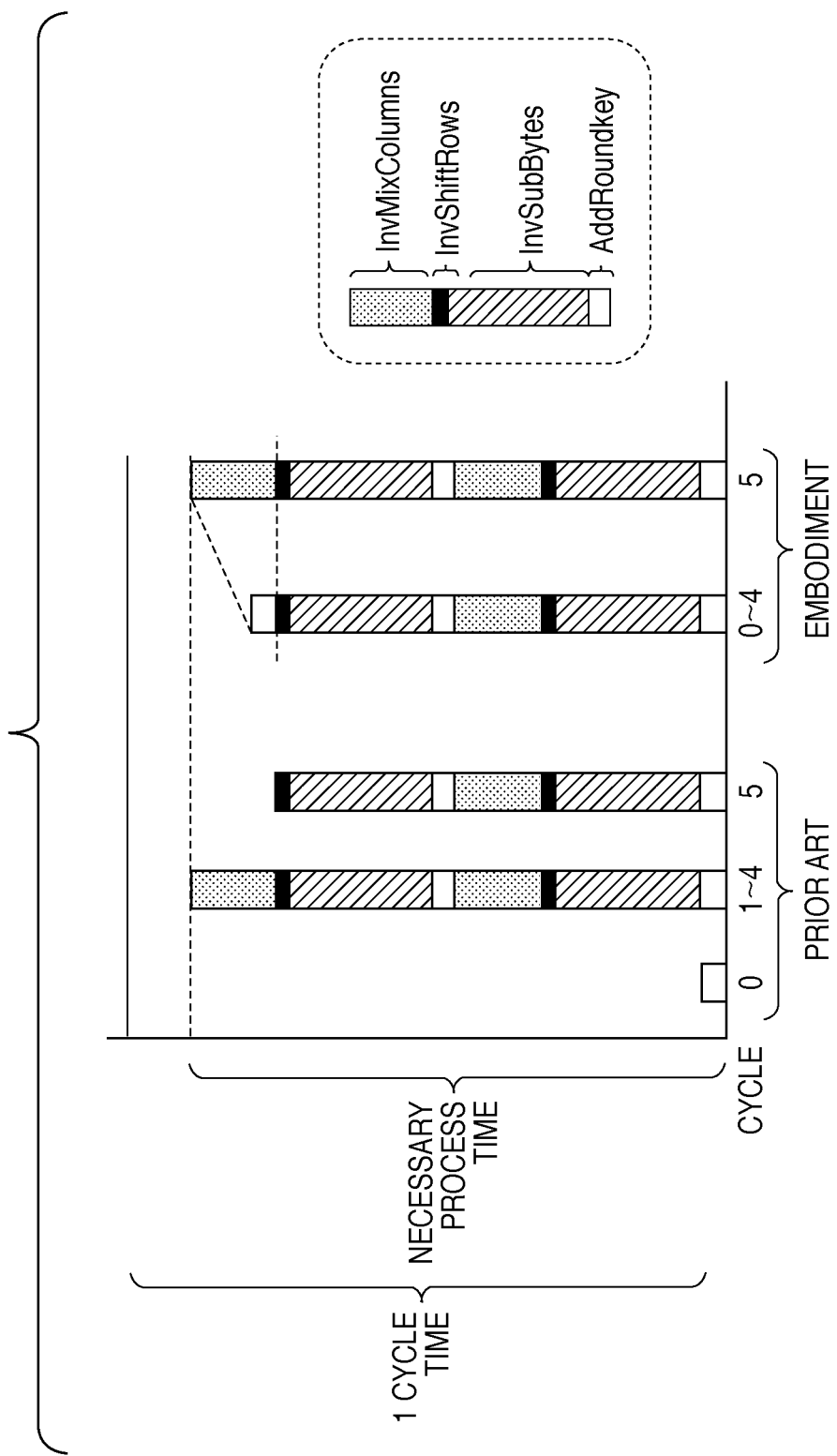
FIG. 51 is a view for comparing the summation of the decryption processing time for each sub-block transformations in each clock cycle period in the prior art with that of the seventh embodiment.

The summation of the decryption processing time for each of the sub-block transformations in each clock cycle period according to the seventh embodiment will be described next. FIG. 51 is a view showing the comparison between the summation of the decryption processing time for each of the sub-block transformations in each clock cycle period in the seventh embodiment and that of the prior art. The ordinate represents the time. The longer the bar is, the longer the processing time is. To implement the seventh embodiment, the maximum value of the summation of the signal processing time for each of the sub-block transformations in each clock cycle period must be less than one cycle time. As shown in FIG. 51, the processing time of each sub-block transformation is longest in InvSubBytes Transformation, and shortens in the order of InvMixColumns Transformation, AddRoundKey Transformation, and InvShiftRows Transformation.

In the seventh embodiment, the summation of the signal processing time for each of the sub-block transformations in each of the first to fourth cycles where first InvMixColumns Transformation, first InvShiftRows Transformation, first InvSubBytes Transformation, first AddRoundKey Transformation, second InvMixColumns Transformation, second InvShiftRows Transformation, second InvSubBytes Transformation, and second AddRoundKey Transformation are executed is longer than the summation of the signal processing time for each of the sub-block transformations in the 0th cycle where first AddRoundKey Transformation, first InvShiftRows Transformation, first InvSubBytes Transformation, second AddRoundKey Transformation, second InvMixColumns Transformation, second InvShiftRows Transformation, second InvSubBytes Transformation, and third AddRoundKey Transformation are executed. Hence, the maximum value of the summation of the signal processing time for each of the sub-block transformations executed in one cycle in the seventh embodiment is equal to that of the prior art. If the maximum value of the summation of the signal processing time for each of the sub-block transformations executed in one cycle is shorter than one cycle time in the prior art, this embodiment can also be implemented.

The above-described characteristic features of this embodiment will be summarized.

In the conventional general implementation method, a round function defined by the standards is regarded as a break in processing, and encryption and decryption are distributed to clock cycles. For this reason, the summation of the signal processing time for each of the sub-block transformations in each cycle varies. Additionally, 11 cycles, i.e., an odd number of cycles are necessary for processing, as described in the first embodiment. If processes of two cycles are executed in one cycle, processes of one cycle remain as a fraction. Consequently, the processing requires six cycles.

On the other hand, in the present invention, the AES processing requires 10 cycles. Even when processes of two cycles are executed in one cycle, no fraction remains. When processes of two cycles are executed in one cycle, as in the seventh embodiment, the reduction of one cycle raises the AES processing speed about 20%.

The circuit arrangement of an AES Core for implementing AES encryption and decryption will be described next.

Figure 52:
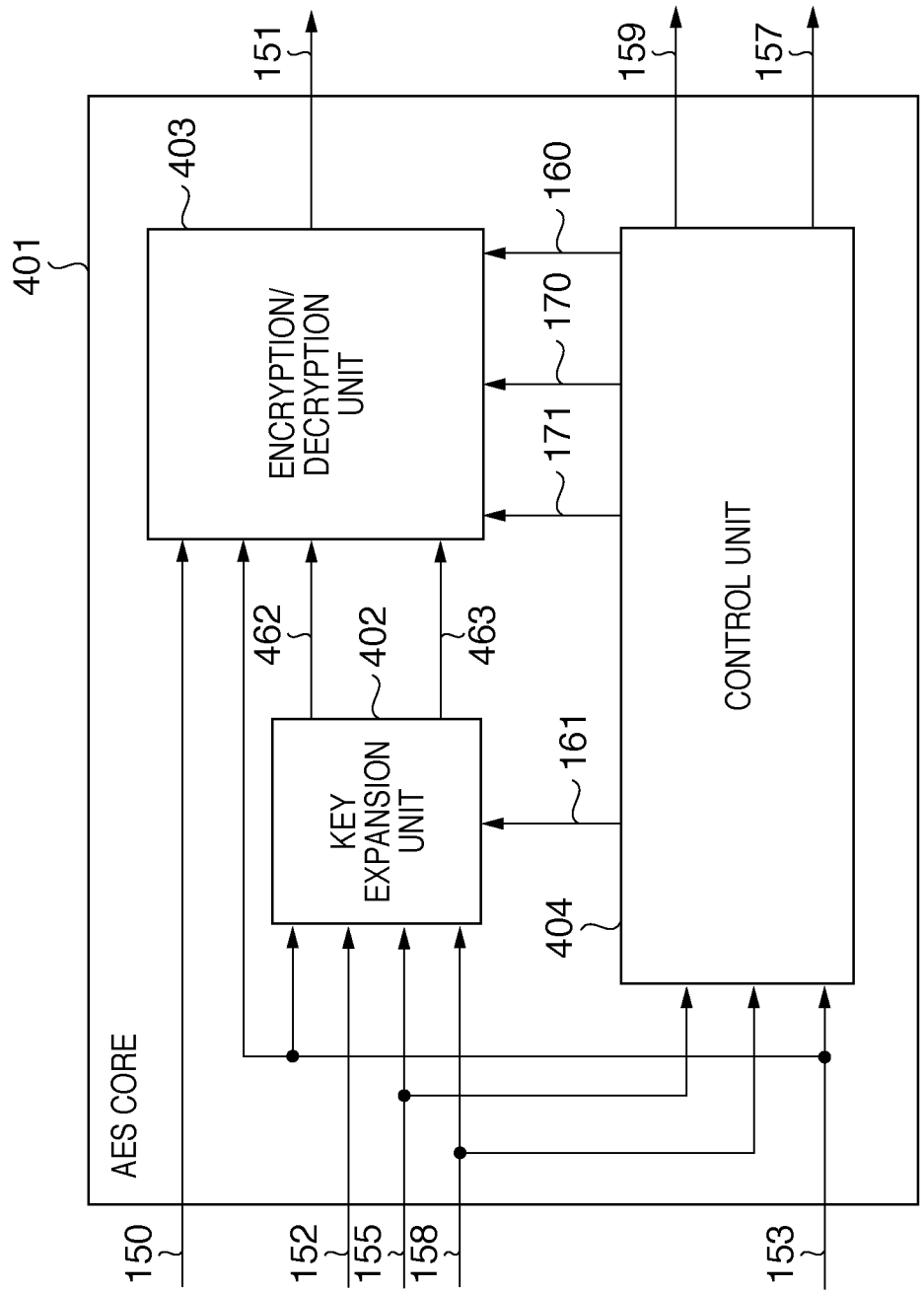
FIG. 52 is a block diagram of an AES Core according to the seventh embodiment.

FIG. 52 is a block diagram of an AES Core according to the seventh embodiment.

Referring to FIG. 52, an AES Core 401 executes AES processing. A Key Expansion unit 402 generates a Round Key necessary for AES encryption and decryption from a cipher key and outputs the Round Key. An encryption/decryption unit 403 executes encryption of 128-bit plaintext data or decryption of 128-bit ciphertext data using the Round Key supplied from the Key Expansion unit 402. A control unit 404 receives a signal from a unit outside the AES Core 401 and generates signals to control the operations of the Key Expansion unit 402 and encryption/decryption unit 403 and a signal to notify the unit outside the AES Core 401 of completion of the operation.

Referring to FIG. 52, a Round Key A1 462 is one of Round Keys generated by the Key Expansion unit 402. A Round Key A2 463 is one of Round Keys generated by the Key Expansion unit 402.

The same reference numerals as in the first embodiment denote the same constituent elements and signal lines in FIG. 52, and a description thereof will not be repeated.

In the above arrangement, the Round Key A1 462 is input from the Key Expansion unit 402 to the encryption/decryption unit 403, and the Round Key A2 463 is input from the Key Expansion unit 402 to the encryption/decryption unit 403.

Figure 53:
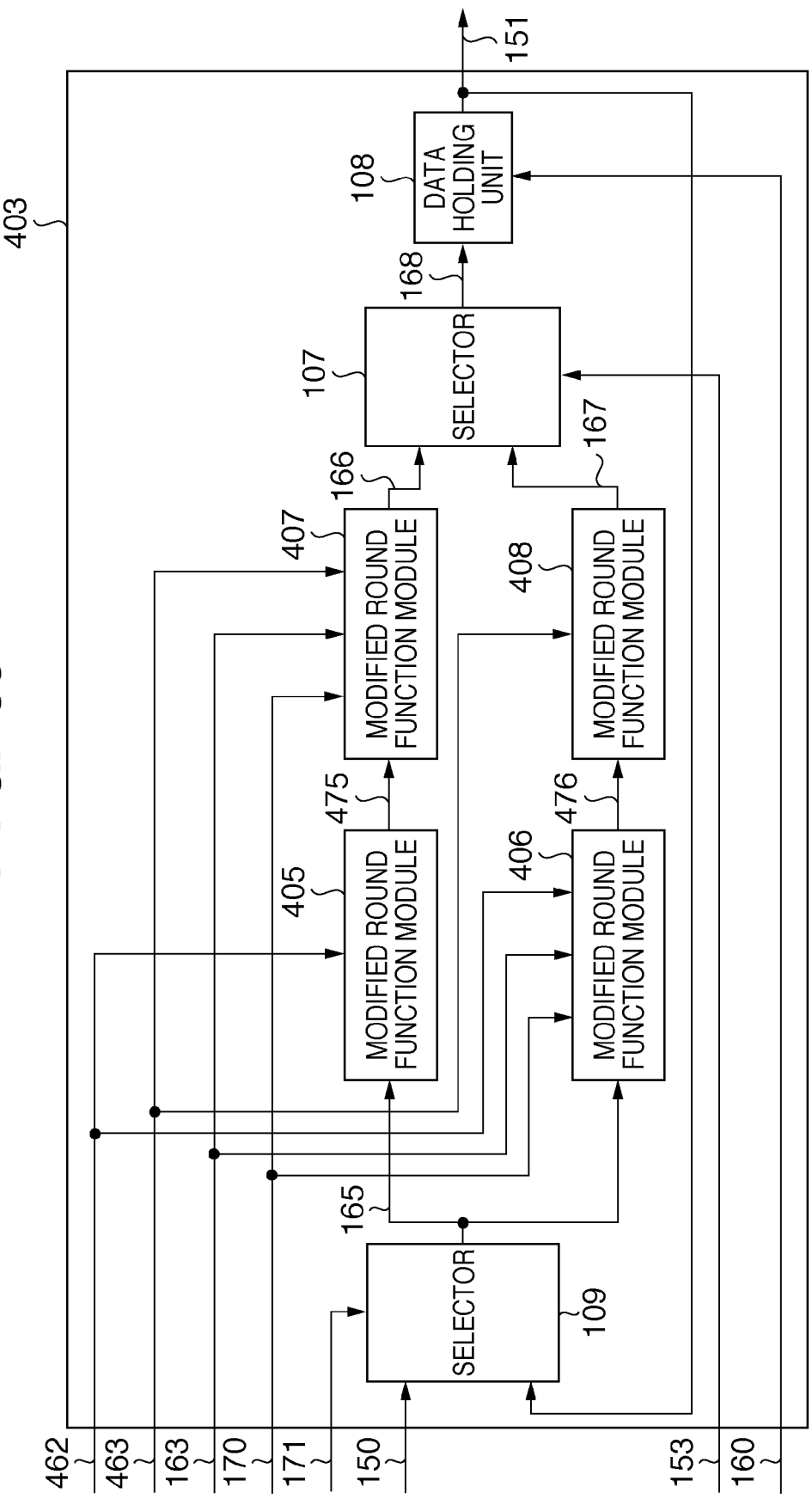
FIG. 53 is a block diagram of an encryption/decryption unit according to the seventh embodiment.

The encryption/decryption unit 403 will be described next. FIG. 53 is a block diagram of the encryption/decryption unit 403. Referring to FIG. 53, a modified round function module 405 executes encryption using the Round Key A1 462. A modified round function module 407 executes encryption using the Round Key A2 463 and a Round Key B 163 under the control of a selection signal 170. A modified round function module 406 executes decryption using the Round Key A1 462 and the Round Key B 163 under the control of the selection signal 170. A modified round function module 408 executes decryption using the Round Key A2 463.

Referring to FIG. 53, the modified round function module 407 receives an input signal 475. The modified round function module 408 receives an input signal 476. The same reference numerals as in the first embodiment denote the same constituent elements and signal lines in FIG. 53, and a description thereof will not be repeated.

FIG. 54A is a block diagram of the modified round function module 405. FIG. 54B is a block diagram of the modified round function module 407.

The modified round function module 405 will be described with reference to FIG. 54A. Referring to FIG. 54A, an AddRoundKey Transformation module 110 receives an input signal 165 and the Round Key A1 462 and executes AddRoundKey Transformation. A SubBytes Transformation module 111 receives the output from the AddRoundKey Transformation module 110 and executes SubBytes Transformation. A ShiftRows Transformation module 112 receives the output from the SubBytes Transformation module 111 and executes ShiftRows Transformation. A MixColumns Transformation module 113 receives the output from the ShiftRows Transformation module 112 and executes MixColumns Transformation. The output signal of the MixColumns Transformation module 113 is the output of the modified round function module 405.

The modified round function module 407 will be described next with reference to FIG. 54B. Referring to FIG. 54B, the AddRoundKey Transformation module 110 receives the input signal 475 and the Round Key A2 463 and executes AddRoundKey Transformation. The SubBytes Transformation module 111 receives the output from the AddRoundKey Transformation module 110 and executes SubBytes Transformation. The ShiftRows Transformation module 112 receives the output from the SubBytes Transformation module 111 and executes ShiftRows Transformation. The MixColumns Transformation module 113 receives the output from the ShiftRows Transformation module 112 and executes MixColumns Transformation. An AddRoundKey Transformation module 114 receives the output from the ShiftRows Transformation module 112 and the Round Key B 163 and executes AddRoundKey Transformation. A selector 115 selects and outputs one of the output from the MixColumns Transformation module 113 and the output from the AddRoundKey Transformation module 114 in accordance with the selection signal 170. The output signal of the selector 115 is the output of the modified round function module 407.

Note that the names of the above-described transformations are the same as those of sub-block transformations of AES processing described in FIPS197.

In the above arrangement, when the selection signal 170 is negated, the selector 115 selects and outputs the output from the MixColumns Transformation module 113. When the selection signal 170 is asserted, the selector 115 selects and outputs the output from the AddRoundKey Transformation module 114.

The modified round function modules 406 and 408 will be described next with reference to FIGS. 55A and 55B. FIG. 55A is a block diagram of the modified round function module 406.

Referring to FIG. 55A, an InvMixColumns Transformation module 116 receives the input signal 165 and executes InvMixColumns Transformation. An AddRoundKey Transformation module 121 receives the input signal 165 and the Round Key B 163 and executes AddRoundKey Transformation. A selector 118 selects and outputs one of the output from the InvMixColumns Transformation module 116 and the output from the AddRoundKey Transformation module 121 in accordance with the selection signal 170. An InvShiftRows Transformation module 119 receives the output from the selector 118 and executes InvShiftRows Transformation. An InvSubBytes Transformation module 120 receives the output from the InvShiftRows Transformation module 119 and executes InvSubBytes Transformation. An AddRoundKey Transformation module 117 receives the output from the InvSubBytes Transformation module 120 and the Round Key A1 462 and executes AddRoundKey Transformation. The output of the AddRoundKey Transformation module 117 is the output of the modified round function module 406.

Note that the names of the above-described transformations are the same as those of sub-block transformations of AES processing described in FIPS197.

In the above arrangement, when the selection signal 170 is negated, the selector 118 selects and outputs the output from the InvMixColumns Transformation module 116. When the selection signal 170 is asserted, the selector 118 selects and outputs the output from the AddRoundKey Transformation module 121.

The modified round function module 408 will be described next with reference to the block diagram of FIG. 55B.

Referring to FIG. 55B, the InvMixColumns Transformation module 116 receives the input signal 476 and executes InvMixColumns Transformation. The InvShiftRows Transformation module 119 receives the output from the InvMixColumns Transformation module 116 and executes InvShiftRows Transformation. The InvSubBytes Transformation module 120 receives the output from the InvShiftRows Transformation module 119 and executes InvSubBytes Transformation. The AddRoundKey Transformation module 117 receives the output from the InvSubBytes Transformation module 120 and the Round Key A2 463 and executes AddRoundKey Transformation. The output of the AddRoundKey Transformation module 117 is the output of the modified round function module 408.

Note that the names of the above-described transformations are the same as those of sub-block transformations of AES processing described in FIPS197.

The encryption operation in the above arrangement will be described next in detail with reference to the timing chart of FIGS. 56A and 56B.

Figure 56A:
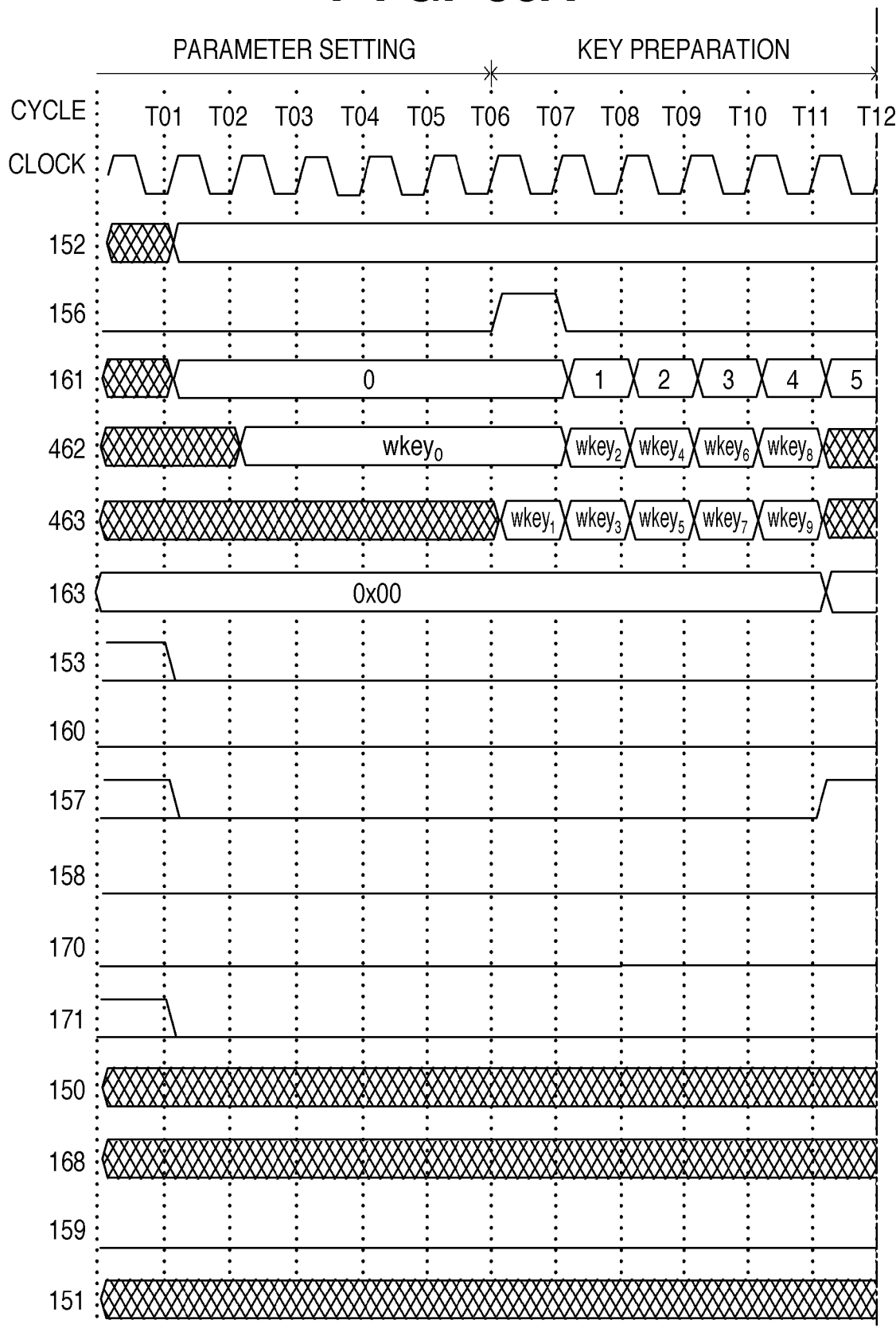
FIGS. 56A and 56B are a timing chart of encryption according to the seventh embodiment.
Figure 56B:
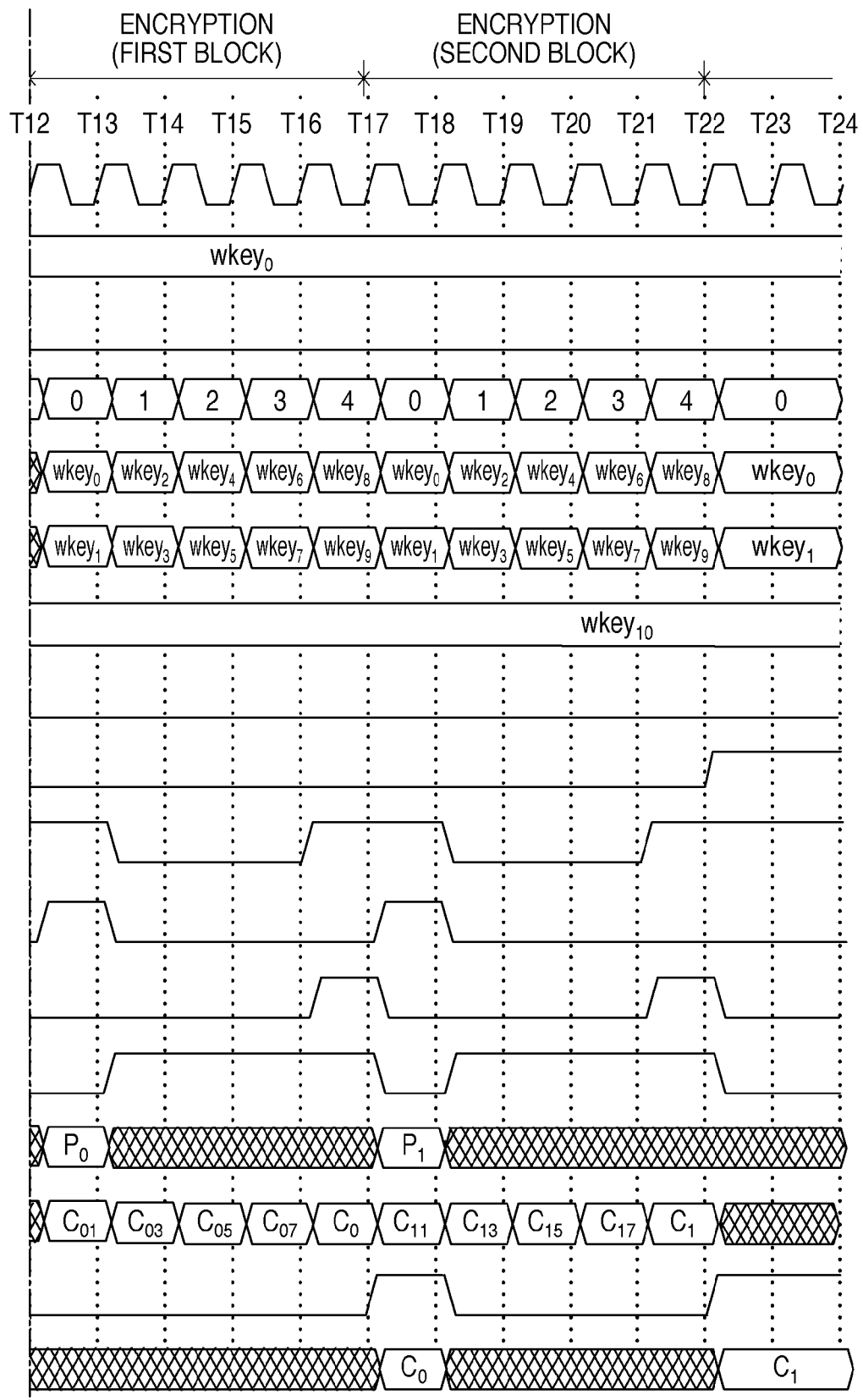

Referring to FIGS. 56A and 56B, the abscissa represents the time. Timing names T01, T02, . . . , T33 are assigned to the leading edges of the clock pulses. Three-digit numbers along the ordinate on the left end of FIG. 56A indicate signal lines and have a one-to-one correspondence with the reference numerals of the signal lines used in FIGS. 52 to 55B.

The encryption operation shown in the timing chart of FIGS. 56A and 56B is roughly divided into four parts. The first part is a parameter setting period (T01 to T06) for setting various parameters such as a cipher key. The second part is a key preparation period (T06 to T12) for generating wkey0 and holding it in a register. The third part is a first block encryption period (T12 to T17). The fourth part is a second block encryption period (T17 to T22).

In parameter setting, various kinds of parameters necessary for encryption/decryption such as a key length and an encryption mode are set, as needed, in addition to a cipher key 152 and an encryption/decryption selection signal 153. The parameter setting period is a period having an arbitrary length immediately after reset. When a key preparation start signal 155 is asserted from the unit outside the AES Core 401 (T06), the parameter setting period finishes.

Simultaneously with the end of the parameter setting period, the next key preparation period starts. In the key preparation period, the Key Expansion unit generates a Round Key in advance. The key preparation period is the period from assertion of the key preparation start signal 155 (T06) to the timing (T12) six cycles later, at which the final Round Key (wkey10) is generated.

The operation of each circuit during the key preparation period will be described next. The Key Expansion unit 402 generates wkey1 using wkey0 as the cipher key 152 already in the key preparation period. Simultaneously with assertion of the key preparation start signal 155, wkey1 is held in the register of the Round Key A2 463 and output. In accordance with the assertion of the key preparation start signal 155, the control unit 404 counts up a counter signal 161 sequentially from 0. At T07, the Key Expansion unit 402 performs key expansion using wkey1 held as the Round Key A2 463 to generate wkey2 and wkey3 and outputs them as the Round Key A1 462 and the Round Key A2 463, respectively. In the next cycle (T08), the Key Expansion unit generates wkey4 and wkey5 using wkey3 output as the Round Key A2 463 and outputs them as the Round Key A1 462 and the Round Key A2 463, respectively. The Round Keys are generated in the same way so that wkey6 and wkey7 are output at the timing T09, and wkey8 and wkey9 are output at the timing T10 as the Round Key A1 462 and the Round Key A2 463, respectively. At the timing T11, the Key Expansion unit 402 generates wkey10 using wkey9 output as the Round Key A2 463 and outputs wkey10 as the Round Key B 163. From then on, wkey10 is continuously output as the Round Key B 163 until key preparation is executed again.

At the end of the key preparation period (T12), the Key Expansion unit 402 generates wkey1 using wkey0 supplied as the cipher key 152 and outputs initial Round Keys (wkey0 and wkey1) to be used in encryption/decryption as the Round Key A1 462 and the Round Key A2 463, respectively. The values of the Round Key A1 462 and the Round Key A2 463 are held until assertion of an encryption/decryption start signal 158. The control unit 404 stops counting up the counter signal 161 and clears the counter to 0.

Near the end of the key preparation period, and more specifically, in the fifth cycle (T11) after the start of key preparation, predicting that key preparation will finish in the next cycle (T12), and encryption is enabled, the control unit 404 asserts an control signal 157.

Upon detecting assertion of the control signal 157 at the timing T12, an input signal supply unit arranged outside the AES Core 401 supplies plaintext data P0 to the AES Core 401 as the input signal 150. The encryption/decryption start signal 158 is asserted to start encryption of the input signal 150 (T12). In the timing chart, the encryption/decryption start signal 158 is asserted in a shortest cycle. However, the timing is freely determined outside the AES Core 401.

In the encryption period, the input signal 150 is encrypted. The encryption period is the period from assertion of the encryption/decryption start signal 158 (T12) to the timing (T17) five cycles later.

Upon detecting assertion of the encryption/decryption start signal 158, the control unit 404 negates the control signal 157, a valid signal 159, and an output holding control signal 160 in the next cycle (T13). Simultaneously, the control unit 404 starts counting up the counter signal 161.

The Key Expansion unit 402 generates Round Keys as in the key preparation period and outputs, as the Round Key A1 462, wkey0 at the timing T12, wkey2 at the timing T13, . . . , and wkey8 at the timing T16. The Key Expansion unit 402 outputs, as the Round Key A2 463, wkey1 at the timing T12, wkey3 at the timing T13, . . . , and wkey9 at the timing T16.

From T12 to T13, the selection signal 171 is negated. Hence, the modified round function module 405 executes the sub-block transformations for the input signal 150 using wkey0 output as the Round Key A1. From T13 to T17, the selection signal 171 is asserted. Hence, the modified round function module 405 executes the sub-block transformations for the output signal from the data holding unit 108 using wkey2 from T13 to T14, wkey4 from T14 to T15, . . . , and wkey6 from T15 to T16.

On the other hand, the modified round function module 407 executes the sub-block transformations for the input signal 475 using wkey1 from T12 to T13, wkey3 from T13 to T14, wkey5 from T14 to T15, . . . , and wkey7 from T15 to T16.

In the final cycle (T16) of encryption, the control unit 404 asserts the selection signal 170. Accordingly, the selector 115 of the modified round function module 407 selects the output from the AddRoundKey Transformation module 114 which executes AddRoundKey Transformation using the Round Key B 163 so that the sub-block transformations of the final cycle are executed. At the timing T16, an output signal 166 of the modified round function module 407 outputs ciphertext data C0 that is the result of encryption of the plaintext data P0 as the input signal. One cycle after (T17), the data holding unit 108 externally outputs the value of the ciphertext data C0 as the output from the AES Core 401. Simultaneously, to notify the unit outside the AES Core 401 that the encryption is ended, and an output signal 151 is enabled, the control unit 404 asserts the valid signal 159 (T17). While the valid signal 159 is being asserted, the AES Core 401 guarantees that the output signal 151 is enabled.

On the other hand, the control signal 160 is kept negated because the valid signal 159 is asserted at the timing T17, but the encryption/decryption start signal 158 is also asserted at T17. If the encryption/decryption start signal 158 is not asserted at the timing T17, the control signal 160 is asserted at T17, and the value of the data holding unit 108 holds the ciphertext data C0.

At T17 when encryption finishes, the Key Expansion unit 402 outputs wkey0 as the Round Key A1 462 and wkey1 as the Round Key A2 463. The values of the Round Key A1 462 and the Round Key A2 463 are held until assertion of a next encryption/decryption start signal 156.

Predicting the end of the encryption (T17), the control unit 404 asserts the control signal 157 one cycle before (T16) the end. When the control signal 157 is asserted, the unit outside the AES Core 401 sets the value of the input signal 150 to next plaintext data P1 so that encryption of the second block can start. In the timing chart of FIGS. 56A and 56B, the unit outside the AES Core 401 asserts the next encryption/decryption start signal in a shortest cycle (T17). The second block encryption period is from T17 to T22, in which the same operation as that for the first block is performed. From then on, the encryption operation is repeatedly performed as many as a predetermined number of blocks. In the timing chart of FIGS. 56A and 56B, the encryption of the second block starts at a shortest interval from the end of the encryption of the first block. The AES Core can exhibit its maximum performance by executing the encryption of all blocks at such a timing. However, the encryption interval can fundamentally be set to an arbitrary length.

When the encryption of a predetermined number of blocks has completely finished, and the next job is to be executed using different parameters such as a cipher key, the processing starts again from parameter setting.

The decryption operation of the seventh embodiment will be described next.

Figure 57A:
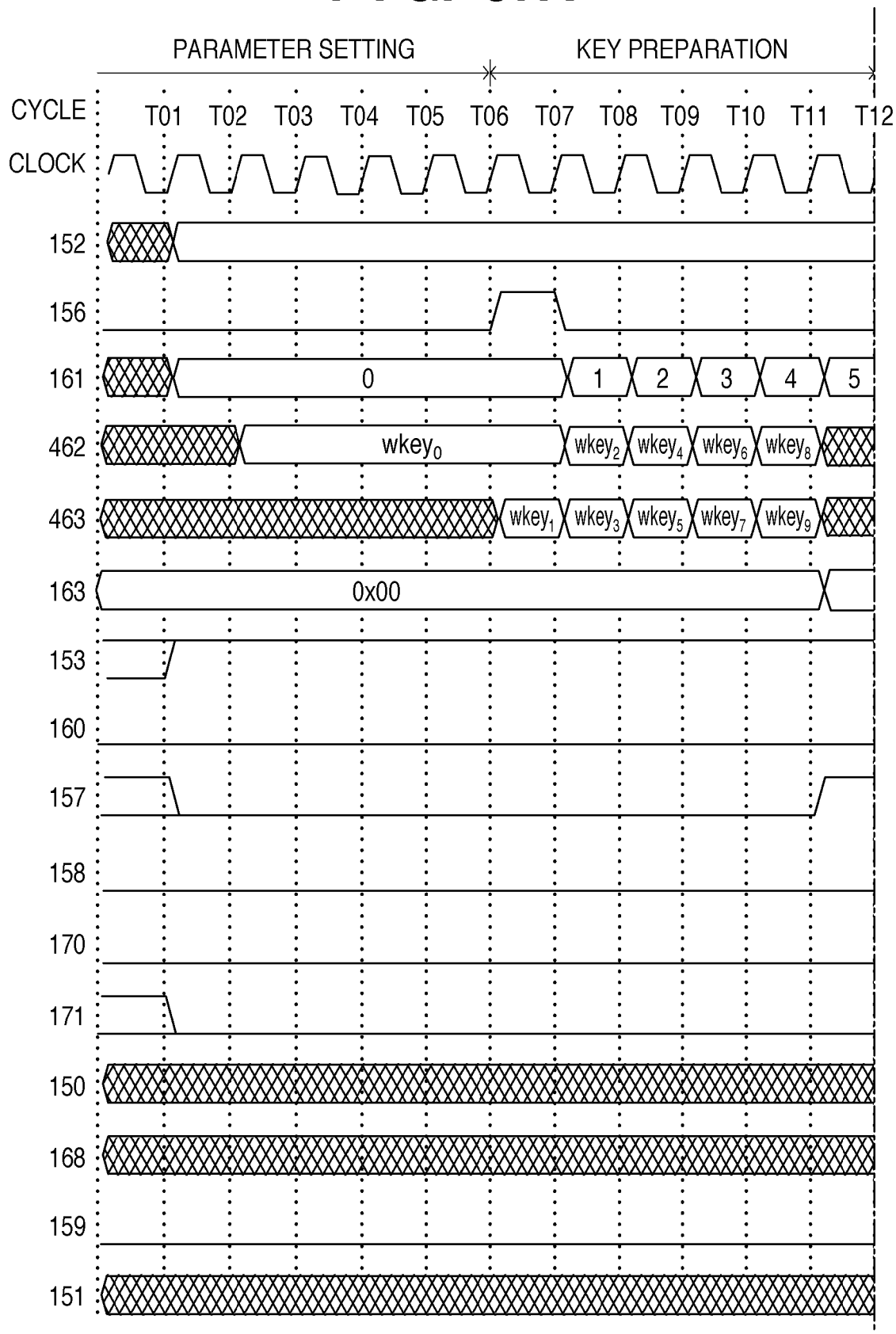
FIGS. 57A and 57B are a timing chart of decryption according to the seventh embodiment.
Figure 57B:
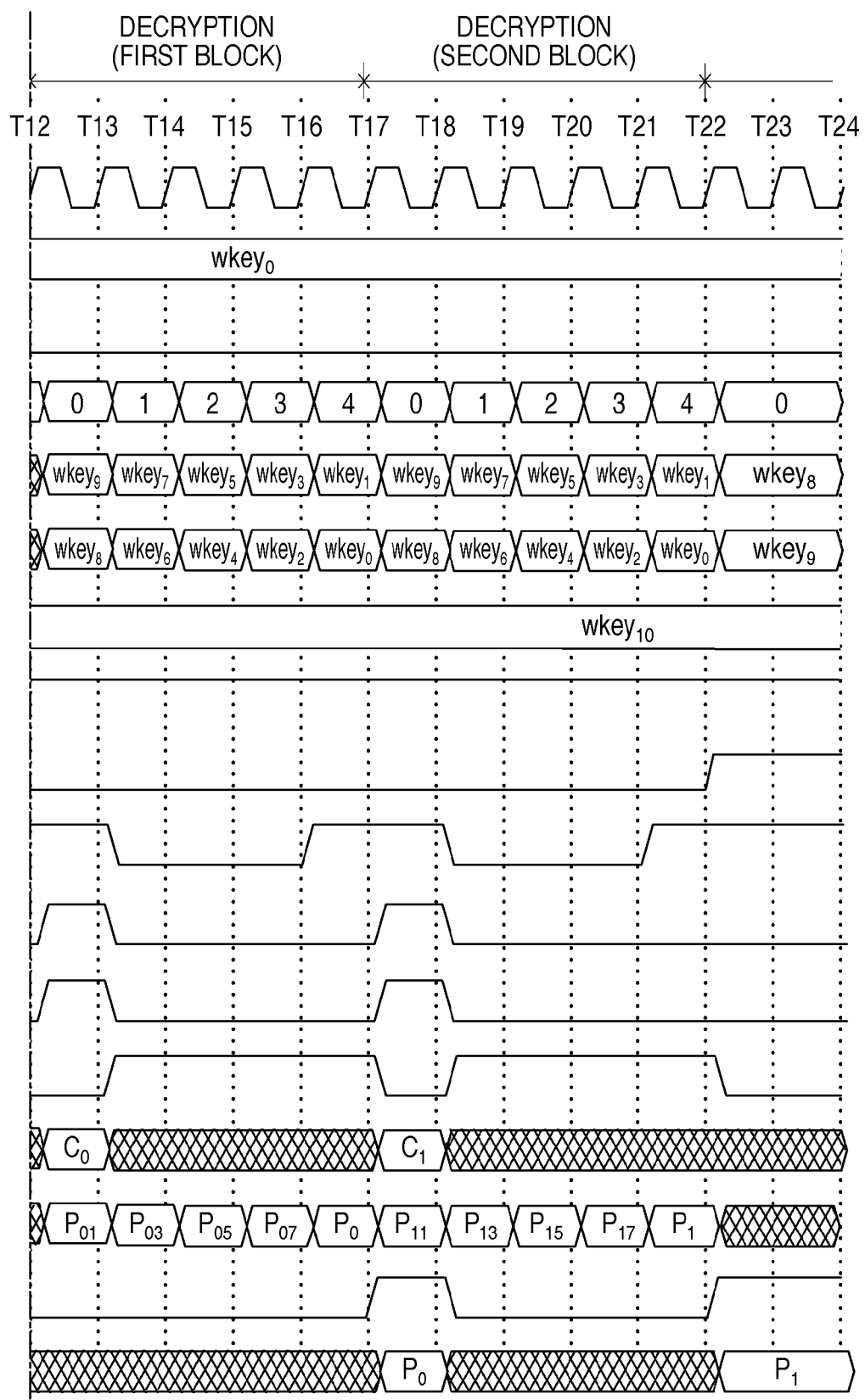

FIGS. 57A and 57B are a timing chart of decryption according to this embodiment. Referring to FIGS. 57A and 57B, the abscissa represents the time. Timing names T01, T02, . . . , T33 are assigned to the leading edges of the clock pulses. Three-digit numbers along the ordinate on the left end of FIG. 57A indicate signal lines and have a one-to-one correspondence with the reference numerals of the signal lines used in FIGS. 52 to 55.

The decryption operation is also roughly divided into four parts: parameter setting (T01 to T06), key preparation (T06 to T12), first block decryption (T12 to T17), and second block decryption (from T17).

The role, start condition, and end condition of the parameter setting period are the same as in encryption of the embodiment. However, the encryption/decryption selection signal 153 needs to be asserted in decryption.

The key preparation period is from T06 to T12, and its start condition and end condition are the same as in encryption of the embodiment. However, at the end of the key preparation period (T12), the Key Expansion unit 402 performs key expansion reversely using wkey10 held as the Round Key B 163 and outputs initial Round Keys (wkey9 and wkey8) to be used in decryption as the Round Key A1 462 and the Round Key A2 463, respectively. The values of the Round Key A1 462 and the Round Key A2 463 are held until assertion of the encryption/decryption start signal 158. The control unit 404 stops counting up the counter signal 161 and clears the counter to 0.

Near the end of the key preparation period, predicting that key preparation will finish at T12, and decryption is enabled, the control unit 404 asserts the control signal 157 at T11.

Upon detecting assertion of the control signal 157 at T12, the input signal supply unit arranged outside the AES Core 401 supplies the ciphertext data C0 to the AES Core 401 as the input signal 150. The encryption/decryption start signal 158 is asserted to start decryption of the input signal 150 (T12). In the timing chart, the encryption/decryption start signal 158 is asserted in a shortest cycle. However, the timing is freely determined outside the AES Core 401.

In the decryption period, the input signal 150 is decrypted. The decryption period is the period from assertion of the encryption/decryption start signal 158 (T12) to the timing (T17) five cycles later.

Upon detecting assertion of the encryption/decryption start signal 158, the control unit 404 negates the control signal 157, output holding signal 159, and control signal 160 in the next cycle (T13). Simultaneously, the control unit 404 starts counting up the counter signal 161.

At T13, the Key Expansion unit 402 performs key expansion using wkey8 held as the Round Key A2 463 to generate wkey7 and wkey6 and outputs them as the Round Key A1 462 and the Round Key A2 463, respectively. In the next cycle (T14), the Key Expansion unit generates wkey5 and wkey4 using wkey6 output as the Round Key A2 463 and outputs them as the Round Key A1 462 and the Round Key A2 463, respectively. The Round Keys are generated in the same way so that wkey3 and wkey2 are output at T15, and wkey1 and wkey0 are output at the timing T16 as the Round Key A1 462 and the Round Key A2 463, respectively.

In the first cycle (T12) of decryption, the control unit 404 negates the selection signal 171. For this reason, the plaintext data P0 of the input signal 150 is input to the modified round function module 406. Since the selection signal 170 is asserted, the modified round function module 406 switches the selector 118 to select the output from the AddRoundKey Transformation module 121 so that decryption of one cycle is executed. The output from the modified round function module 406 is directly input to the modified round function module 408 so that decryption of one more cycle is executed. The output result from the modified round function module 408 is held by the data holding unit 108.

In the next cycle (T13), the control unit 404 asserts the selection signal 171, and the output from the data holding unit is input to the modified round function module 406. Since the selection signal 170 is negated, the modified round function module 406 switches the selector 118 to select the output from the InvMixColumns Transformation module 116 so that decryption of one cycle is executed. The output from the modified round function module 406 is directly input to the modified round function module 408 so that decryption of one more cycle is executed. The processing is performed in the same way up to T16. The modified round function module 406 uses, as the Round Keys, wkey10 and wkey9 at T12, wkey7 at T13, wkey5 at T14, and wkey1 at T16. The modified round function module 408 uses, as the Round Keys, wkey8 at T12, wkey6 at T13, and wkey0 at T16.

At T16, the output signal 167 of the modified round function module 408 outputs the plaintext data P0 that is the result of decryption of the ciphertext data C0 as the input signal. One cycle after (T17), the data holding unit 108 externally outputs the value of the plaintext data P0 as the output from the AES Core 401. Simultaneously, to notify the unit outside the AES Core 401 that the decryption is ended, and the output signal 151 is enabled, the control unit 404 asserts the valid signal 159 (T17). While the valid signal 159 is being asserted, the AES Core 401 guarantees that the output signal 151 is enabled.

On the other hand, the control signal 160 is kept negated because the valid signal 159 is asserted at T17, but the encryption/decryption start signal 158 is also asserted at T17. If the encryption/decryption start signal 158 is not asserted at T17, the control signal 160 is asserted at T17, and the value of the data holding unit 108 holds the plaintext data P0.

At T17 when decryption finishes, the Key Expansion unit 402 outputs wkey9 as the Round Key A1 462 and wkey8 as the Round Key A2 463. The values of the Round Key A1 462 and the Round Key A2 463 are held until assertion of the next encryption/decryption start signal 156.

Predicting the end of the decryption (T17), the control unit 404 asserts the control signal 157 one cycle before (T16) the end. When the control signal 157 is asserted, the unit outside the AES Core 401 sets the value of the input signal 150 to next ciphertext data C1 so that decryption of the second block can start.

The second block decryption period is from T17 to T22, in which the same operation as that for the first block is performed. From then on, the decryption operation is repeatedly performed as many as a predetermined number of blocks. In the timing chart of FIGS. 57A and 57B, the decryption of the second block starts at a shortest interval from the end of the decryption of the first block. The AES Core can exhibit its maximum performance by executing the decryption of all blocks at such a timing. However, the decryption interval can fundamentally be set to an arbitrary length.

When the decryption of a predetermined number of blocks has completely finished, and the next job is to be executed using different parameters such as a cipher key, the processing starts again from parameter setting.

The seventh embodiment can be implemented in the above-described way. In the seventh embodiment, the number of clock cycles required for AES encryption and decryption is decreased by one without increasing the maximum value of which the summation of the signal processing time for each of the sub-block transformations in each clock cycle period. This raises the AES processing speed about 20%.

The first embodiment has been exemplified above. However, the same implementation can be possible even for any other embodiment.

The above-described seventh embodiment is merely an example of the present invention, and the effects of the present invention are not limited to those of the above-described embodiment.

Eighth Embodiment

As a general form of the seventh embodiment, the processes of N cycles in the first embodiment may be executed in one clock cycle. N is a natural number of 2 or more. In the eighth embodiment, a circuit arrangement for implementing this method will be described.

Circuits for executing the processes of N cycles in the first embodiment in one clock cycle can be classified into two types: a type in which the total number of cycles required for processing can be divided by N without a remainder, and a type in which the number cannot be divided by N. In, e.g., AES-128, the total number of cycles necessary for the processing is 10 (FIG. 1). A case in which N is 2 or 5 is classified into the former, and other cases are classified into the latter.

The case in which the total number of cycles can be divided by N without a remainder will be described first. In this case, N (N is a natural number of 2 or more) modified round function modules are implemented for each of encryption and decryption, as in the seventh embodiment in which N=2. Processing is executed using all modified round function modules in every clock cycle. At this time, the number of clock cycles necessary for the processing is 10/N.

Figure 58:
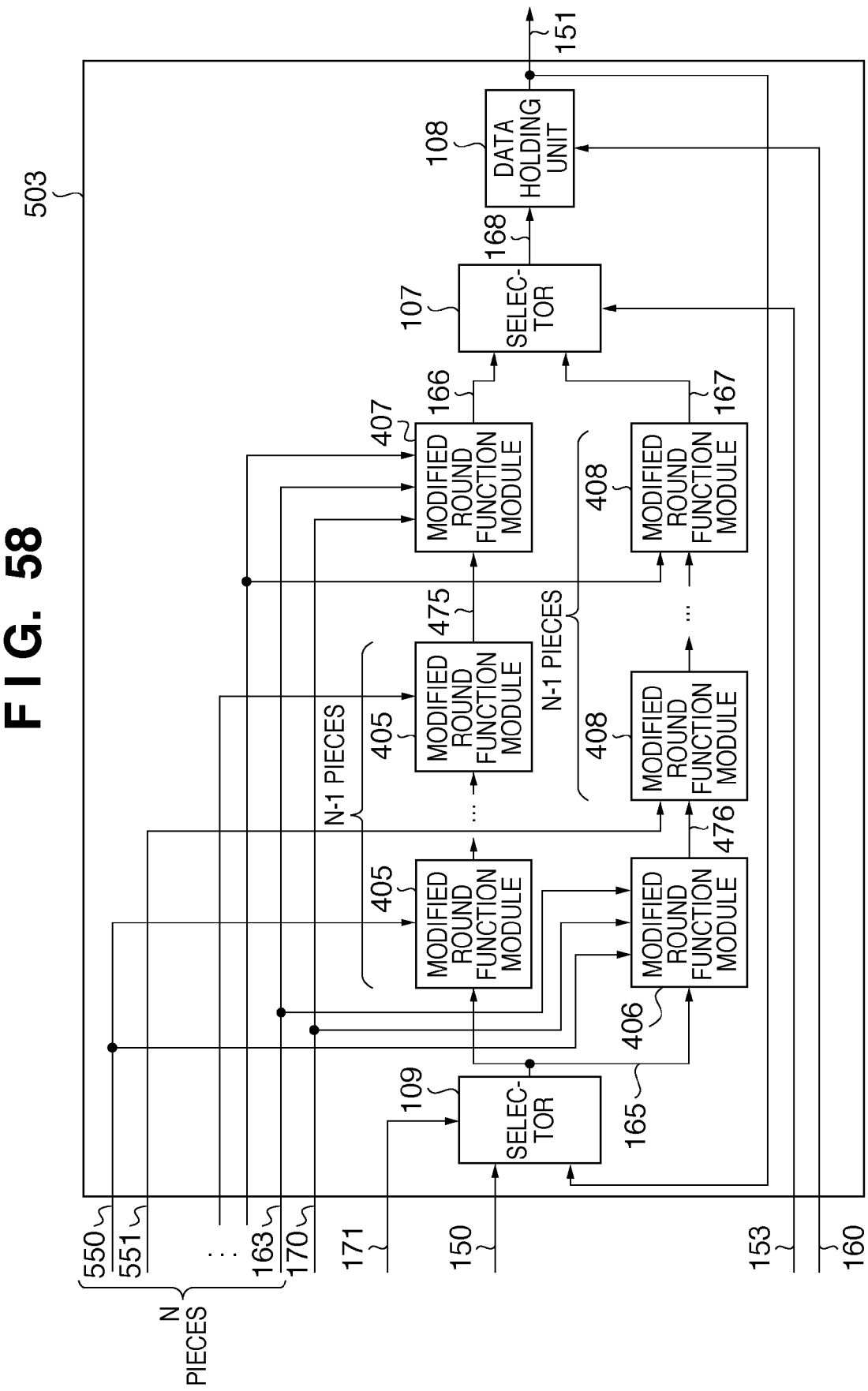
FIG. 58 is a block diagram of an encryption/decryption unit according to the eighth embodiment.

The circuit arrangement of an encryption/decryption unit when the total number of cycles in the first embodiment can be divided by N without a remainder will be described. FIG. 58 is a block diagram of an encryption/decryption unit according to the eighth embodiment. Referring to FIG. 58, reference numeral 503 denotes an encryption/decryption unit; 550, a Round Key A1; and 551, a Round Key A2. There are N Round Keys A including the Round Key A1 550 and the Round Key A2 551. The same reference numerals as in the seventh embodiment denote the same constituent elements and signal lines, and a description thereof will not be repeated.

In the above arrangement, the output of a selector 109 is connected to a modified round function module 405. (N−1) modified round function modules 405 are connected in series. The output of the final modified round function module 405 is connected to a modified round function module 407. The output of the selector 109 is also connected to a modified round function module 406. The output of the modified round function module 406 is connected to a modified round function module 408. (N−1) modified round function modules 408 are connected in series. The output of the final modified round function module 408 is connected to a selector 107. The modified round function modules 405 receive the Round Key A1 550, Round Key A2 551, and the remaining Round Keys A, respectively, in the connection order. The modified round function module 407 receives the Nth Round Key A and a Round Key B 163. The modified round function module 406 receives the Round Key A1 550 and the Round Key B 163. The modified round function modules 408 receive the Round Key A2 551 and the remaining Round Keys A, respectively, in the connection order. A description of constituent elements in FIG. 58, which have the same connection relationship as in the seventh embodiment, will be omitted.

The case in which the total number of cycles in the first embodiment cannot be divided by N without a remainder will be described next. In this case, N modified round function modules are implemented for each of encryption and decryption. It is also necessary to bypass some modified round function modules in a specific cycle of encryption or decryption. For example, when N=4, the processes of the 0th to third cycles in the first embodiment shown in FIG. 1 are executed in the 0th clock cycle. In the first clock cycle, the processes of the fourth to seventh cycles in the first embodiment in FIG. 1 are executed. In the second clock cycle, the processes of the eighth and ninth cycles in the first embodiment in FIG. 1 are executed. That is, if the total number of cycles cannot be divided by N without a remainder, all the four modified round function modules are used in the 0th and first clock cycles. In the second clock cycle, however, only two modified round function modules suffice. At this time, the number of clock cycles necessary for the processing is 10/N (the fractional portion is rounded up).

A variety of circuit arrangements are available when the total number of cycles in the first embodiment cannot be divided by N without a remainder. For example, a selector is provided immediately after each modified round function module shown in FIG. 58 to select whether to bypass the modified round function module, and each selector is switched in accordance with the number of cycles from the start of encryption or decryption. The circuit arrangement of this case can easily be imagined from FIG. 58, and a block diagram thereof will be omitted.

The eighth embodiment can be implemented in the above-described way. According to the first embodiment of the present invention, the total number of clock cycles necessary for processing is 10 in AES-128, 12 in AES-192, and 14 in AES-256. All circuits can be implemented by classifying them into the case in which the total number of cycles can be divided by N without a remainder, or the case in which the number cannot be divided by N, as described in this embodiment. A circuit arrangement for implementing all of AES-128, AES-192, and AES-256 is also possible. In this case, if N=1, or N=2, the total number of clock cycles necessary for processing can be divided by N without a remainder in all of AES-128, AES-192, and AES-256. Hence, the circuit can be implemented using the arrangement for the total number of clock cycles which can be divided by N without a remainder in this embodiment. Even when N takes any other value, a circuit for implementing all of AES-128, AES-192, and AES-256 can be formed using the arrangement of this embodiment which can select, as the output of the encryption/decryption unit, the output of an arbitrary one of N modified round function modules implemented in the encryption/decryption unit, as in the case in which the total number of cycles in the first embodiment cannot be divided by N without a remainder.

Ninth Embodiment

In the first to sixth embodiments of the present invention, the processing of one cycle does not fit in one clock cycle defined in some cases. In such a case, a new data holding unit is added to the modified round function module so that the processing of one cycle in the first to sixth embodiments is executed in a plurality of clock cycles. A circuit arrangement will be described as a detailed example, in which processing executed in one cycle in the first embodiment is executed in two clock cycles.

Figure 59:
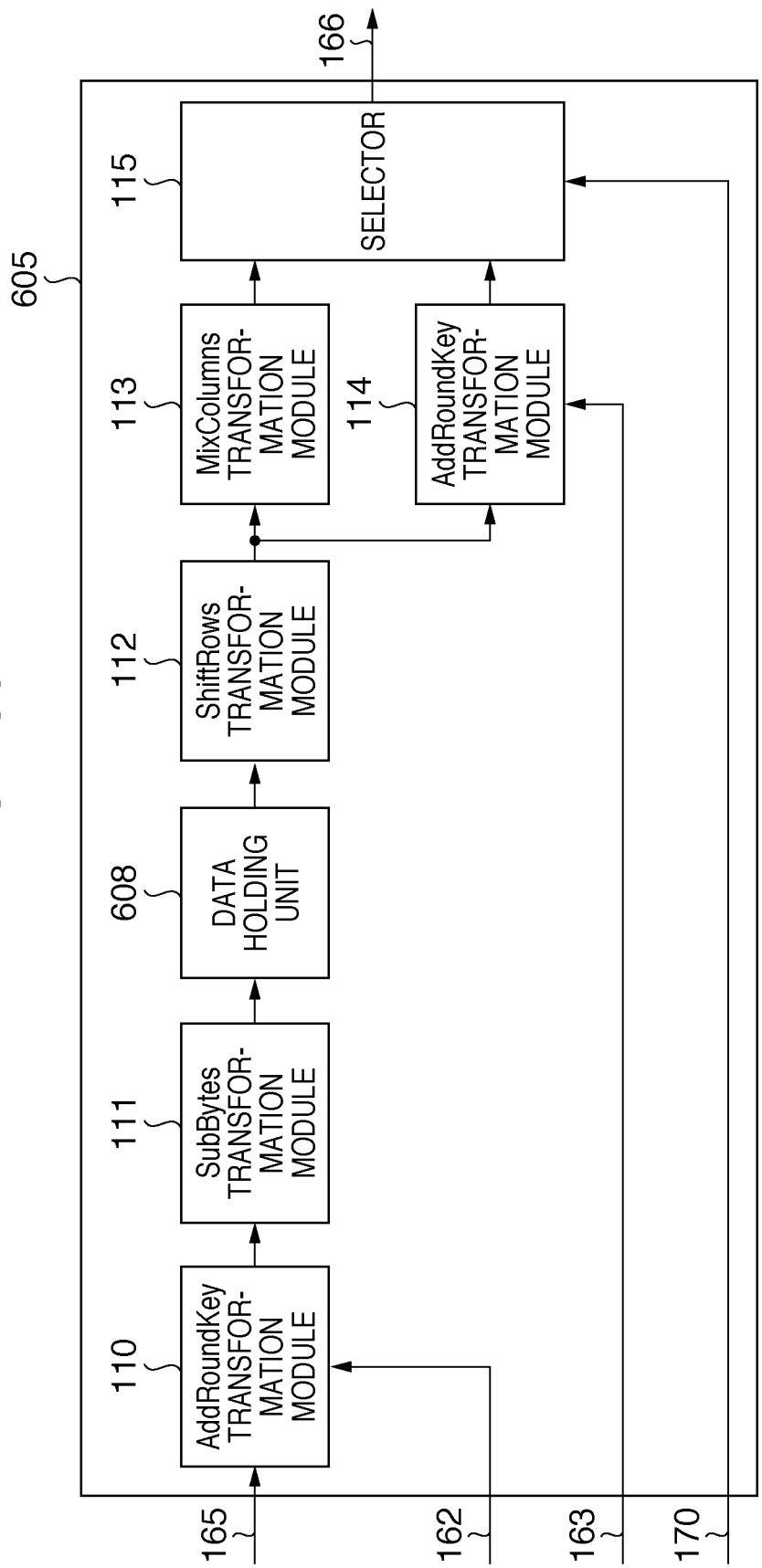
FIG. 59 is a block diagram of a modified round function module according to the ninth embodiment.

FIG. 59 shows an example in which a new data holding unit is added to the modified round function module of the first embodiment. Referring to FIG. 59, reference numeral 605 denotes the modified round function module, and a data holding unit 608 holds a result in progress of encryption.

In the above arrangement, the output from a SubBytes Transformation module 111 is input to the data holding unit 608. The output from the data holding unit 608 is input to a ShiftRows Transformation module 112.

Addition of a new data holding unit to the encryption unit enables to execute the processing of one cycle of the first embodiment in two clock cycles. In FIG. 59, the data holding unit 608 is added between the SubBytes Transformation module 111 and the ShiftRows Transformation module 112. However, the data holding unit can be connected to an arbitrary point. Alternatively, the SubBytes Transformation module 111 may incorporate a data holding unit.

In the above-described example, two clock cycles are required for the processing of one cycle of the first embodiment. However, the processing may be done in N clock cycles. In this case, (N−1) data holding units are newly added to arbitrary points between the transformation modules or implemented in the transformation modules.

The first embodiment has been exemplified above. However, the same implementation can be possible even for any other embodiment.

10th Embodiment

In the first to ninth embodiments of the present invention, the data update period of the data holding unit is one clock cycle. However, it is not always necessary.

Generally, the frequency of the operation clock of a CPU or DMA is high in many cases. If the data holding unit for encryption uses the same clock, it is impossible to ensure the summation of the signal processing time for each of the sub-block transformations in each clock cycle period, and the processing may not fit in one clock cycle.

In such a case, for example, if the summation of the signal processing time for each of the sub-block transformations in each clock cycle period is twice or less of one clock cycle, data update of the data holding unit may be done once in two clock cycles.

This arrangement can easily be implemented by newly inputting an enable signal to the data holding unit.

This embodiment will be described with reference to the timing charts of FIGS. 61A and 61B. FIG. 61A shows a timing chart when update of the data holding unit synchronizes with the clock cycle. In synchronism with the trailing edge of the clock cycle, the data holding unit updates data.

FIG. 61B shows a timing chart when update of the data holding unit does not synchronize with the clock cycle. An enable signal is input to the data holding unit and repeats HIGH and LOW at a period of ½ the clock. Only when the enable signal is HIGH, the data holding unit performs data update. Hence, the data holding unit updates data once in two clock cycles at the trailing edge of the clock.

In this case, the processing of one cycle is executed in two clock cycles.

In the example described in this embodiment, the processing of one cycle is executed in two clock cycles. However, the processing of one cycle may be executed in N clock cycles, as a matter of course.

In the first to ninth embodiments of the present invention, N clock cycles may be defined as one cycle.

The embodiments of the present invention have been described above. In each embodiment, AES-128 has been exemplified. However, AES-192 and AES-256 can also be implemented. Different points from the embodiments of AES-128 are the number of bits of a cipher key input to the Key Expansion unit, the number of Round Keys generated by the Key Expansion unit, and the Assert/Negate timings of the control signals. These can easily be implemented based on the same concept as described in each embodiment. The encryption/decryption unit and the modified round function modules require no changes from those described in the embodiments of AES-128.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2007-264967, filed Oct. 10, 2007, and No. 2008-233094 filed Sep. 11, 2008, which are hereby incorporated by reference herein in their entirety.

What is claimed is:

1. An Advanced Encryption Standard (AES) encryption circuit comprising:

a first AddRoundKey Transformation module for performing a first AddRoundKey Transformation operation;

a second AddRoundKey Transformation module for performing a second AddRoundKey Transformation operation;

a ShiftRows Transformation module for performing a ShiftRows Transformation operation;

a SubBytes Transformation module for performing a SubBytes Transformation operation;

a MixColumns Transformation module for performing a MixColumns Transformation operation; and a data holding unit, wherein, in a plurality of clock cycles, an encryption is executed using said first AddRoundkey Transformation module, said second AddRoundkey Transformation module, said ShiftRows Transformation module, said SubBytes Transformation module, said MixColumns Transformation module and said data holding unit, wherein, in a last clock cycle of the plurality of clock cycles, said first AddRoundKey Transformation module and said second AddRoundKey Transformation module are both used and said MixColumns Transformation module is not used, wherein, in other clock cycles other than the last clock cycle among the plurality of clock cycles, either said first AddRoundKey Transformation module or said second AddRoundKey Transformation module, but not both, is used, wherein each of the steps in the plurality of clock cycles is performed sequentially, and wherein, in a first clock cycle of encryption, said first AddRoundKey Transformation module inputs plaintext data, said SubBytes Transformation module inputs the output from said first AddRoundKey Transformation module, said ShiftRows Transformation module inputs the output from said SubBytes Transformation module, said MixColumns Transformation module inputs the output from said ShiftRows Transformation module, and said data holding unit inputs the output from said MixColumns Transformation module, in each clock cycle of encryption from a second clock cycle to an (Nr−1)th clock cycle, where Nr is a number of rounds, said first AddRoundKey Transformation module inputs the output from said data holding unit, said SubBytes Transformation module inputs the output from said first AddRoundKey Transformation module, said ShiftRows Transformation module inputs the output from said SubBytes Transformation module, said MixColumns Transformation module inputs the output from said ShiftRows Transformation module, and said data holding unit inputs the output from said MixColumns Transformation module, and in an Nrth clock cycle of encryption, said first AddRoundKey Transformation module inputs the output from said data holding unit, said SubBytes Transformation module inputs the output from said first AddRoundKey Transformation module, said ShiftRows Transformation module inputs the output from said SubBytes Transformation module, said second AddRoundKey Transformation module inputs the output from said ShiftRows Transformation module, and said data holding unit inputs the output from said second AddRoundKey Transformation module.

2. The circuit according to claim 1, further comprising:

a Key Expansion unit which generates a Round Key from a Cipher Key and supplies the Round Key to either said first AddRoundKey Transformation module or said second AddRoundKey Transformation module; and a control unit which counts a clock cycle from a start of encryption and generates a control signal to execute the encryption.

3. An Advanced Encryption Standard (AES) decryption circuit comprising:

a first AddRoundKey Transformation module for performing a first AddRoundKey Transformation operation;

a second AddRoundKey Transformation module for performing a second AddRoundKey Transformation operation;

an InvShiftRows Transformation module for performing an InvShiftRows Transformation operation;

an InvSubBytes Transformation module for performing an InvSubBytes Transformation operation;

an InvMixColumns Transformation module for performing an InvMixColumns Transformation operation; and a data holding unit, wherein, in a plurality of clock cycles, a decryption is executed using said first AddRoundkey Transformation module, said second AddRoundkey Transformation module, said InvShiftRows Transformation module, said InvSubBytes Transformation module, said InvMixColumns Transformation module and said data holding unit, wherein, in a leading clock cycle of the plurality of clock cycles, said first AddRoundKey Transformation module and said second AddRoundKey Transformation module are both used, and said InvMixColumns Transformation module is not used, wherein, in other clock cycles other than the leading clock cycle among the plurality of clock cycles, either said first AddRoundKey Transformation module or said second AddRoundKey Transformation module, but not both, is used, wherein each of the steps in the plurality of clock cycles is performed sequentially, and wherein, in a first clock cycle of decryption, said first AddRoundKey Transformation module inputs ciphertext data, said InvShiftRows Transformation module inputs the output from said first AddRoundKey Transformation module, said InvSubBytes Transformation module inputs the output from said InvShiftRows Transformation module, said second AddRoundKey Transformation module inputs the output from said InvSubBytes Transformation module, and said data holding unit inputs the output from said second AddRoundKey Transformation module, in each clock cycle of decryption from a second clock cycle to an (Nr−1)th clock cycle, where Nr is a number of rounds, said InvMixColumns Transformation module inputs the output from said data holding unit, said InvShiftRows Transformation module inputs the output from said InvMixColumns Transformation module, said InvSubBytes Transformation module inputs the output from said InvShiftRows Transformation module, said second AddRoundKey Transformation module inputs the output from said InvSubBytes Transformation module, and said data holding unit inputs the output from said second AddRoundKey Transformation module, and in an Nrth clock cycle of decryption, said InvMixColumns Transformation module inputs the output from said data holding unit, said InvShiftRows Transformation module inputs the output from said InvMixColumns Transformation module, said InvSubBytes Transformation module inputs the output from said InvShiftRows Transformation module, said second AddRoundKey Transformation module inputs the output from said InvSubBytes Transformation module, and said data holding unit inputs the output from said second AddRoundKey Transformation module.

4. The circuit according to claim 3, further comprising:

a Key Expansion unit which generates a Round Key from a Cipher Key and supplies the Round Key to said first AddRoundKey Transformation module or said second AddRoundKey Transformation module; and a control unit which counts a clock cycle from a start of decryption and generates a control signal to execute the decryption.

5. An Advanced Encryption Standard (AES) encryption circuit comprising:

a first AddRoundKey Transformation module for performing a first AddRoundKey Transformation operation;

a second AddRoundKey Transformation module for performing a second AddRoundKey Transformation operation;

a third AddRoundKey Transformation module for performing a third AddRoundKey Transformation operation;

a first ShiftRows Transformation module for performing a first ShiftRows Transformation module operation;

a second ShiftRows Transformation module for performing a second ShiftRows Transformation module operation;

a first SubBytes Transformation module for performing a first SubBytes Transformation operation;

a second SubBytes Transformation module for performing a second SubBytes Transformation operation;

a first MixColumns Transformation module for performing a first MixColumns Transformation operation;

a second MixColumns Transformation module for performing a second MixColumns Transformation operation; and a data holding unit, wherein, in a plurality of clock cycles, an encryption is executed using said first AddRoundKey Transformation module, said second AddRoundKey Transformation module, said third AddRoundKey Transformation module, said first ShiftRows Transformation module, said second ShiftRows Transformation module, said first SubBytes Transformation module, said second SubBytes Transformation module, said first MixColumns Transformation module, said second MixColumns Transformation module and said data holding unit, wherein, in one clock cycle of the plurality of clock cycles, said first AddRoundKey Transformation module, said second AddRoundKey Transformation module and said third AddRoundKey Transformation module are all used, wherein, in other clock cycles other than the one clock cycle among the plurality of clock cycles, two of said first AddRoundKey Transformation module, said second AddRoundKey Transformation module and said third AddRoundKey Transformation module, but not all three, are used, wherein each of the steps in the plurality of clock cycles is performed sequentially, and wherein, in a first clock cycle of encryption,
  said first AddRoundKey Transformation module inputs plaintext data,
  said first SubBytes Transformation module inputs the output from said first AddRoundKey Transformation module,
  said first ShiftRows Transformation module inputs the output from said first SubBytes Transformation module,
  said first MixColumns Transformation module inputs the output from said first ShiftRows Transformation module,
  said second AddRoundKey Transformation module inputs the output from said first MixColumns Transformation module,
  said second SubBytes Transformation module inputs the output from said second AddRoundKey Transformation module,
  said second ShiftRows Transformation module inputs the output from said second SubBytes Transformation module,
  said second MixColumns Transformation module inputs the output from said second ShiftRows Transformation module, and
  said data holding unit inputs the output from said second MixColumns Transformation module, in each clock cycle of encryption from a second clock cycle to an (Nr/2−1)th clock cycle, where Nr is a number of rounds,
  said first AddRoundKey Transformation module inputs the output from said data holding unit,
  said first SubBytes Transformation module inputs the output from said first AddRoundKey Transformation module,
  said first ShiftRows Transformation module inputs the output from said first SubBytes Transformation module,
  said first MixColumns Transformation module inputs the output from said first ShiftRows Transformation module,
  said second AddRoundKey Transformation module inputs the output from said first MixColumns Transformation module,
  said second SubBytes Transformation module inputs the output from said second AddRoundKey Transformation module,
  said second ShiftRows Transformation module inputs the output from said second SubBytes Transformation module,
  said second MixColumns Transformation module inputs the output from said second ShiftRows Transformation module, and
  said data holding unit inputs the output from said second MixColumns Transformation module, and in an (Nr/2)th clock cycle of encryption,
  said first AddRoundKey Transformation module inputs the output from said data holding unit,
  said first SubBytes Transformation module inputs the output from said first AddRoundKey Transformation module,
  said first ShiftRows Transformation module inputs the output from said first SubBytes Transformation module,
  said first MixColumns Transformation module inputs the output from said first ShiftRows Transformation module,
  said second AddRoundKey Transformation module inputs the output from said first MixColumns Transformation module,
  said second SubBytes Transformation module inputs the output from said second AddRoundKey Transformation module,
  said second ShiftRows Transformation module inputs the output from said second SubBytes Transformation module,
  said third AddRoundKey Transformation module inputs the output from said second ShiftRows Transformation module, and
  said data holding unit inputs the output from said third AddRoundKey Transformation module.

6. The circuit according to claim 5, further comprising:
  a Key Expansion unit which generates a Round Key from a Cipher Key and supplies the Round Key to said first AddRoundKey Transformation module, said second AddRoundKey Transformation module or said third AddRoundKey Transformation module; and
  a control unit which counts a clock cycle from a start of encryption and generates a control signal to execute the encryption.

7. An Advanced Encryption Standard (AES) decryption circuit comprising:
  a first AddRoundKey Transformation module for performing a first AddRoundKey Transformation operation;
  a second AddRoundKey Transformation module for performing a second AddRoundKey Transformation operation;
  a third AddRoundKey Transformation module for performing a third AddRoundKey Transformation operation;
  a first InvShiftRows Transformation module for performing a first InvShiftRows Transformation operation;
  a second InvShiftRows Transformation module for performing a second InvShiftRows Transformation operation;
  a first InvSubBytes Transformation module for performing a first InvSubBytes Transformation operation;
  a second InvSubBytes Transformation module for performing a second InvSubBytes Transformation operation;
  a first InvMixColumns Transformation module for performing a first InvMixColumns Transformation operation;

a second InvMixColumns Transformation module for performing a second InvMixColumns Transformation operation; and a data holding unit, wherein, in a plurality of clock cycles, a decryption is executed using said first AddRoundKey Transformation module, said second AddRoundKey Transformation module, said third AddRoundKey Transformation module, said first InvShiftRows Transformation module, said second InvShiftRows Transformation module, said first InvSubBytes Transformation module, said second InvSubBytes Transformation module, said first InvMixColumns Transformation module, said second InvMixColumns Transformation module and said data holding unit, wherein, in one clock cycle of the plurality of clock cycles, said first AddRoundKey Transformation module, said second AddRoundKey Transformation module and said third AddRoundKey Transformation module are all used, wherein, in other clock cycles other than the one clock cycle among the plurality of clock cycles, two of said first AddRoundKey Transformation module, said second AddRoundKey Transformation module and said third AddRoundKey Transformation module, but not all three, are used, wherein each of the steps in the plurality of clock cycles is performed sequentially, and wherein, in a first clock cycle of decryption, said first AddRoundKey Transformation module inputs ciphertext data, said first InvSubBytes Transformation module inputs the output from said first AddRoundKey Transformation module, said first InvShiftRows Transformation module inputs the output from said first InvSubBytes Transformation module, said first InvMixColumns Transformation module inputs the output from said first InvShiftRows Transformation module, said second AddRoundKey Transformation module inputs the output from said first MixColumns Transformation module, said second InvSubBytes Transformation module inputs the output from said second AddRoundKey Transformation module, said second InvShiftRows Transformation module inputs the output from said second SubBytes Transformation module, said second InvMixColumns Transformation module inputs the output from said second InvShiftRows Transformation module, and said data holding unit inputs the output from said second InvMixColumns Transformation module, in each clock cycle of decryption from a second clock cycle to an (Nr/2−1)th clock cycle, where Nr is a number of rounds, said first AddRoundKey Transformation module inputs the output from said data holding unit, said first InvSubBytes Transformation module inputs the output from said first AddRoundKey Transformation module, said first InvShiftRows Transformation module inputs the output from said first InvSubBytes Transformation module, said first InvMixColumns Transformation module inputs the output from said first InvShiftRows Transformation module, said second AddRoundKey Transformation module inputs the output from said second InvMixColumns Transformation module, said second InvSubBytes Transformation module inputs the output from said second AddRoundKey Transformation module, said second InvShiftRows Transformation module inputs the output from said second SubBytes Transformation module, said second InvMixColumns Transformation module inputs the output from said second InvShiftRows Transformation module, and said data holding unit inputs the output from said second InvMixColumns Transformation module, in an (Nr/2)th clock cycle of decryption, said first AddRoundKey Transformation module inputs the output from said data holding unit, said first InvSubBytes Transformation module inputs the output from said first AddRoundKey Transformation module, said first InvShiftRows Transformation module inputs the output from said first InvSubBytes Transformation module, said first InvMixColumns Transformation module inputs the output from said first InvShiftRows Transformation module, said second AddRoundKey Transformation module inputs the output from said first InvMixColumns Transformation module, said second InvSubBytes Transformation module inputs the output from said second AddRoundKey Transformation module, said second InvShiftRows Transformation module inputs the output from said second InvSubBytes Transformation module, said third AddRoundKey Transformation module inputs the output from said second InvShiftRows Transformation module, and said data holding unit inputs the output from said third AddRoundKey Transformation module.

8. The circuit according to claim 7, further comprising:

a Key Expansion unit which generates a Round Key from a Cipher Key and supplies the Round Key to said first AddRoundKey Transformation module, said second AddRoundKey Transformation module or said third AddRoundKey Transformation module; and a control unit which counts a clock cycle from a start of decryption and generates a control signal to execute the decryption.

* * * * *